US012162308B2

(12) United States Patent
    Tsiberidis

(10) Patent No.: US 12,162,308 B2
(45) Date of Patent: Dec. 10, 2024

(54) EMERGENCY WHEEL

(71) Applicant: KT Projektentwicklungs GmbH, Heilbronn (DE)

(72) Inventor: Konstantinos Tsiberidis, Untergruppenbach (DE)

(73) Assignee: KT Projektentwicklungs GmbH, Heilbronn (DE)

( * ) Notice: Subject to any disclaimer, the term of this patent is extended or adjusted under 35 U.S.C. 154(b) by 756 days.

(21) Appl. No.: 17/415,184

(22) PCT Filed: Dec. 18, 2019

(86) PCT No.: PCT/EP2019/085891
§ 371 (c)(1),
(2) Date: Jul. 30, 2021

(87) PCT Pub. No.: WO2020/127447
PCT Pub. Date: Jun. 25, 2020

(65) Prior Publication Data
US 2022/0041011 A1    Feb. 10, 2022

(30) Foreign Application Priority Data
Dec. 20, 2018  (DE) ..................... 10 2018 010 081.3

(51) Int. Cl.
    *B60B 11/10*    (2006.01)
    *B60B 15/26*    (2006.01)
(52) U.S. Cl.
    CPC .............. *B60B 11/10* (2013.01); *B60B 15/26* (2013.01); *B60B 2900/212* (2013.01); *B60B 2900/731* (2013.01)
(58) Field of Classification Search
    CPC ....... B60B 11/10; B60B 15/26; B60B 15/263; B60B 19/00; B60B 2900/212; B60B 2900/731; B60B 25/02
    (Continued)

(56) References Cited

U.S. PATENT DOCUMENTS 1,055,372 A    6/1913   Turnbull
1,558,864 A   10/1925   Goyette
                        (Continued)

FOREIGN PATENT DOCUMENTS

CN      103072438 A  *  5/2013   ............ B60C 17/04
DE       1240430 B1    5/1967
                        (Continued)

OTHER PUBLICATIONS

International Search Report and Written Opinion, completed Apr. 18, 2011 and issued in connection with PCT/EP2018/052144, 19 pages.
(Continued)

*Primary Examiner* — S. Joseph Morano
*Assistant Examiner* — Eva L Comino
(74) *Attorney, Agent, or Firm* — Barnes & Thornburg LLP

(57) ABSTRACT

An attachment is provided for a vehicle wheel, having a rim and a tire arranged on the rim, for enabling a driving operation with a restricted tire function in an operating state in which the attachment is fastened on the vehicle wheel. The attachment may include a stationary section configured to be fastened immovably with respect to the rim in the operating state in which the attachment is fastened on the vehicle wheel, a tread section with a tread for contacting the road, and at least two clamping devices configured to engage behind a section of the rim to fasten the attachment on the vehicle wheel, wherein the tread includes at least one tread segment arranged movably in a circumferential direction with respect to the stationary section in the operating state in which the attachment is fastened on the vehicle wheel.

26 Claims, 92 Drawing Sheets

(58) Field of Classification Search
USPC ...................................... 301/201, 38.1, 40.2
See application file for complete search history.

(56) References Cited

U.S. PATENT DOCUMENTS

| | | | |
|---|---|---|---|
| 1,593,129 A | | 7/1926 | Matthews |
| 1,823,660 A | * | 9/1931 | Nehin .................... B60B 11/10 |
| | | | 301/40.3 |
| 2,083,367 A | | 6/1937 | Fuller |
| 2,212,076 A | | 8/1940 | Rollings |
| 2,454,923 A | | 11/1948 | Howell, Jr. |
| 2,494,850 A | | 1/1950 | Williams |
| 2,912,035 A | | 11/1959 | Hill |
| 2,989,347 A | | 6/1961 | Leopold |
| 3,112,784 A | | 12/1963 | Montenare |
| 3,608,970 A | * | 9/1971 | Strumbos ................ B60C 17/00 |
| | | | 301/38.1 |
| 3,679,267 A | * | 7/1972 | Zachmann ............. B60B 11/10 |
| | | | 301/38.1 |
| 4,666,216 A | * | 5/1987 | Smith .................... B60B 11/10 |
| | | | 301/40.4 |
| 5,772,286 A | | 6/1998 | Jordan |
| 6,068,346 A | | 5/2000 | Pender |
| 6,217,125 B1 | | 4/2001 | Tubetto |
| 8,251,458 B2 | | 8/2012 | Biesse |
| 9,404,522 B2 | | 8/2016 | Zhou |
| 11,498,359 B2 | | 11/2022 | Tsiberidis |
| 2009/0267404 A1 | | 10/2009 | Thompkins |
| 2021/0039432 A1 | | 2/2021 | Tsiberidis |
| 2021/0053391 A1 | | 2/2021 | Tsiberidis |

FOREIGN PATENT DOCUMENTS

| | | |
|---|---|---|
| DE | 1480751 A1 | 5/1969 |
| DE | 3816415 A1 | 11/1989 |
| DE | 102011010509 A1 | 8/2012 |
| DE | 102017103101 A1 | 8/2018 |
| DE | 102017105302 A1 | 9/2018 |
| EP | 0606946 A1 | 7/1994 |
| EP | 2048003 A1 | 4/2009 |
| EP | 2662222 A1 | 11/2013 |
| EP | 3112205 A1 | 1/2017 |
| FR | 1043038 A | 11/1953 |
| GB | 857897 A | 1/1961 |
| WO | 198705866 A1 | 10/1987 |
| WO | 2001038106 A | 5/2001 |
| WO | 2006123044 A2 | 11/2006 |
| WO | 2018167040 A2 | 9/2018 |
| WO | 2019072775 A1 | 4/2019 |
| WO | 2019141817 A1 | 7/2019 |

OTHER PUBLICATIONS

International Preliminary Report on Patentability, issued Jul. 30, 2019 in connection with PCT/EP2018/052144, 14 pages.
International Search Report and Written Opinion, completed Jun. 8, 2018 and issued in connection with PCT/EP2018/053764, 25 pages.
International Preliminary Report on Patentability, mailed Jul. 20, 2019 in connection with PCT/EP2018/053764, 19 pages.
PCT International Search Report and Written Opinion completed by the ISA/EP on Oct. 11, 2018 and issued in connection with PCT/EP2018/068293, 19 pages.
International Preliminary Report on Patentability, mailed Jan. 7, 2020 in connection with PCT/EP2018/068293, 15 pages.
PCT International Search Report and Written Opinion completed by the ISA/EP on Oct. 12, 2018 and issued in connection with PCT/EP2018/068295, 22 pages.
International Preliminary Report on Patentability, issued Jan. 7, 2020 in connection with PCT/EP2018/068295, 18 pages.
PCT International Search Report and Written Opinion completed by the ISA/EP on Jan. 16, 2019 and issued in connection with PCT/EP2018/077353, 13 pages.
PCT International Preliminary Examination Report mailed by the IPEA/EP on Jan. 16, 2020 and issued in connection with PCT/EP2018/077353, 18 pages.
PCT International Search Report and Written Opinion completed by the ISA/EP on Jan. 9, 2019 and issued in connection with PCT/EP2018/077963, 12 pages.
PCT International Preliminary Examination Report mailed by the IPEA/EP on Nov. 5, 2019 and issued in connection with PCT/EP2018/077963, 20 pages.
PCT International Search Report and Written Opinion completed by the ISA/EP on May 9, 2019 and issued in connection with PCT/EP2019/051264, 12 pages.
PCT International Preliminary Examination Report mailed by the IPEA/EP on Dec. 17, 2019 and issued in connection with PCT/EP2019/051264, 21 pages.
PCT International Search Report and Written Opinion completed by the ISA/EP on May 9, 2019 and issued in connection with PCT/EP2019/051265, 25 pages.
PCT International Preliminary Examination Report completed by the IPEA/EP on May 19, 2020 and issued in connection with PCT/EP2019/051265, 26 pages.
Communication pursuant to Rule 71(3) EPC with intent to grant in co-pending application EP19832632A—12 pages.
PCT International Search Report and Written Opinion completed by the ISA/EP on Jul. 22, 2020 and issued in connection with PCT/EP2019/085891.

* cited by examiner

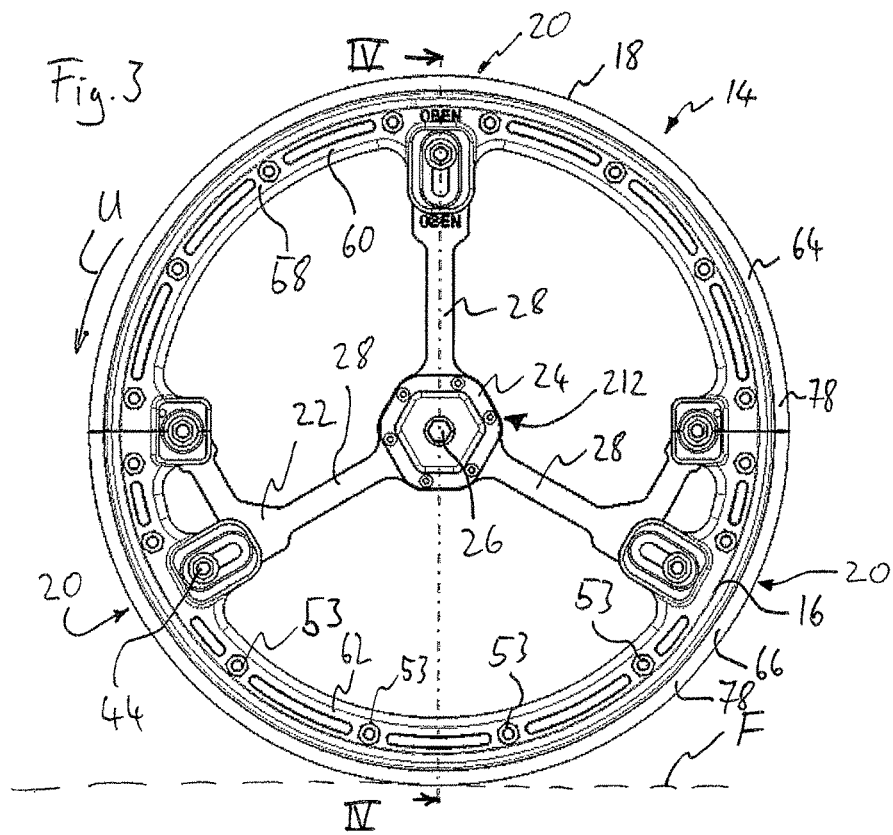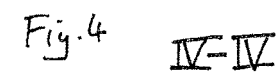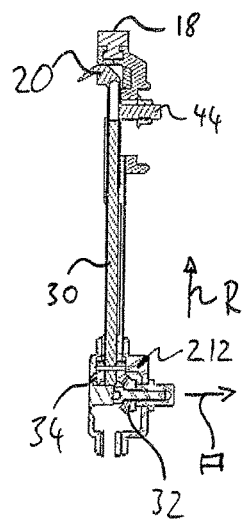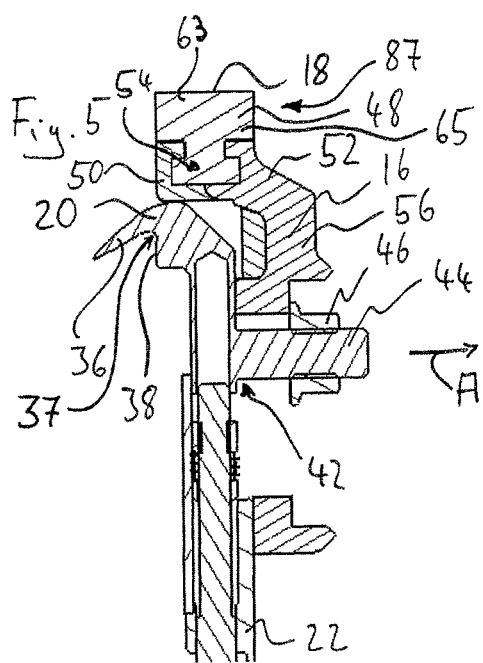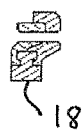

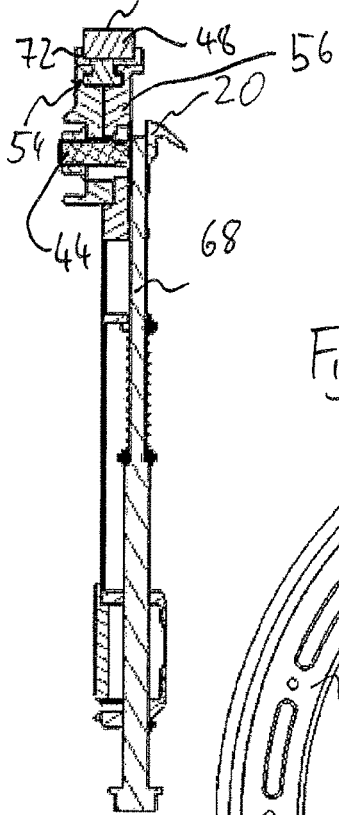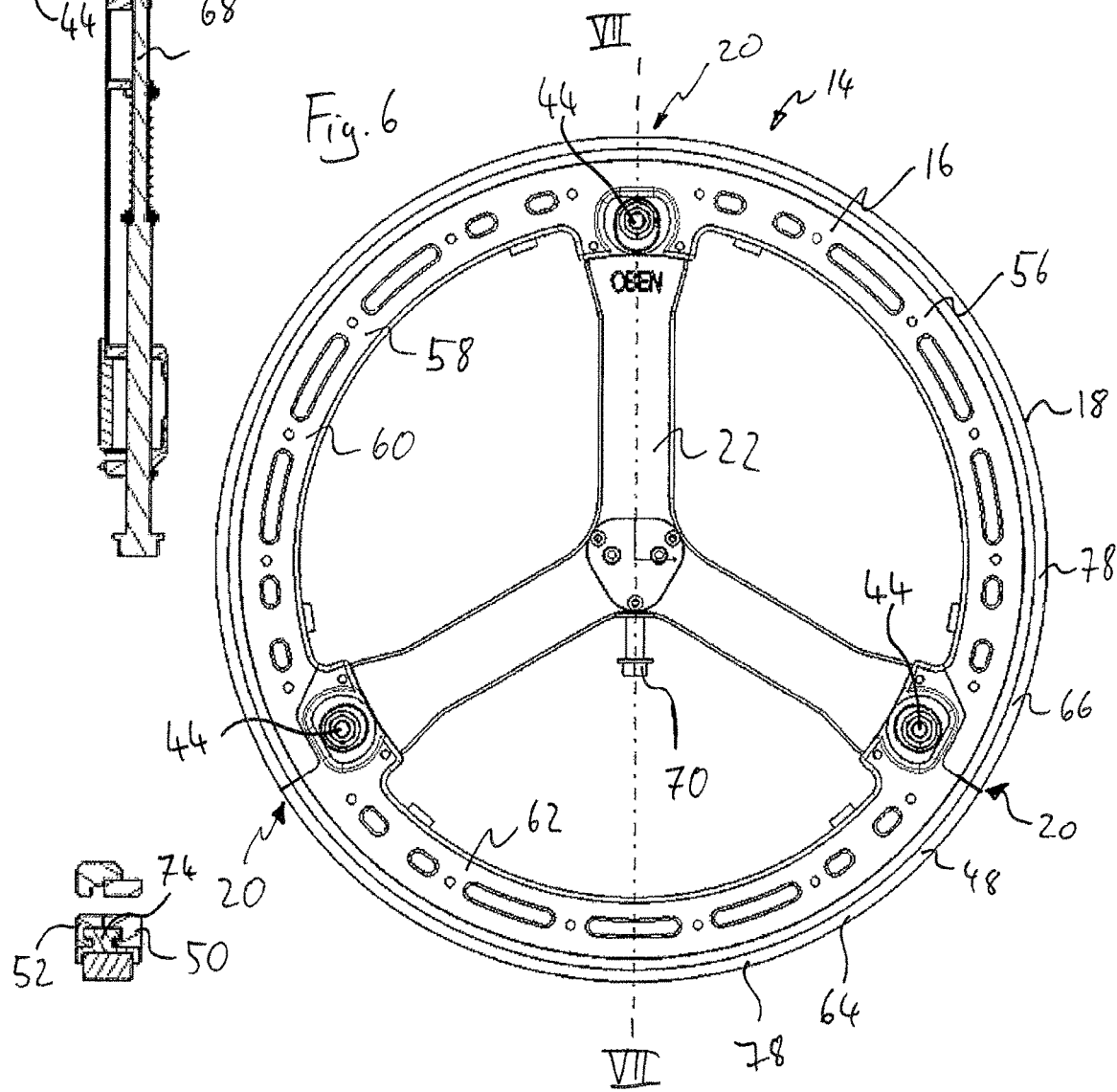

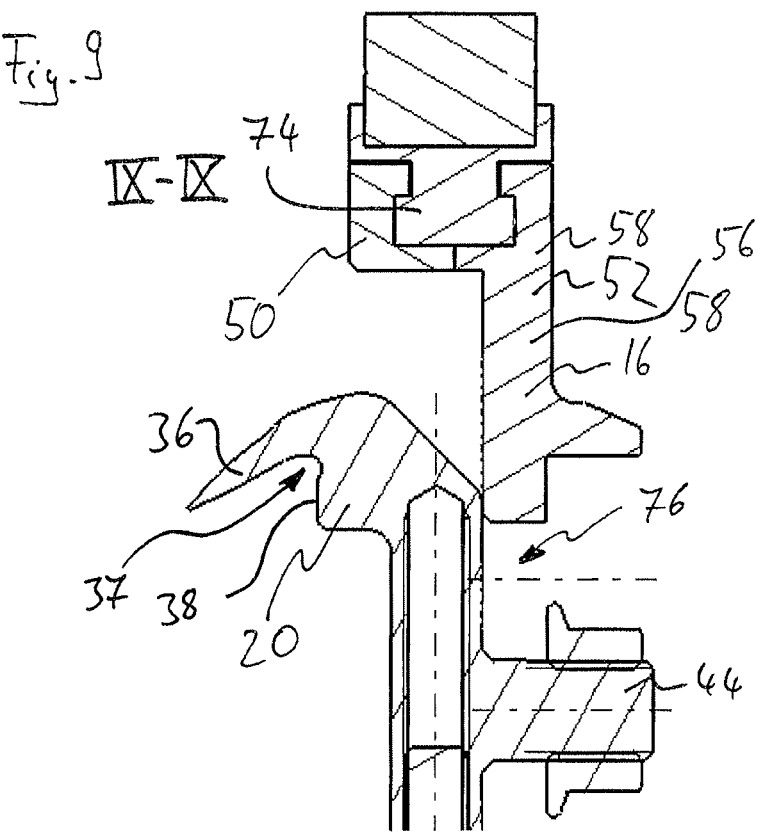
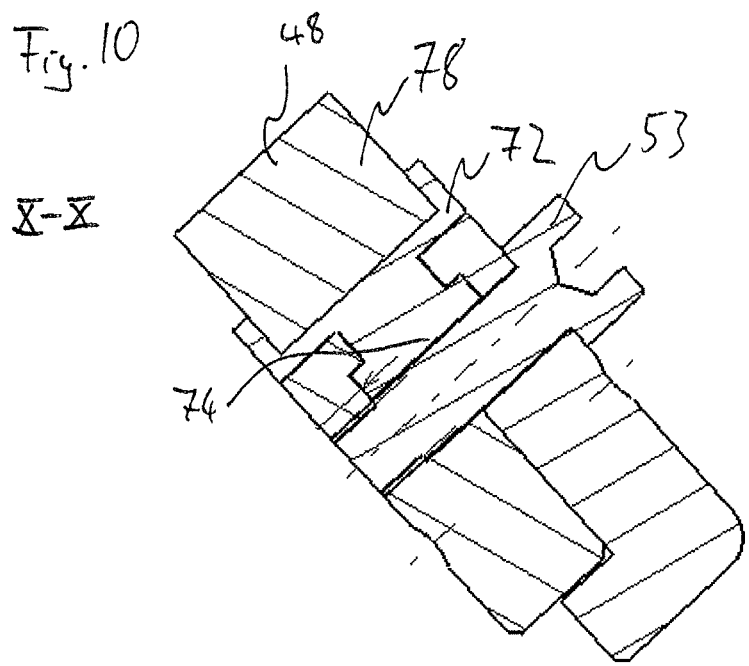

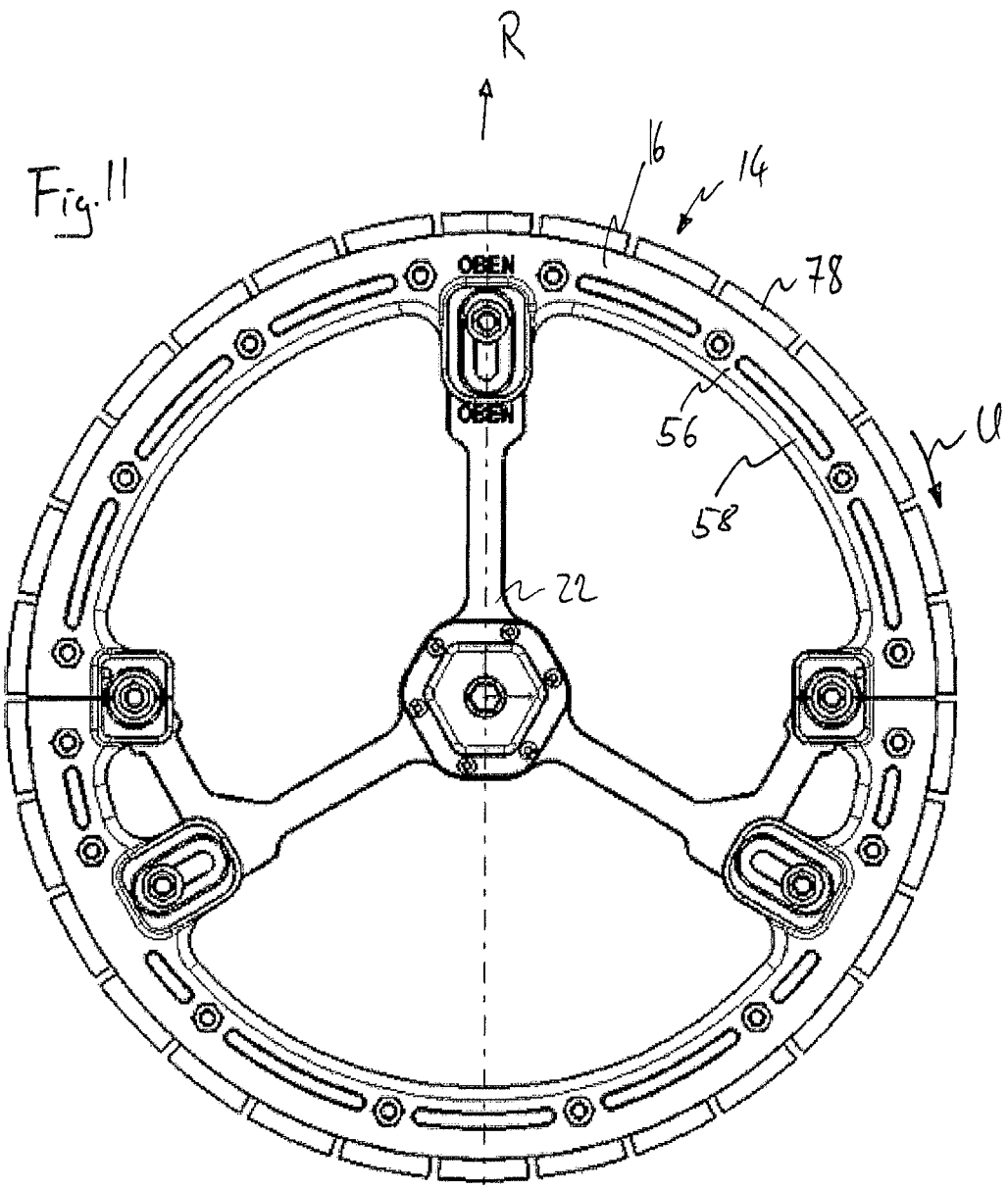

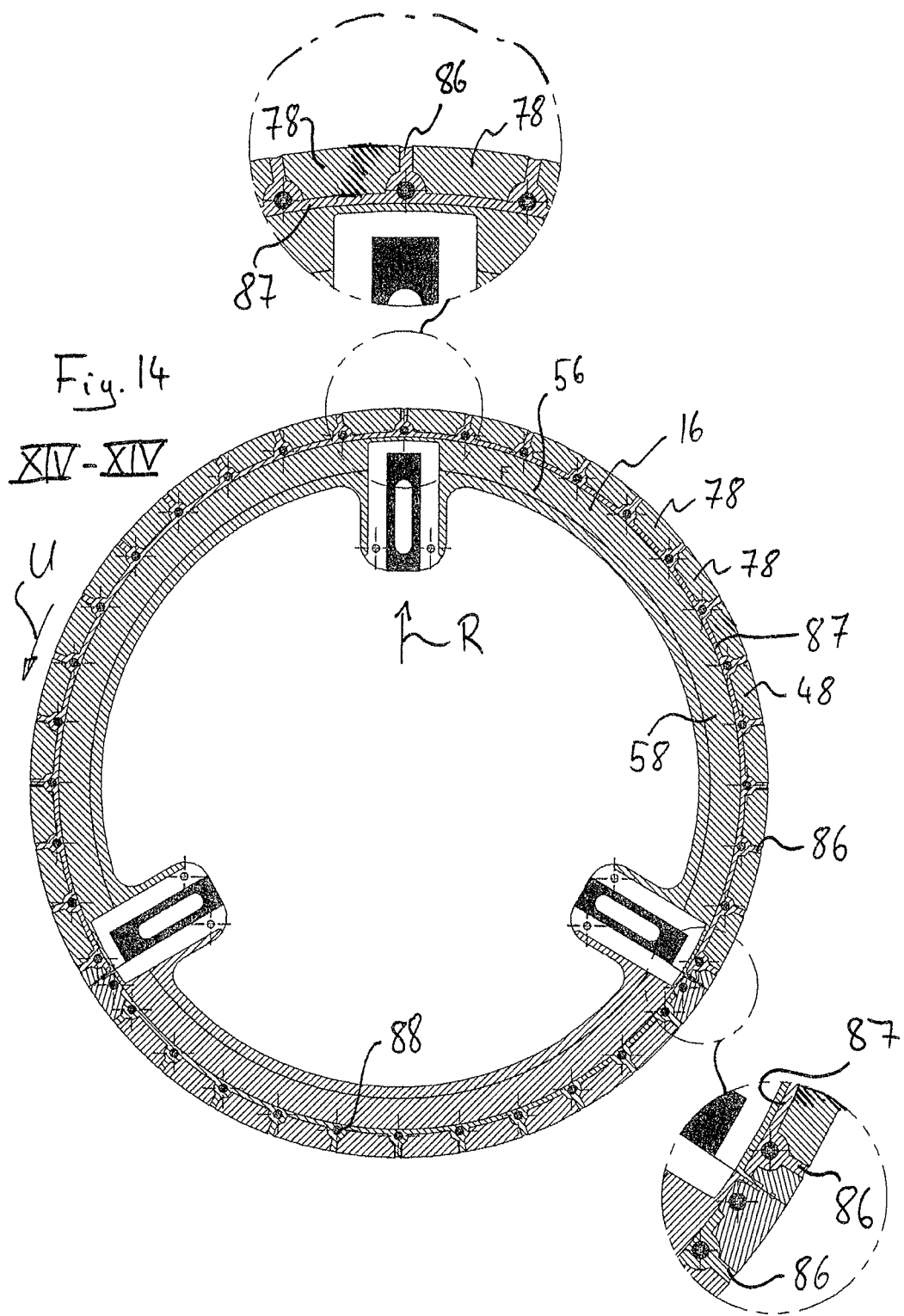

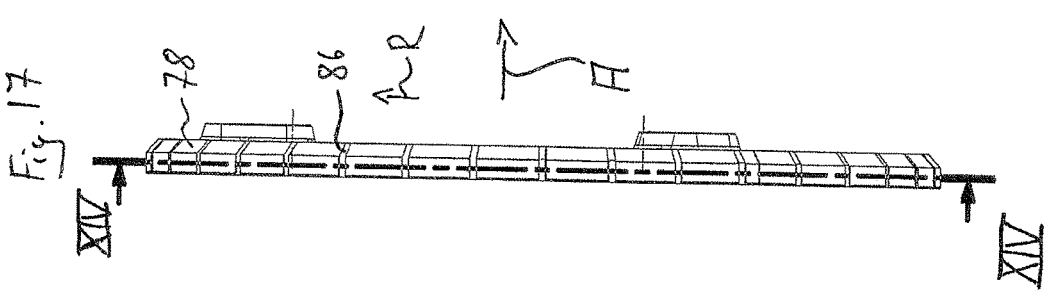
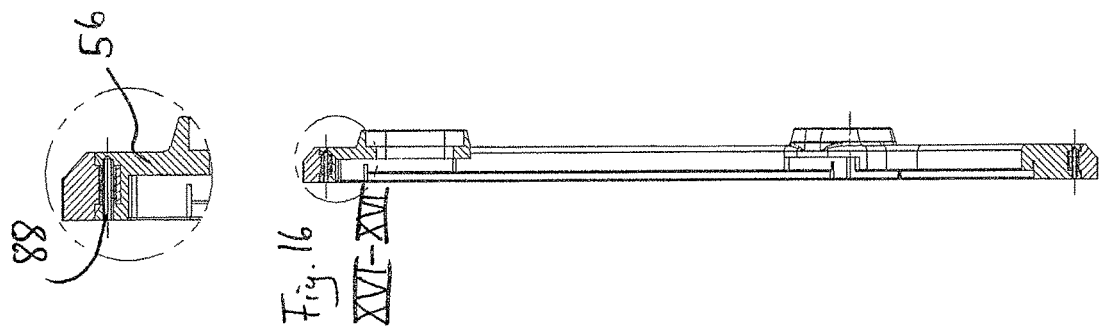
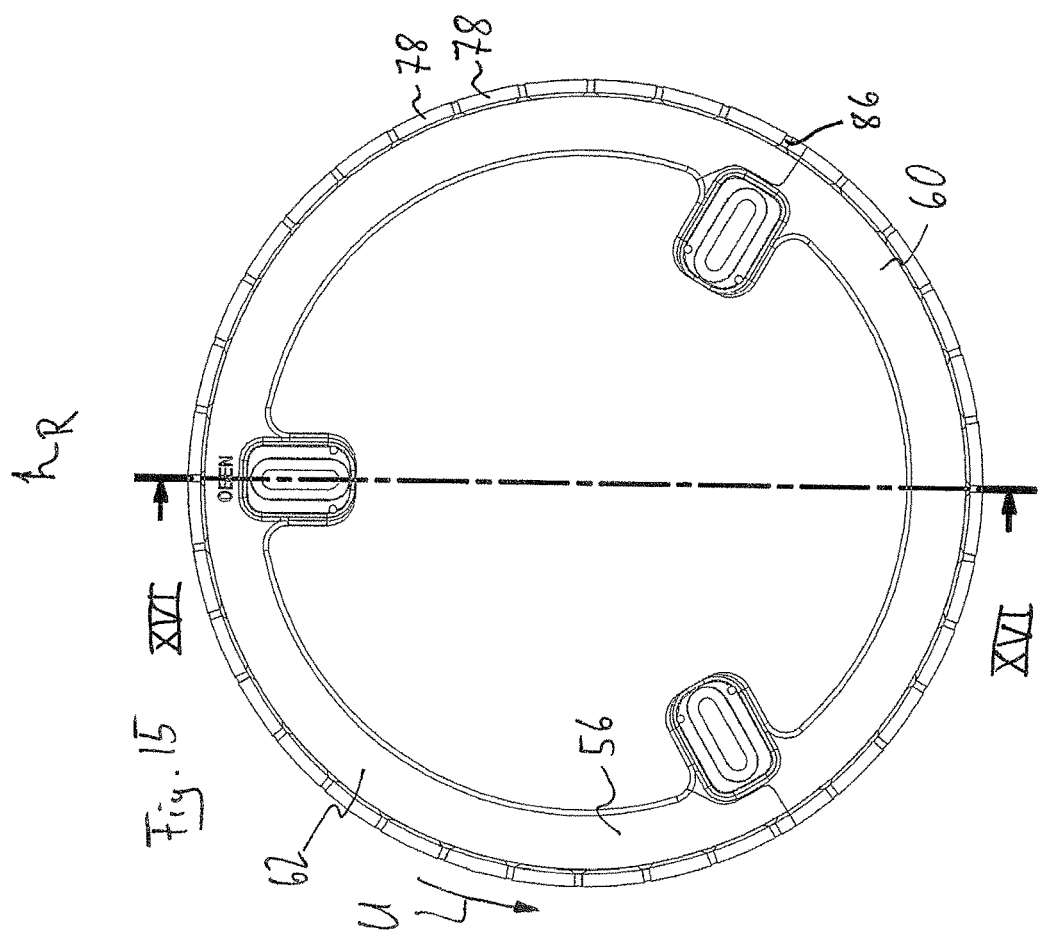

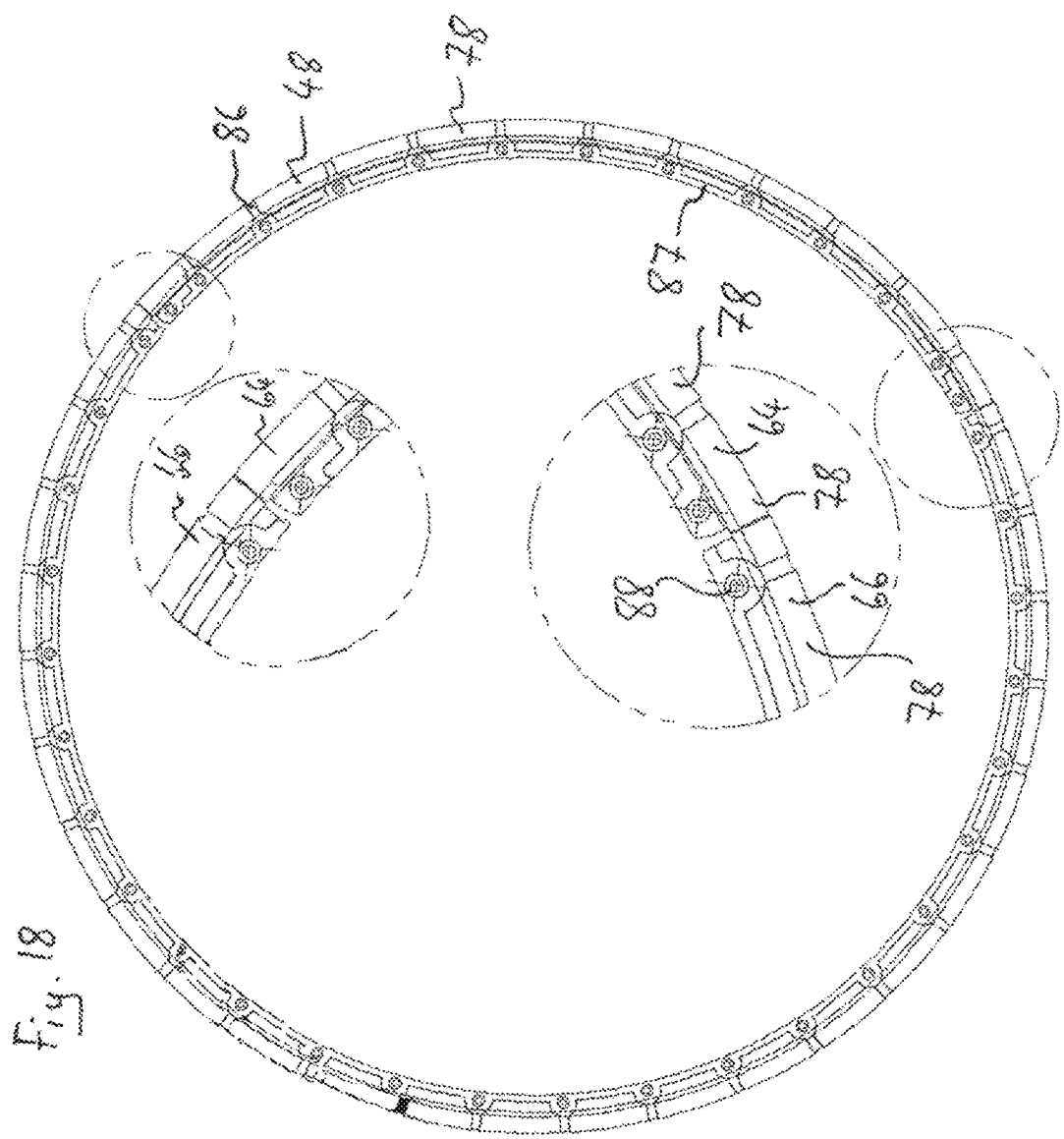

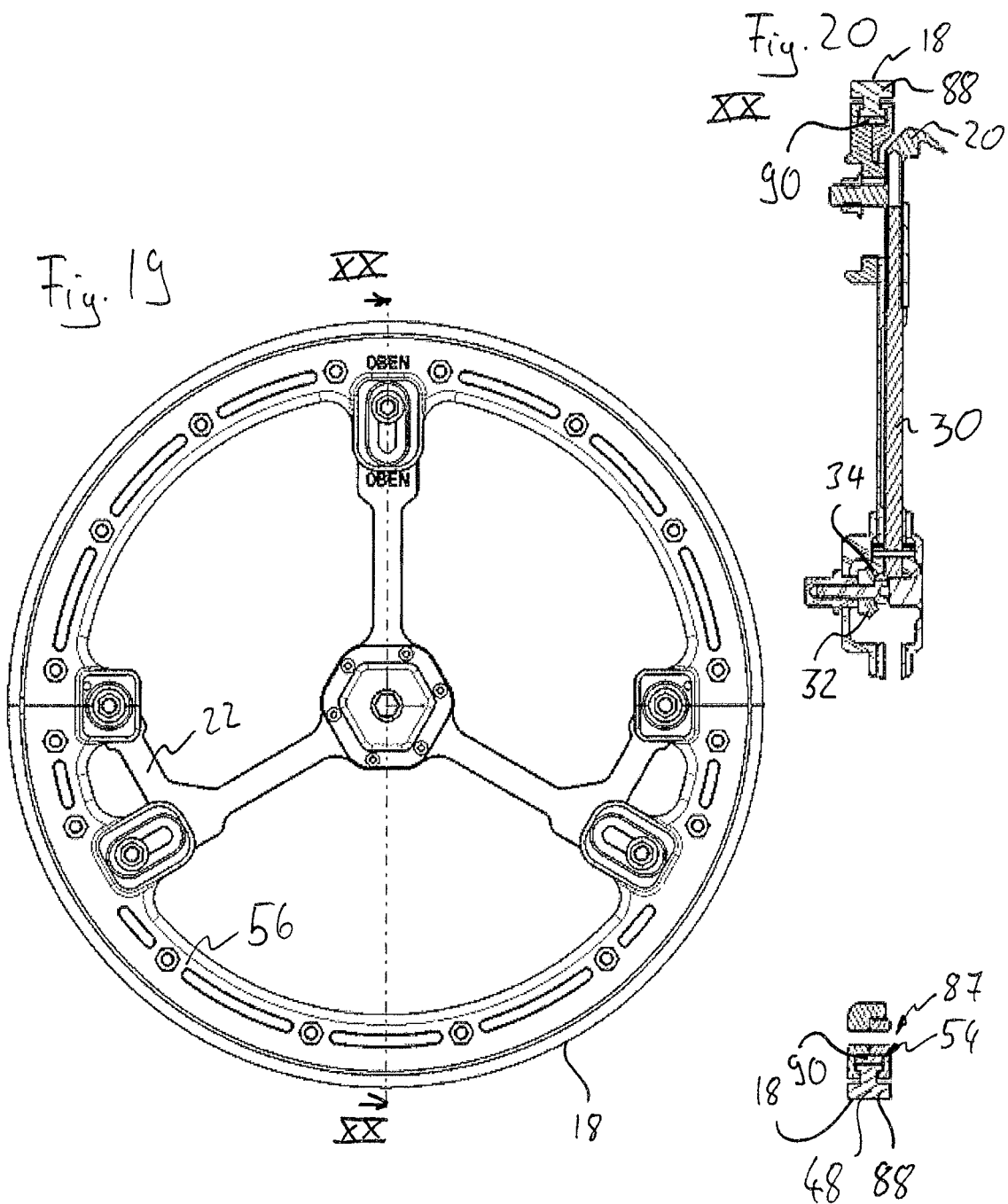

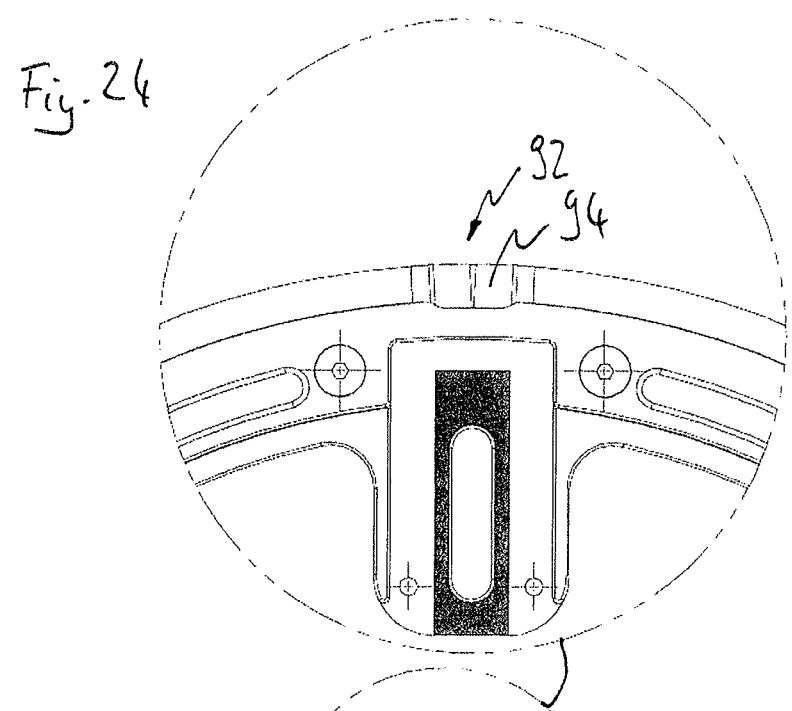
Fig. 24
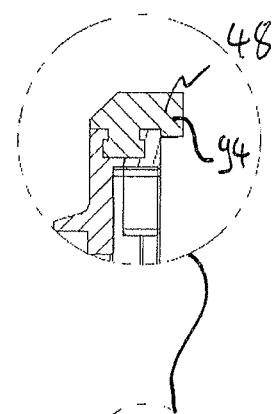
Fig. 25 XXV-XXV
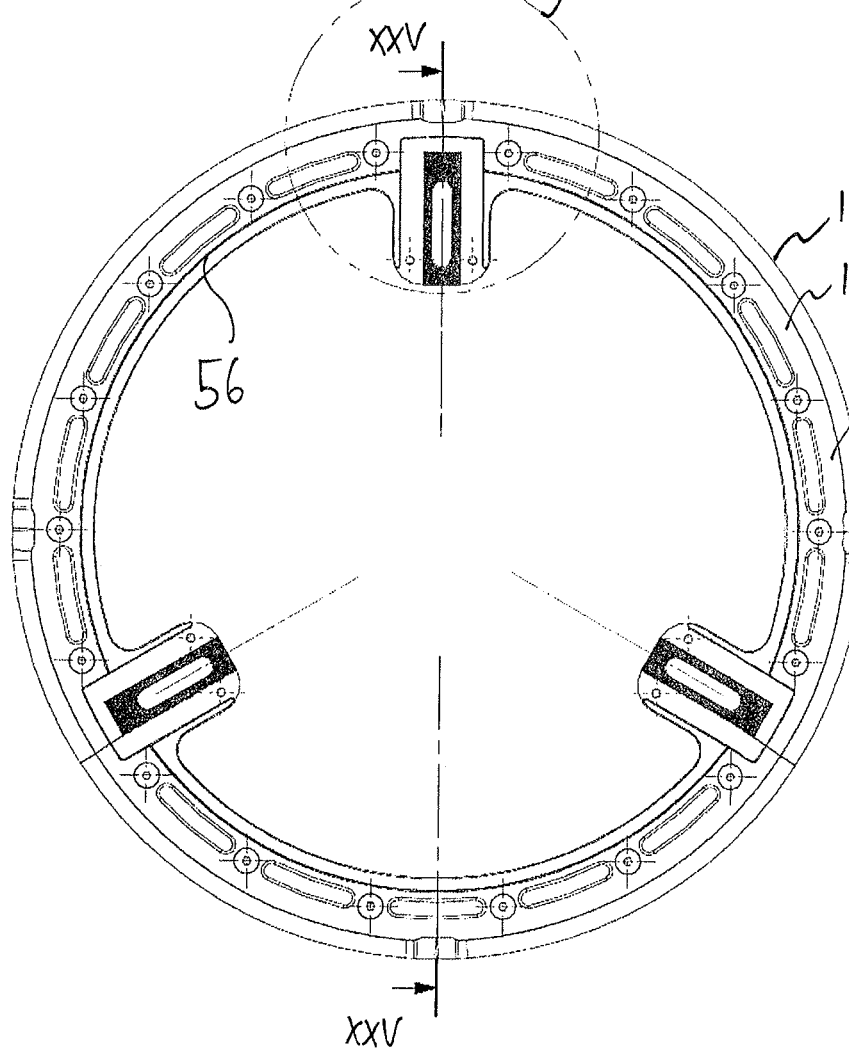
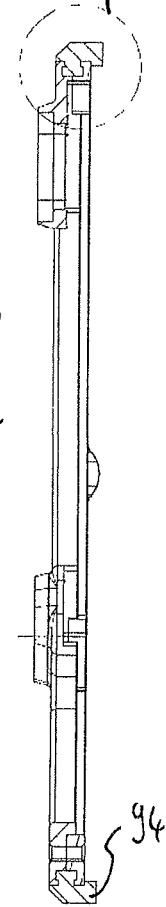

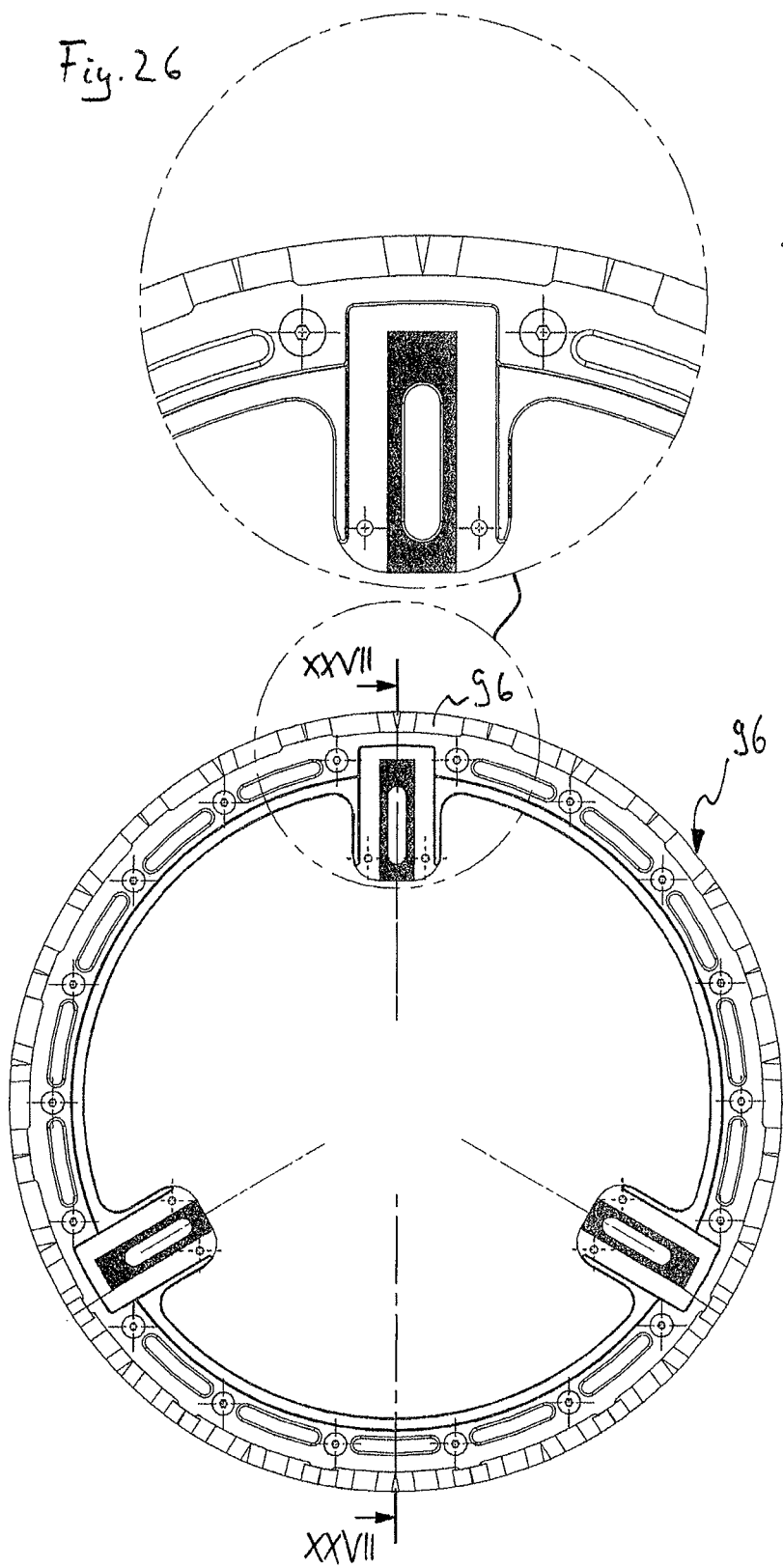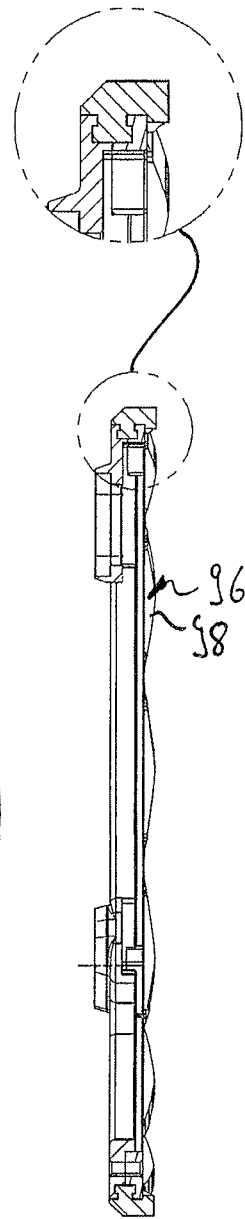

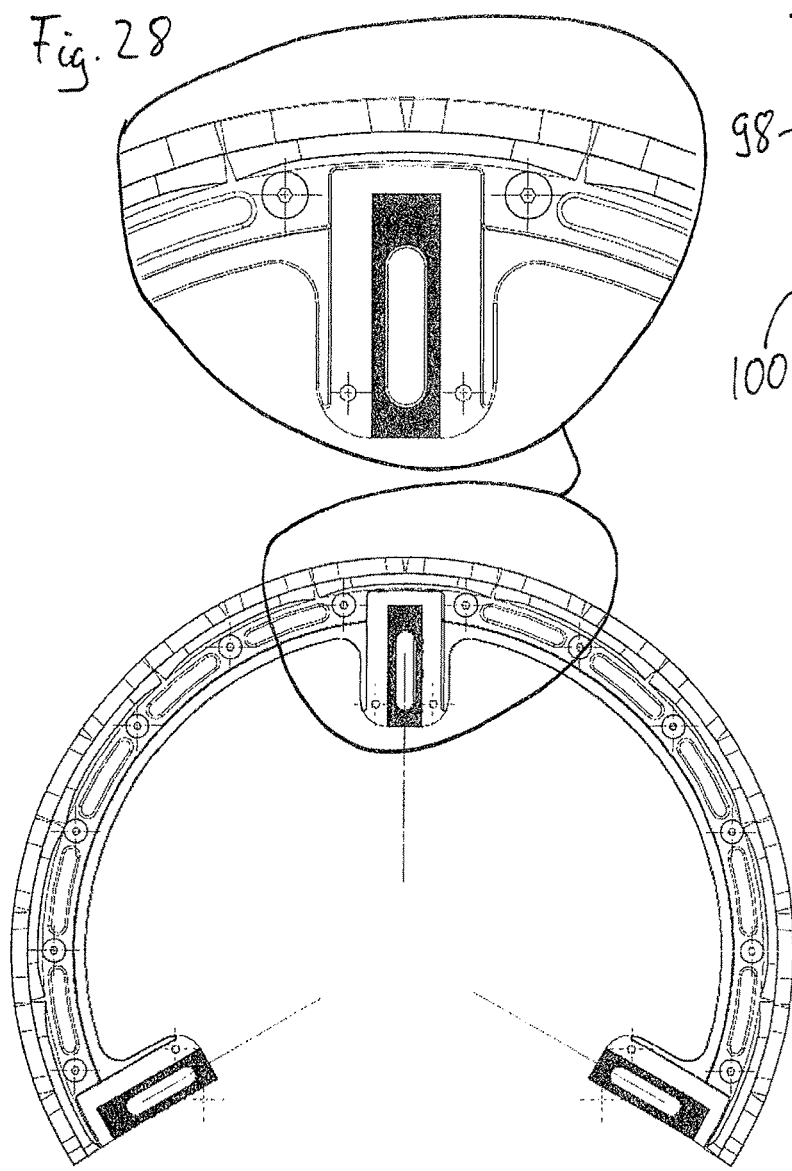
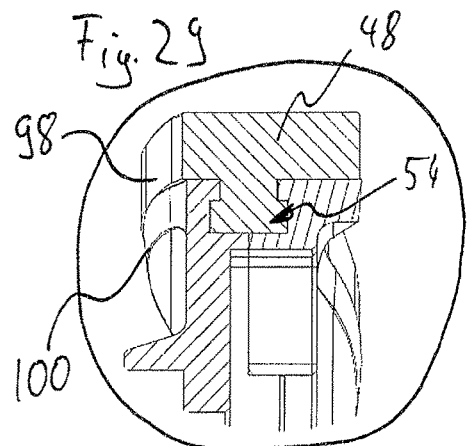
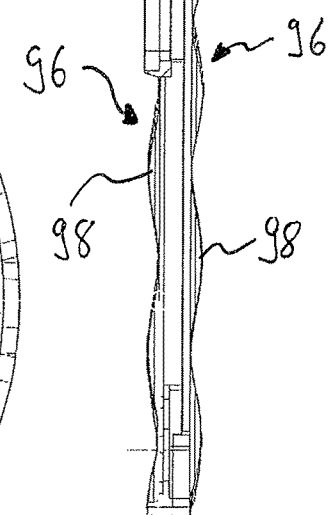
Fig. 28
Fig. 29

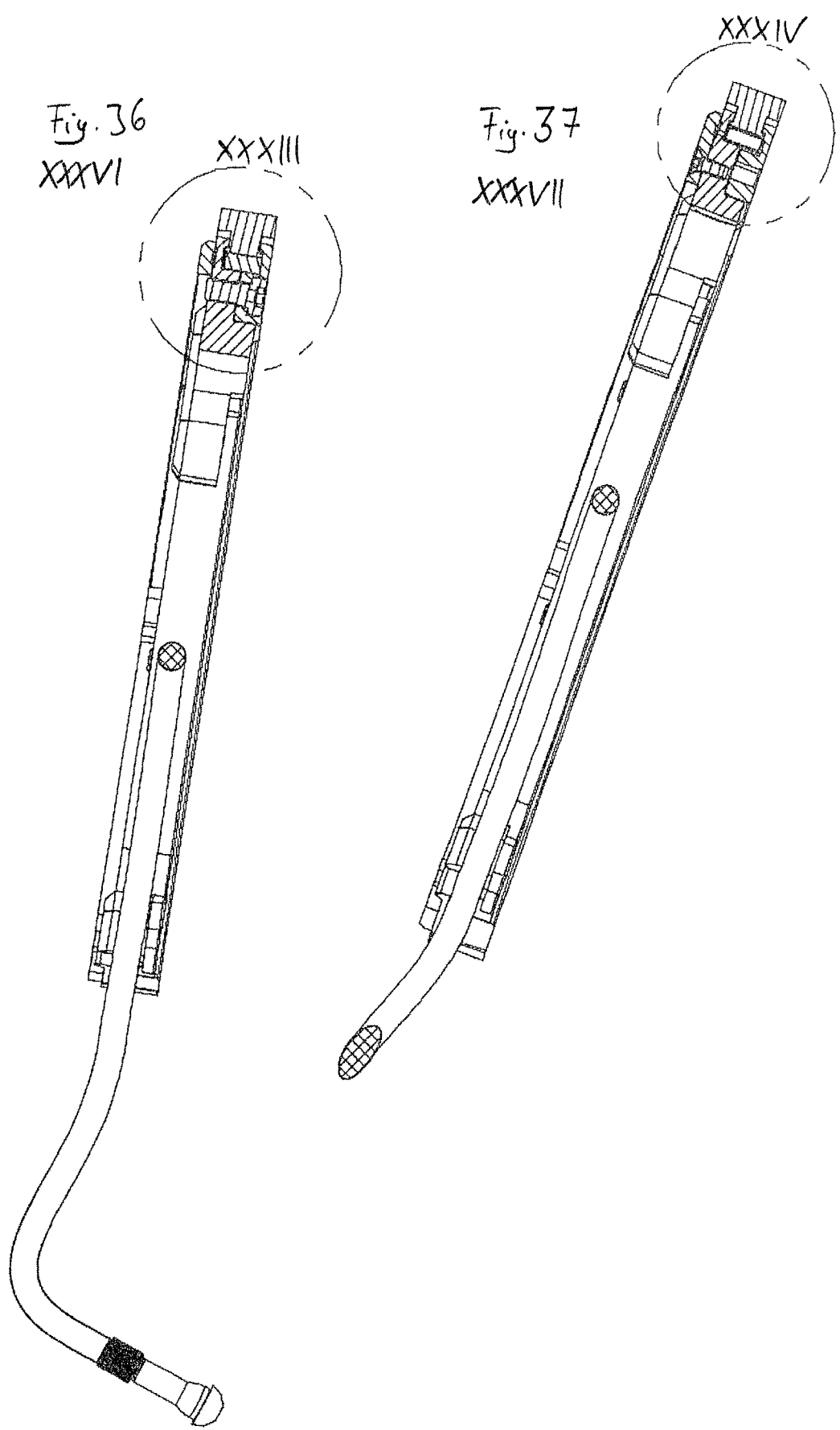

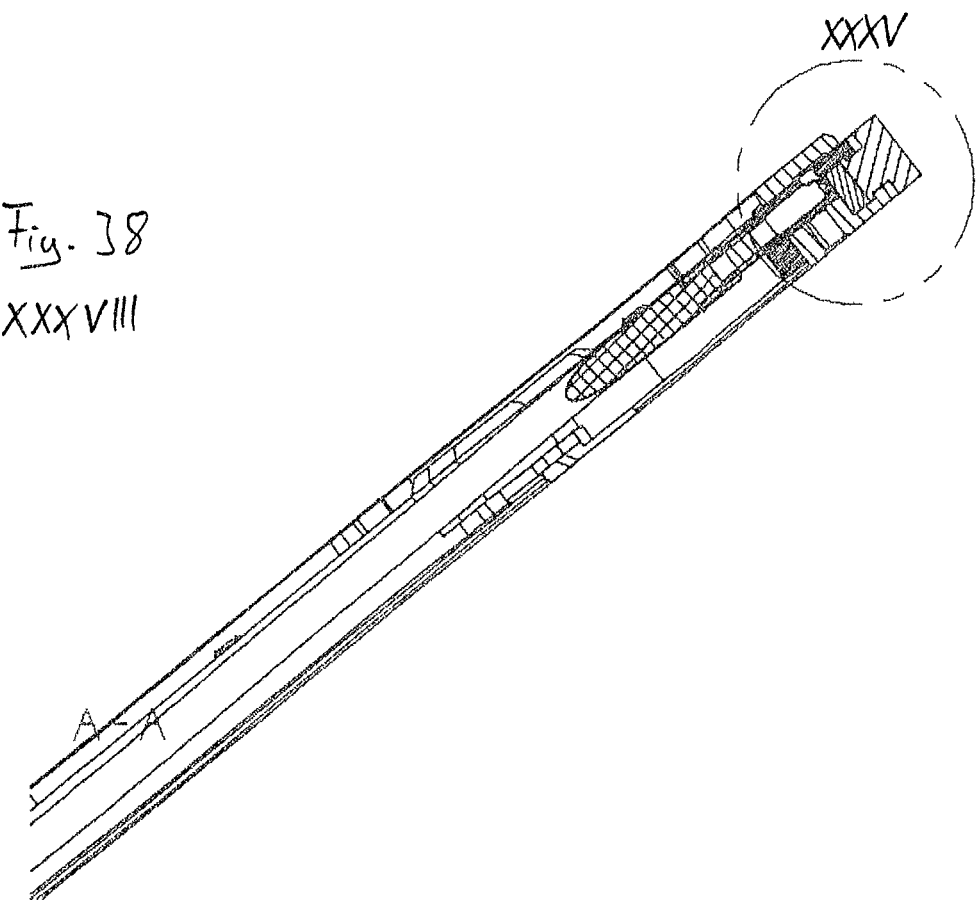

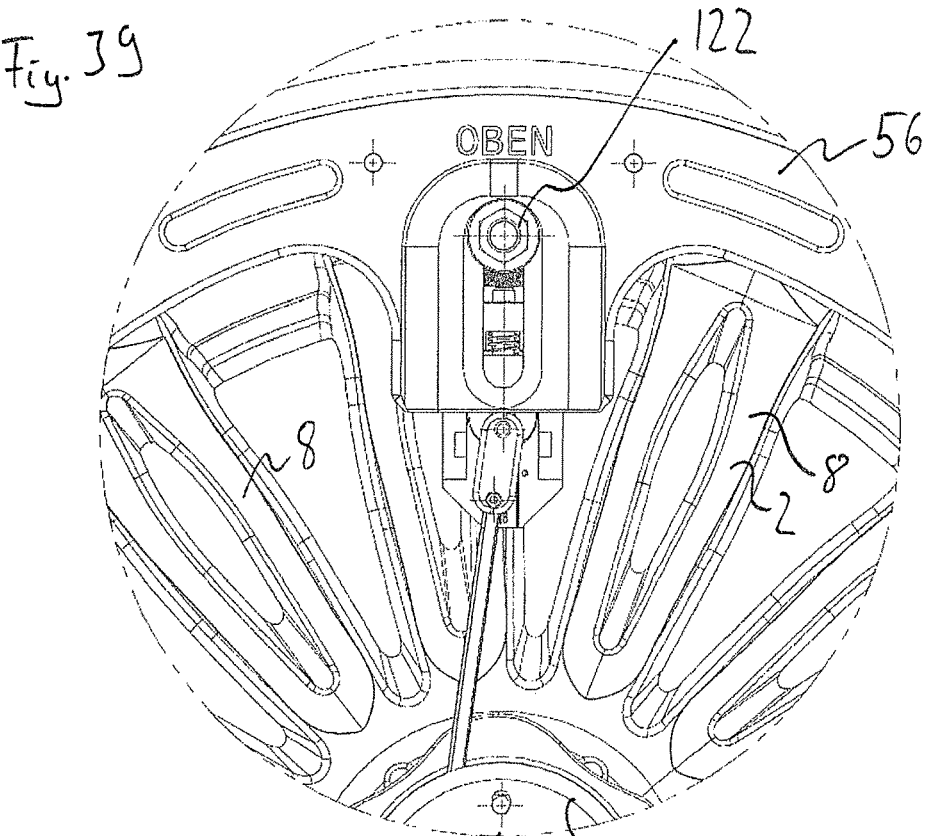
Fig. 39
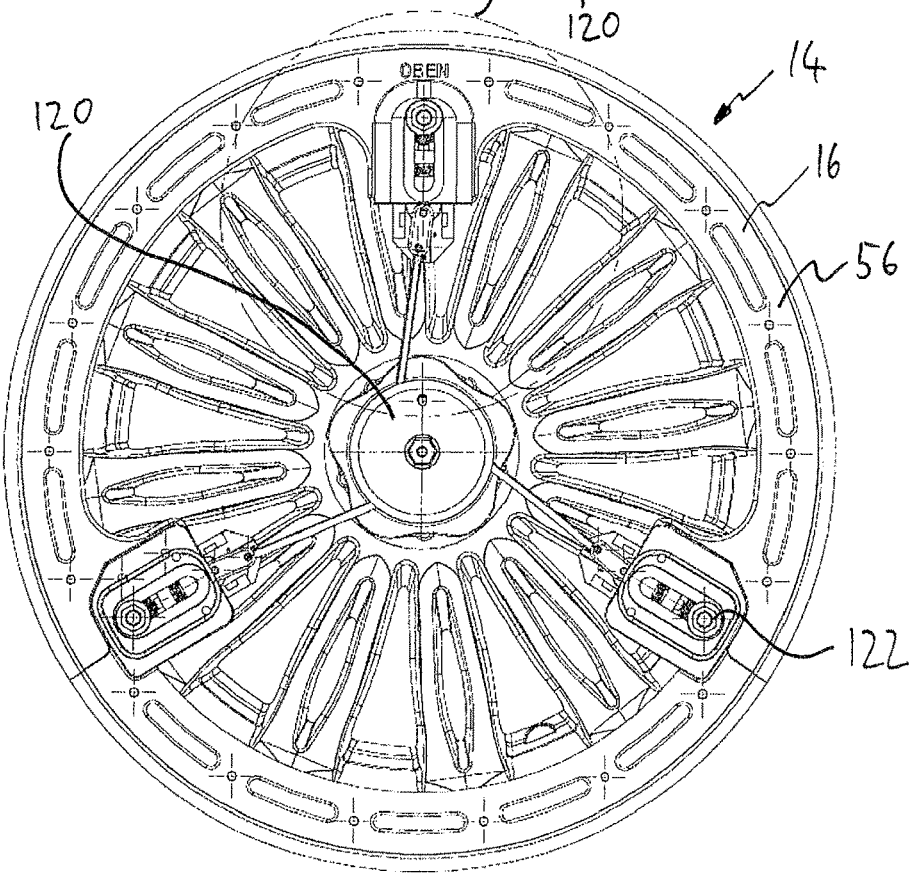

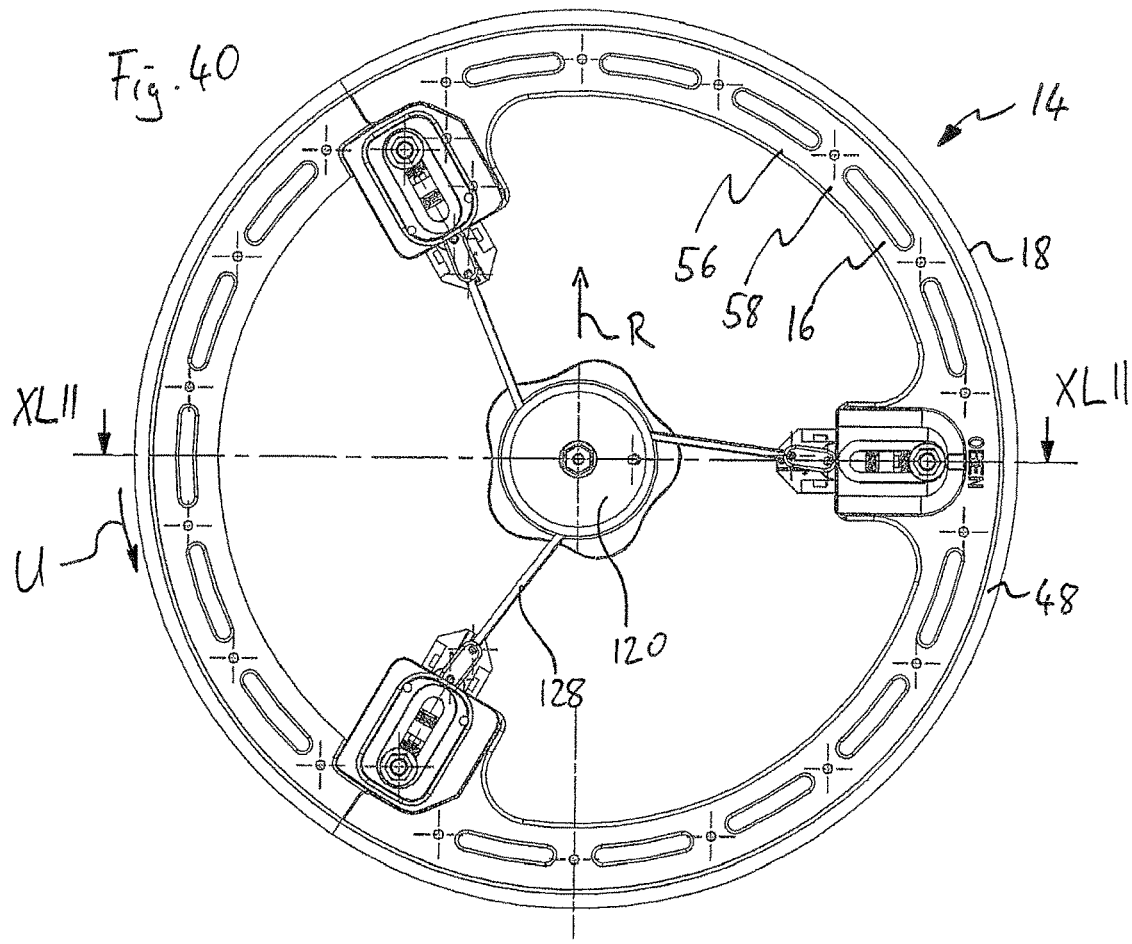
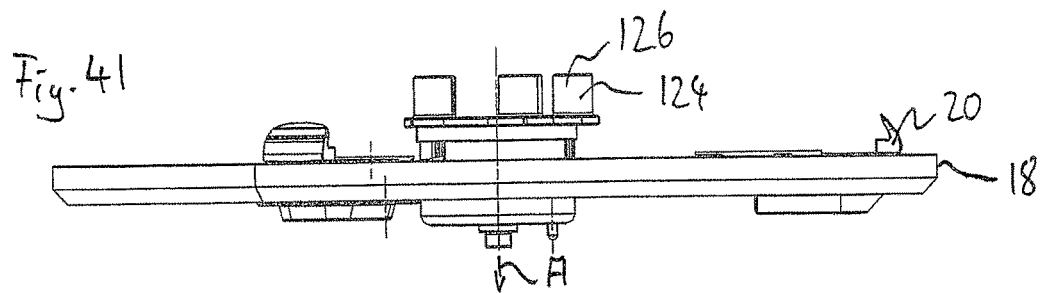
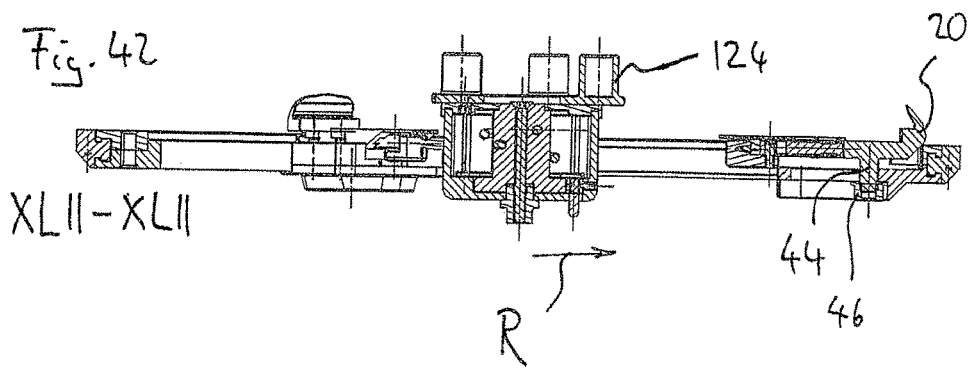

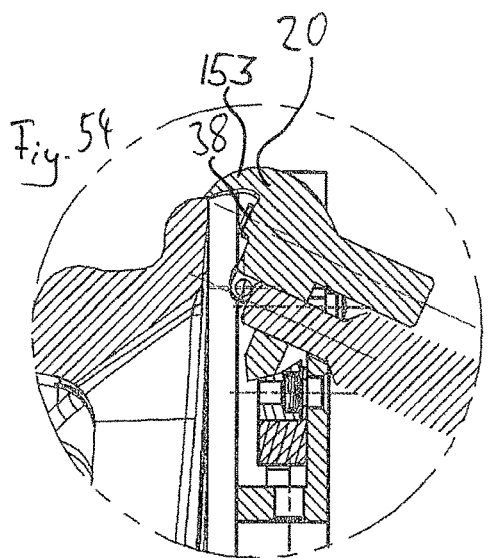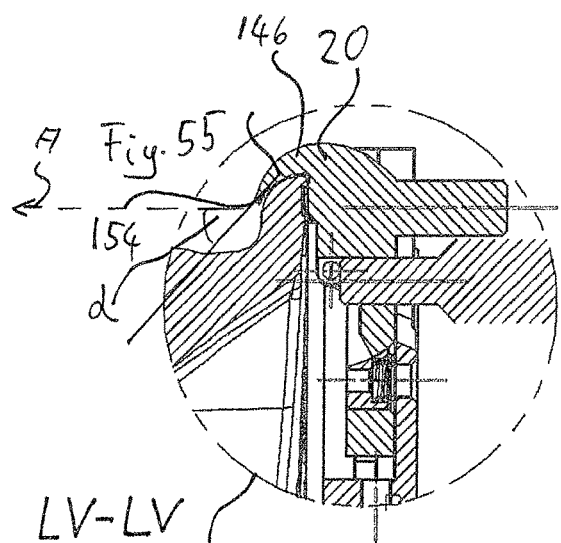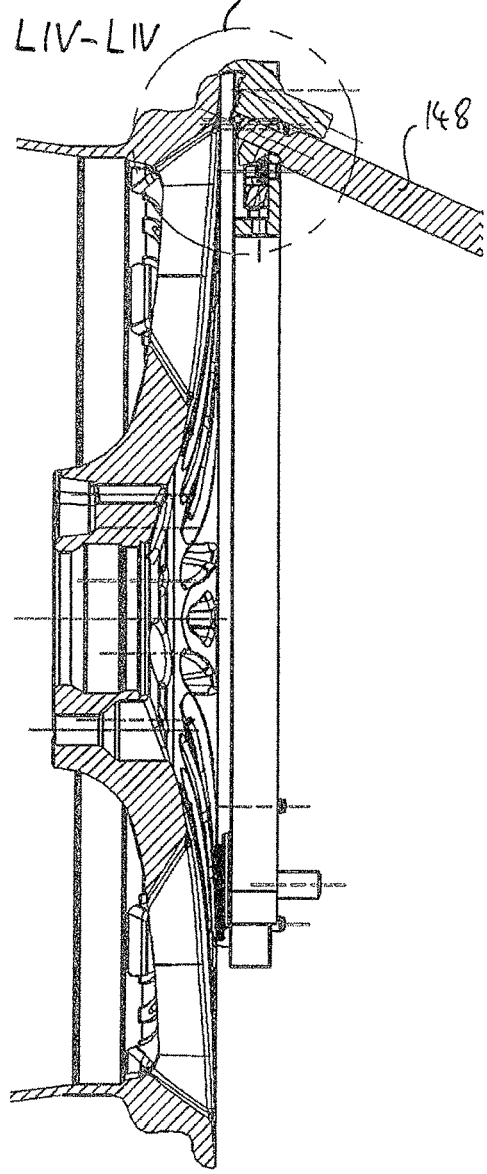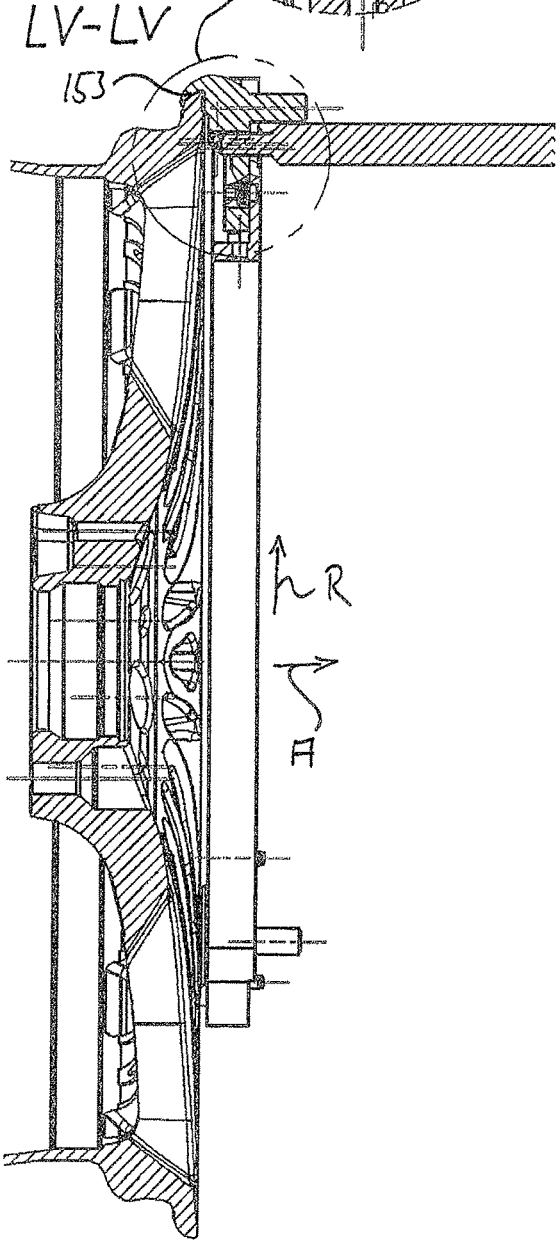

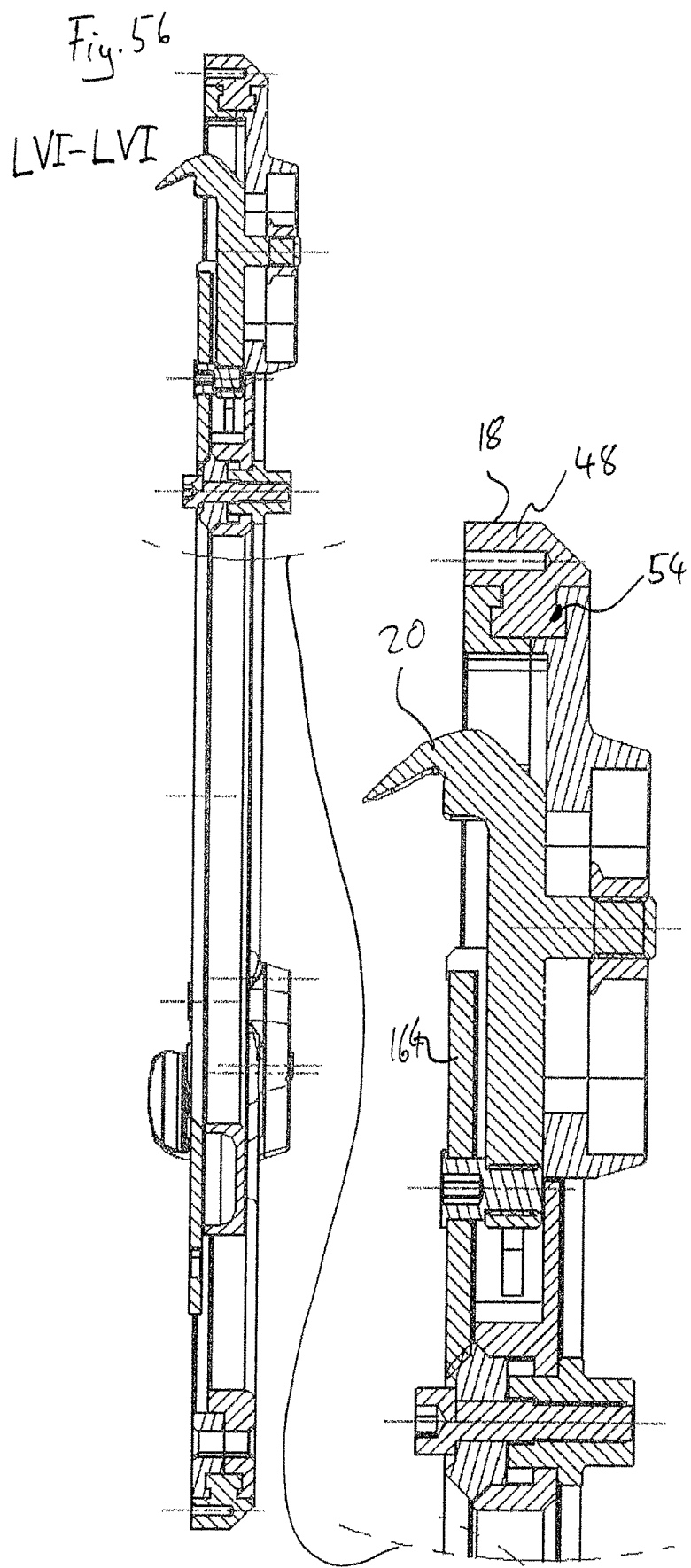

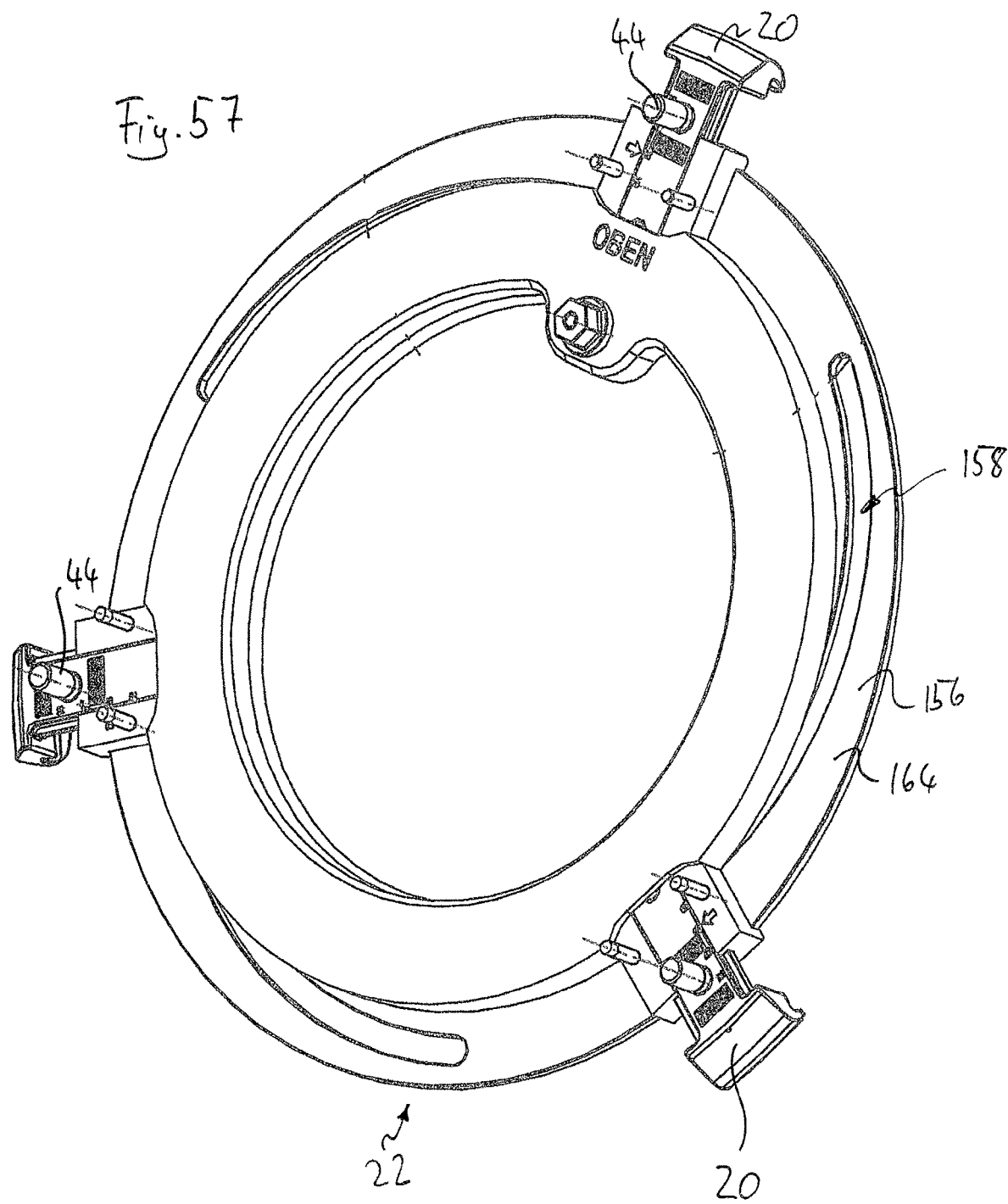

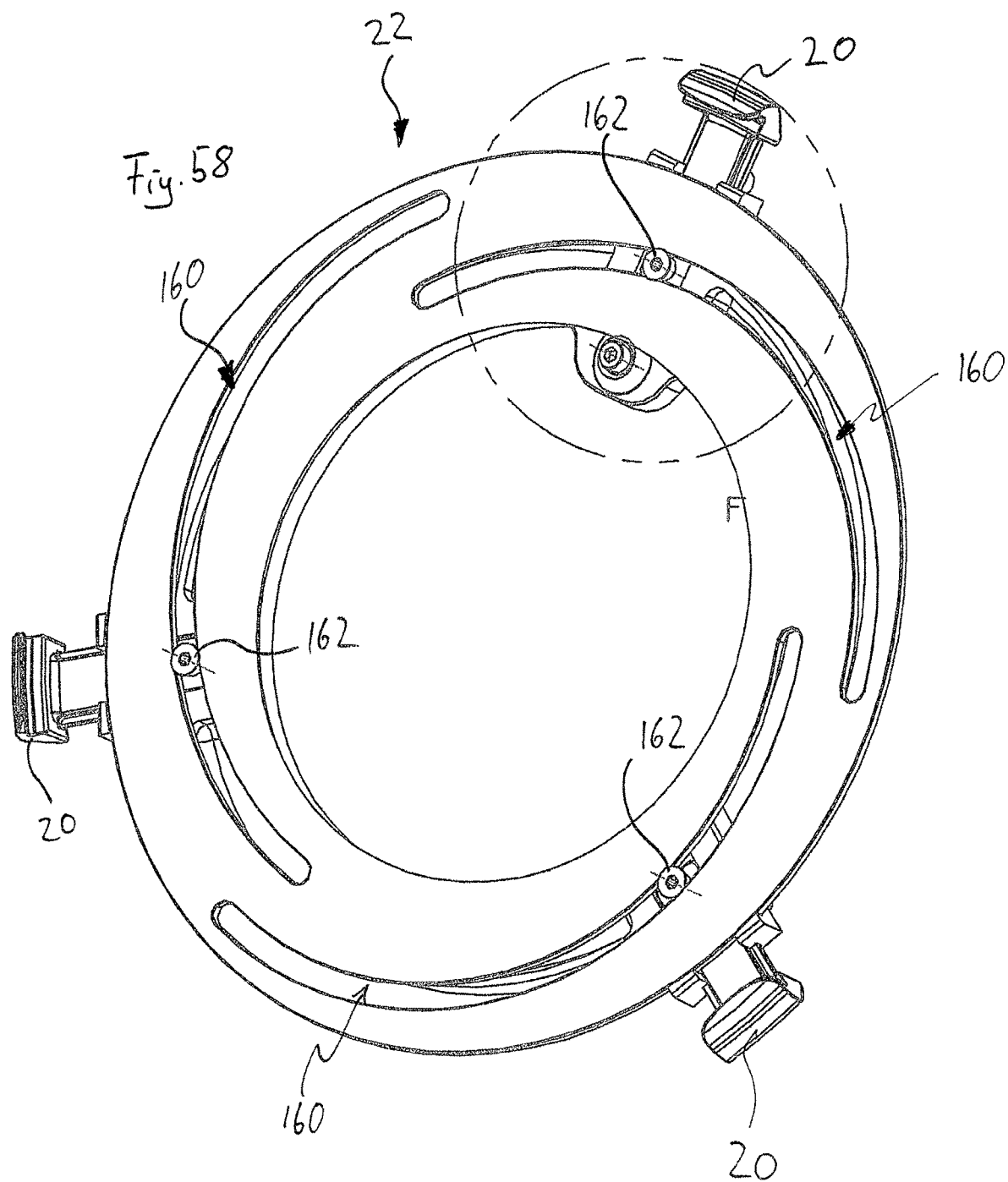

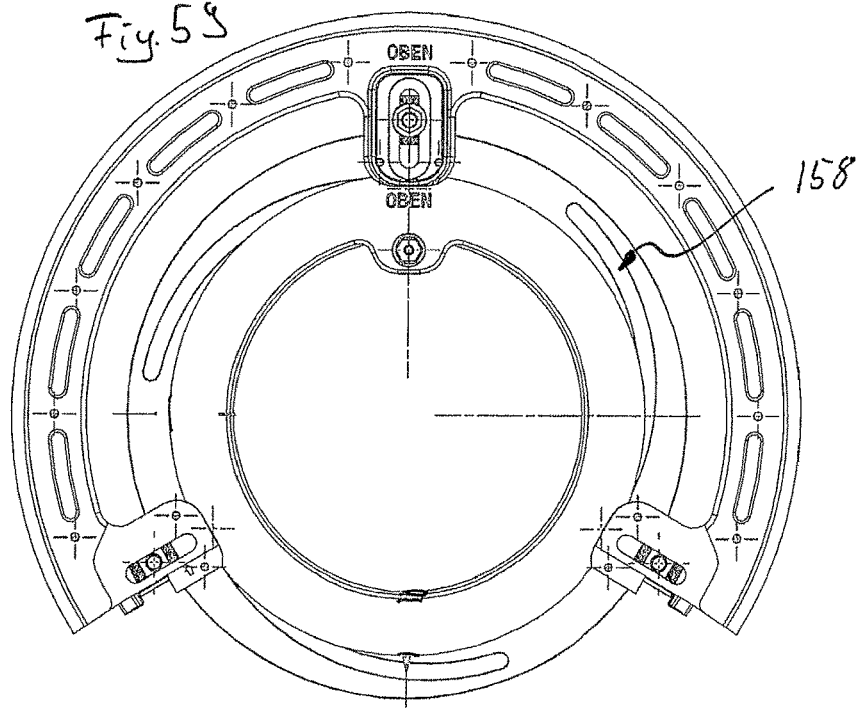
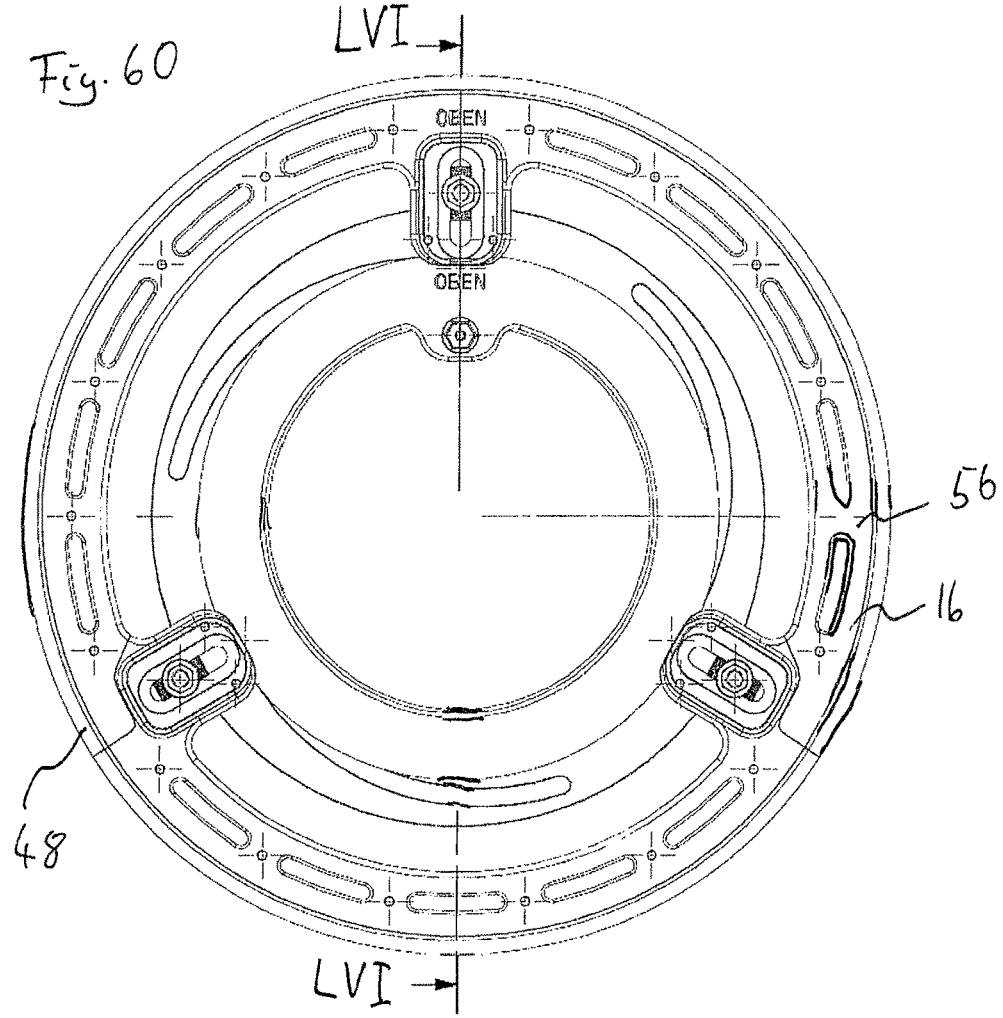

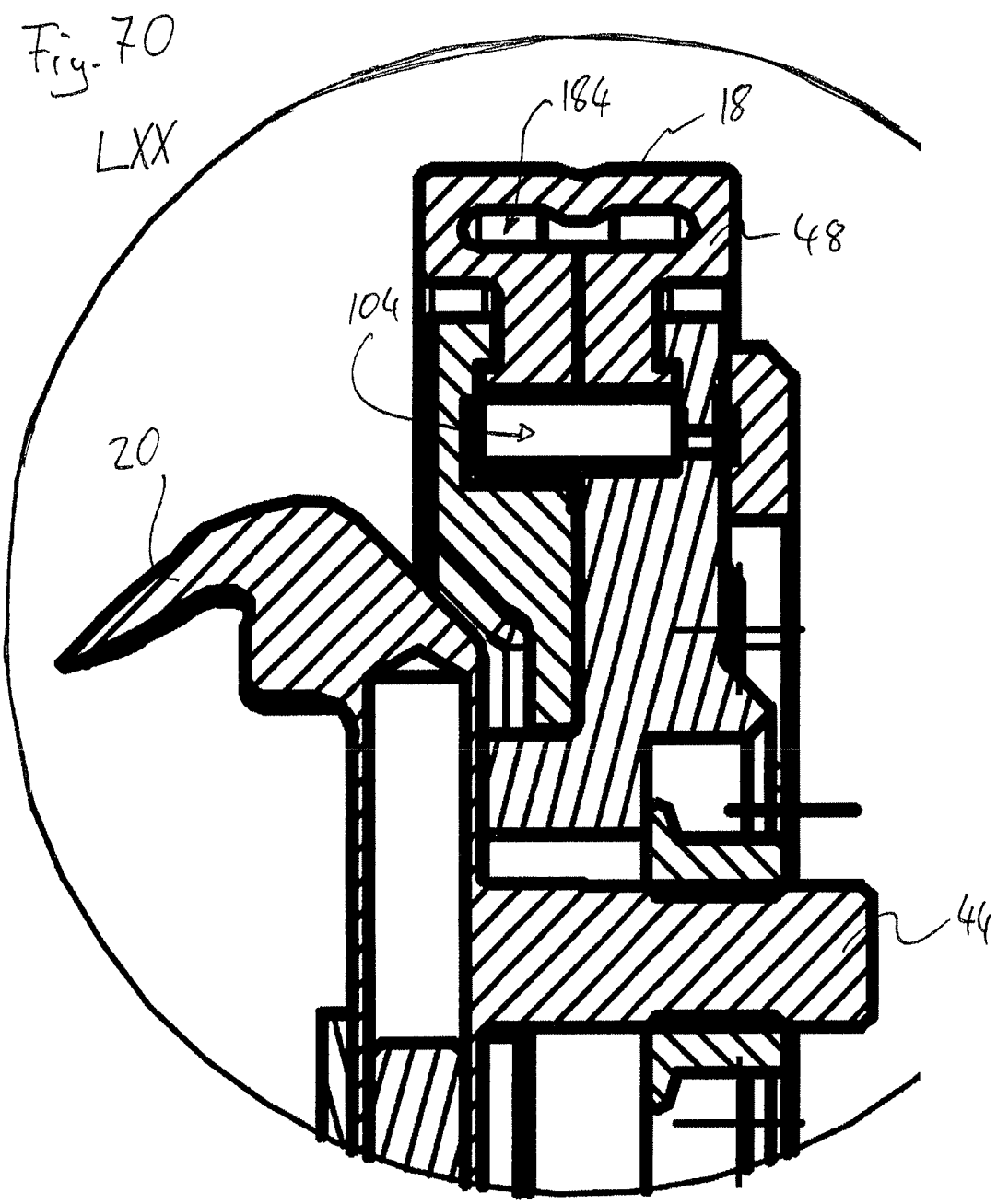

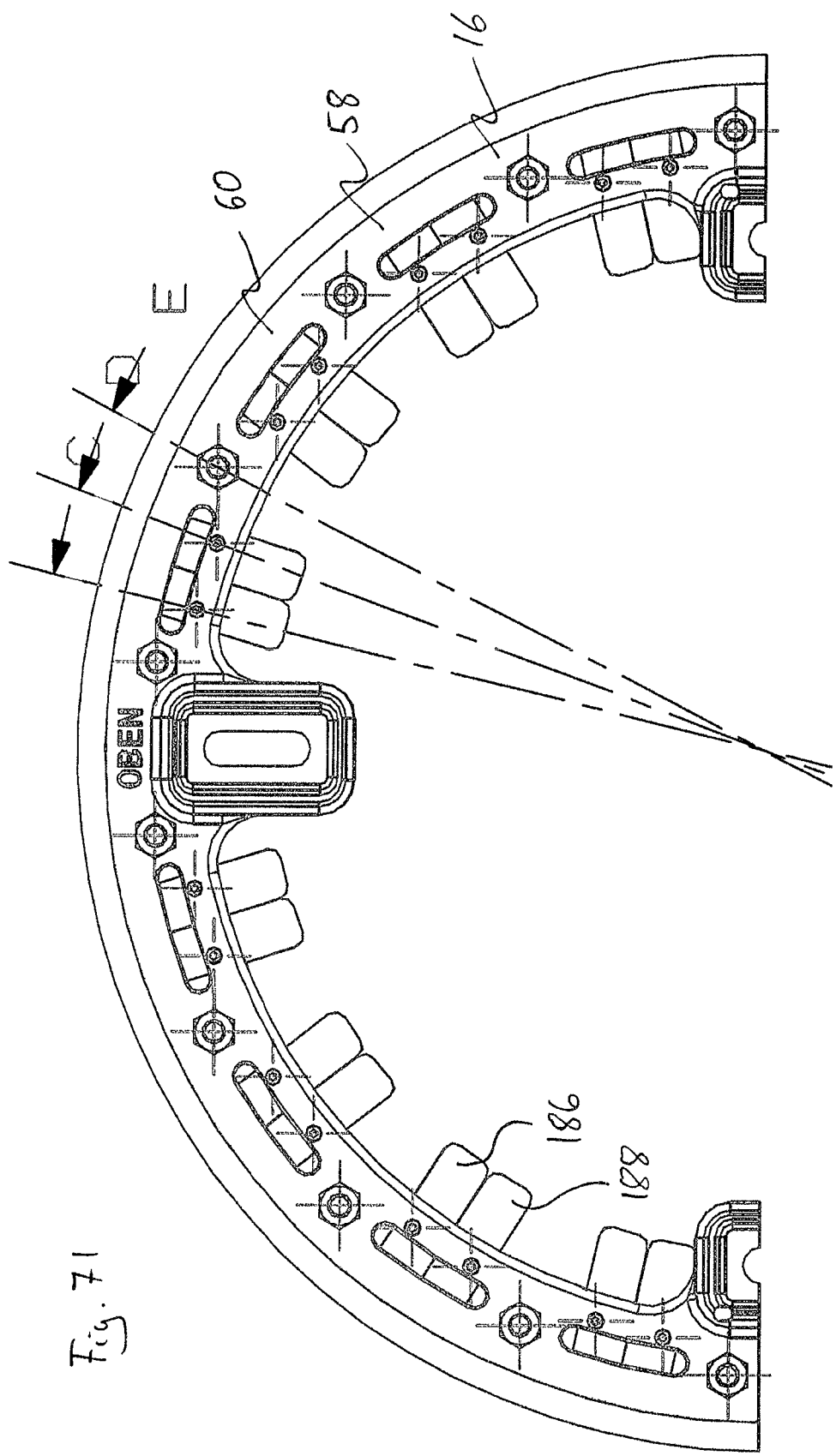

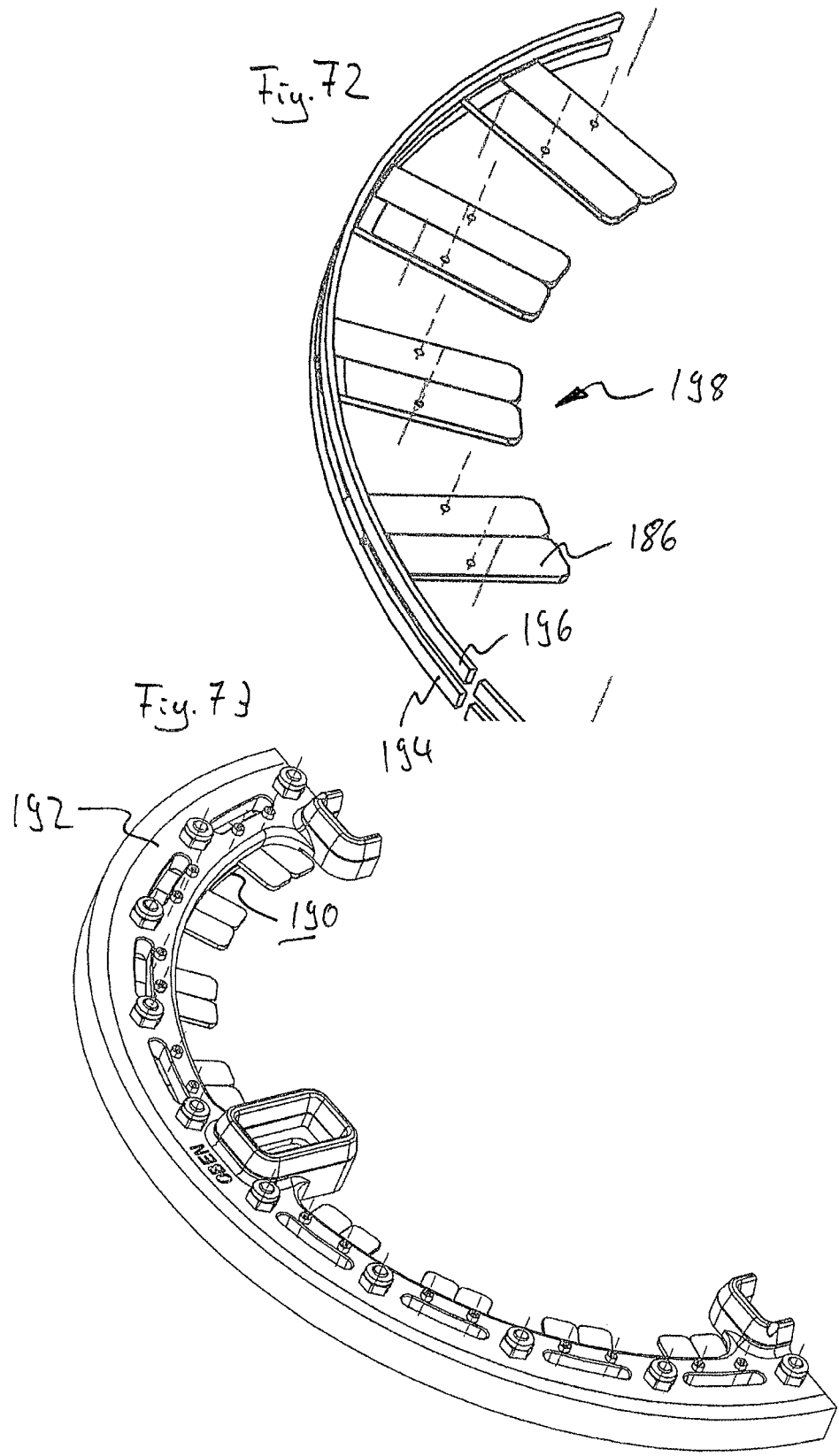

LXXX-LXXX

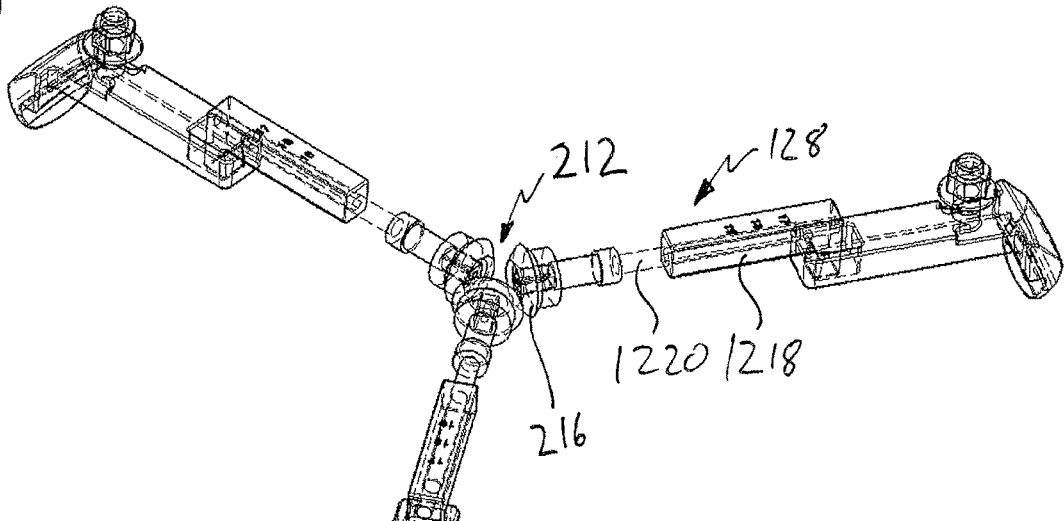
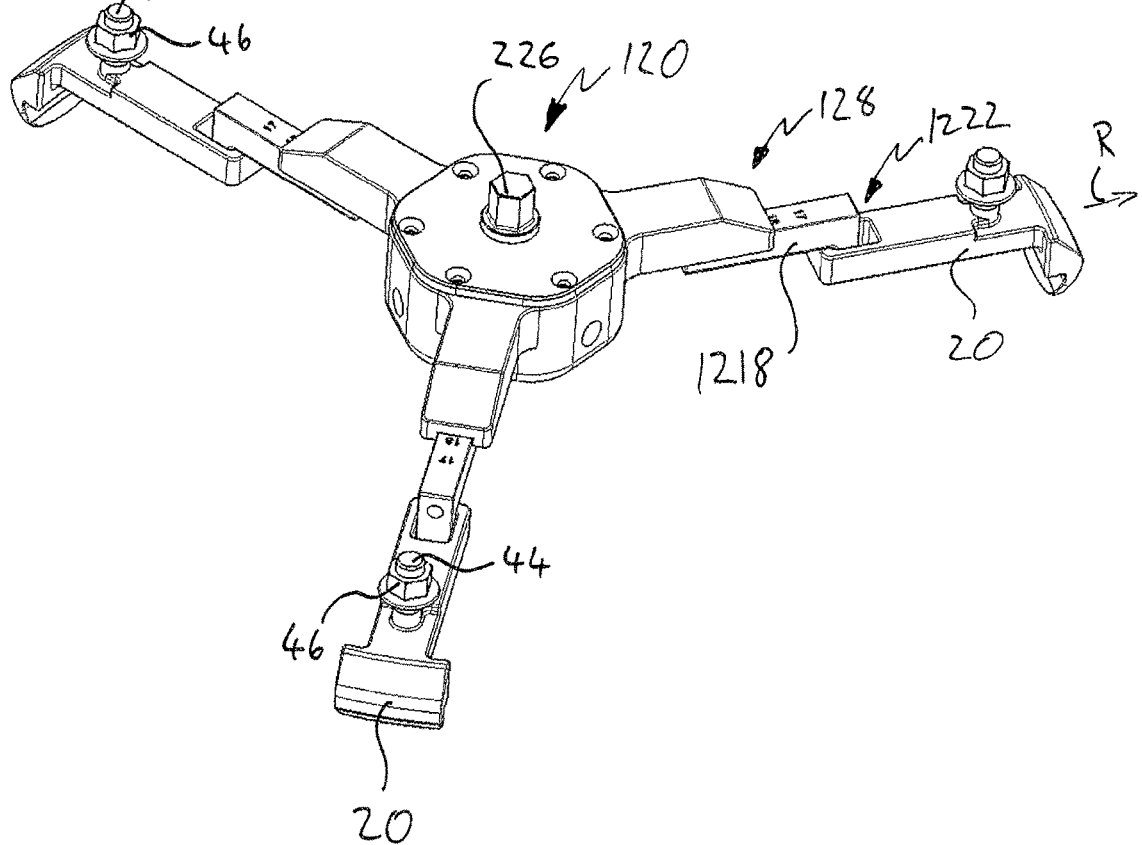

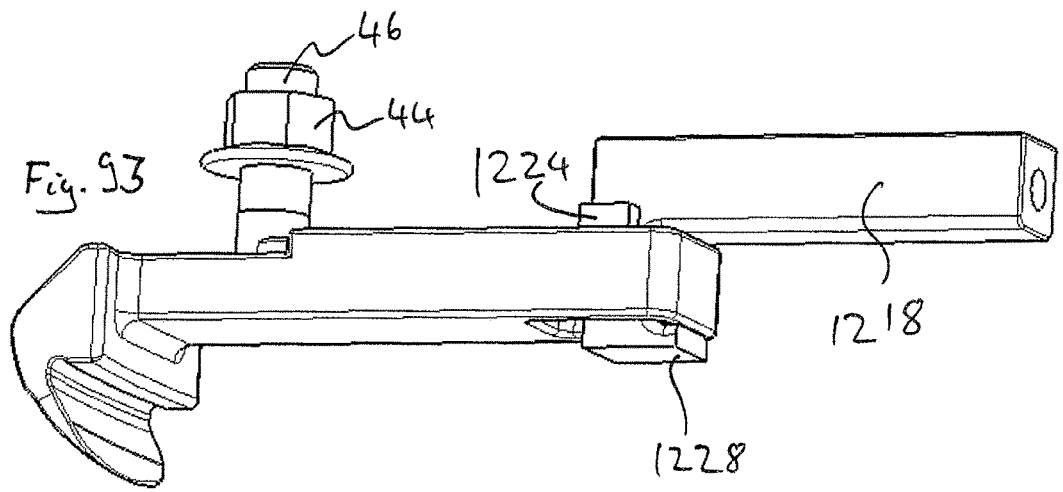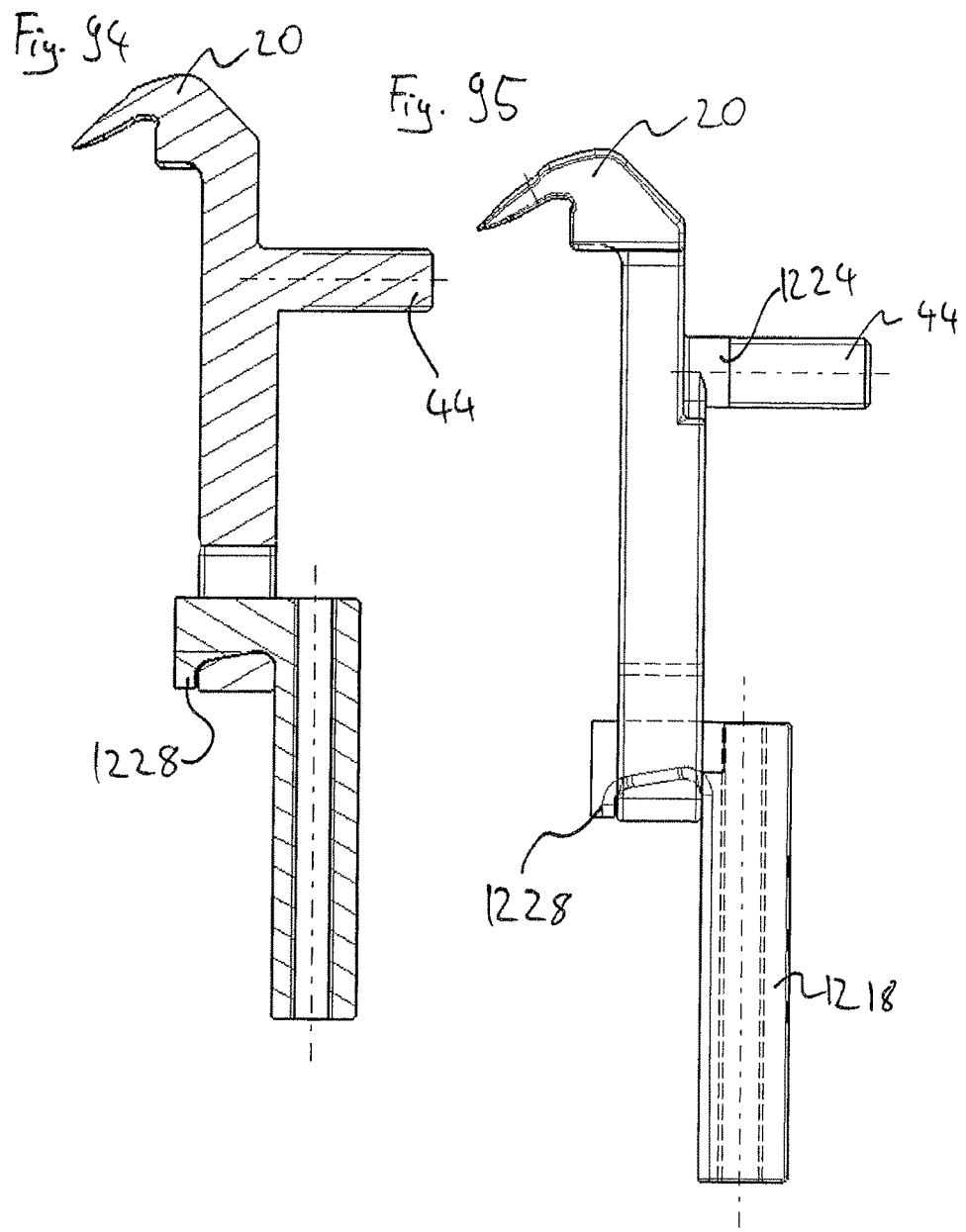

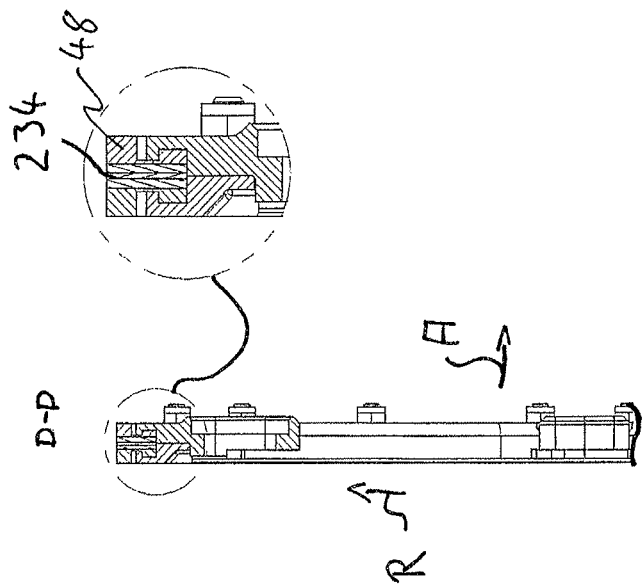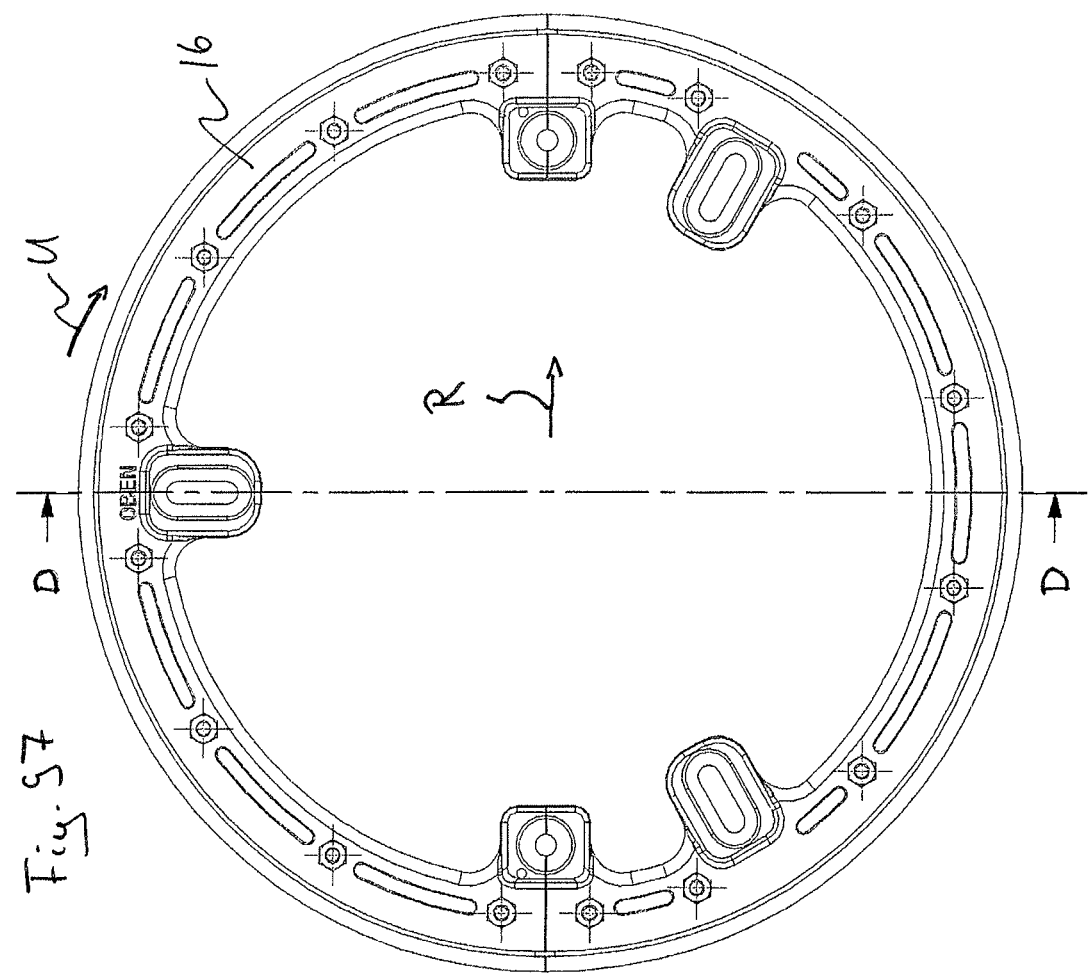
Fig. 57

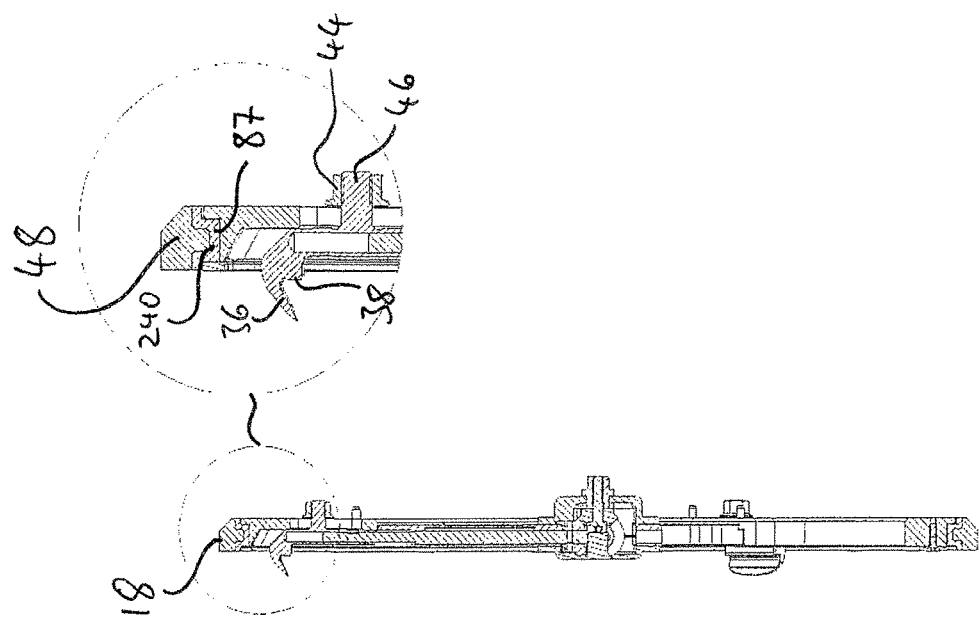
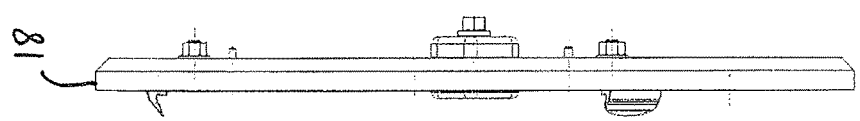
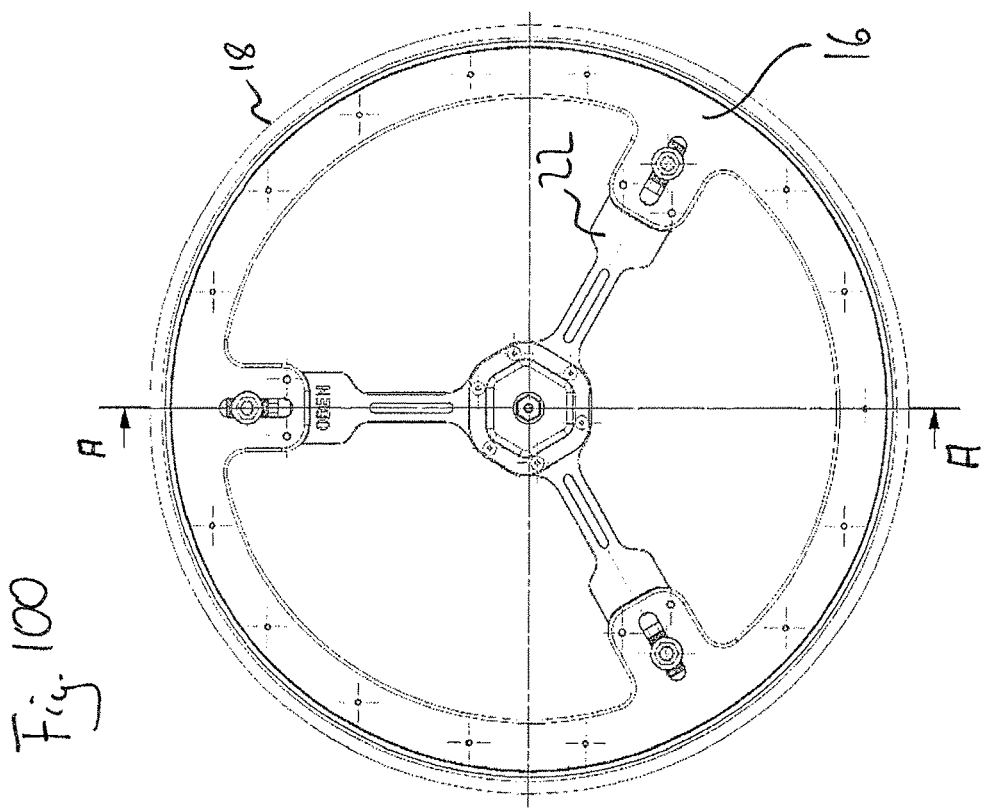
Fig. 100

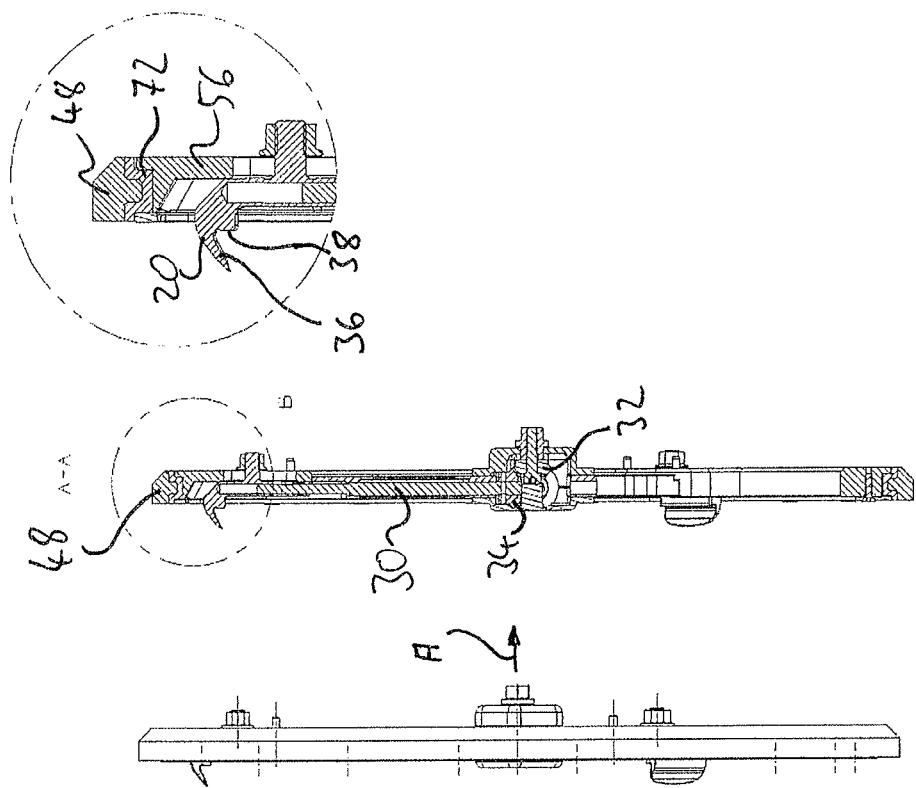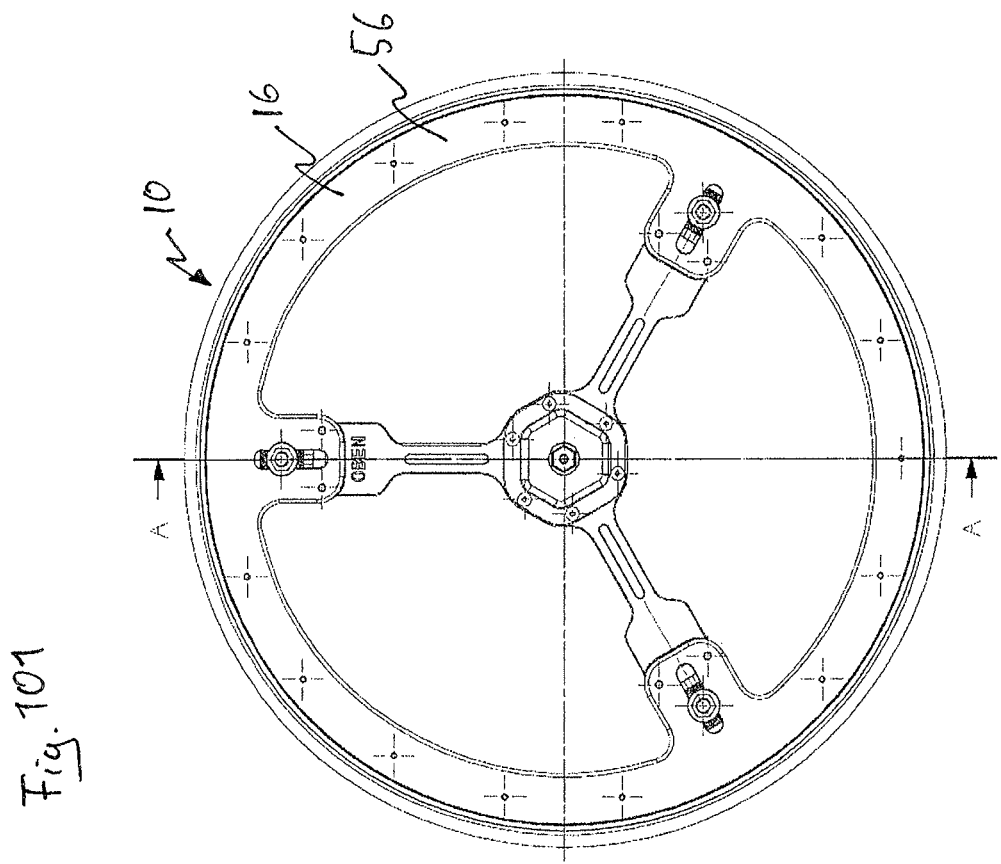
Fig. 101

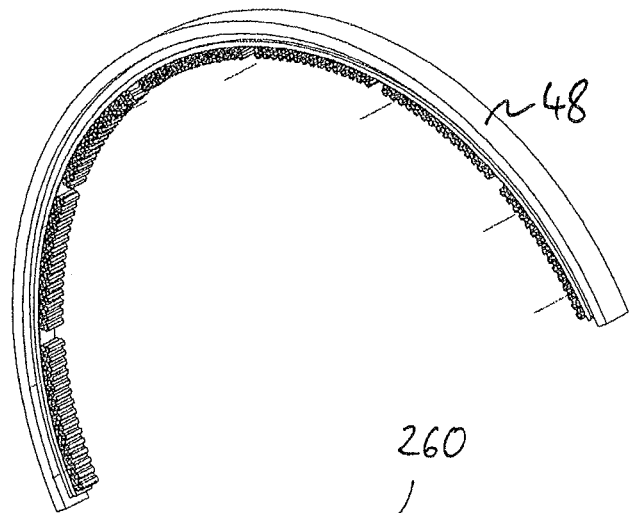
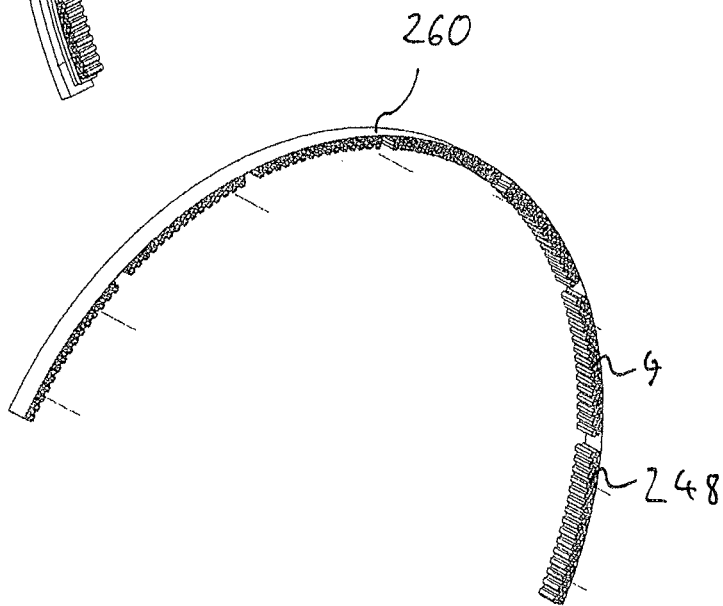
Fig. 105
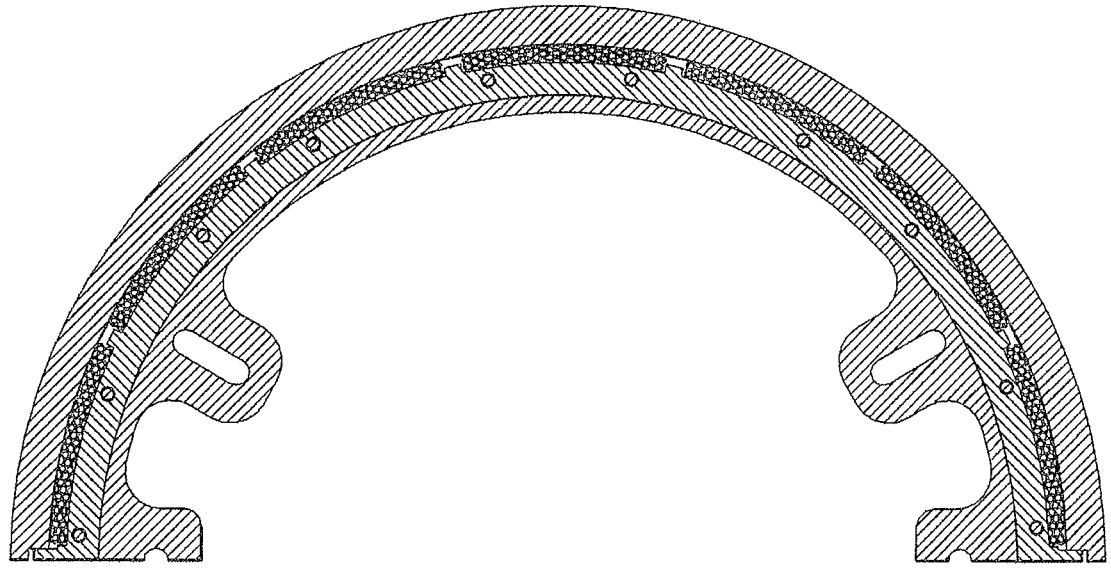

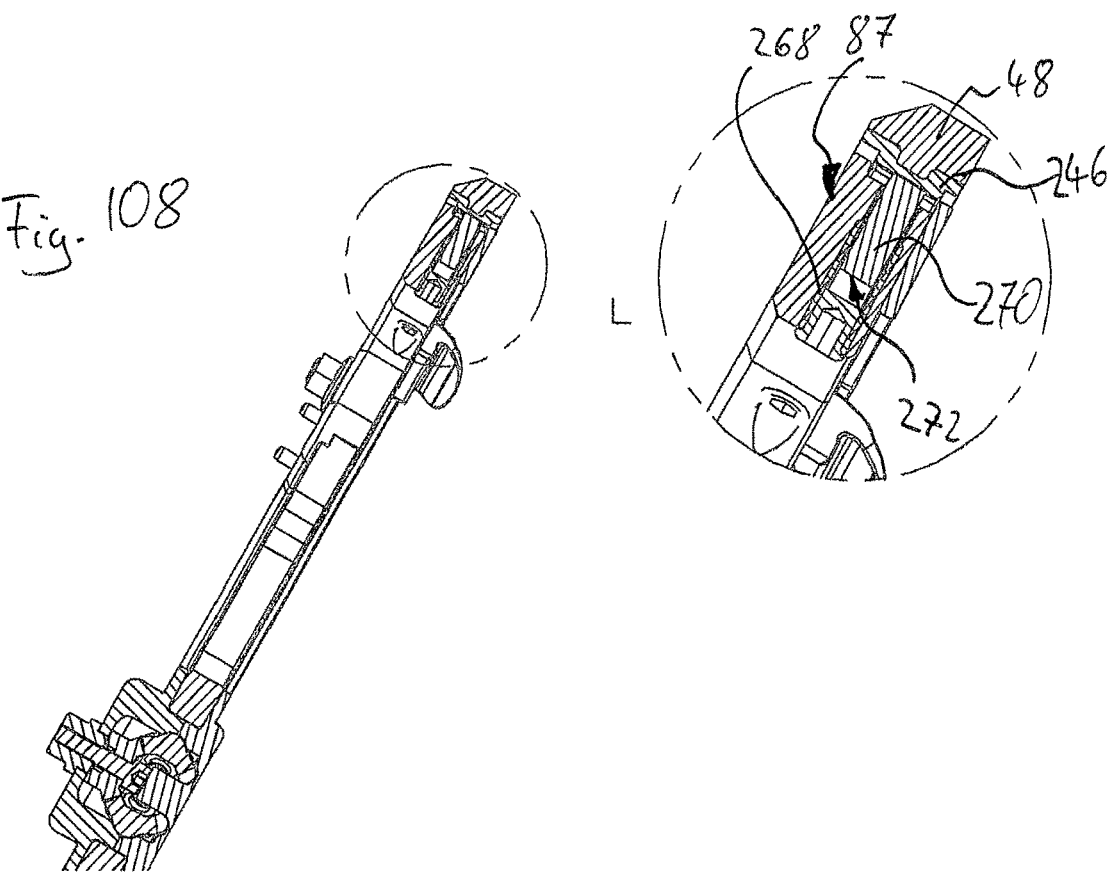
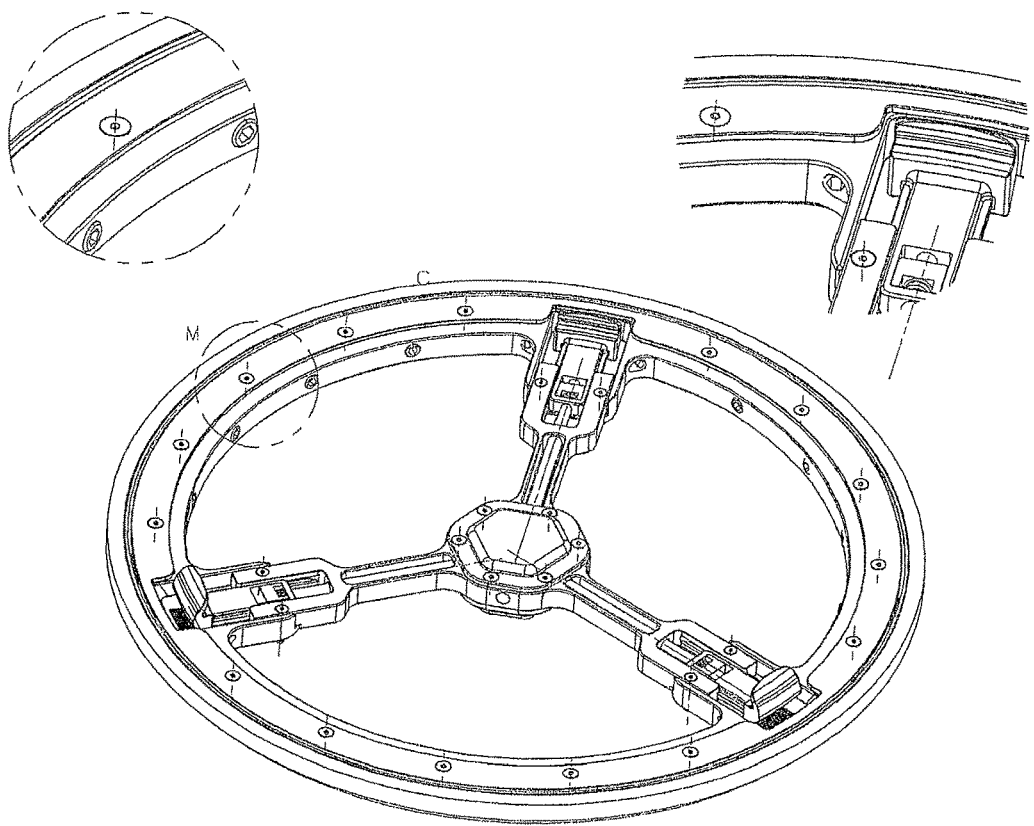
Fig. 108

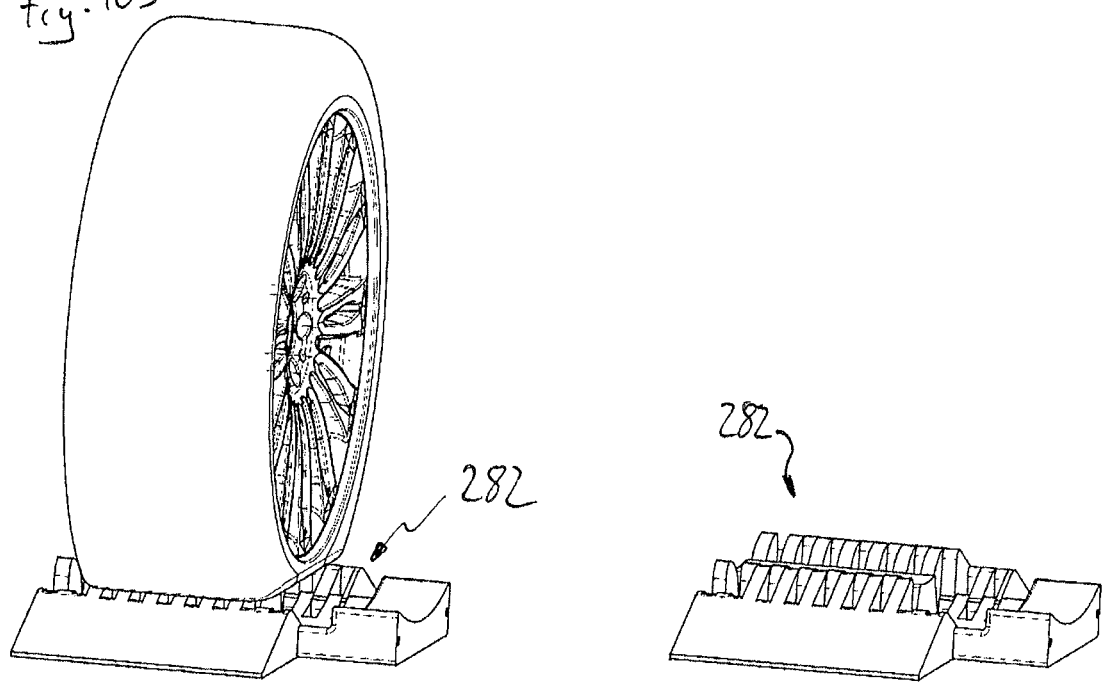
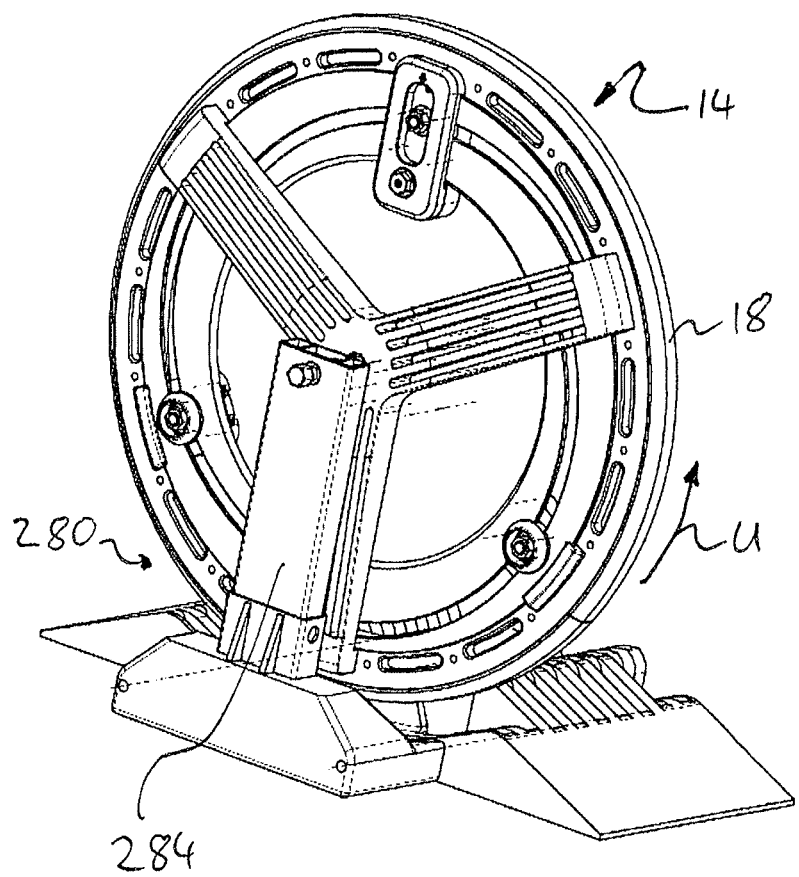
Fig. 109

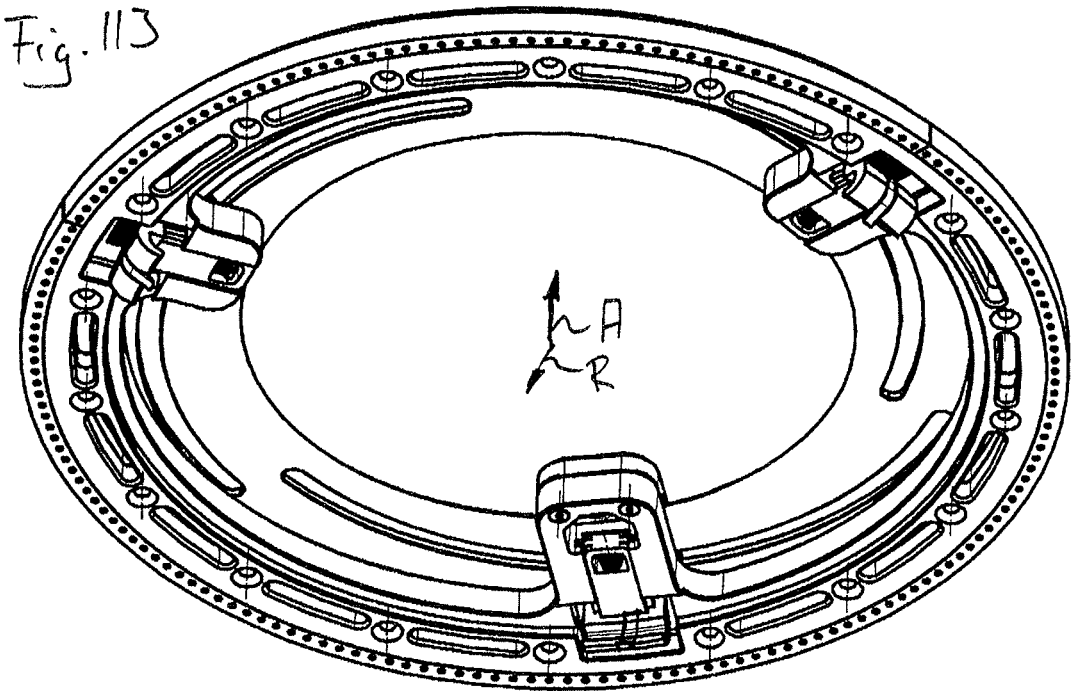
Fig. 113
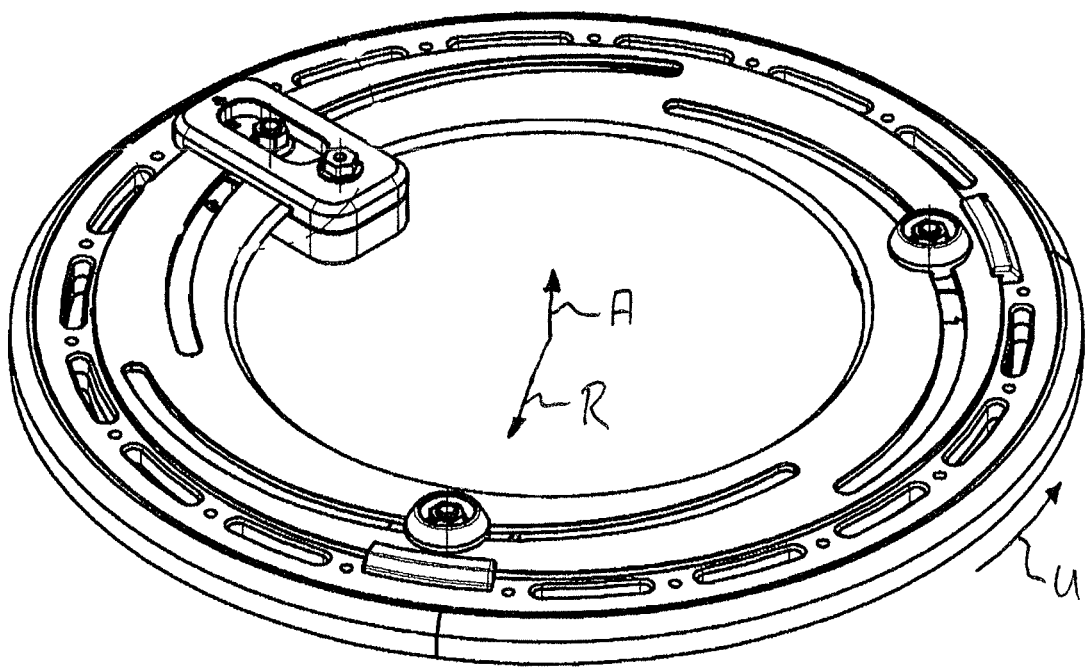

Fig. 115
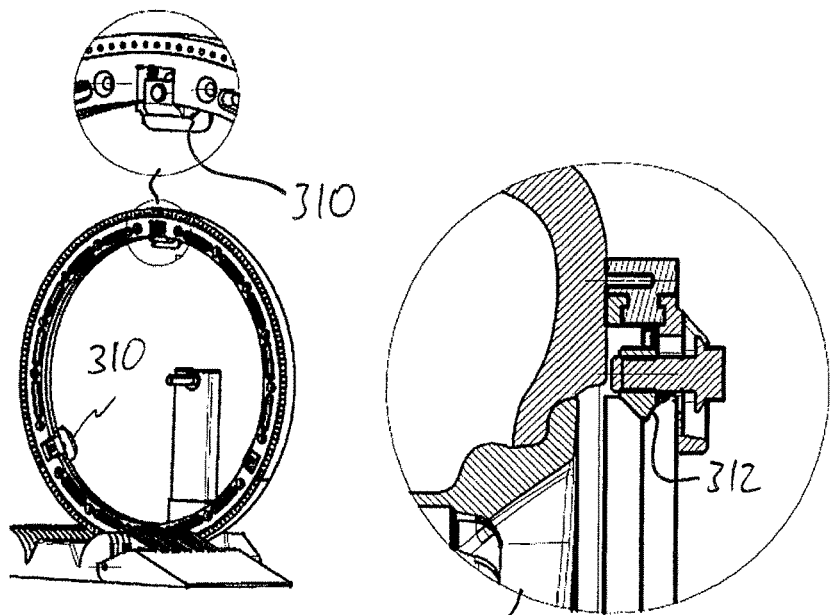
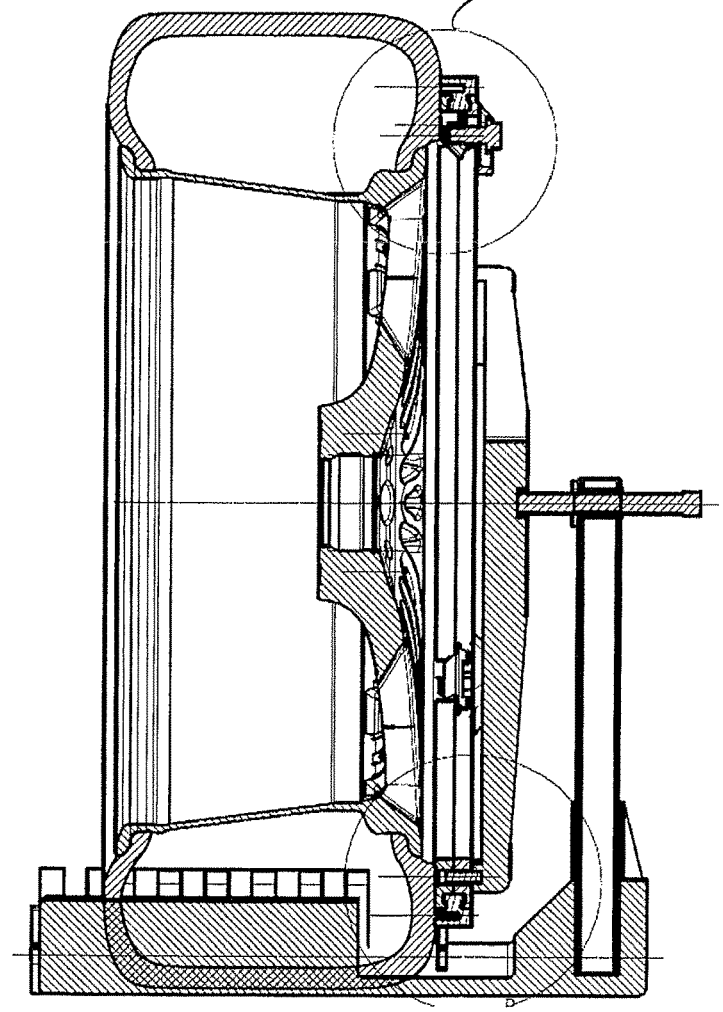

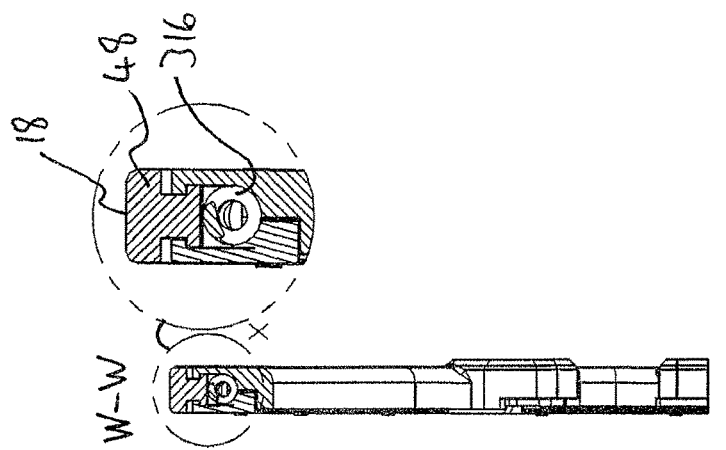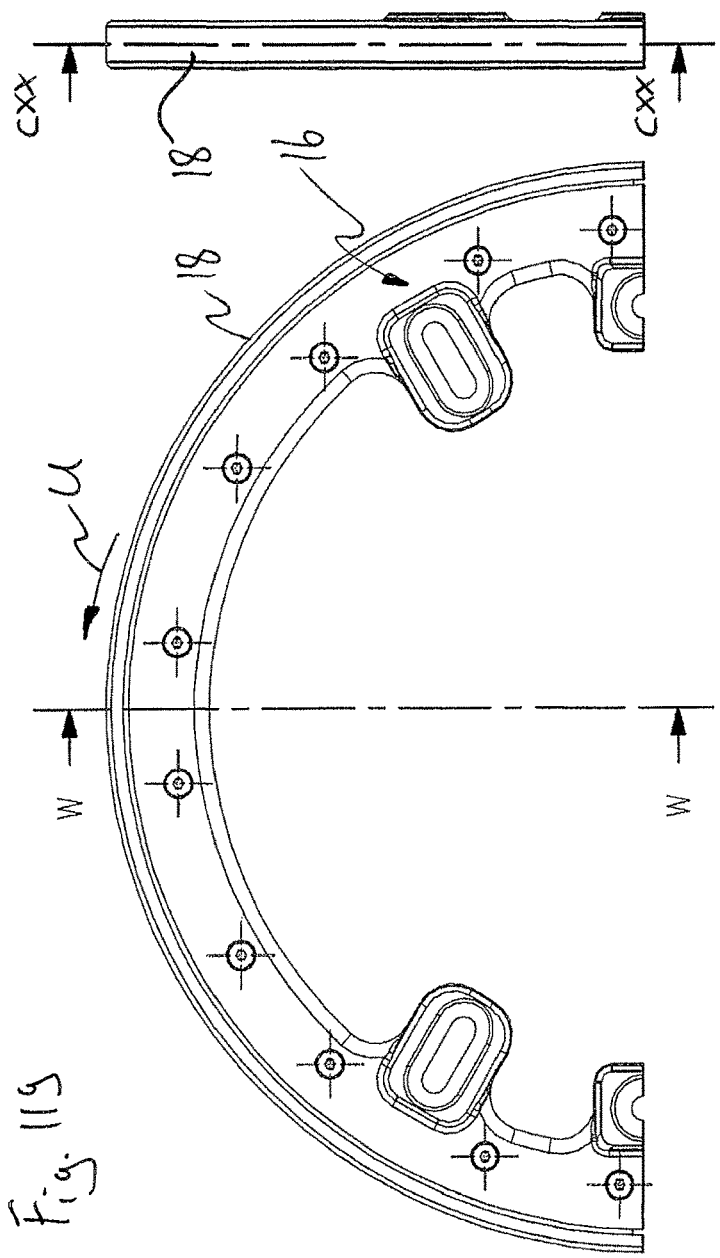
Fig. 119

CXX-CXX

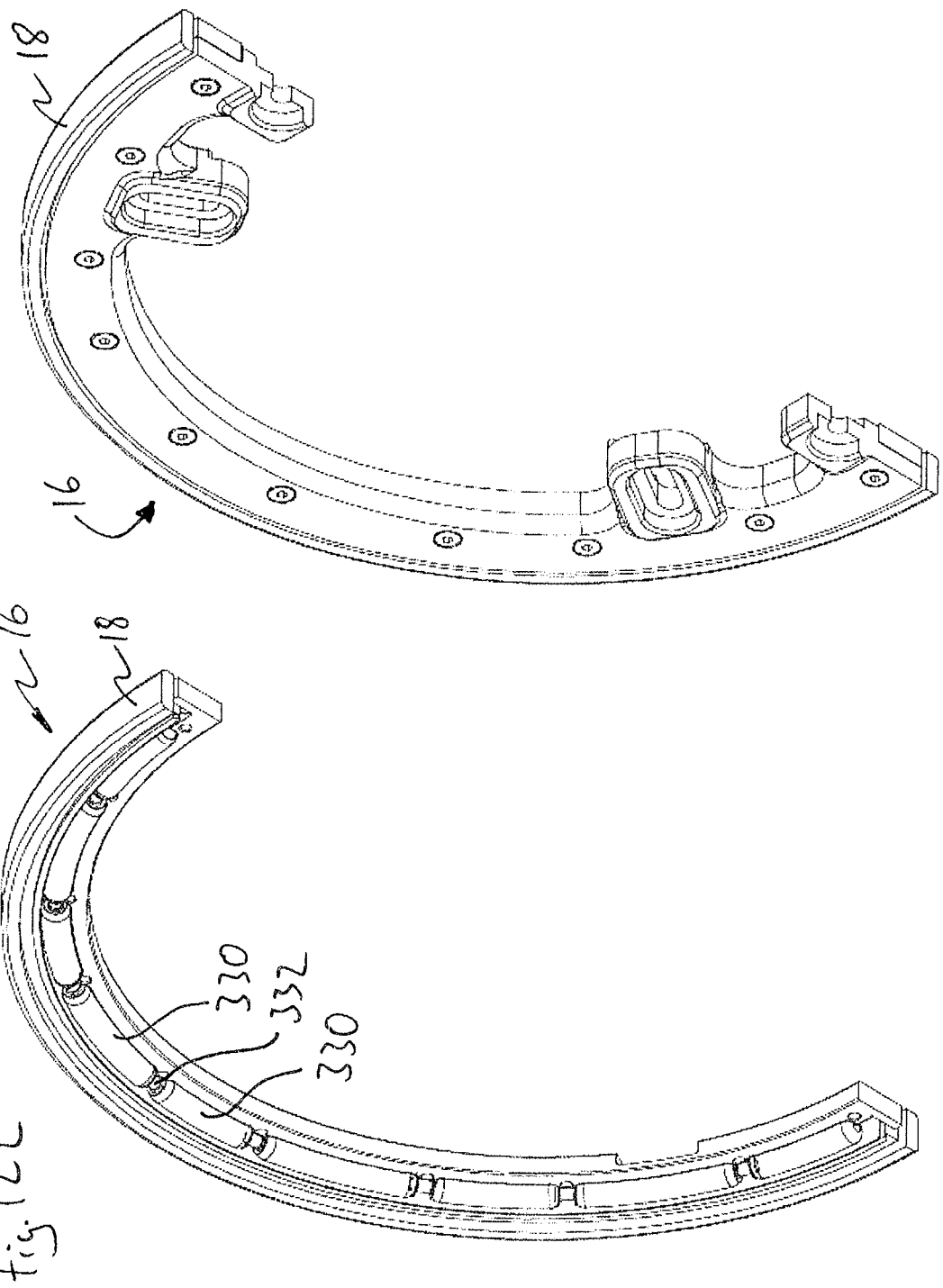

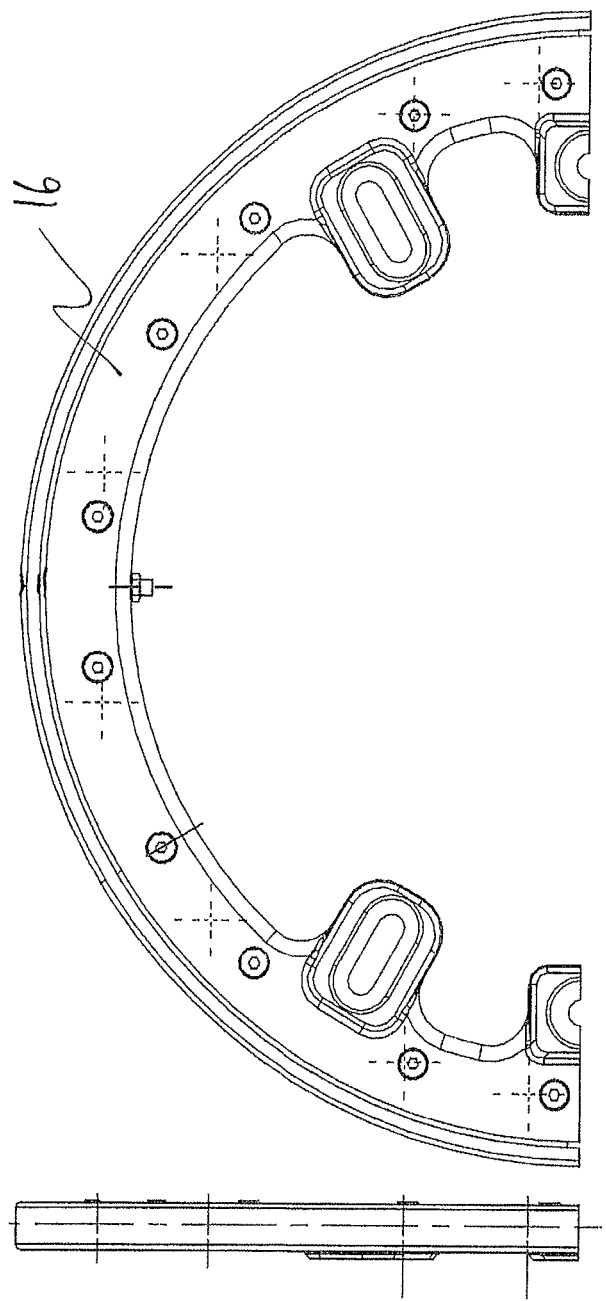
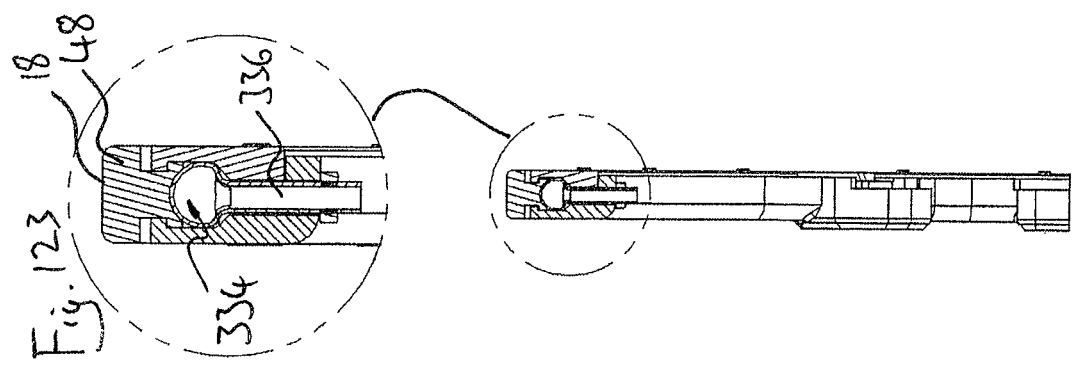
Fig. 123

EMERGENCY WHEEL

CROSS-REFERENCE TO RELATED APPLICATIONS

This is a national stage entry of International Patent Application No. PCT/EP2019/085891, filed Dec. 18, 2019, which claims the benefit of and priority to German Patent Application No. 102018010081.3 filed Dec. 20, 2018.

The present invention relates to an attachment for a vehicle wheel for enabling a driving operation with a restricted tire function according to the preamble of claim 1. In the following, an attachment of this kind is also described as an attachment of the type described at the beginning.

Vehicle wheel in the present case means a vehicle wheel of a motor vehicle. Driving operation with a restricted tire function means here a driving operation in which the tire is not operable with its given properties in normal road conditions and a normal tire state. A drive with a flat tire can be meant thereby, for example, or also operation of the vehicle on ice or packed snow. A preferred application of the present invention is enabling a drive with a flat tire.

In the case of an attachment affixed to the vehicle wheel, axial direction means here the direction of the rotary axis of the vehicle wheel. Radial direction means the direction orthogonal to this rotary axis of the vehicle wheel. Viewed from the rim of the vehicle wheel, the tire of the vehicle wheel is thus arranged radially on the outside. Radially on the inside is a bolt pattern of the rim, for example, with a central opening of the vehicle wheel, the bolt pattern of the vehicle wheel meaning here the arrangement of the holes in the rim that are provided to receive wheel bolts or stay bolts, and the central opening.

Circumferential direction means the direction along the circumference of the vehicle wheel, thus along its tire tread.

Inventive Aspect 1—Wear-Resistant Tread (Slip Compensation)

The object of a first aspect according to the invention is to provide an attachment for a vehicle wheel that can be used in a wear-resistant manner and that has high driving comfort.

This object is achieved by an attachment according to claim 1. The attachment according to the invention is thus an attachment for a vehicle wheel that comprises a rim and a tire arranged on the rim. The attachment is designed here to enable a driving operation with a restricted tire function in one operating state. By the operating state, a state is meant in this case in which the attachment is fastened to the vehicle wheel and enables a driving operation by supporting or assuming the function of any flat tire.

The attachment has a stationary section. In the operating state, thus when the attachment is firmly fastened on the vehicle wheel and serves to support the driving operation of the vehicle, this stationary section is fastened immovably with respect to the rim. In other words, the stationary section is designed so that it can be fastened on the vehicle wheel such that it is fastened immovably with respect to the rim in the operating state. The stationary section thus moves neither in a circumferential direction nor in an axial or radial direction with respect to the rim, but is fixed and arranged in a fixed relative position to this.

The attachment further has a tread section with a tread. The tread is arranged and designed for contacting the road. The tread thus forms the section of the attachment that contacts the road in the driving operation. The stationary section can form a part of the tread section.

Furthermore, the attachment has at least two clamping devices. Three, four or more clamping devices can also be provided, however (arranged distributed on the attachment in particular in a circumferential direction, in particular uniformly). The clamping devices are designed to engage behind a section of the rim. The fastening of the attachment on the vehicle wheel is realised by this rear engagement. Additional means for fastening are conceivable. The clamping devices (or the attachment) are designed in particular in such a way, however, that fastening of the attachment takes place due to their rear engagement with the rim. In particular, the rear engagement can be sufficient for fastening. In particular, the clamping devices can form the sole (single) fastening mechanism of the attachment. In particular, it can be provided that the clamping devices engage behind the rim flange of the rim. A positive-locking and frictional fastening of the attachment on the rim is guaranteed thereby. In a section through a section plane extending in a radial direction and axial direction (orthogonal to the circumferential direction), the clamping devices can comprise a rear grip section, which is designed in the manner of a hook, protrudes in an axial direction and runs radially on the inside, for positive engagement behind the rim flange. The rear grip section can be designed so that the clamping device, when it is moved in particular translationally radially inwards into rear engagement with the rim flange, presses in an axial direction towards the rim flange.

As also described further below, the attachment can comprise a contact surface or contact section, which is designed and arranged to contact the rim flange from axially outside and ensure a precisely defined position of the attachment with respect to the rim flange in the operating state.

The contact sections can each be a part (formed integrally with the clamping device) of the respective clamping device. They can also be mounted on the attachment separately from the clamping devices. If the contact sections are formed on the respective clamping devices themselves, the rear grip section can transition into the contact section, wherein an indentation (axially recessed section) running in an axial direction can be provided in the area of the transition between the rear grip section and the contact section on the side of and above the contact section.

It is provided according to the invention that the tread comprises at least one tread segment, which is arranged movably in a circumferential direction with respect to the stationary section in the operating state. The tread segment can mean here the totality of the tread, thus an annular element (tread body) which can move in a circumferential direction with respect to the stationary section. The tread segment can also mean, however, in the broadest sense a curvilinear part (sector) of the tread or of the body forming the tread, which is designed to be movable (in the operating state) in a circumferential direction with respect to the stationary section. A number of such movable tread segments are preferably arranged distributed around the circumference. It is conceivable that the tread segments obtain their mobility in a circumferential direction by an inclination, that they can therefore incline in the circumferential direction. In other words, the tread segments in this variant can be inclined in a circumferential direction and the movement of the tread segments takes place due to this inclination, wherein a radially inner section of the tread segments is immovable with respect to the stationary section. In another embodiment, however, the segments move translationally in the circumferential direction or are movable translationally in a circumferential direction. In this variant, therefore, not only is an upper section of the tread segment movable with respect to the stationary section and a lower section is connected immovably to this, but the entire movable tread segment can be displaced in the circumferential direction with respect to the stationary section. In other words, the area of the tread segment forming part of the tread moves in a movement of the tread segment with respect to the stationary section exactly (or at the same angular velocity) as an area of the tread segment arranged radially inwards from the tread.

The tread body can be supported movably in the circumferential direction in a seating of the stationary section by means of a clearance fit. The tread body can be held by means of a positive rear engagement (of the tread body or of an element fixedly connected to this) in a positive-locking manner with the stationary section in a radial direction.

It can be provided that the stationary section comprises an annular section, thus a section that is closed in the circumferential direction in the operating state (this annular section can be formed in multiple parts and only transferred to its circumferentially closed configuration in the operating state). The attachment can comprise a number of tread segments arranged distributed in a circumferential direction on the annular section, which segments are each disposed movably translationally in the circumferential direction with respect to the stationary section. The tread segments are preferably movable translationally with respect to the stationary section independently of one another. Instead of the individual movable tread segments, it can be provided that the tread section is designed so that the entire tread is arranged and designed rotatably about the axis of a direction with respect to the annular section of the stationary section. In this embodiment, the tread section can thus be rotated at least up to a certain angle with respect to the annular section of the stationary section. It can also be provided that the entire tread is rotatable with respect to the annular section without any limitation of the rotation angle. It can therefore be permanently rotated further. It can also be provided that the tread can only be rotated in one direction with respect to the annular section.

The individual movable tread segments can be spring-mounted in the circumferential direction on the stationary section (in particular annular section). The spring mounting can be formed by way of elastic elements. These elastic elements can be arranged between the individual tread segments and/or the spring mounting can be formed by way of flexible elements, which brace the tread segments movably with respect to the stationary section (in particular annular section). It is possible, for example, that individual plastic elements are arranged spring-mounted by means of springs or other elastic or flexible elements with respect to corresponding contact sections on the stationary section (in particular annular section). It is likewise possible that elastic elements, for example of elastic plastic, are arranged between individual tread segments and that a spring mounting is realised hereby.

As already stated further above, it is possible that the stationary section is constructed in multiple parts. It is conceivable in particular that the annular section of the tread section, in particular the entire tread section, seen in a circumferential direction, has at least two segments. The two segments can be detachable from one another and/or pivotable or displaceable relative to one another. In other words, the attachment can have a circumferentially divisible tread. The tread section can be advantageously stored in the vehicle hereby on the one hand, and on the other hand the assembly of the tread section or of the entire attachment can be simplified hereby.

It can be provided that the tread body bearing the tread is not coupled directly to the annular section of the stationary section. To support the tread body, the attachment can have a sliding element, which is connected immovably to the tread body on the one hand and on the other hand is movable in a circumferential direction with respect to the annular section but can be held positively in a radial direction (for example, in a double groove).

As already mentioned above, it is thus possible that the stationary section is part of the tread section. The tread section can thus comprise the stationary section that is immovable with respect to the rim and the segment of the tread that is movable with respect to the stationary section. The tread can be formed, for example, by means of a plastic element. It is also conceivable that the tread or the tread body having the tread has individual plastic segments or an annular plastic segment as a whole, which segments or segment are or is held in a metal seating and the seating enables a displacement with respect to the stationary section via a bearing arrangement. The tread body can be arranged supported movably with respect to the stationary section, for example, via a ball bearing, sliding bearing or other bearing device.

To enable the mounting of the attachment in a simple way, the attachment can comprise an assembly section. The attachment can in this case be designed such that on fastening of the attachment to the vehicle wheel or the rim of the vehicle wheel, the assembly section is first fastened in the position envisaged by the operating state. Following this, the tread section, which comprises the tread, can be attached. The attachment can be designed so that the assembly section is arranged lying radially inside the tread in the operating state (or in the fastening configuration provided for the operating state). Fastening the tread section on the assembly section means that this is fastened on the latter in the position envisaged for operation. It can already be connected to this on fastening of the assembly section. It is also conceivable for the tread section or parts of the tread section to be designed detachably from the assembly section. The attachment can be designed such that the assembly section remains connected to the tread section in the configuration envisaged for operation. If the assembly section is removable, it is also described in connection with the present application as a (removable) bracing unit.

The clamping devices can be arranged on the assembly section.

In the variant of the attachment with assembly section, the stationary section can be immovable with respect to the assembly section in the operating state.

It is also conceivable that the clamping devices or at least some of the clamping devices are arranged on the tread section. The attachment can hereby be designed without an assembly section, for example. This can be the case, for example, if the tread section is constructed continuously in the circumferential direction and the tread comprises a detachable circumferential segment (removable part).

Inventive Aspect 2—Removable Bracing Unit

A second aspect according to the invention relates to a bracing unit. The assembly of a generic attachment (preamble to claim 1), in particular of one of the attachments described previously and below (aspect 1 and 3 and ff.), can take place by means of a bracing unit.

The clamping devices can be arranged, for example, on the tread section or the stationary section (this can be part of the tread section). The attachment can comprise a bracing unit, which is designed to bring the clamping devices (which can be arranged on the stationary section) into rear engagement with the section or the rim flange of the rim. The attachment can accordingly be designed such that the bracing unit is detachable from the tread section or stationary section in the configuration provided for operation (operating state) or is detached from the stationary section or tread section in the operating state (and is accordingly no longer affixed to the vehicle wheel).

The bracing unit therefore serves only for assembly of the stationary section/tread section and is then removed. On removal of the bracing unit it is provided, however, that the clamping devices remain in their rear engagement position with the rim flange or the rim. The bracing unit is thus detachable from the stationary section/tread section without releasing the clamping devices from their rear engagement position. Accordingly, the bracing unit is removable from the attachment even in the operating state without releasing the clamping devices from their rear engagement position. The attachment can therefore be implemented in a very lightweight manner. It can be provided that only the tread section (comprising the stationary section if applicable) has to be provided and the clamping devices can be brought into the rear engagement position via the bracing unit to achieve a reliable fastening. Once assembly is complete, the bracing unit can be removed and only the tread section with tread and if applicable the stationary section remain on the vehicle wheel. To this end the tread section (if applicable stationary section) can be designed mostly curvilinear and designed in particular so that the inner area of the rim is not covered by the tread section/stationary section in the operating state, but rather the latter is only located in the peripheral area or in the area of the rim flange. In particular, the inner 50% of the diameter of the rim can remain uncovered by the tread section/stationary section. The attachment can be designed so that the inner 50%, in particular 60%, of the diameter of the rim is not covered by the attachment in the operating state when seen from an axial direction.

The bracing unit can be designed in particular such that it comprises multiple force transmission means for coupling respectively to one of the clamping devices. The force transmission means are preferably designed to move the clamping devices into rear engagement with the rim flange when the bracing unit is actuated, for example to move them (in particular translationally) radially inwards.

The force transmission means can comprise a flexible, for example cable-like, section.

Alternatively or in addition, the force transmission means can be shortenable in a radial direction. The force transmission means can be designed rigid in this case.

The force transmission means can be couplable to the clamping devices such that the latter are transferable to the rear engagement position with the rim due to a shortening of the radial extension of the force transmission means.

The force transmission means can be coupled detachably to the clamping devices by way of a positive-locking rear engagement, preferably hooked detachably in a positive-locking manner to the clamping devices.

The force transmission means can comprise a hook section, which is arranged and designed to engage by hooking from radially outside behind a corresponding hook—in section on the clamping devices.

The bracing unit can be designed in particular to move a number of clamping devices simultaneously. The bracing unit can comprise a central actuating device (for example, a tool application point) in particular, with which the movement of the clamping devices is triggered or brought about.

The bracing unit can have a transmission for converting a rotatory drive movement of an actuating element, preferably of a manual tool or a motor, in particular about the axial direction, into a movement or shortening of the force transmission means. The transmission can comprise in particular a drive bevel gear and a driven bevel gear. It can be provided in particular that a driven bevel gear is provided for each force transmission means. A driven bevel gear can therefore be associated with each of the force transmission means, the force transmission means being coupled to the driven bevel gear via a coupling agent. A suitable coupling agent can be a threaded rod, for example, which engages in a thread on the particular force transmission means.

Inventive Aspect 3—Heat Conduction Elements

A third aspect according to the invention relates to the object of providing an attachment with improved wear resistance of the tread. This object is achieved by the provision of heat conduction elements, which can be designed in particular as (for example strip-shaped) heat conduction plates. The heat conduction plates can be manufactured in particular from copper, aluminium or magnesium or comprise one or more of these materials.

The heat conduction elements are advantageously embedded in the tread body carrying the tread. It is conceivable, for example, that the tread body is fabricated from plastic and the heat conduction elements are moulded or cast into the tread body, for example. The tread body can therefore be moulded onto the heat conduction elements by a plastic casting method, for example injection moulding.

The heat conduction elements are generally preferably substance-bonded to the tread body. The heat conduction elements can extend out of the tread body. It can be provided that the heat conduction elements extend radially inwards from the tread body or the tread segments and extend in particular further radially inwards beyond any stationary section provided.

The heat conduction elements can be formed integrally with a metal base body of the tread section and extend into the tread body. In other words, the tread body can be moulded (for example, cast) onto a part of the metal base body of the tread section in such a way, for example, that the part around which moulding (for example casting) takes place is enclosed by material of the tread body.

The heat conduction elements have a higher heat conductivity than the material of the tread body, in particular a higher heat conductivity than the material of the tread section or stationary section (if applicable annular section).

It can generally be provided that the tread section (if applicable stationary section or annular section) comprises two elements, which are braced relative to one another in the axial direction. If heat conduction elements are provided, these can be arranged between the two elements. In particular, the heat conduction elements can be braced between the two elements of the tread section (if applicable stationary section or annular section). The two elements of the tread section can be formed by the annular section, for example, which can be implemented in two parts in the axial direction. In particular, the heat conduction elements can protrude radially inwards via the annular elements.

Alternatively or in addition to the heat conduction elements described here, it can be provided that the tread body comprises a plastic material into which particles, in particular metal particles, which improve heat conduction are incorporated. The particles improving heat conduction can be mixed into the plastic material, for example, in the casting or injection process. The particles improving heat conduction are preferably elongated, for example in the form of fibres. It is conceivable, for example, that the particles improving heat conduction are provided in the form of carbon fibres.

The present description is generally to be understood such that the other features of the various inventive aspects are to be understood as described combined together or with one another. It is thus meant that, for example, the above described heat conduction elements can be combined with the movable segments of the tread and/or with the removable bracing unit and are to be understood as described both as independent and in combination with these.

Inventive Aspect 4—Bracing Mechanism for Movement of the Clamping Devices and of the Tread Section The object of a fourth aspect according to the invention is to provide an attachment for a vehicle wheel that can be assembled as simply as possible. This object is achieved with an attachment of the type described at the beginning in that the attachment comprises a bracing mechanism, which is designed to bring the clamping devices into the rear engagement position with the rim on the one hand and on the other hand to bring about a movement of the tread section towards the rim in an axial direction.

The bracing mechanism can be designed so that the movement of the tread section takes place offset in time to the transfer of the clamping devices to the rear engagement position. In particular, it can be provided that first the transfer of the clamping devices to the rear engagement position commences and the start of the movement of the tread section takes place later.

The bracing mechanism can also be designed so that the movement of the tread section takes place simultaneously with the transfer of the clamping devices to the rear engagement position.

The bracing mechanism can be implemented, for example, such that first the clamping devices are moved into the rear engagement position; this can take place, for example, via a movement of the clamping devices directed radially inwards. Following this, the bracing mechanism moves the tread section towards the rim in the axial direction into the position envisaged for the operating state.

According to the present inventive aspect, the attachment therefore comprises a device, the bracing mechanism, which both moves the clamping devices into the rear engagement position with the rim and transfers the tread section to the envisaged position on the rim. For actuation, which triggers both movements, the bracing mechanism has an actuating device (tool application point, for example to introduce a force or a torque, or a switching device, via which a motor of the bracing mechanism, for example, can be actuated).

The tread section can be designed to be removable from the bracing mechanism. The tread section is expediently moved via the bracing mechanism in the axial direction towards the rim in order to transfer it to the position envisaged for the operating state. The bracing mechanism can comprise a tool application point. A force can be introduced via this tool application point to bring about the transfer of the clamping devices to the rear engagement position and to bring about the movement of the tread section into the bracing mechanism. The bracing mechanism can also alternatively or additionally comprise a drive, which provides the force to bring about the transfer of the clamping devices to the rear engagement position and the movement of the tread section. This drive can be of an electromechanical nature, for example. For example, the attachment can comprise its own energy source, such as an accumulator or a battery, for this. It is also conceivable that the energy is stored in a non-electrical manner, for example in the form of a medium under pressure, which provides the energy for the pertinent movement by expansion.

It can be provided that on transfer to the rear engagement position (in particular purely translationally with respect to the bracing mechanism), the clamping devices are moved radially inwards (in this case the clamping devices can "pull" the entire attachment towards the rim in an axial direction).

The bracing mechanism can have a transmission for converting a rotatory drive movement of an actuating element, preferably of a manual tool or a motor, in particular about the axial direction, into the movement of the clamping devices or the movement of the tread section. The transmission can comprise in particular a drive bevel gear and a driven bevel gear. It can be provided in particular that a driven bevel gear is provided for each clamping device. A driven bevel gear can therefore be associated with each of the clamping devices, the clamping devices being coupled to the driven bevel gear via a coupling agent in each case.

A suitable coupling agent can be a threaded rod, for example, which engages in a thread on the particular clamping device. The drive and driven bevel gear together with the coupling agents therefore together form a transmission and the coupling of the clamping devices to the transmission takes place via the threaded rod, which can in turn pull the clamping device radially inwards by means of a thread. A central drive bevel gear can be provided, and a number of driven bevel gears, preferably a driven bevel gear for each clamping device. The movement of the drive bevel gear can be transformed by means of the transmission into a corresponding movement, which moves the clamping devices. The coupling agent is part of the transmission here. The transmission converts the rotational movement of the drive bevel gear into a differently directed rotational movement and, due to the connection of the coupling agent to the clamping device (for example a threaded rod, which converts the rotational movement into a translational movement via engagement in the thread on the clamping device), into the corresponding translational movement of the clamping device.

The bracing mechanism, in particular the transmission, can have a tightening force limiting device, which limits the force with which the clamping devices are moved. Such a tightening force limiting device can be formed, for example, by a torque limiting device, which is integrated into the aforesaid coupling agent (for example, threaded rod).

In other words, a drive bevel gear can be arranged centrally on the attachment. This drive bevel gear can be designed to rotate about the axial direction via an electric drive, for example, or via a tool. A number of driven bevel gears can engage on the drive bevel gear. It can be advantageous in particular if a driven bevel gear is provided for each clamping device. A coupling agent, which can be a threaded rod in particular, can extend from the driven bevel gear to the respective clamping device. The combination of drive and driven bevel gear converts the rotational movement of the drive bevel gear into a rotational movement of the driven bevel gear in another direction (for example, about the radial direction). The rotational movement of the driven bevel gear can accordingly be transmitted to the coupling agent, in particular the threaded rod. The threaded rod can engage in the clamping devices via a thread, for example, and thus turn the rotational movement of the coupling agents into the (at any rate also) translational movement of the clamping devices.

The coupling agent or the threaded rod can comprise a torque limitation, so that the torque is only transmitted up to a certain resistance by the coupling agent or the threaded rod (tightening force limiting device).

The transmission can turn the drive movement also into a movement of the tread section. For example, the tread section can initially be arranged spaced at a distance from the bracing mechanism in an axial direction.

To bring about the movement of the tread section, it can be provided that the attachment comprises another coupling agent, which is coupled to the coupling agent for moving the clamping device or to the coupling agents for moving the clamping devices, for example. For example, both coupling agents can be connected via toothing (for example, gear-wheel sections. It can be provided that the other coupling agent is connected to a threaded section, which is set in rotation via a movement of the other coupling agent and engages in a mating thread on the tread section. Due to the movement of the threaded section and its engagement in the mating thread, the tread section can be movable in an axial direction, for example.

The bracing mechanism, in particular the transmission, can have a pressure limiting device, which limits the force with which the tread section is moved in the axial direction towards the rim. Such a pressure limiting device can be formed, for example, by a torque limiting device, which is integrated into the aforesaid other coupling agent (for example, threaded rod).

It is thus conceivable that a switchover takes place with torque control from the coupling with the clamping device to a coupling with the tread section that causes a movement of the tread section towards the rim, thus in an axial direction (if the tightening force of the clamping devices thus reaches a certain value, then a switchover can take place by means of a switchover device of the bracing mechanism to the movement of the tread section, for example until a certain pressure of the tread section is reached).

It can also be provided that the movement of the clamping devices and/or of the tread section takes place, by way of torque limitation, only up to a certain resistance.

Inventive Aspect 5—Drive-Off Aid

The object of a fifth aspect according to the invention is to provide an attachment for a vehicle wheel that guarantees particularly reliable operation, in particular even during operation of the attachment in regions where rails are laid in the road or other groove-like recesses exist in the road.

This object is achieved with an attachment of the type described at the beginning in that the attachment comprises a drive-off aid, which is used to drive out of a groove, in particular a track. The drive-off aid comprises an area of the tread projecting in an axial direction. In other words, when viewed in a radial direction the tread has an axial edge that does not run in a straight line but comprises areas protruding in an axial direction. It can be provided that the tread comprises an undulating structure projecting in an axial direction (viewed in the radial direction the tread has an axial edge that is formed wave-shaped). Preferably a number of projecting areas at any rate are arranged distributed circumferentially around the tread.

If the vehicle is driven with the attachment arranged on the vehicle wheel into a tram rail, for example, so that the attachment is located in the groove-like recess of the rail, the steerability of the vehicle may be influenced so that the "annulus-disc-like" attachment is located in the "groove". To make it easier to drive out of the groove, the projecting areas of the tread (the drive-off aid) contact the edges of the groove from above during a steering movement, whereby the attachment can be "lifted out of the groove", so to speak. The vehicle with attachment affixed is easily steerable even when the attachment is located in a groove-like recess in the road.

The projecting areas can be formed by the material of the tread or the tread body, for example plastic. It is also conceivable, however, that a metal coating section extends under the material of the tread/the tread body (the projecting plastic) to guarantee increased stability.

A drive-off aid can be used with all inventive aspects and embodiments described in this application.

Inventive Aspect 6—Damping Device

The object of a sixth aspect according to the invention is to provide an attachment to a vehicle wheel that is wear-resistant and has high driving comfort. This object is achieved with an attachment of the type described at the beginning in that the tread section comprises a damping device for damping the tread in a radial direction. This damping device can comprise, for example, a tread surface/tread body with varying stiffness in a radial direction.

For example, the tread surface/tread body can have a surface (which forms the tread) that is harder than a layer lying underneath it. It is also conceivable that the damping device is arranged underneath (radially inside) the tread body and formed separately from this. For example, the damping device can comprise a damping body formed separately from the tread body, which comprises a flexible, soft material layer (for example, a solid material that is deformable on loading). It is also conceivable that the damping body (or a radially inner section of the tread body) has recesses (the recesses can increase the compressibility in a radial direction). The damping body can in particular have a honeycombed section or have overall a honeycombed structure. The damping body can be manufactured from plastic.

The damping device can be designed so that the damping takes place due to elastic deformation of an element (for example, a spring element) separate from the tread body.

The damping device can comprise a spring element in particular. In particular, it can be provided that the damping device comprises a number of spring elements arranged distributed in a circumferential direction.

The spring elements can each be formed as in particular metal mechanical springs. The spring elements can be formed as a metal honeycomb structure, for example. The spring elements can also be designed as wavy spring elements, which can have an undulating structure when seen in the axial direction, for example (a radially outer area alternates with a radially inner area and the radially outer areas support the tread body radially outwards. The radially inner areas can rest on a metal base body of the tread section). It is also conceivable that the individual spring elements are formed as leaf-spring-like springs. The leaf-spring-like springs can be formed, for example, by a number of U-shaped springs, which have a central section for contacting a radially inner area of the attachment (for example, the metal base body of the tread section) and outer sections respectively that are provided for supporting the tread body in a radial direction. Combinations of different spring elements are possible. The spring elements can also be designed as spiral springs arranged extending in the circumferential direction.

The damping device can therefore be designed and arranged to provide a spring effect by reversibly elastic deformation of an in particular metal spring element.

A tread surface that is supported flexibly in a radial direction not only has an advantageous effect on driving comfort, but it is also guaranteed hereby that the wear of the tread or of the tread surface remains low. The damping device can be designed so that the damping is provided based purely on an elastic material deformation by the damping device.

It can be provided that the tread body is arranged on a metal carrier body. The carrier body can be designed to deform during the rolling process. To this end it can be provided in particular that the carrier body is formed thin-walled so as to deform with a deformation of the tread body. Alternatively it can also be provided that the carrier body is formed rigid and does not deform during the process of deformation of the tread body. In particular, it is possible with both types of carrier body that the actual damping device is arranged radially inside of the carrier body. Seen in a radial direction, therefore, the tread body can be arranged outside and following this in a radial direction the carrier body and then the damping device, for example in the form of mechanical springs. In the case of a rigid carrier body, virtually the entire carrier body is displaced in a radial direction during the spring process. If the part of the carrier body facing the road is thus moved towards the base body of the tread section, then on the opposite side the carrier body moves in a radial direction away from the metal base body of the tread section, for example the stationary section. In contrast to this, if a flexible or elastically formable carrier body is provided, the carrier body deforms virtually only in the area in which the tread body contacts the road.

The damping device can also be formed in that the attachment is designed with a tread body, which comprises a pressure chamber, which is or can be acted upon by a pressure medium (filled with a medium, in particular a gas with long molecule chains or nitrogen and closed gas-tight). The pressure chamber is designed and arranged here so that the tread is damped during the rolling process of the tread over the road by the pressure medium located in the pressure chamber. The pressure chamber is preferably acted upon by pressure medium via a check valve.

The damping device can be formed separately from the tread body. In particular, a pressure chamber can be provided radially inside of the tread body.

The pressure chamber can advantageously be combined with the below-named pressure-generating device and the pressure-generating device makes available pressure medium under pressure for filling the pressure chamber. The damping device can thus be formed sprung by gas pressure. In other words, the damping property of the damping device can be based on the compression of a gaseous medium.

The damping device can also comprise a media chamber that is filled with a liquid, in particular a high-viscosity medium. The media chamber can in particular comprise sub-chambers, which are each connected fluidically to one another, the connection sections of the sub-chambers to one another having a higher flow resistance (bottlenecks in the flow cross section) than the sub-chambers.

In addition or alternatively to the damping device, it can be provided that the attachment comprises a tread body, which in turn comprises a section that damps in an axial direction. It is meant by this that the damping section enables a compression of the tread body in an axial direction. For example, the damping section can be designed such that it is more flexible in the axial direction than the material of the tread body surrounding it axially inside and outside respectively. The arrangement of two partial tread bodies following one another in an axial direction and which are connected to one another in an axial direction via the damping section in the axial direction is also conceivable. For example, the damping section can be formed in the form of a flexible material arranged between these two partial tread bodies. It is also conceivable that flexible elements are arranged between the two partial tread bodies.

Inventive Aspect 7—Pressure-Generating Device

The object of a seventh aspect according to the invention is to provide an attachment for a vehicle wheel that in the driving operation draws supportively on the tire arranged on the rim of the vehicle wheel.

This object is achieved according to the invention in that the attachment comprises a pressure-generating device, which is designed and arranged to put a fluid medium under pressure by a rolling movement of the attachment.

A pump function can advantageously be effected by the fluid medium put under pressure, with which function the tire that is supported by the attachment and is impaired in its operation can be supplied with compressed air or with gas under pressure. It can be provided, for example, that the tread body of the attachment contacts a pump coating. This pump coating can comprise cavities, which can each be equipped with flutter valves, so that the cavities expand in the relaxed state of the pump coating and fill with ambient air. If the attachment then rolls in the circumferential direction, the tread coating exerts pressure on the pump coating and the cavities are compressed, so that the air located in the cavities can escape under pressure through flutter valves opening on the outlet side. The attachment preferably comprises a collective pipe, which connects a number of pressure-generating spaces of the pressure-generating device, in particular the cavities mentioned, to one another. This collective pipe can open into a connection pipe. The connection pipe can be connectable in turn to the tire. It can advantageously be provided that the collective pipe can be formed by a groove extending in the circumferential direction, preferably fully around the attachment.

It is also possible that the pressure-generating device comprises at least one cavity, this cavity being arranged radially inside of the tread. A wall section of the cavity can be movable by a rolling movement of the attachment such that the volume is reduced by the movement of the wall section and the medium located in the cavity is compressed by the volume reduction. This can be formed, for example, by a cavity in the tread surface that is squeezed by the movement, due to which its wall moves. Due to the compression of the cavity volume, the gas located therein is put under pressure and can escape via a suitable valve device, for example the flutter valves already mentioned above, and be supplied to the tire, for example.

The aforesaid collective pipe can be formed for example as a groove in a part of the attachment.

The pressure-generating device can also be formed by a cylinder-piston arrangement, for example, wherein the piston can extend into the tread or in contact with the tread body, for example, so that the piston moves when the tread rolls over the road. The piston can also be indirectly in contact with the tread, for example via a suitable coupling agent, which can transfer a pressure on the tread to a movement of the piston.

Inventive Aspect 8—Assembly Section with Pivotable Limbs

The object of an eighth aspect according to the invention is to provide an attachment that is easy to manufacture and can be mounted efficiently on the rim of a vehicle wheel. This object is achieved with an attachment of the type described at the beginning in that the attachment has an assembly section which comprises the clamping devices, the assembly section having in turn two limbs that are pivotable relative to one another. Here the limbs can be formed movably relative to one another via a pivot joint, for example.

At least one clamping device is arranged on each of the limbs. A third clamping device is preferably provided, and at least one of the clamping devices can be varied in its relative position with respect to the other two clamping devices by pivoting one of the limbs.

The assembly section can be connected to the tread section or a part of the tread section.

The attachment according to this inventive aspect preferably has a clamping device arrangement in which one of the clamping devices is held (in particular, the clamping device of the clamping device arrangement can be fixed in different radial positions coordinated to different rim diameters) and two limbs, which extend with respect to the clamping device arrangement pivotably away from this and each carry another clamping device. The other clamping devices can accordingly be adjusted in their relative position to one another and in their relative position to the clamping device in the clamping device arrangement by pivoting of the respective limbs.

The attachment according to this inventive aspect can have a bracing element via which the two limbs can be moved opposite to one another. The two limbs can preferably be braced towards one another. It is possible hereby to apply the clamping devices to the rim of the vehicle wheel in a state of the limbs moved away from one another and finally to brace the two movable or pivotable limbs against one another such that the clamping devices come into rear engagement with the rim flange.

The bracing means can preferably comprise a length-variable element for this purpose. This can be realised, for example by a double-threaded sleeve and two threaded rods. The two threaded rods are arranged for this purpose (pivotably, for example) at the free ends of the limbs. The thread-bearing sections of the two threaded rods, which extend away from the limbs, can be taken up in the double-threaded sleeve with opposed threads. Due to twisting of the threaded sleeve, the two threaded rods are screwed into the threaded sleeve and the length-variable element formed by the threaded rods and threaded sleeve is shortened in its extension between the two limbs, so that these are drawn towards one another. The rim or the rim flange can be braced hereby between the limbs or between the clamping devices arranged on the limbs.

The clamping means can also comprise a lever mechanism, for example, by means of which the two pivotable limbs can be braced towards one another. The lever mechanism can comprise a spring device for this purpose, which on bracing by means of the lever draws the two limbs towards one another with a defined spring force. It can be provided that the clamping device in the area of the free ends of the limbs is articulated to these. The clamping means is preferably arranged closer to the free end of the limbs than the respective clamping devices of the limbs. A lever arm of the pivotable limbs can be utilised particularly well hereby.

Inventive Aspect 9—Pretensioned Clamping Devices

The object of a ninth aspect according to the invention is to provide an attachment for a vehicle wheel that can be mounted particularly easily.

This object is achieved according to the invention in that the attachment comprises at least one, in particular at least two, in particular at least three clamping devices, which are pretensioned in a radially inward position (for example, by means of pressure spring elements or also a pretensioning element of a different kind). In particular, the clamping devices can be designed to be spring-pretensioned.

In particular, a leaf spring arrangement can form a pressure spring element, which can be provided to pretension the clamping devices in a position directed radially inwards.

A stop section lying radially outwards can be provided on the attachment, on which section the pressure spring element rests and lying radially inside of this a stop section of the clamping devices on which the other end of the pressure spring element rests. The clamping devices are now movable radially outwards against the tension of the pretensioning element (here the pressure spring element), which can be formed by the leaf springs. In this state the clamping devices can be set on the rim flange. Due to the pretensioning of the springs, the clamping devices are now drawn radially inwards and slide here along the rim flange and end in positive-locking rear engagement with the rim flange.

It can also be provided that the clamping devices are locked in a state lying radially outwards and the pretensioning can be released by actuation of a release device (also described as a locking device), so that the clamping devices are pushed radially inwards by the pretensioning.

Following release, the clamping devices are pressed radially inwards. The clamping devices can thus be set on the rim flange in their state lying radially outwards (locked). In the applied state, the pretensioning device can be released accordingly and the clamping devices push radially inwards, due to which the clamping devices can slide into the rear engagement position with the rim flange. The clamping device can have a clearance due to the pretensioning.

It can be provided that the attachment comprises only one spring-pretensioned clamping device. At least two other stationary clamping devices are preferably provided, which are arranged spaced at a distance in the circumferential direction from the spring-pretensioned clamping device. The attachment preferably comprises a curvilinear assembly section or a curvilinear stationary section on which these clamping devices are arranged. This assembly section or stationary section can be set on the rim flange and by way of the spring pretensioning of the pretensioned clamping device this can be brought into the rear engagement position with the rim flange. Then either the tread or a part of the tread section can be affixed to the clamping devices or the tread can be completed in the circumferential direction by insertion of another segment of the tread. A majority of the tread can already be arranged on the part of the attachment equipped with the clamping devices and after the clamping devices have been moved into the rear engagement position with the rim flange, the attachment can be moved forward with the vehicle wheel, for example by half a revolution. The tread can then be completed by insertion of another tread segment and the assembly of the attachment can be completed. An attachment of this kind has the advantage, for example, that the central area of the rim can remain free and the attachment only extends in the outer area, thus in the area of the rim flange of the rim. This can be advantageous if the attachment can also be used on rims that extend in the central area further outwards than the rim flange in an axial direction.

Inventive Aspect 10—Bracing by Means of a Bracing Mechanism with a Curved Track The object of a tenth aspect according to the invention is to provide an attachment that is designed to be able to be mounted easily on rims with different contours in the area of the spokes.

This object is achieved according to the invention in that the attachment has a bracing mechanism for the clamping devices that comprises a curved track. In particular, the bracing mechanism for the clamping devices can be formed in the manner of an annulus disc and carry the curved track. In particular, the attachment according to this inventive aspect can be assembled in a simple manner on rims that protrude far out axially in the central area (for example, beyond the rim flange in an axial direction). The clamping devices are arranged in the area of the rim flange. The curved track in turn in the area of the clamping devices, so that a central area of the rim can remain unconcealed by the attachment.

The attachment can thus have a bracing mechanism for movement of the clamping devices that comprises a curved track, in particular a number of curved track sections, the clamping devices being coupled to the curved track via a respective engagement section that engages in the curved track, so that the clamping devices are movable by a relative movement of the parts of the bracing mechanism carrying the curved track.

The clamping devices can have protruding elements (or generally engagement sections), which can engage in the curved track, for coupling to the curved track. Due to twisting (or, depending on the arrangement of the curved track, a relative movement of the parts carrying the curved track to the clamping devices) of the parts of the bracing mechanism carrying the curved track, the clamping devices can be moved, for example in a radial direction. The curved track extends in a circumferential direction with a change in its radial position, so that the radial position of the clamping devices is variable on movement in a circumferential direction of the parts of the bracing mechanism carrying the curved track. For this purpose the bracing mechanism preferably has for each clamping device a curved track in the form of a slot, which comprises a first circumferential end lying radially on the inside and a second circumferential end lying radially on the outside. The radial position of the curved track changes steadily between the two circumferential ends.

Inventive Aspect 11—Pivotable Clamping Devices

The object of an eleventh aspect according to the invention is to provide an attachment for a vehicle wheel that can be mounted particularly efficiently. To this end the attachment preferably has a clamping device that is pivotable radially inwards. The attachment preferably has two other clamping devices that are immovable on assembly of the attachment. Using these two immovable clamping devices, which are spaced at a distance from the pivotable clamping device in a circumferential direction, the attachment can be applied to the vehicle wheel. The pivotable clamping device can be pressed in the direction of the rim flange so that its tip rests on the rim flange. The pivotable clamping device can then be pivoted into the rear engagement position with the rim flange, for example via a lever. The clamping devices in this implementation variant are preferably arranged offset from one another by 100° to 140°, in particular 110° to 130°, in particular 120°, in each case. The attachment preferably has a stationary section or assembly section in the form of a circular arc segment on which the clamping devices are arranged. The attachment preferably has two limbs, which extend away from the pivotable clamping device in a circumferential direction, the two fixed clamping devices being arranged at the free ends of the limbs. The pivotable clamping device preferably has a lever application point for connection to a lever mechanism.

Inventive Aspect 12—System

The object of a twelfth aspect according to the invention is to provide an option by means of which an attachment can be mounted as easily and quickly as possible.

This object is achieved by system comprising an attachment, in particular according to one of the embodiments described in this application, for a vehicle wheel, which comprises a rim and a tire arranged on the rim, wherein the attachment is designed to enable a driving operation with a restricted tire function in an operating state in which it is fastened on the vehicle wheel, wherein the attachment comprises a tread section, which has a tread of the attachment for contacting the road, and wherein the attachment comprises at least two, in particular at least three, in particular at least four, clamping devices, wherein the clamping devices are designed to engage behind a section, in particular a rim flange, of the rim, wherein the system further comprises a lifting device, which is designed to lift the vehicle wheel with a restricted tire function, by driving the vehicle onto the lifting device and if applicable by a lifting process, in such a way that the attachment with circumferentially closed tread can be fastened on the vehicle wheel.

The lifting device can comprise an inflatable section for placing under the vehicle wheel with a restricted tire function. The lifting device can further comprise a connection for a pressurised gas cartridge, preferably a CO2 pressurised gas cartridge (the pressurised gas cartridge is connectable fluidically via the connection to the inflatable section).

The lifting device can be designed ramp-like. The lifting device can be designed to be collapsible/foldable (via one or more hinges, for example).

The attachment of this inventive aspect can comprise a tread section, which is neither collapsible nor foldable or movable in another manner changing the outer circular ring contour of the tread.

Furthermore, the lifting device can comprise a support element, which is arranged and designed to support a corresponding attachment in an axial direction to the vehicle when a vehicle wheel is located on the lifting device. The support element is preferably designed so that it comprises a device to push the attachment in the axial direction in the direction of the rim. For example, a screw mechanism can be provided for this by means of which the attachment can be screwed in the direction of the vehicle wheel.

The support element is preferably designed in the manner of a strut and extends from a part of the lifting device contacting the road, on which part the vehicle wheel also stands, upwards in a vertical direction. Due to the weight of the vehicle located on the lifting device, the device is pressed practically firmly on the ground and the support element extending up from a ground area of the lifting device is held securely and stably. The support element can be formed as a square tube, for example.

It is possible to combine the lifting device according to the inventive system with an attachment that is formed in one piece in a circumferential direction and also has clamping devices in the form of sliders tensioned radially inwards. The sliders tensioned radially inwards can have a flatter slope on their side facing the rim than on their side provided for contacting the rim. The attachment with the sliders tensioned radially inwards is pushed virtually with the sliders in the position located radially inwards in an axial direction onto the rim. Due to the slope on the side of the slider facing the rim, the slider is moved radially outwards. After the sliders have been pushed over the rim flange, they are moved by the spring pretensioning of the sliders into rear engagement with the rim flange. On their side formed for contacting the rim flange, the sliders preferably have a contour formed complementary to the rim flange. The sliders can then be connected fixedly to the tread section by means of a fastening device, so that the sliders are prevented from moving out of the rear engagement position with the rim flange.

Inventive Aspect 13—Protective Strip Slider Mechanism

The object of a thirteenth aspect according to the invention is to provide an attachment for a vehicle wheel that is particularly suitable for assembly on vehicle wheels with tires with a protective strip.

To this end a pivotably articulated clamping device is provided on an attachment of the type named at the beginning, a slider mechanism for the protective strip being provided in addition in the area of the clamping device. The pivotable clamping device is additionally movable in a radial direction via a central tool application point. At least three such clamping devices combined with a respective protective strip slider mechanism are preferably arranged distributed around the circumference of the attachment. During a radial movement of the clamping device, the protective strip slider mechanism likewise moves in a radial direction. To brace the attachment on the vehicle wheel, it is provided in this case that the protective strip slider mechanism is brought into engagement with the protective strip via actuation of the tool application point and then a movement directed radially outwards of the clamping device and of the protective strip slider mechanism is brought about. Once the clamping device has been moved far enough radially outwards, it pivots via spring pretensioning automatically into the rear engagement position with the rim flange. This automatic pivoting is possible because the tire has been pushed away from the rim flange by the protective strip slider mechanism, so that sufficient clearance exists for pivoting the clamping device. Following pivoting in of the clamping device, the clamping device together with the protective strip slider mechanism is moved radially inwards and the individual clamping devices are thus braced relative to one another.

Due to retraction (in a radial direction) of the protective strip slider mechanism, the tire returns to contact with the rim flange or the clamping device now located on the rim flange and presses this (these) clamping device(s) additionally against the rim flange. A particularly secure fastening of the attachment via the clamping devices is enabled hereby.

Following this fastening process, a tread section can then be attached by way of the clamping devices located on the assembly section. This can take place via fastening devices designed similar to those from previous embodiments.

The protective strip slider mechanisms are preferably arranged on both sides of the pivotable clamping devices. The pivotable clamping devices are preferably tensioned via leaf springs towards the rim in their pivot position.

Inventive Aspect 14—Pivoting by Means of a Movement Directed Radially Outwards

The object of another aspect according to the invention is to provide an attachment that can be affixed to a vehicle wheel in a simple manner.

This object is achieved according to the invention with a generic attachment in that it has a number of clamping devices, which can each be pivoted into a rear engagement position with the rim flange by a movement directed radially outwards of an activation element. The activation element is preferably movable in its radial position by means of a threaded rod that screws into or out of the activation element. The activation element is preferably arranged in an activation frame that is arranged in turn pivotably on the respective clamping device. The activation element is preferably arranged movably translationally in the activation frame. The respective clamping device preferably has a pivot axis lying axially inside and fixedly connected to the respective assembly section of the attachment.

General

As already mentioned above, the present description is to be understood as meaning that the respective other features of the individual inventive aspects are each to be understood (apart from their character as independent inventions) as a development of the respectively other inventive aspects. Furthermore, the other aspects described below, wherein these have already been mentioned above in some cases, can be present in the embodiments and various inventive aspects described in this application.

The tread section can be constructed in multiple parts in the circumferential direction. In the separated state of the tread section, this does not form a fully closed circular ring.

The tread section can be constructed continuously in a circumferential direction, wherein the tread comprises a withdrawable circumferential segment (removable part). It can thus be provided that a radially outer part of the tread section has a circumferential interruption, while a radially inner part of the tread section is closed in circumferential direction and thus the tread section is constructed continuously in itself.

The attachment according to the invention can hereby be mounted without using a means for lifting the damaged vehicle wheel. For example, first the assembly section can be attached. Then a first circumferential segment of the tread section can be mounted on the assembly section already fastened to the vehicle wheel. The vehicle wheel with the partial attachment located thereon can then be rotated and the other circumferential segment of the tread section can be inserted or attached. Assembly is then complete. (With this type of design of the tread section, it can be provided in particular that the attachment manages without a separate assembly section. In other words, the attachment substantially comprises only the two parts of the tread section and no other components.)

When using a tread section with a withdrawable circumferential segment of tread, the tread section can be fastened, for example, directly on the vehicle wheel or on the assembly section initially with the withdrawable segment removed (with the recess designed for combination with this segment oriented towards the road). The vehicle wheel can then be rotated so that the corresponding recess points upwards, and the withdrawn segment of the tread can be inserted. In the case of a tread rotatable completely about the axial direction with respect to the stationary section, it can be provided that corresponding transitions between the circumferential segments of the tread section or the withdrawable segment and the rest of the tread section nonetheless permit displacement of the tread with respect to the stationary section. Bearing of the tread body is designed, for example, to this end such that no stop exists in a circumferential direction on which the tread body could rest and could thereby be obstructed in a movement.

It can be provided that the tread section is detachable from the clamping devices.

It can be provided that the clamping devices are affixed to an assembly section that can be fastened separately from the tread section on the vehicle rim.

It can further be provided that at least one, in particular several, in particular all, clamping devices have a fastening section with a fastening device. The fastening device serves to or is designed to fasten the tread section on the clamping devices. On fastening of the tread section on the clamping devices, the fastening device is designed in such a way that the tread section is braced in an axial direction against the clamping devices so that it is secured via a clamping fastening against play with respect to the clamping devices.

The fastening device can be designed such that upon fastening, the tread section moves by means of the fastening device in an axial direction towards the rim.

It can be provided in particular here that the tire is pushed away from the rim flange in the direction of the rim base by fastening of the tread section on the clamping devices. It can be provided that the bracing of the tread with respect to the clamping devices is combined with the contact section already mentioned further above to ensure a precisely defined position of the tread with respect to the rim flange.

In the case of the described attachments according to the various inventive aspects, it can be provided that at least one of the clamping devices, in particular a number of clamping devices, comprises in a section through a section plane extending in a radial direction and axial direction a rear grip section, which protrudes in an axial direction, runs radially inwards and is designed in the manner of a hook, for engaging positively behind the rim flange. The rear grip section can be designed so that the clamping device, when it is moved in particular translationally radially inwards into rear engagement with the rim flange, presses in an axial direction towards the rim flange (the rear grip section has a corresponding inclination for this purpose). As also described further above, the attachment can comprise a contact surface or contact section, which is designed and arranged to contact the rim flange from axially outside and ensure a precisely defined position of the attachment with respect to the rim flange in the operating state. Clamping devices of this kind slide accordingly in a movement directed radially inwards in an axial direction towards the rim until the rim flange contacts the contact surface or the contact section.

The contact sections can be a part of the clamping device (for example, formed integrally with the clamping device). They can also be mounted on the attachment separately from the clamping devices, for example as part of the tread section. If the contact sections are formed on the respective clamping devices themselves, the rear grip section can transition into the contact section, wherein an indentation (axially recessed section) running in an axial direction can be provided in the area of the transition between the rear grip section and the contact section on sides and above the contact section.

It can be provided that the clamping devices of the attachments described can be affixed on the attachment in various predetermined positions, which are matched to certain rim sizes. The clamping devices can be fixedly (in the sense of immovably) affixed in the predetermined positions. The clamping devices can also be attached movably, in particular radially inwards, in the predetermined positions (the movement play in the individual positions is then smaller than the spacing of the positions from one another).

The attachment can comprise clamping devices that are fixedly (in the sense of immovably with respect to the assembly or tread section) attached (also fastenable in various predetermined positions) and clamping devices that are attached movably, in particular radially inwards (the relative position of the clamping devices to one another is variable, however, in order to brace the attachment on the rim).

Both the assembly section, the bracing mechanism and the bracing unit removable in the operating state can be designed with a central section, from which webs extend to different clamping devices (or to their positions). The webs can be implemented as shells (or as partial shells, which are open in one direction, for example, for example towards the rim). Coupling agents (for example, threaded rods) can be arranged in the shells. The coupling agents can serve to connect a part of a transmission arranged in the central section to the clamping devices.

The stationary section or tread section and/or the assembly section can comprise a basic structure, which is designed as a magnesium die-cast element. In particular, it can be provided that the material of this magnesium basic structure is AZ91 (with 0.8% zinc).

The clamping devices are preferably formed of steel.

It can be provided that the tread body of plastic protrudes in an axial direction at least to one side (in particular axially towards the rim and axially facing away from the rim) over a metal section of the tread section lying underneath it that supports the tread body. This can be the case around the entire circumference. The tread body can therefore project axially over the structure supporting it, so to speak. The tread body thereby acquires increased wear resistance.

The tread body can preferably have an extension in a radial direction of at least 15 mm, in particular 20 mm, in particular 25 mm, in particular 30 mm.

The tread body can preferably have an extension in a radial direction of at least 75 mm, in particular 70 mm, in particular 65 mm, in particular 60 mm, in particular 55 mm, in particular 50 mm.

DESCRIPTION OF FIGURES

Other features, application possibilities and advantages of the invention result from the following description of exemplary embodiments of the invention, which are explained with the aid of the drawing, wherein the features, both alone and in different combinations, may be substantial for the invention without reference again being made explicitly hereto. The figures show:

FIG. 3 a first embodiment of an attachment according to the invention;

FIG. 4 a sectional view of the attachment from FIG. 3;

FIG. 5 a sub-area of FIG. 4;

FIG. 6 another attachment according to the invention;

FIG. 7 a sectional view through the attachment from FIG. 6;

FIG. 9 a sectional view through the attachment from FIG. 8;

FIG. 10 a sectional view of another position of the attachment from FIG. 8;

FIG. 11 another attachment according to the invention;

FIG. 14 a running section of another attachment according to the invention in a sectional view;

FIG. 15 the tread section from FIG. 14 in a view when looking in an axial direction;

FIG. 16 a sectional view through the tread section from FIG. 15;

FIG. 17 a side view of the attachment from FIG. 15;

FIG. 18 an individual view of the tread body of the attachment in FIGS. 14 to 17;

FIG. 19 another attachment according to the invention;

FIG. 20 a sectional view through the attachment from FIG. 19;

FIG. 24 another view of the attachment from FIG. 21;

FIG. 25 a sectional view through the attachment from FIG. 24;

FIG. 26 a view corresponding to FIG. 24 of the attachment from FIG. 22;

FIG. 27 a sectional view of the attachment from FIGS. 22 and 26;

FIG. 28 another view of the attachment from FIG. 23;

FIG. 29 a sectional view of the attachment from FIG. 23;

FIG. 36 another sectional view through the attachment in FIGS. 30 to 32;

FIG. 37 another sectional view through the attachment in FIGS. 30 to 32;

FIG. 38 another sectional view through the attachment in FIGS. 30 to 32;

FIG. 39 another attachment according to the invention;

FIG. 40 another view of the attachment from FIG. 39;

FIG. 41 a side view of the attachment from FIGS. 39 and 40;

FIG. 42 a sectional view of the attachment from FIGS. 39 to 41

FIG. 54 a sectional view of the configuration according to FIGS. 50 and 51;

FIG. 55 a sectional view according to the configurations of FIGS. 52 and 53;

FIG. 56 another attachment according to the invention;

FIG. 57 the attachment from FIG. 56 in a perspective view;

FIG. 58 the attachment from FIGS. 56 and 57 in a perspective view when looking at the side facing the rim;

FIG. 59 a view of the attachment from FIGS. 56 to 58;

FIG. 60 another view of the attachment from FIGS. 56 to 59;

FIG. 70 a detailed view of the attachment from FIG. 69;

FIG. 71 another attachment according to the invention and a part of the tread section of this attachment;

FIG. 72 heat conduction elements from the attachment from FIG. 71;

FIG. 73 a perspective view of a part of the tread section of the attachment from FIGS. 71 and 72;

FIG. 89 parts of a bracing unit of another attachment according to the invention;

FIG. 90 a bracing unit and the clamping devices of the attachment for FIG. 89;

FIG. 93 another perspective . . .? the view of FIG. 92;

FIG. 94 another perspective . . . the view of FIG. 92;

FIG. 95 another perspective . . . the view of FIG. 92;

FIG. 97 a tread section of another attachment according to the invention;

FIG. 100 another attachment according to the invention;

FIG. 101 another attachment according to the invention;

FIG. 105 alternative design of spring elements and a tread section of another attachment according to the invention;

FIG. 108 details of the attachment from FIG. 107, in particular the damping device 87;

FIG. 109 a system according to the invention, comprising a lifting device and an attachment;

FIG. 113 the attachment from FIG. 112 in other perspectives;

FIG. 115 another system according to the invention;

Figure 121:
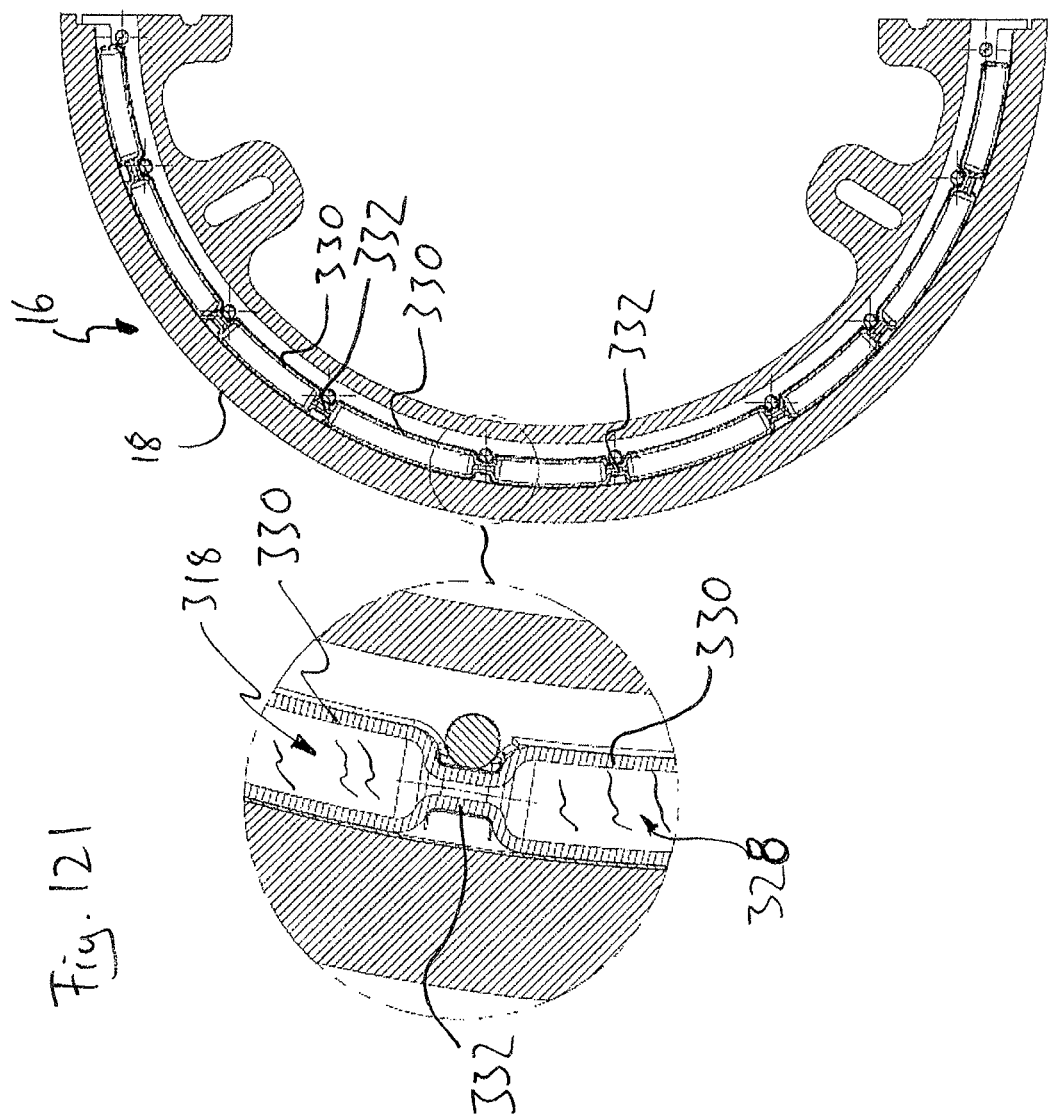
Figure 120:
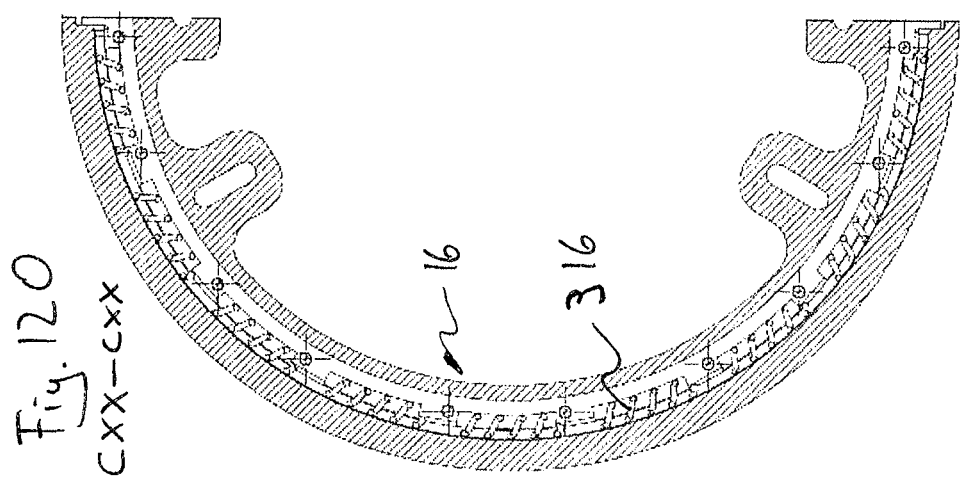
Figure 124:
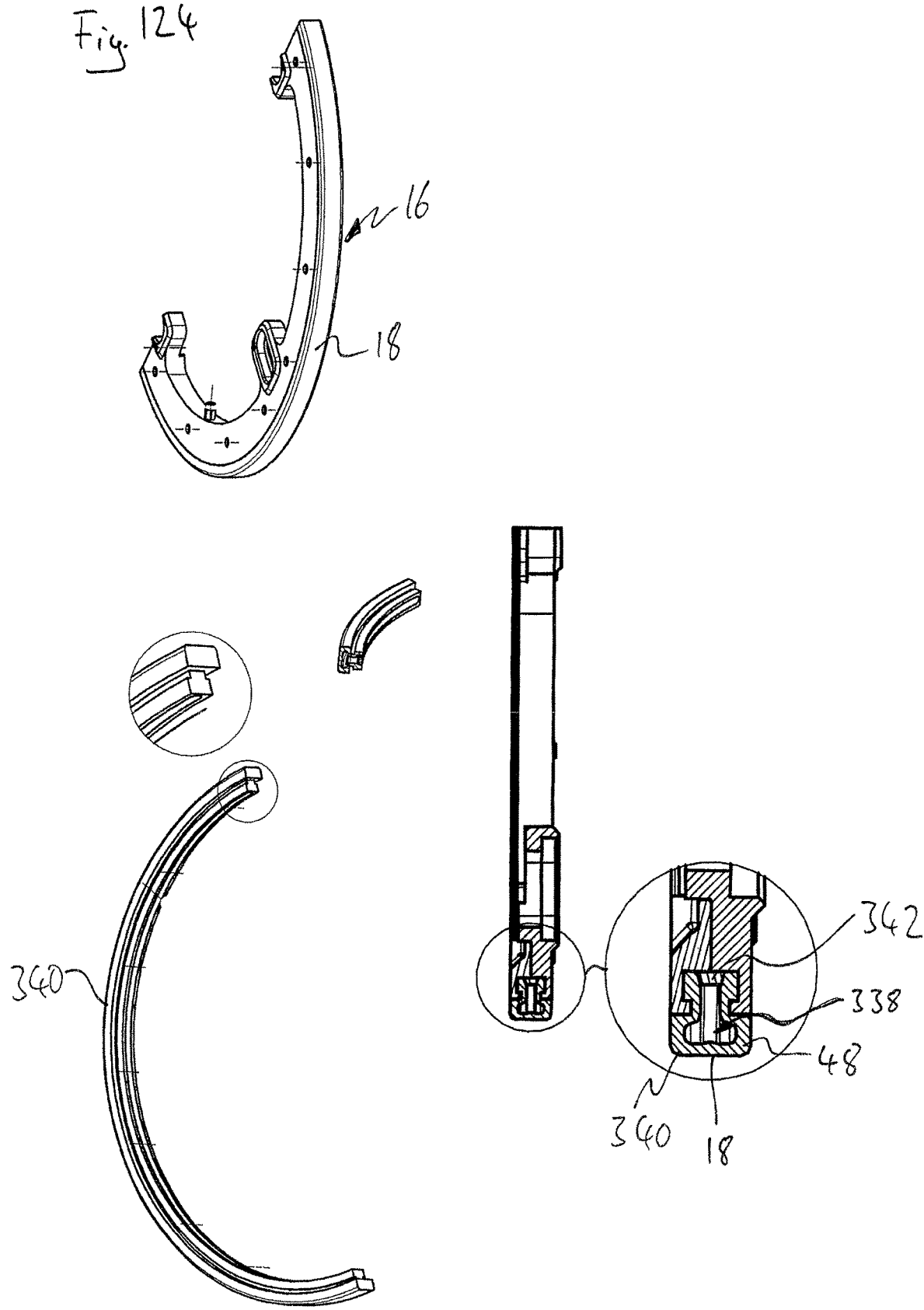

FIG. 119 a tread section of another attachment according to the invention;

FIG. 120 a tread section of another attachment according to the invention;

FIG. 121 a tread section of another attachment according to the invention;

FIG. 122 the attachment from FIG. 121 in other views;

FIG. 123 the tread section of another attachment according to the invention;

FIG. 124 the tread section of another attachment according to the invention.

Figure 125:
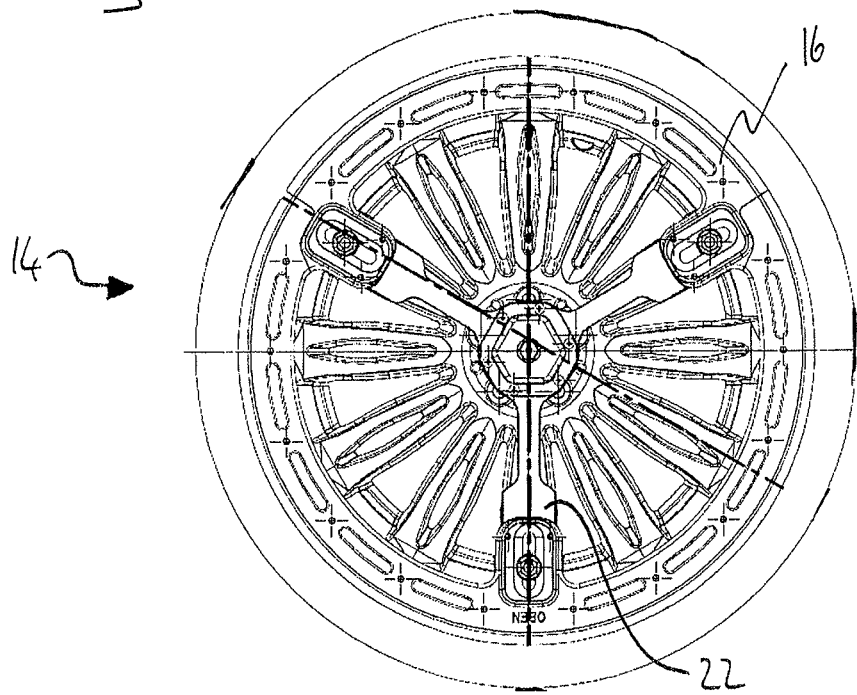
Figure 126:
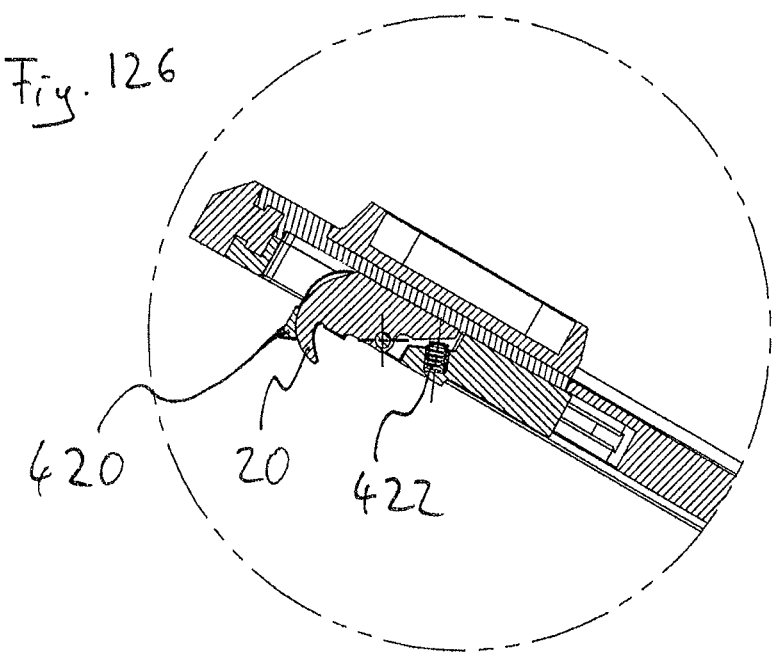
Figure 127:
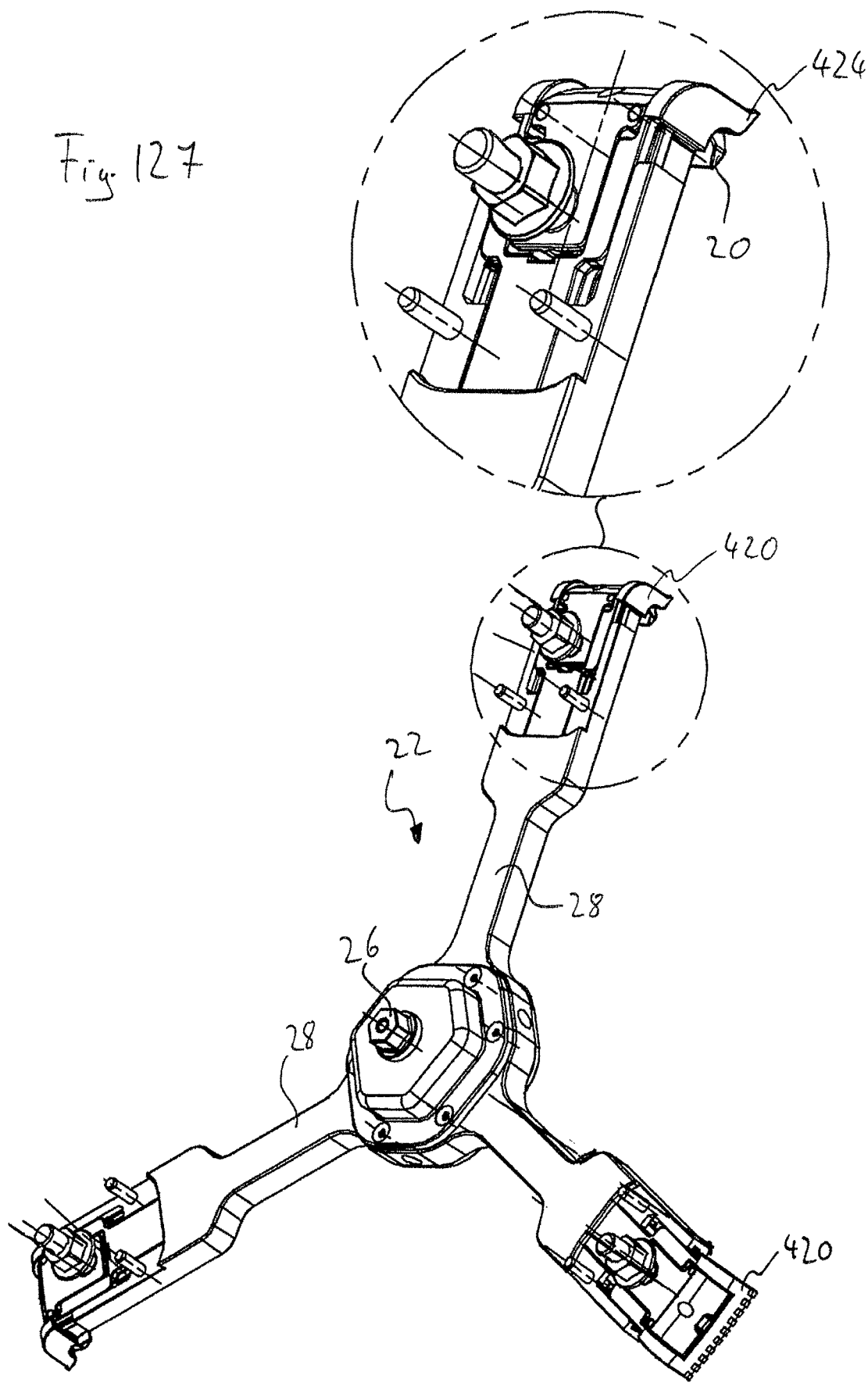
Figure 128:
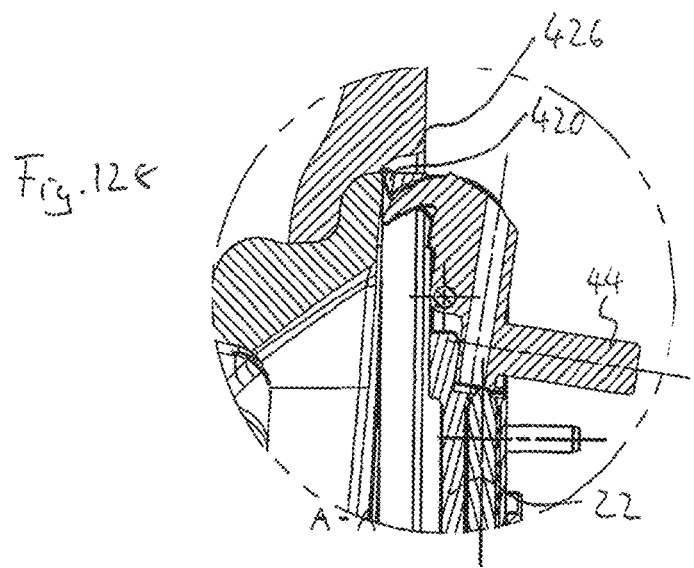
Figure 129:
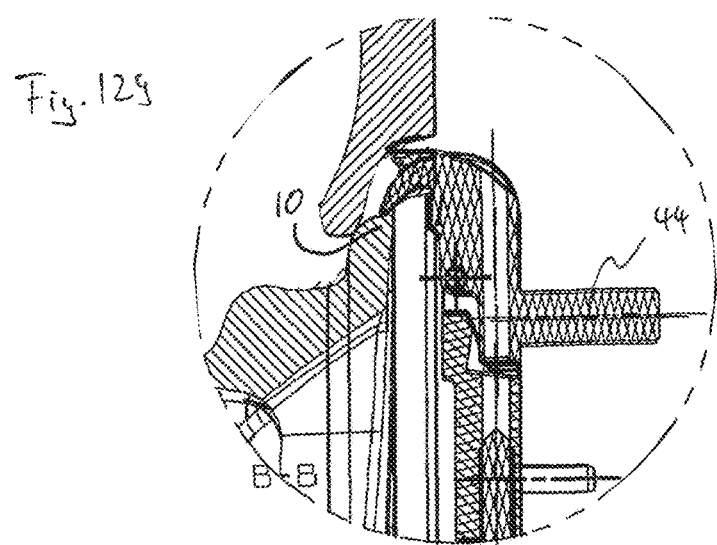
Figure 130:
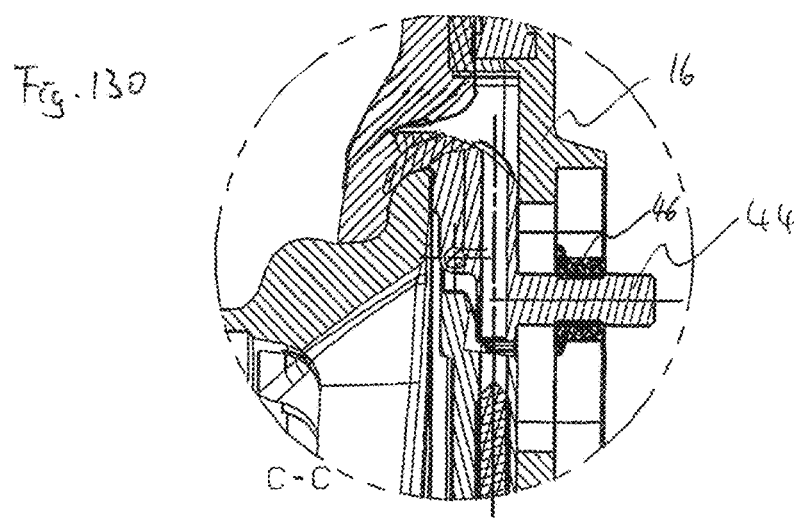
Figure 131:
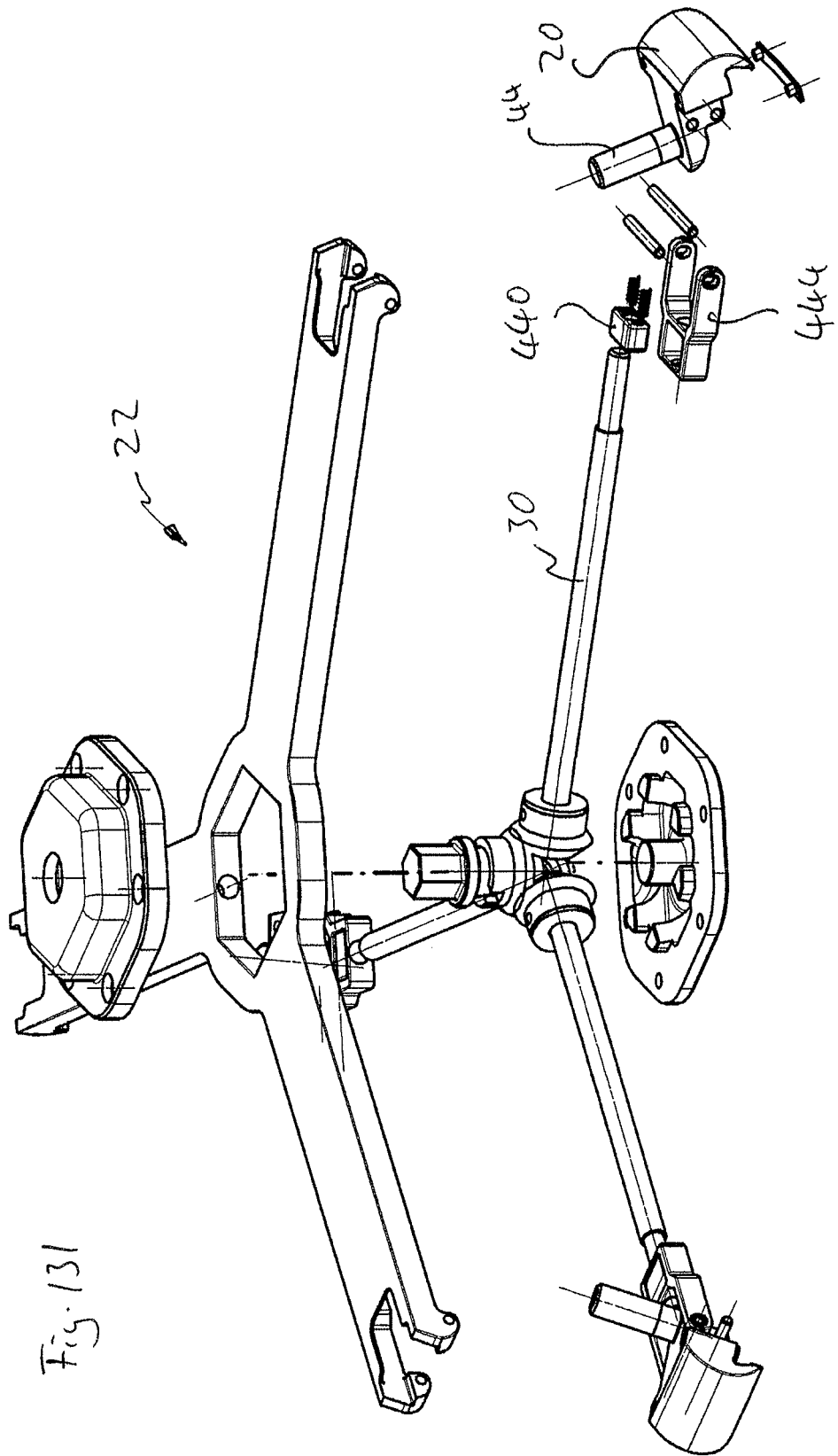
Figure 132:
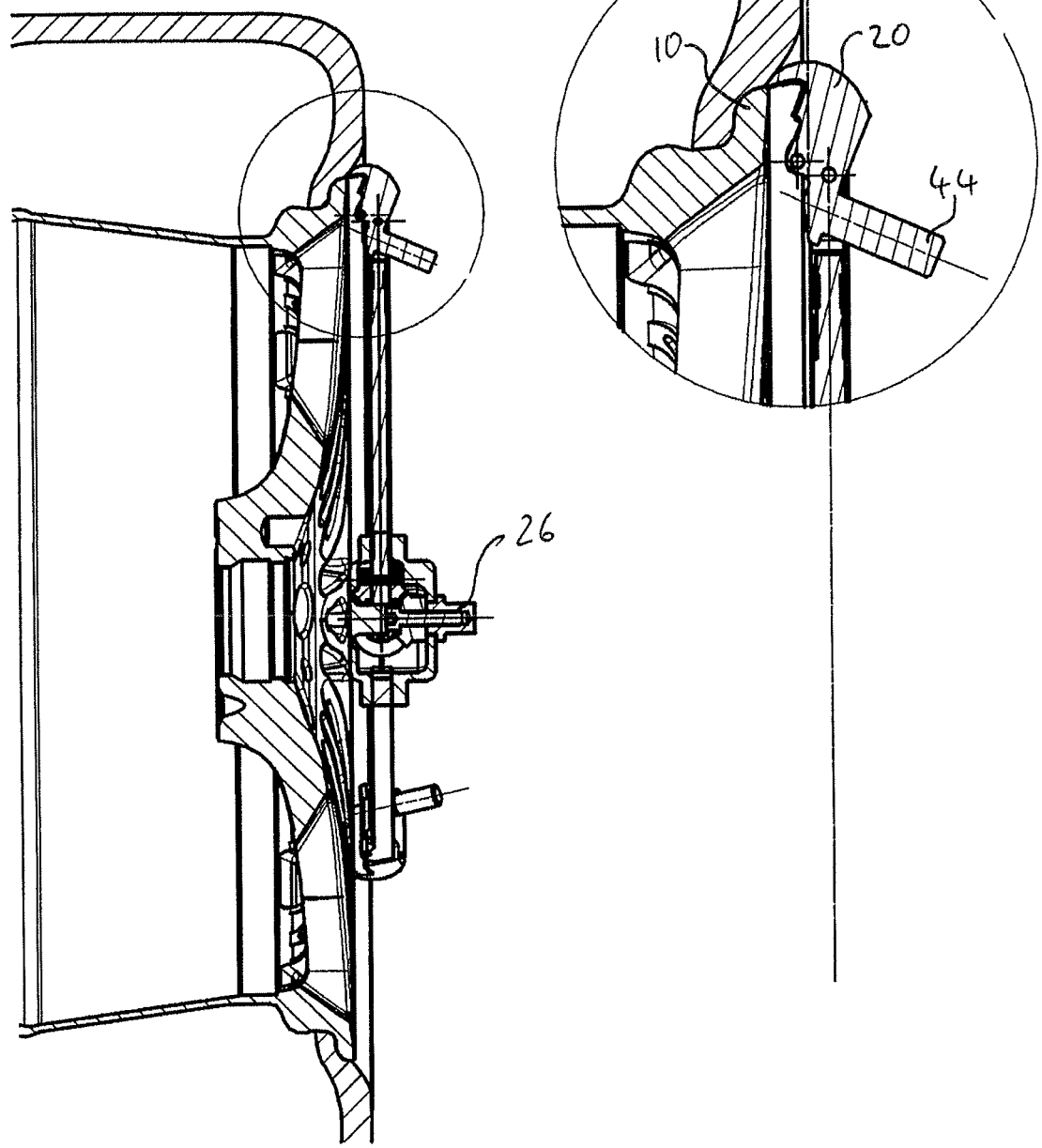
Figure 133:
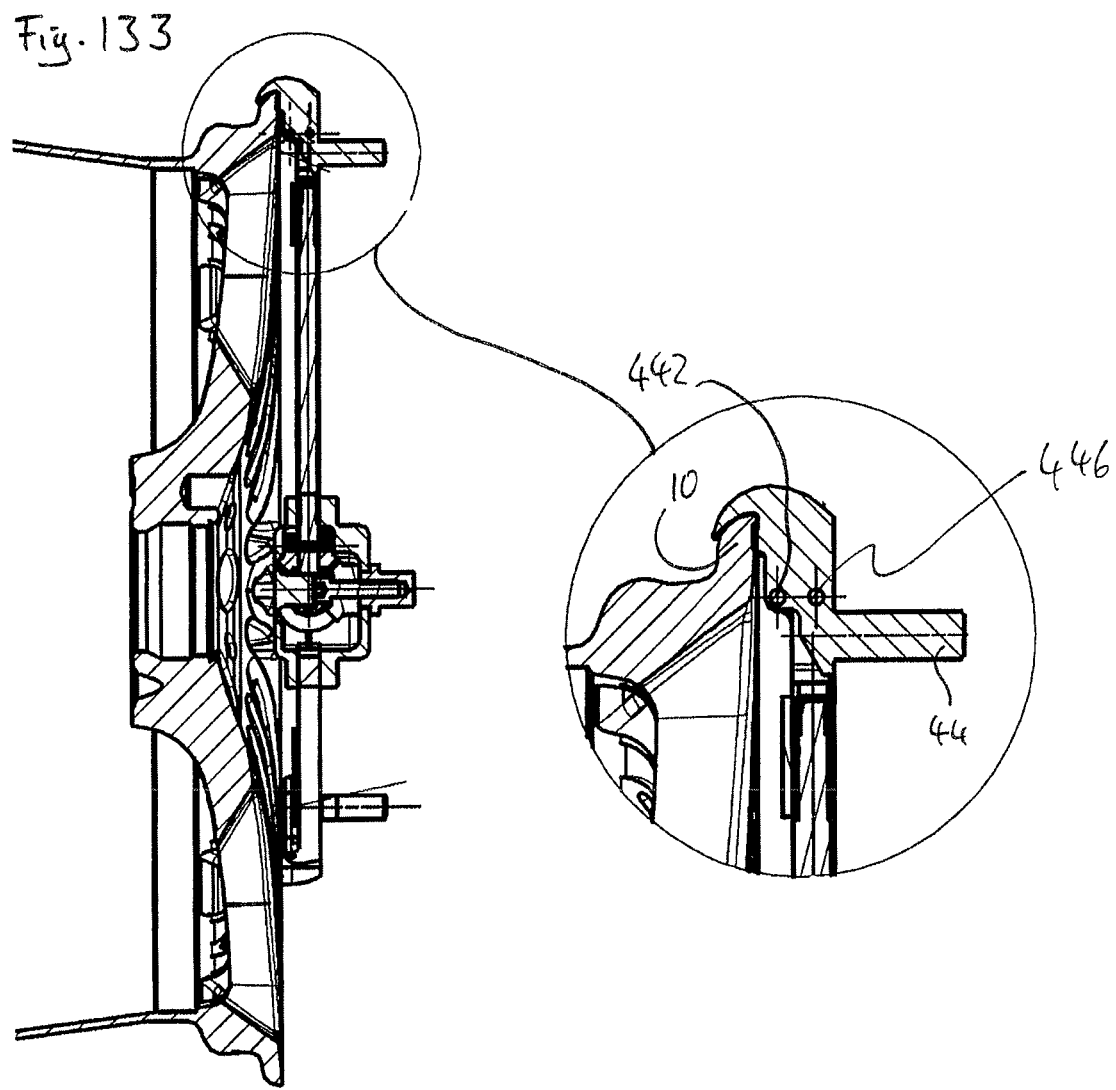
Figure 134:
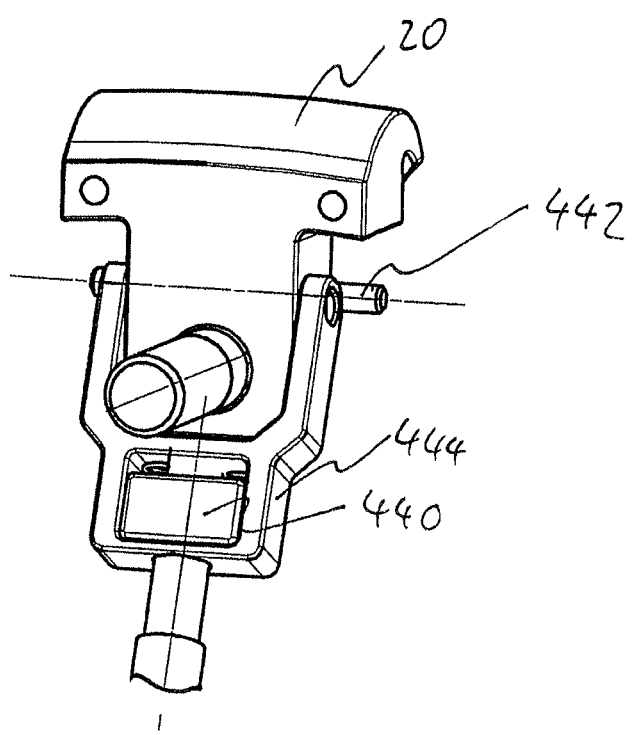

FIG. 125 another attachment according to the invention in the state fastened on the vehicle wheel;

FIG. 126 a detail of the attachment from FIG. 125;

FIG. 127 the assembly section of the attachment from FIG. 125 in detail;

FIG. 128 a clamping device of the attachment from FIG. 125;

FIG. 129 the clamping device from FIG. 128 when engaging behind the rim flange;

FIG. 130 the clamping device in the rear engagement position with the rim flange;

FIG. 131 the assembly section of another embodiment in an exploded view;

FIG. 132 the assembly section from FIG. 131 on attachment to the rim of a vehicle wheel;

FIG. 133 the assembly section from FIG. 131 with clamping devices, which engage behind the rim flange; and FIG. 134 a detail of the clamping devices of the attachment of the assembly section from FIG. 131.

DESCRIPTION OF FIGURES

In the following figures, corresponding components and elements bear the same reference characters. For the sake of greater clarity not all figures include all reference characters.

Figure 1:
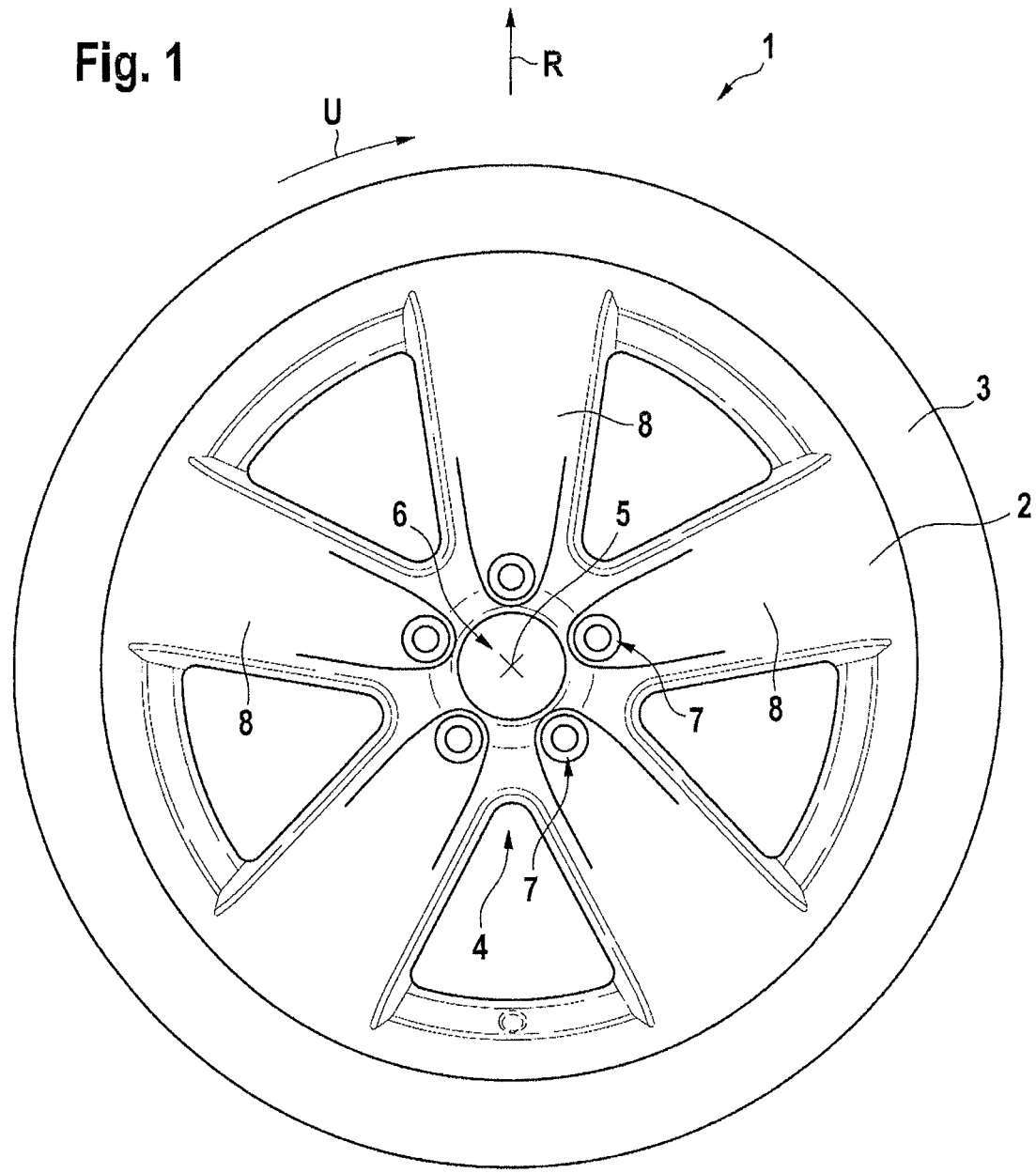
FIG. 1 a vehicle wheel.
Figure 2:
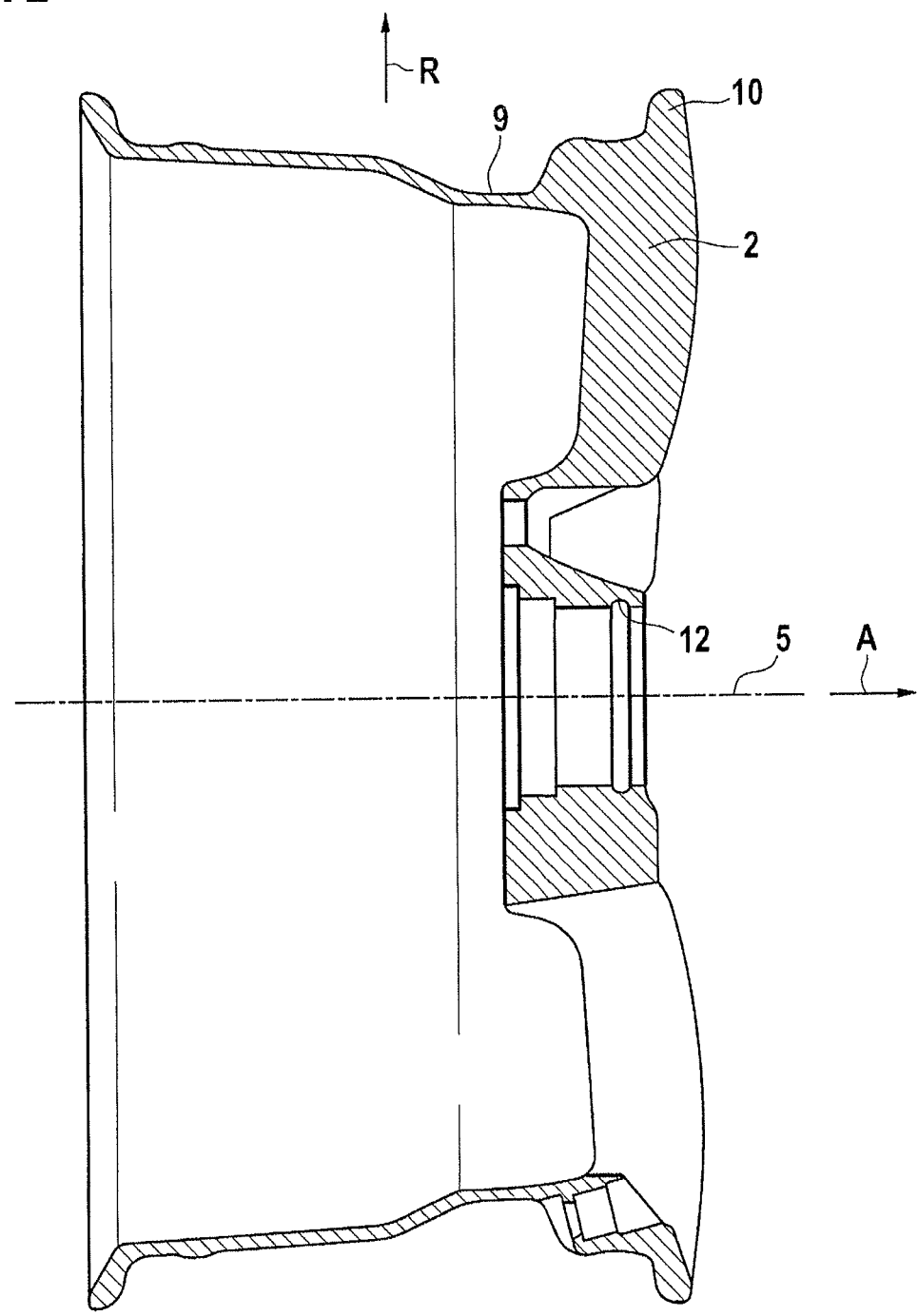
FIG. 2 the rim of the vehicle wheel from FIG. 1 in a sectional view.

FIG. 1 shows a vehicle wheel 1 in a schematic representation. The vehicle wheel 1 comprises a rim 2 and a tire 3 mounted on the rim 2. In FIG. 2, the rim 2 is shown alone without the tire 3.

A circumferential direction is represented by an arrow with the reference character U. An axial direction is represented by an arrow with the reference character A (FIG. 2). A radial direction is represented by an arrow with the reference character R.

The rim 2 comprises a bolt pattern 4 of the vehicle wheel 1 lying radially on the inside. Arranged in the centre of the bolt pattern 4 around a rotary axis 5 of the vehicle wheel 1 running along the axial direction A is a so-called central opening 6, which in some cases is also described as a hub bore or centre hole centring. The bolt pattern 4 here comprises five screw holes 7, two of which are provided with a reference character 30. In the case of the present vehicle wheel 1, five spokes 8 extend radially outwards from the area of the bolt pattern 4. The rim 2 comprises a rim base 9 and a rim flange 10 and the central opening 6 has a recessed circumferential groove 12.

If the tire 3 of the vehicle wheel 1 has a hole, the air located in the tire escapes and the tire function of the vehicle wheel 1 is restricted.

In order to enable the continued driving operation in such a case, an inventive attachment 14 can be used.

An example of such an attachment 14 is shown in FIG. 3. The attachment 14 is designed with a tread section 16 and with a tread 18 for contacting a road F. The tread section 16 comprises the tread 18. The tread 18 corresponds to the part of the attachment 14 provided for contacting the road.

In FIG. 3, the attachment 14 is shown with a view of its side facing away from the vehicle wheel 1 in the assembled state. Arranged distributed around the circumference of the attachment 14 or the tread 18 are several clamping devices 20. The clamping devices 20 are easily recognisable in FIG. 4 (which shows a section along the line A-A) and 5 (which shows an enlarged view of the upper area of FIG. 4).

In the embodiment shown, the clamping devices 20 are part of an assembly section 22. The assembly section 22 has here a central section 24, which has a substantially hexagonal basic shape and here comprises a tool application point 26. The central section 24 also forms a housing for a part of a transmission 212. Webs 28 extend away from the central section 24 of the assembly section 22 towards the positions of the individual clamping devices 20. The webs 28 are designed as shells for coupling agents 30. The webs 28 enclose the coupling agents 30 axially outwards and in the circumferential direction U. In axial direction A towards the rim, the webs 28 are executed here open. The webs 28 can also be executed completely closed, however (completely enclosing the coupling agents 30).

Together with a drive bevel gear 32 and for each clamping device a driven bevel gear 34, which interacts with the drive bevel gear 32, the coupling agents 30 form a transmission 212. The tool application point 26 is coupled to the drive bevel gear 32. Upon actuation via the tool application point 26, the drive bevel gear 32 rotates about the axial direction A and interacts with the driven bevel gear 34 so that this rotates about the radial direction R. The driven bevel gear 34 is coupled to the coupling agent 30. The coupling agent 30 is implemented here as a threaded rod. The threaded rod rotates with the driven bevel gear 34. The threaded rod engages with the opposite end (thus the end that is not coupled to the driven bevel gear) in a mating thread on the clamping device 20. Due to rotation of the coupling agent 30 or the threaded rod 30, the threaded rod 30 is screwed further into (or out of) the clamping device 20 and the clamping device 20 is moved hereby in the radial direction R. A driven bevel gear 34 for each clamping device 20 engages in the drive bevel gear 32. In this manner all three clamping devices 20 are moved simultaneously and uniformly by actuation of the tool application point 26. Upon actuation via the tool application point 26, the clamping devices 20 are moved radially inwards or radially outwards in a purely translational manner.

In FIGS. 4 and 5, the clamping devices 20 are depicted in a section that extends along the plane extending in radial direction R and axial direction A. The clamping devices comprise a rear grip section 36 protruding in axial direction A.

The rear grip section 36 is designed here for the positive-locking rim flange 10. The rear grip section 36 is also further designed so that the clamping device 20, when it is moved translationally radially inwards, is moved into rear engagement with the rim flange 10 and presses in axial direction A towards the rim flange 10.

Furthermore, the attachment 14 and here the clamping devices 20 have contact sections 38. The contact sections 38 are thus part of the clamping device 20 in the present case. The rear grip section 36 transitions into the contact section 38, wherein in the area of the transition between the rear grip section 36 and the contact section 38, an indentation 37 running in axial direction A is present on the side of and above the contact section 38. The indentation 37 serves to enable the contact section 38 to rest flat on the rim flange 10. The contact section 38 extends here in a plane stretched through the radial direction R and circumferential direction U. Due to the contacting of the contact section 38 with the rim flange 10, it is possible to position the attachment 14 in a precisely defined position with respect to the rim flange 10 in the operating state. On the inside of the rim flange, the rear grip section 36 rests on the rim flange 10. On the outside of the rim flange, the contact section 38 rests on the rim flange 10. A positive-locking secure holding of the attachment on the rim flange 10 is guaranteed hereby and there is no play in axial direction A. Clamping devices 20 in particular that only have a curvature in which the rim flange 10 is taken up cannot guarantee such a fixed positioning of the attachment 14 in axial direction A, as the rim flange 10 can move back and forth in the curved area.

As is also clearly recognisable in FIG. 5, the clamping devices 20 each have a fastening section 42 with a fastening device 44. The fastening device 44 is implemented here as a threaded bolt 44 formed integrally with the clamping device 20.

A corresponding counterpart 46, which is formed here as a screw nut, can be applied to the fastening device 44. It is possible via the fastening device 44 in interaction with the counterpart 46 (the screw nut) to fasten the tread section 16 on the clamping device 20 and to affix it on the clamping device secured against play in an axial direction. The tread section 16 is virtually clamped or braced between the clamping device 20 and the counterpart 46. Due to the precise positioning of the clamping device 20 on the rim flange 10 via the contact section 38 and the clamping of the tread section 16 between the clamping device 20 and the counterpart 46 with the fastening device 44, the tread section 16 and thus also the tread 18 can be mounted on the vehicle wheel 1 in a precisely defined position with respect to the rim flange 10. Upon fastening of the tread section 16 via the fastening device 44, the tread section 16 moves in axial direction A towards the rim 2.

Here the tread 18 is arranged on a tread body 48. The tread body 48 in the present example is designed as a plastic element formed integrally (integrally per circumferential segment of the tread section 16). The tread body 48 is held between a first part of the tread section 16 lying axially on the inside and a second part 52 of the tread section 16 lying radially on the outside. The two parts 50 and 52 of the tread section 16 are braced against one another via several connection elements 53, which are distributed circumferentially and formed here as screw connections. The two parts 50 and 52 of the tread section 16 form a dovetailed seat 54 for the tread body 48. The tread body 48 is positively held in the seat 54. The take-up of the tread body 48 is such, however, that this is not clamped frictionally between the two parts 50 and 52 but is held in the seat 54 with a clearance fit.

Displacement of the tread body 48 in the circumferential direction U with respect to a stationary section 56 is possible. Here the stationary section 56 is part of the tread section 16 and comprises the two parts 50 and 52 of the tread section 16. The stationary section 56 is fastened by way of the fastening by means of the clamping devices 20 in such a way with respect to the rim that in the operating state, thus in driving operation of the vehicle, it does not move with respect to the rim (either in the circumferential or in the axial or radial direction).

In contrast to this, the tread body 48, and thus the tread 18, can execute a relative movement in a circumferential direction with respect to the stationary section 56 of the tread section 16, and thus with respect to the rim 10. In the present case, the stationary section 56 is arranged immovably also with respect to the assembly section 22 in the operating state or in the provided fastening for operation.

The stationary section 56 here comprises an annular section 58. The annular section 58 is formed in this case by the two parts 50 and 52 and is closed in the circumferential direction U. As is recognisable in FIG. 3, the annular section 58 is formed in multiple parts in circumferential direction U and has a first circumferential segment 60 and a second circumferential segment 62. The tread body 48 also has a first circumferential segment 64 of the tread body and a second circumferential segment 66 (which are each formed in one piece here).

The attachment 14 in FIGS. 3 to 5 comprises a damping device 87 in the form of a tread body 48 with varying stiffness and flexibility over its radial extension. To form the damping device 87, the tread body 48 has a hard part 63 of low flexibility lying radially on the outside that also forms the tread 18. Lying radially inside of this the tread body 48 has a part 65 lying radially on the inside that is designed to be more flexible than the part 63 lying radially on the outside and that is deformed more easily. The part 65 lying radially on the inside lies on a metal section of the tread section 16 and is supported by this. Upon loading due to road contact, the part 65 lying radially on the inside can deform and thereby damps the rolling movement of the attachment 14. The part 63 lying radially on the outside and the part 65 lying radially on the inside are formed here integrally with one another, different types of plastic being combined with one another during the manufacturing process of the tread body 48 to obtain the variable flexibility. The attachment 14 can also be designed without the damping device 87 or also with a damping device 87 of a different type.

To assemble the attachment 14, first the assembly section 22 with the clamping devices 20 can be put on the vehicle wheel 1. The clamping devices 20 can then be moved radially inwards via the tool application point 26. Here the clamping devices 20 engage behind the rim flange 10 with their rear grip sections 36 until the contact section 38 rests from axially outside on the rim flange 10. The position of the clamping devices 20 and of the assembly section 22 is thus fixed in a precisely defined manner with respect to the rim flange 10.

One of the circumferential segments 60, 62 of the tread section 16 can then be applied initially to the assembly section 22. Via fastening by means of the fastening devices 44, the first segment 60 can be attached firmly to the vehicle wheel or on the clamping devices or the assembly section 22 in the upper area of the vehicle wheel 1. The vehicle wheel 1 can then be rotated by half a revolution and the circumferential segment 60 of the tread section 16 that is already attached contacts the road. In the area now lying at the top (the area initially arranged on the bottom and contacting the road) the second circumferential segment 62 of the tread section 16 can now be affixed and thus the annular section 58 can be closed in the circumferential direction U. The second circumferential segment is also fastened by means of the fastening device 44 with respect to the clamping devices 20. When fastening is complete, the attachment 14 is located in the operating state and the journey with the vehicle can continue despite a flat tire.

FIGS. 6 and 7 show a modified embodiment of the attachment 14. The attachment 14 likewise has a first circumferential segment 60 and a second circumferential segment 62 both of the annular section 58 and accordingly of the tread body 48. The circumferential segments of the tread section 16 are divided up here in the ratio ⅓:⅔.

The clamping devices 20 are not visible in FIG. 6. In FIG. 7 only the clamping device 20 arranged at the top in FIG. 6 (sectional view along the line VII-VII) is visible.

Here only the clamping device visible in FIG. 7 is movable radially inwards via a threaded rod 68. The other two clamping devices 20 are arranged in a fixed position with respect to the assembly section 22. The threaded rod 68, which represents an actuation means, has a tool application point 70 by means of which the clamping device 20 is movable in radial direction R.

In the case of the attachment according to FIGS. 6 and 7, it is further provided that the tread body 48 bearing the tread 18 is not coupled directly to the annular section 58 of the stationary section 56. To support the tread body 48, the attachment 14 from FIGS. 6 and 7 has a sliding element 72, which is connected immovably to the tread body 48 on the one hand and on the other hand engages in the seat 54 of the annular section 58 (circumferentially closed). To this end the annular section 58 forms a double groove on both sides through its two parts 50 and 52, in which groove a T-shaped subsection 74 of the sliding element 72 engages (supported movably with respect to the stationary section 56 in circumferential direction U; held positively by means of positive-locking rear engagement on the stationary section 56 in radial direction R).

Figure 8:
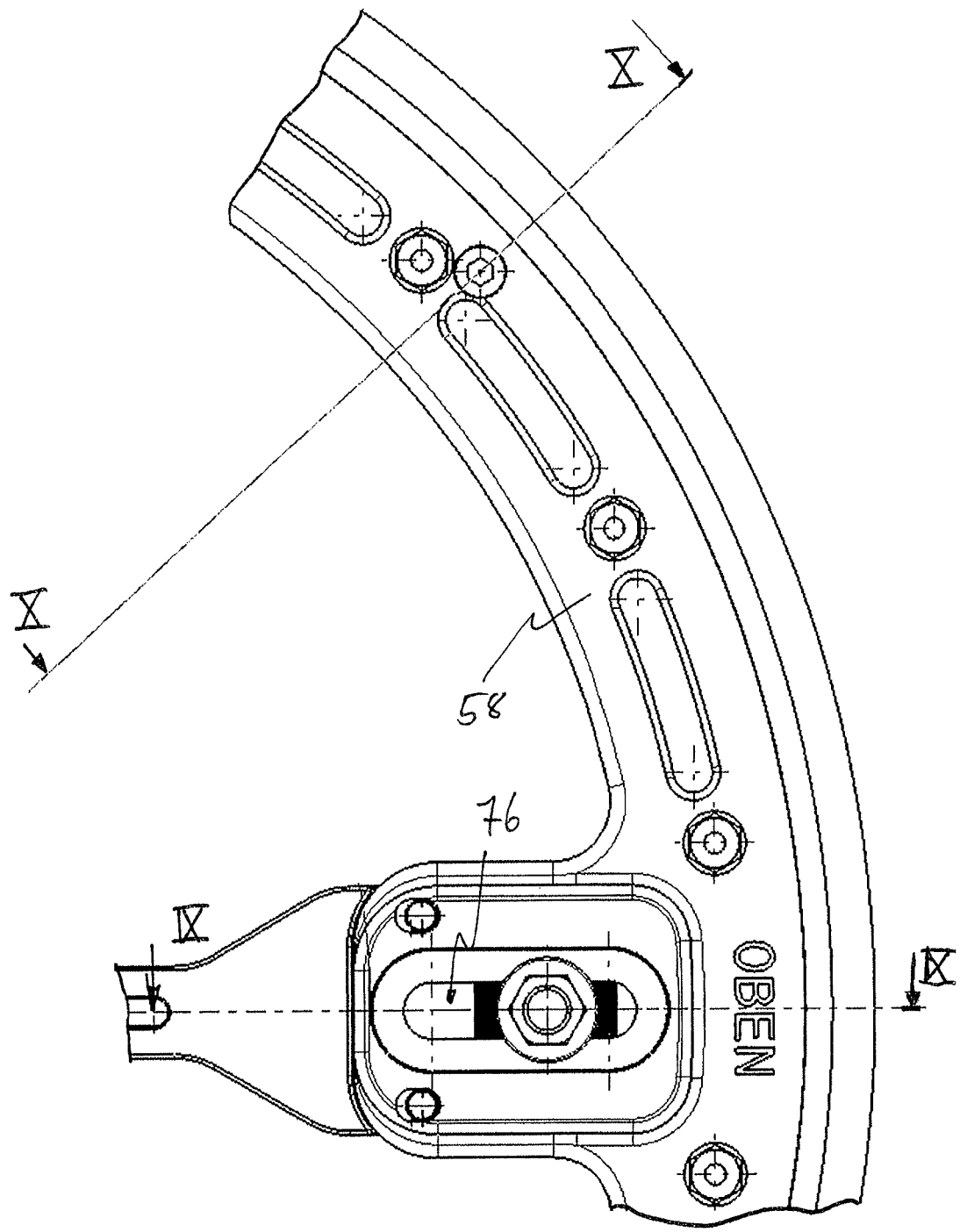
FIG. 8 a sub-area of another attachment according to the invention.

FIGS. 8 to 10 show an attachment 14 or sections of an attachment 14, which is constructed similarly to that of FIGS. 6 and 7 in relation to the tread body 48 and the sliding element 76. With regard to the assembly section 22 and the design of the tread section 16, the attachment 14 is constructed similarly to the attachment shown in FIGS. 3 to 5. The clamping devices 20 and their actuation also substantially correspond to the version of FIGS. 3 to 5.

It is clearly recognisable in FIGS. 9 and 10 how the sliding element 72 is held between the parts 50 and 52 of the tread section 16 and of the annular section 58. It is clearly recognisable here in FIG. 10 that the two parts 50 and 52 are braced against one another by means of the screws 53, which represent connection elements. It is also recognisable that the annular section 58 or the stationary section 56 is connected via elongated holes 76 to the fastening devices 44. This makes it possible that the attachment 14 can be used for different rim diameters due to the freedom of movement of the clamping devices 20 provided in radial direction R (in the unbraced state of the fastening devices 44).

Figure 12:
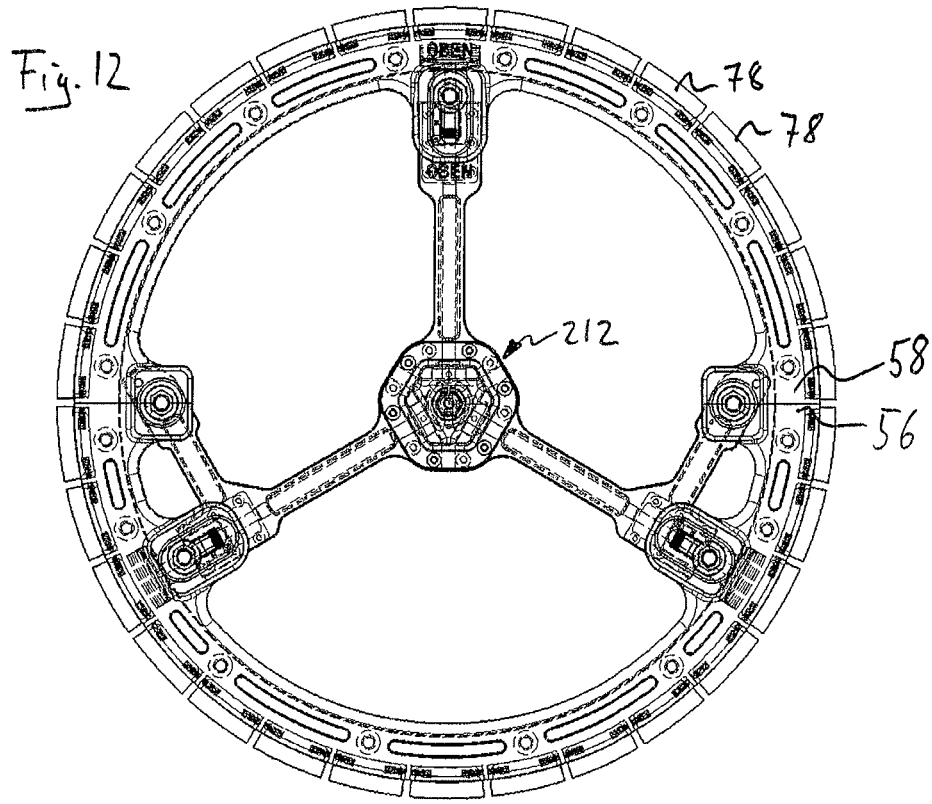
FIG. 12 another view of the attachment from FIG. 11.
Figure 13:
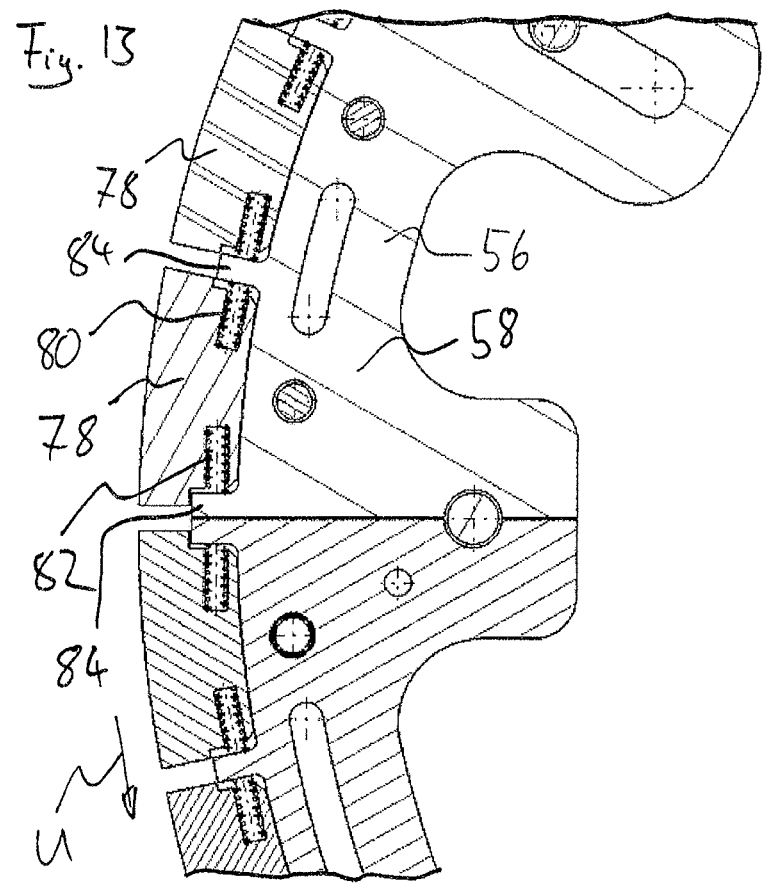
FIG. 13 a sectional view along a plane through the attachment from FIG. 12, which plane is extending orthogonal to the axial direction.

Another attachment according to the invention is depicted in FIGS. 11 to 13. The other attachment 14 according to the invention from FIGS. 11 to 13 is constructed similarly to that of FIGS. 3 to 5 with reference to its assembly section 22 and the fastening by means of the clamping devices 20 as well as the design of the tread section 16 and of the annular elements 58. The tread section 16 differs with respect to that of FIG. 3, however, in that no continuous tread body 48 is provided. The tread body 48 has a plurality of single tread segments 78 (formed separately from one another). The tread segments 78 are arranged distributed uniformly around the circumference of the attachment 14. The tread segments 78 are each arranged movably in circumferential direction U with respect to the stationary section 56, which comprises the annular section 58.

As in FIG. 13 (which shows a semi-transparent depiction), the individual tread segments 78 are each supported flexibly with respect to the annular section 58. To this end each of the tread segments 78 is braced in the circumferential direction on both sides via a first elastic or flexible element 80 and a second elastic or flexible element 82 in both circumferential directions with respect to contact sections 84 of the stationary section 56.

The elastic or flexible elements 80 and 82 are each formed here as mechanical compression springs. Other flexible elements 80 are also conceivable, however. In the case of the embodiments described previously, the tread body 48 in its totality or its two circumferential segments each form a tread segment 78. In the embodiments described previously (FIGS. 3 to 10) the movement possibility of the respective tread segments 64, 66 in circumferential direction U is not restricted. In the version in FIGS. 11 to 13, however, each individual tread segment 78 has only a limited movement range in circumferential direction U.

FIGS. 14 to 18 illustrate another attachment 14 according to the invention. The attachment 14 of said figures comprises an assembly section similar to the version of FIGS. 6 and 7. The assembly section 22 is not shown in the figures, however.

The attachment from FIG. 14 comprises a tread section 16, which comprises the stationary section 56 and the tread 18 (or a tread body 48 divided up into multiple tread segments 78). The individual tread segments 78 are spaced at a distance from one another in circumferential direction U. In the gaps between the individual tread segments 78, the tread section 16 has elastic or flexible elements 86. The elastic or flexible elements 86 are connected to one another underneath the tread segments 78 (lying radially inside of the tread segments 78), so that the connection of the elastic or flexible elements 86 forms a damping device 87 for damping the tread 18 in radial direction R.

The flexible elements 86 are each secured via fastening means 88 with respect to the stationary section in a movement in circumferential direction U. The fastening means 88 extend through the flexible elements 86 connected to one another in axial direction A.

Due to the arrangement of the flexible elements 86, which extend between the individual tread segments 78, in combination with the damping device 87 (which is formed here by the connection of the flexible elements 86 to one another) arranged in the radial direction between the stationary section 56 and the individual tread segments 78, the individual tread segments are both movable in circumferential direction U (opposite to the springing due to the flexible elements 86) and movable and damped in the radial direction.

Another implementation variant of an attachment 14 according to the invention is illustrated in FIGS. 19 and 20. The assembly section 22 and the stationary section 56 are designed corresponding to the variant in FIG. 3 to 5. The variant of FIGS. 19 and 20 differs from the variant of FIG. 3 to 5 in that although the tread body 48 is likewise arranged in the seat 54, arranged lying radially inside of an outer section 88 of the tread body 48, which section bears the tread 18, is an inner damping section 90, which is separate from the tread body 48 and has a lower hardness than the section 88 lying outside. The damping section 90 forms a damping device 87.

FIGS. 21 to 29 illustrate three embodiments of attachments 14, which each comprise a drive-off aid 92. The drive-off aid 92 serves to simplify or improve the driving of the attachment 14 out of a groove-like indentation in the road. Such groove-shaped indentations in the road occur, for example, on roads with underground rails. In certain driving situations the attachment can end up here in such a recess and it is then desirable that driving out of the recess is possible in a simple manner.

Figure 21:
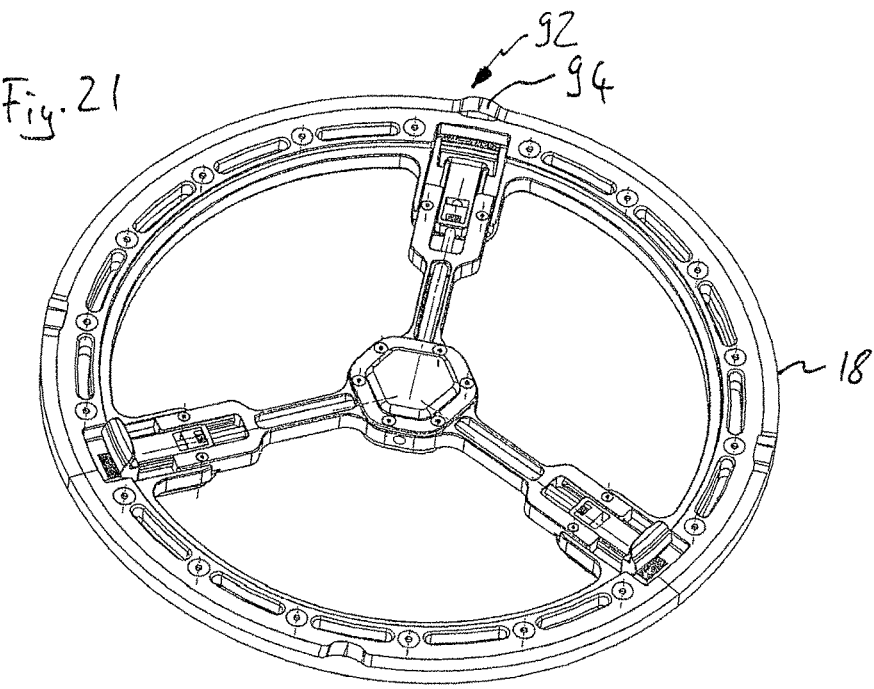
FIG. 21 another attachment according to the invention.

To this end (to form the drive-off aid 92), individual projecting areas 94 directed in axial direction A (this can be axially inwards or axially outwards) can be provided. A variant of this kind is illustrated in FIG. 21 as well as 24 and 25.

Figure 22:
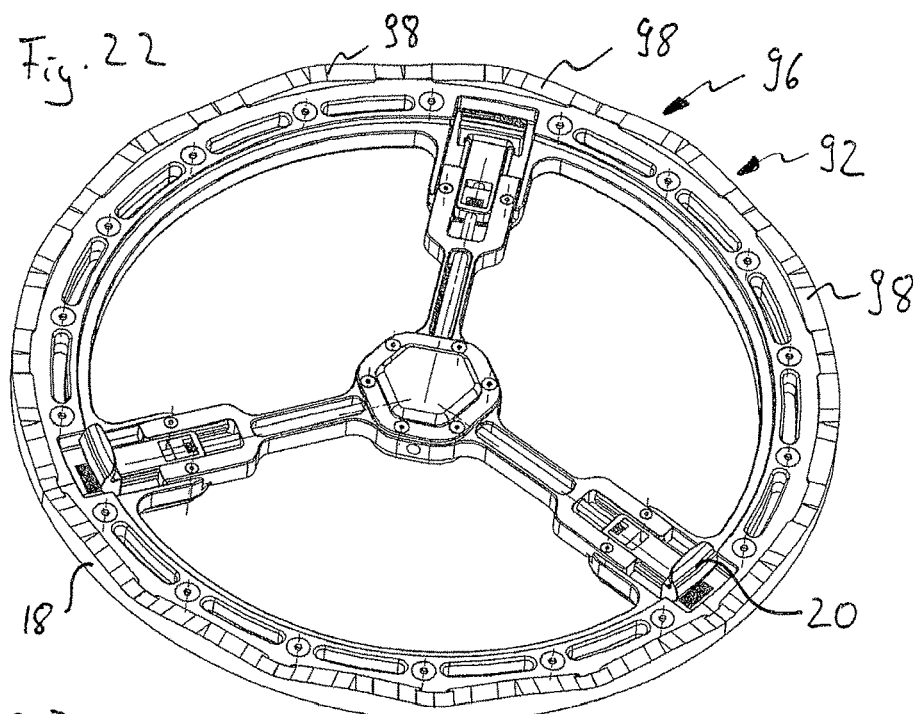
FIG. 22 another attachment according to the invention.

The tread body 48 or the tread can also have an undulating structure 96, which comprises a plurality of axially projecting wavelike sections 98. In FIGS. 22 and 26 and 27 an embodiment according to the invention is illustrated in which the axially projecting wavelike sections 98 are formed in axial direction A towards the rim 2.

Figure 23:
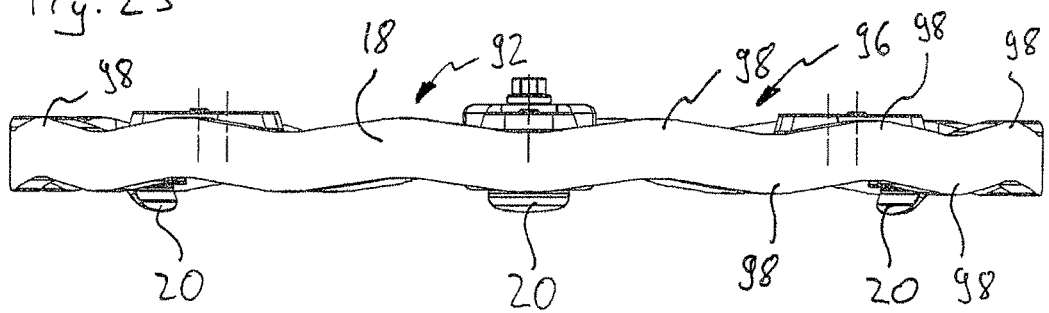
FIG. 23 another attachment according to the invention
Figure 30:
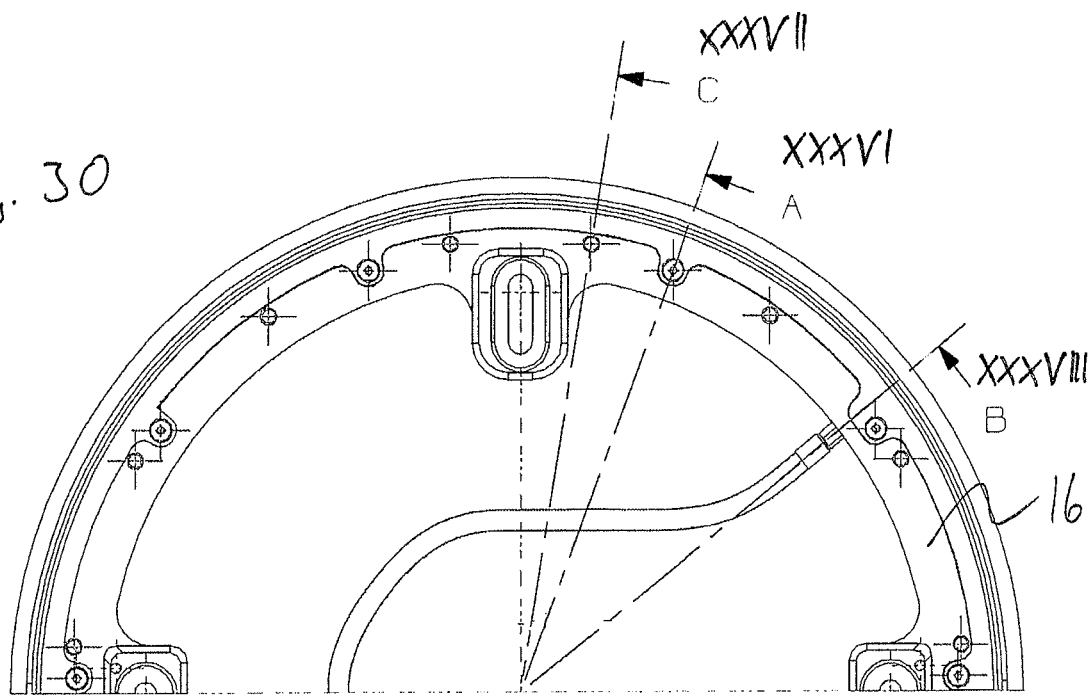
FIG. 30 the tread section of another attachment according to the invention.
Figure 31:
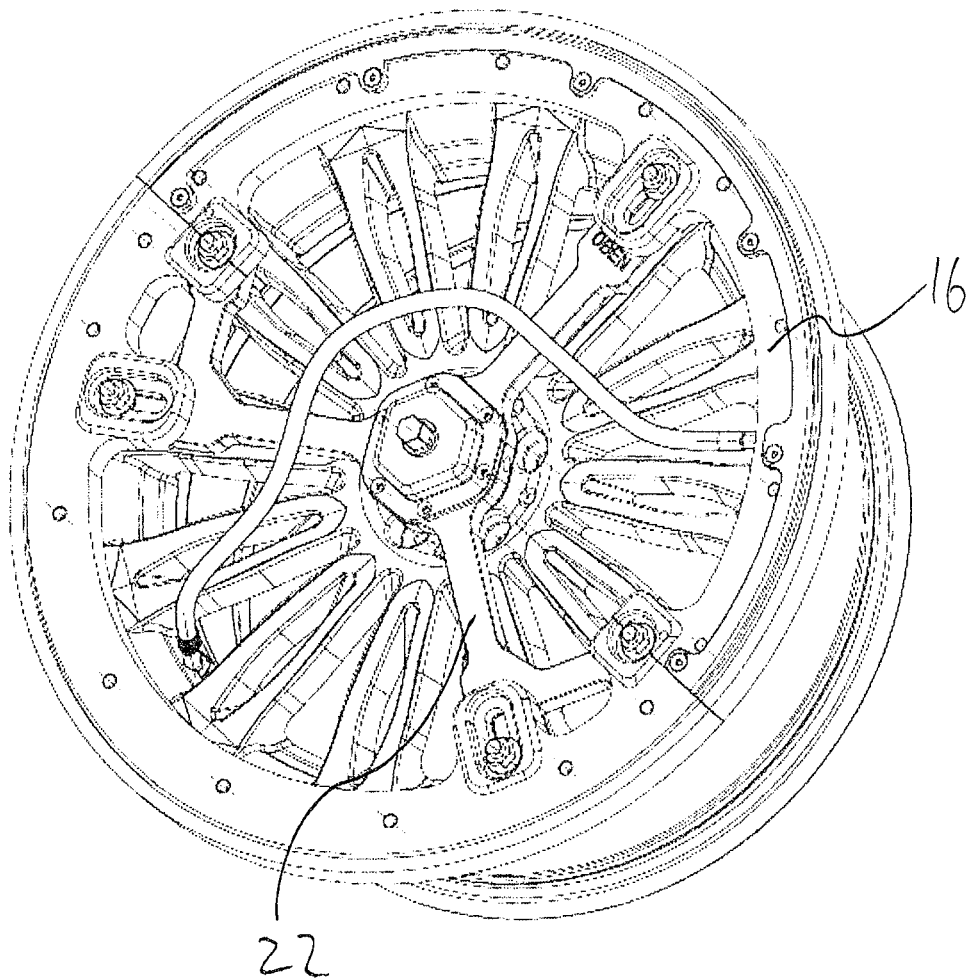
FIG. 31 the attachment from FIG. 30 in the state affixed to the rim.
Figure 32:
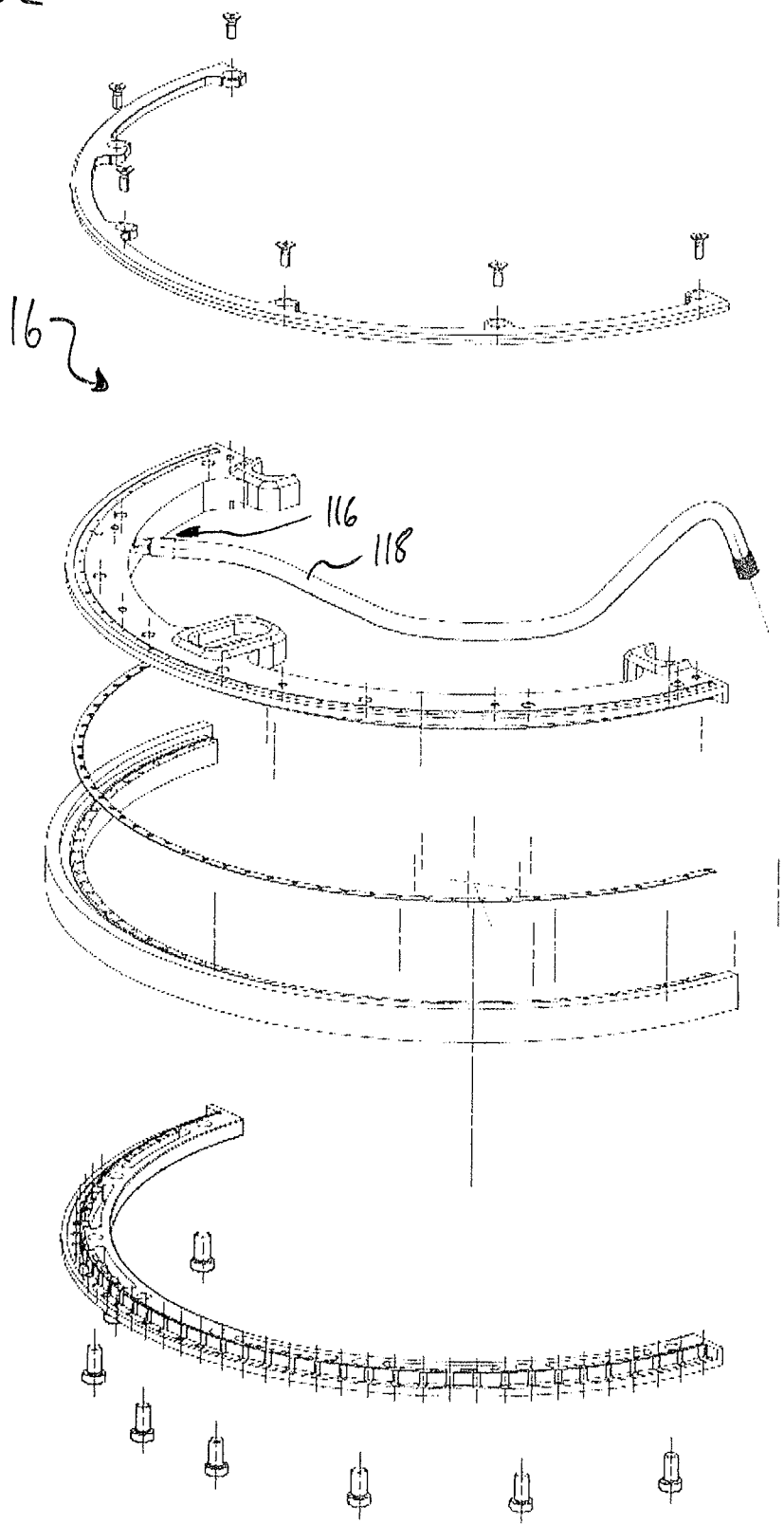
FIG. 32 an exploded view of the tread section from FIG. 30.

In FIGS. 23 and 28 to 29, an embodiment is illustrated in which a wave structure 96 with wavelike sections 98 is provided in axial direction A on both sides, thus extending towards the rim 2 and away from the rim 2. In other words, this embodiment has projecting wavelike sections 98 in both axial directions A respectively. By wave structure it is meant here that the projecting areas (wave crests) transition into recessed areas (wave troughs) and vice versa.

In the case of the illustrated embodiments with the drive-off aid 92, it can be provided that the tread body 48 can move with respect to the stationary section 56 in a circumferential direction, in particular can rotate fully around the stationary section 56. The tread body 48 can also comprise a plurality of tread segments 78 arranged movably (in a circumferential direction). A tread body 48 that is fully rotatable around the stationary section 56 can be arranged in the corresponding recess 54 by means of a clearance fit, for example.

It is alternatively also conceivable according to the invention that the tread surface 48 is braced in the seat 54, so that no relative movement is possible. In the embodiment from FIG. 21 as well as 24 and 25, it is provided that the drive-off aid 92 is only formed by the tread body 48. The same applies to the embodiment from FIG. 22 as well as 26 and 27.

In FIGS. 23, 28 and 29 an embodiment with a support section 100 is illustrated. In this embodiment, the drive-off aid 92 thus comprises the axially projecting wavelike sections 98, which are formed by the tread body 48 and a support section 100 lying underneath it and inwards in axial direction A from it. The support section 100 is formed in turn from a metal material and increases the strength of the drive-off aid 92. If the tread body 48 or the tread 18 is not movable relative to the stationary section 56, the support section 100 can be substance-bonded and/or connected positively and/or frictionally to the tread body 48. Alternatively, it is also possible that the support section 100 only supports the tread body 48 from radially inside and this tread body 48 can move in the seat 54 on account of a clearance fit. Other types of set-up of the mobility of the tread body 48 with respect to the stationary section 56 are likewise conceivable in combination with the drive-off aid 92. It is conceivable, for example, to provide an annular, for example metal, support section 100, which is substance-bonded and/or connected positively and/or frictionally to the tread body 48 and is supported rotatably in a circumferential direction with respect to the stationary section 56.

FIGS. 30 to 38 show another embodiment according to the present invention, it being provided in the embodiment shown in these figures that the attachment 14 comprises a pressure-generating device 102. The pressure-generating device 102 here comprises several cavities 104, which are arranged in radial direction R in the lower (radially inner) area of the tread surface 48. To this end the tread surface 48 is designed with a solid outer section 106, adjoining which is a section 108 lying radially on the inside, this section 108 lying radially on the inside comprising the cavities 104.

Furthermore, the section 108 lying radially on the inside is designed more flexibly than the outer section 106, or the section 108 lying radially on the inside is formed of a softer material, so that the section 108 lying radially on the inside is compressed on contact of the outer section 106 (or the tread 18 supported by it) with the road. The cavities 104 are likewise compressed in this case. The fluid medium (here air) located in the cavities 104 can be put under pressure by the compression.

The cavities 104 are arranged for this purpose lying radially inside the tread 18 and the cavities 104 are designed so that their wall 110 can move due to the weight of the vehicle. The radially outer wall 110 of the cavity 104 thus forms a movable wall section 112 of the cavity 104. On compression of the cavity, the movable wall section 112 moves radially inwards. It can be provided that the several cavities 104 are connected to one another via a collective pipe 114.

Figure 33:
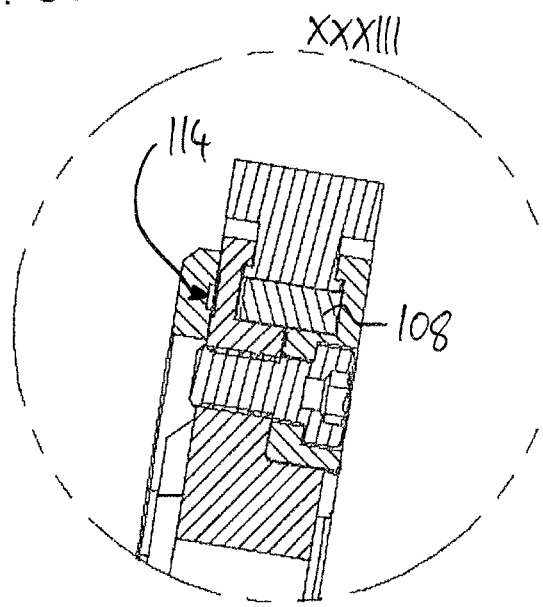
FIG. 33 a sectional view through the tread section of the attachment in FIGS. 30 to 32.
Figure 34:
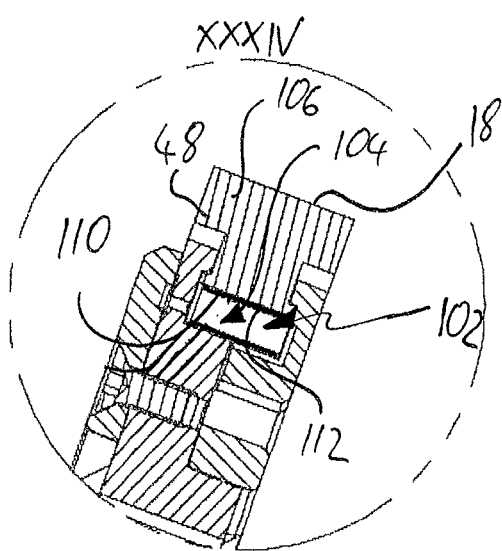
FIG. 34 another sectional view through the attachment in FIGS. 30 to 32.
Figure 35:
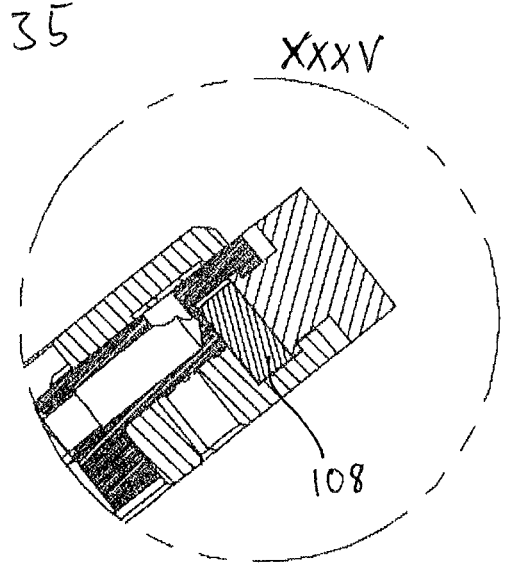
FIG. 35 another sectional view through the attachment in FIGS. 30 to 32.
Figure 43:
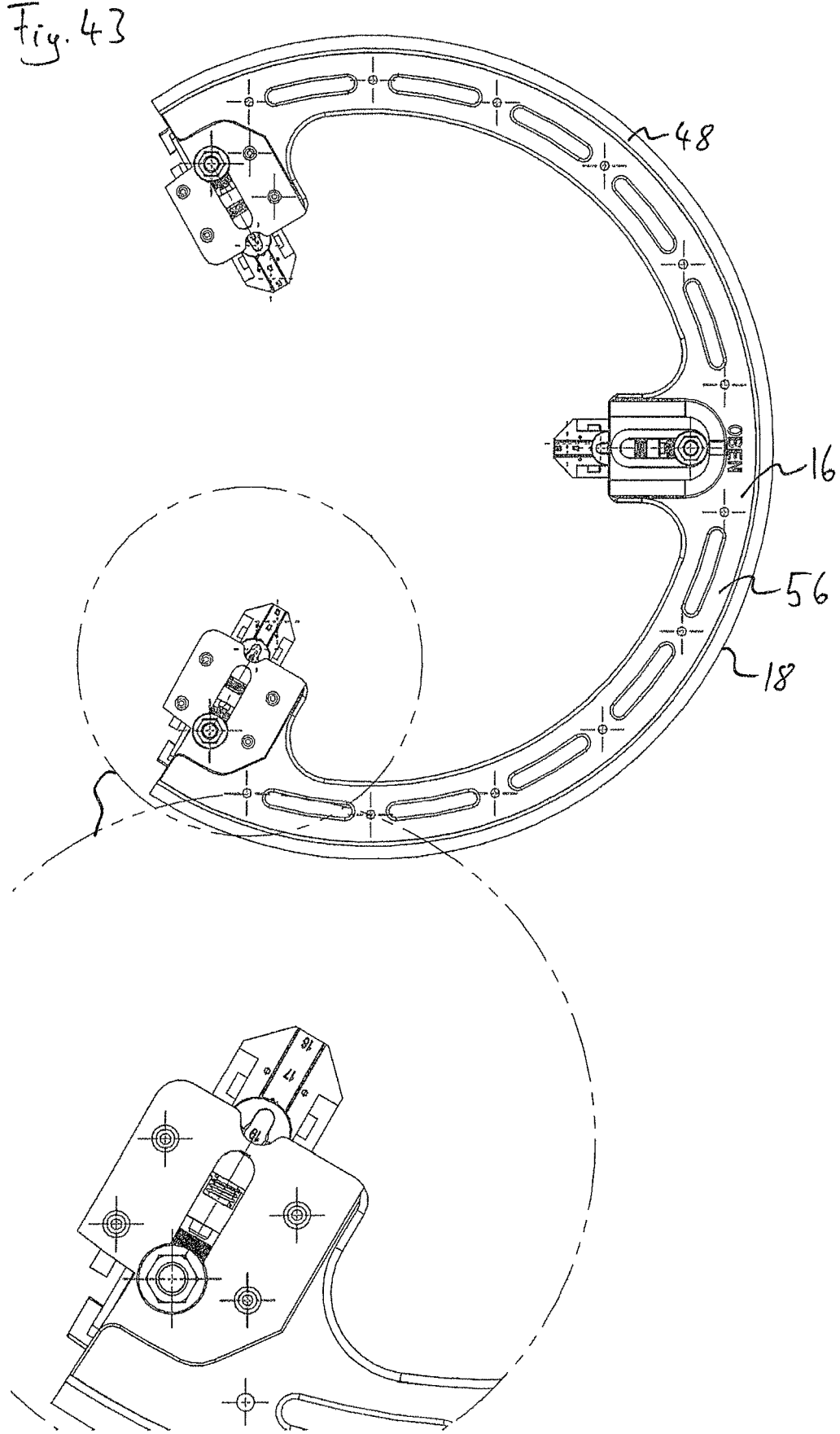
FIG. 43 a detailed view of the attachment from FIGS. 39 to 42.
Figure 44:
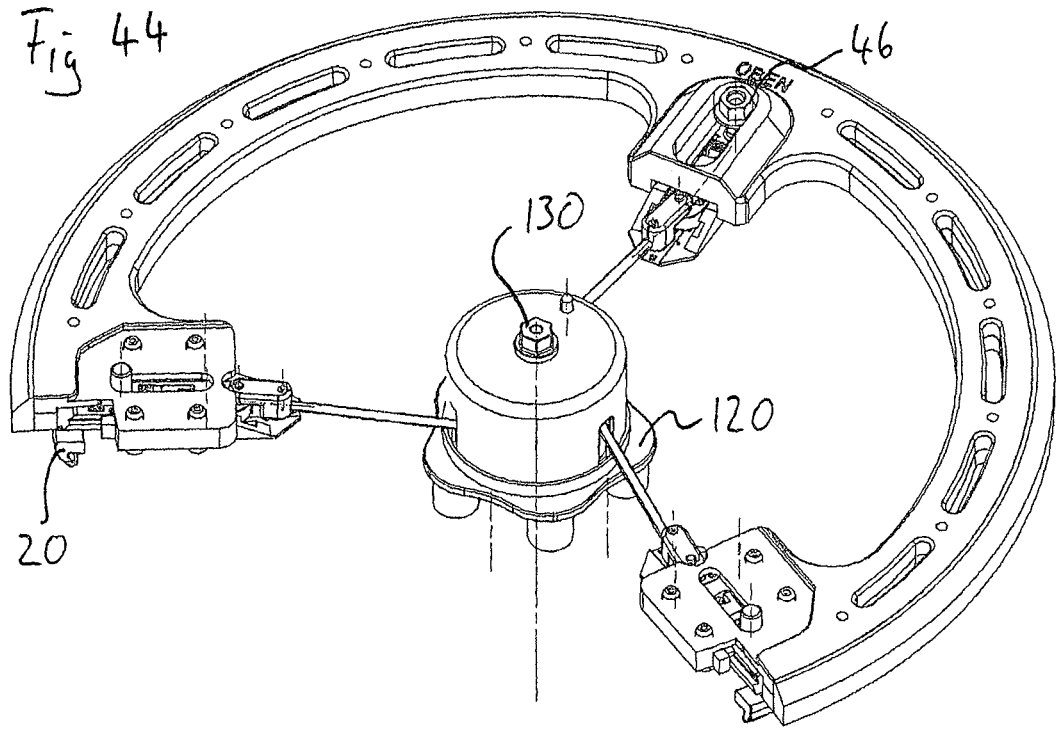
FIG. 44 a detailed view of the attachment from FIGS. 39 to 43.
Figure 45:
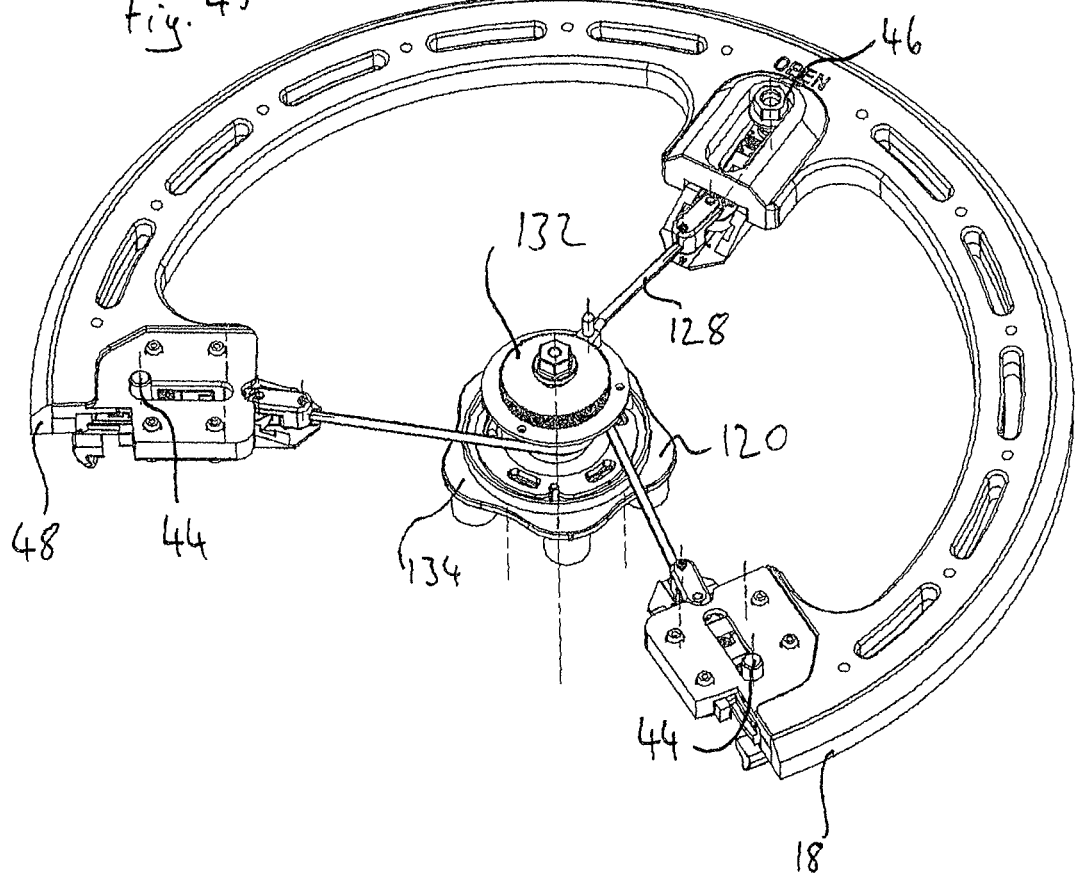
FIG. 45 another detailed view of the attachment from FIGS. 39 to 44.

As is recognisable in FIG. 33, the collective pipe 114 is designed here in the form of a circumferential groove on the stationary section 56 of the attachment 14. The collective pipe 114 then opens into a connection pipe 118 at a coupling point 116. The connection pipe 118 can be coupled to the tire that is impaired in its driving characteristics, so that this can be supplied with compressed air on movement of the attachment 14 and can be pumped up thereby, so that it supports driving additionally to the attachment 14.

The assembly section 22 of the embodiment in FIGS. 30 to 38 is designed corresponding to the assembly section 22 of the embodiment in FIGS. 3 to 5. A tread 18 movable in circumferential direction U or tread segments 78 movable in circumferential direction U can be provided. It can also be provided that the tread body 48, which is elongated in the circumferential direction and can comprise two circumferential segments, for example, is rotatable about the axis of rotation of the vehicle wheel with respect to the stationary section 56 of the attachment 14. It can be provided here, for example, that the section 108 lying radially on the inside with the cavities 104 or the pressure-generating device 102 is arranged immovably with respect to the stationary section 56 and only the radially outer section 106 of the tread body 48 is movable in a circumferential direction. It can also be provided, however, that the radially inner section 108 and the radially outer section 106 are movable jointly in circumferential direction U.

FIGS. 39 to 48 show another embodiment of an attachment 14 according to the invention. The attachment 14 of FIGS. 39 to 48 has a tread section 16 or stationary section 56 on which the clamping devices 20 are arranged. This embodiment of the attachment 14 also has a bracing unit 120. The bracing unit 120 is designed to bring the clamping devices 20 into rear engagement with the rim flange 10. The bracing unit 120 is designed in this case so that it is detachable from the tread section 16 or stationary section 56 and it is provided that the bracing unit 120 is unconnected to the attachment 14 or the stationary section 56 in the operating state and is not located on the vehicle wheel 1.

Once they have been moved into the rear engagement position with the rim flange 10, the clamping devices 20 are fastened by securing agents 122, which are screwed onto corresponding threaded bolts arranged on the clamping devices 20 and are secured against play with respect to the stationary section 56. The threaded bolts extending away from the clamping devices 20 form fastening device 44. Bracing via the fastening device 44 fixes the clamping devices 20 with respect to the rim 2 and with respect to the stationary section 56. This fastening with the securing agents 122 and the threaded bolts thus corresponds to the fastening by means of the fastening device 44 with the counterpart 46, as described in relation to FIGS. 3 to 5.

The bracing unit 120 has here a support device 124. The support device 124 is arranged and designed so that it supports the bracing unit 120 spaced at a distance from the rim 2 in axial direction A. The support device 124 in the present case comprises several set-down devices 126 designed in the manner of a sleeve. The set-down devices 126 are designed and arranged to be set down onto the wheel studs and to support the bracing unit 120 with respect to the wheel studs.

The bracing unit 120 comprises several force transmission means 128, which are arranged and designed to be brought into connection with the clamping devices 20 and to transfer the clamping devices 20 into the rear engagement position with the rim flange 10. Here the transfer to this rear engagement position with the rim flange 10 is executed by a tensile movement directed radially inwards onto the clamping devices 20. To this end a tensile force directed radially inwards via a tool application point 130 of the bracing unit 120 is transmitted by means of the force transmission means 128 to the clamping devices 20.

The force transmission means 128 are formed flexibly here. They are designed in the present case as cable-like connection means.

By rotation of a tensioning section 132 of the bracing unit 120 with respect to a base section 134 and with respect to the stationary section 56 of the attachment 14, the effective length of the force transmission means 128 is shortened by winding onto the tensioning section 132 and the clamping devices 20 are moved radially inwards, or pulled in the present case, via the coupling to the force transmission means 128 (cable-like connection means).

A bracing unit 120 in the sense of the invention can have a base section 134, which is preferably designed so that it can be supported on the rim 2, preferably on wheel studs or on wheel bolts, and is hereby also secured against rotation about the axis of rotation 5 or axial direction A.

A bracing unit 120 in the sense of the present invention can further comprise a tensioning section 132, which is rotatable with respect to the base section, whereby the clamping devices 20 are transferable to the rear engagement position.

A bracing unit 120 can preferably have force transmission means 128, which can preferably be shortened in their elongated extension (or in their extension in a radial direction).

It is likewise conceivable that the force transmission means 128 can be shortened in their radial extension (in the case of a uniform length) by pivoting, for example, so that, although their length remains the same in itself, a shortening of their radial extension takes place by reorientation.

The bracing unit 120 can further comprise a locking device 136, which guarantees securing against an unintentional release of the torsion or of the tensioning of the tensioning section 132.

Figure 46:
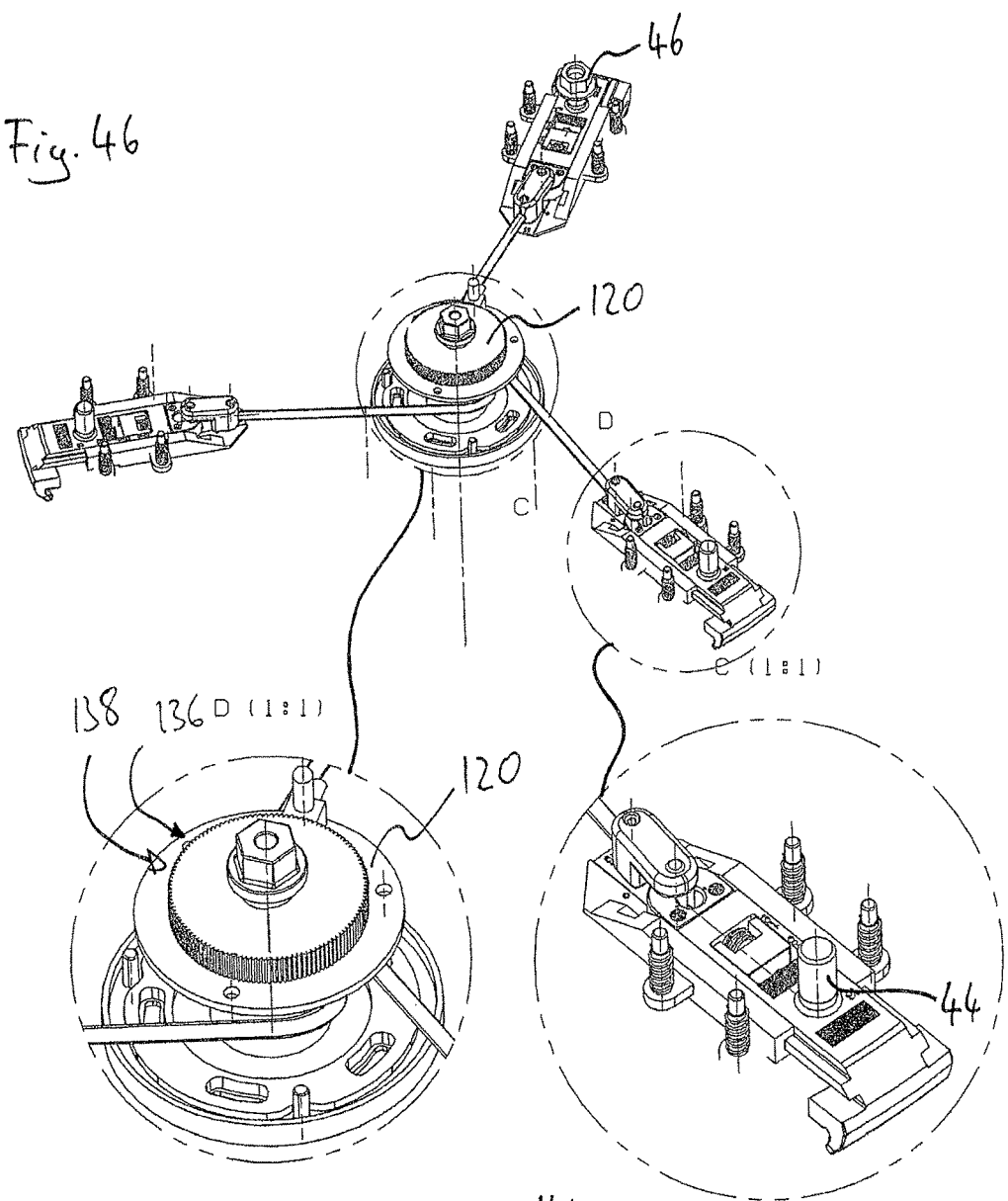
FIG. 46 several detailed views of parts of the attachment from FIGS. 39 to 45.
Figure 47:
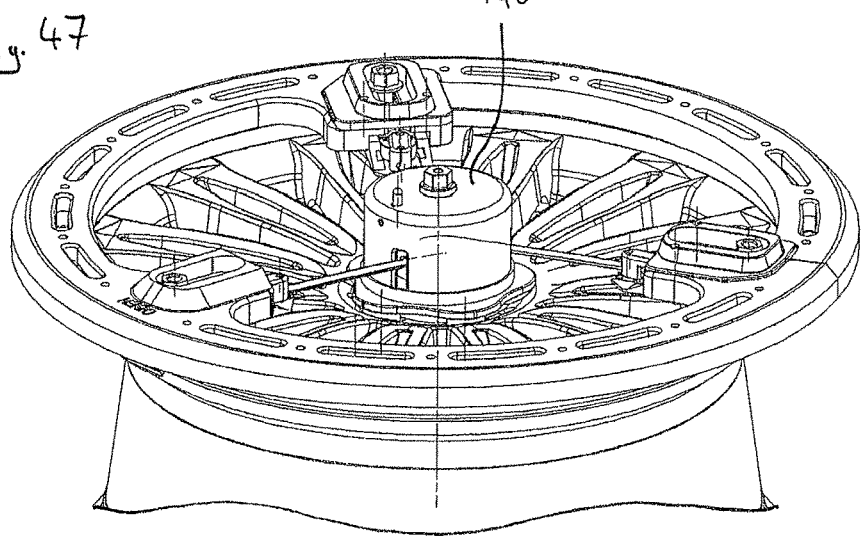
FIG. 47 the attachment from FIGS. 39 to 46 in the state affixed to a rim.
Figure 48:
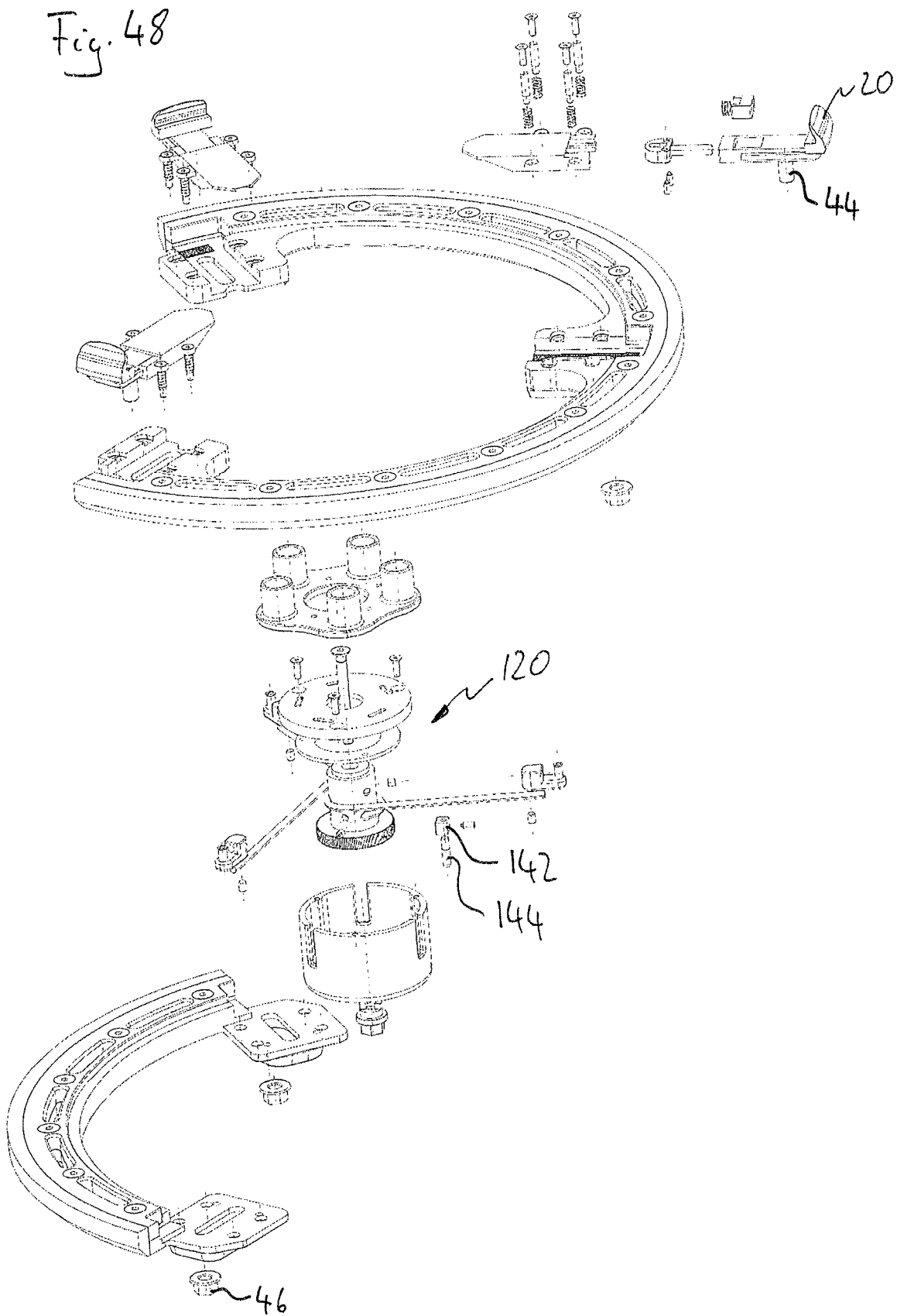
FIG. 48 an exploded view of the attachment from FIGS. 39 to 47.
Figure 49:
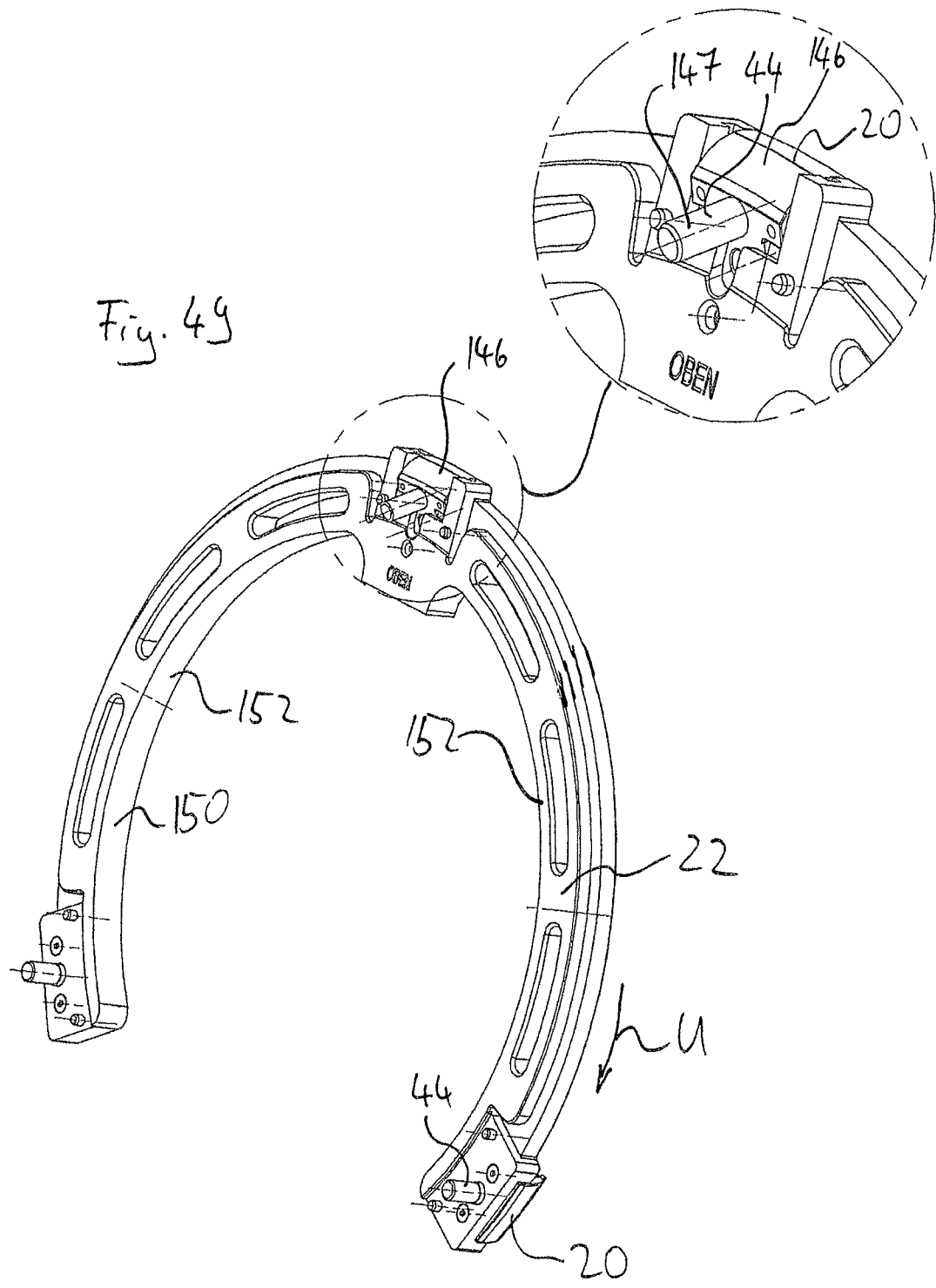
FIG. 49 another embodiment according to the invention of the attachment.
Figure 50:
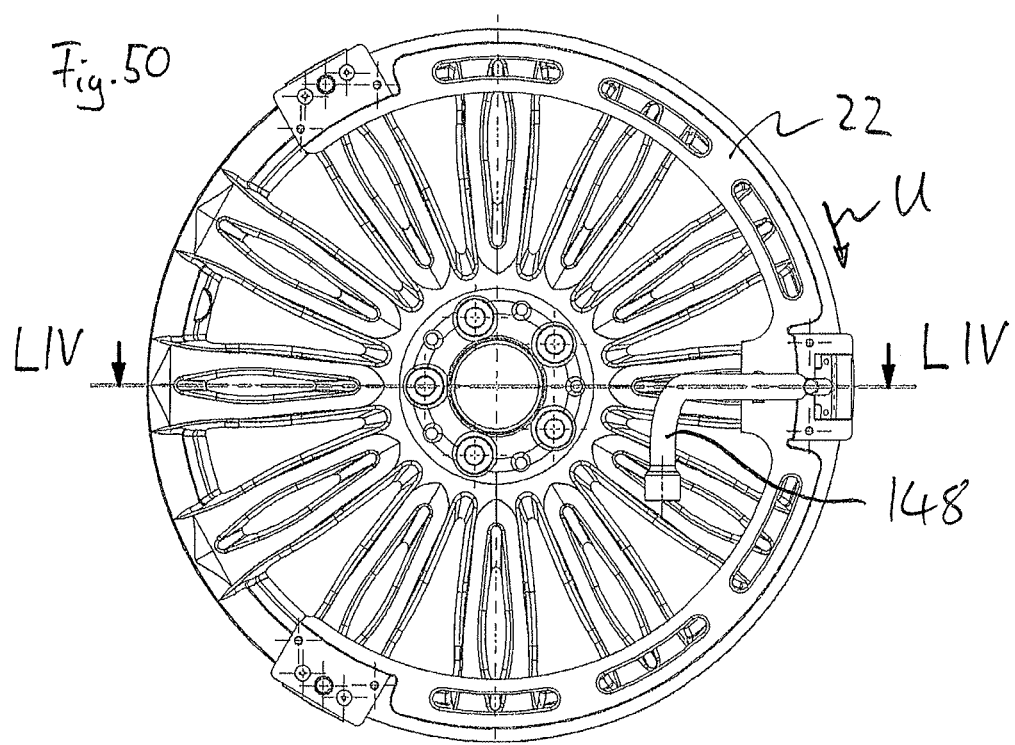
FIG. 50 the assembly section of the attachment from FIG. 49 when affixed to the rim of the vehicle wheel.
Figure 51:
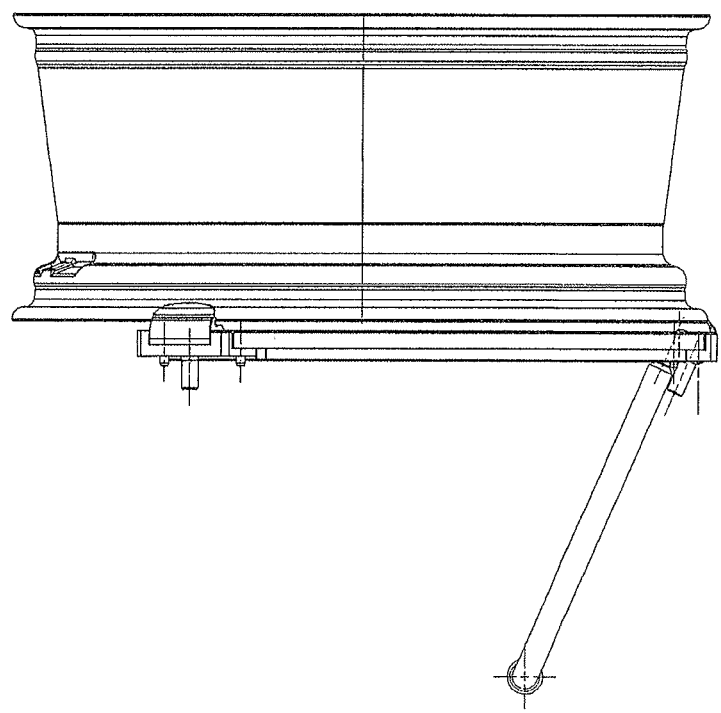
FIG. 51 the mounting process from FIG. 50 in a side view.
Figure 52:
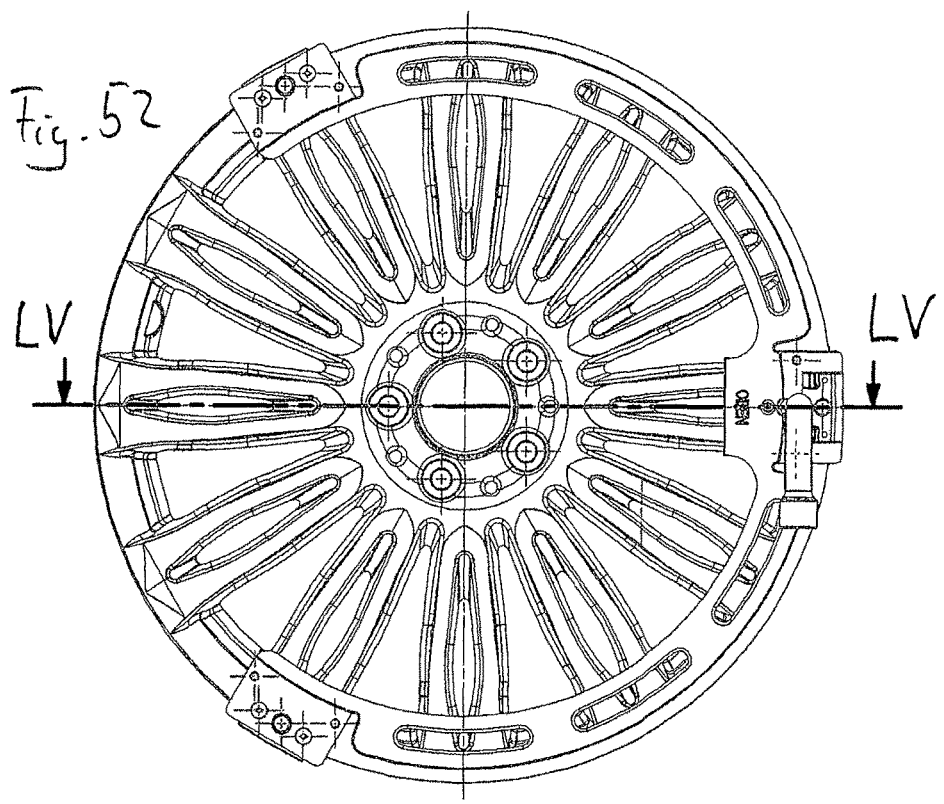
FIG. 52 the assembly section with the clamping device engaging behind the rim flange.
Figure 53:
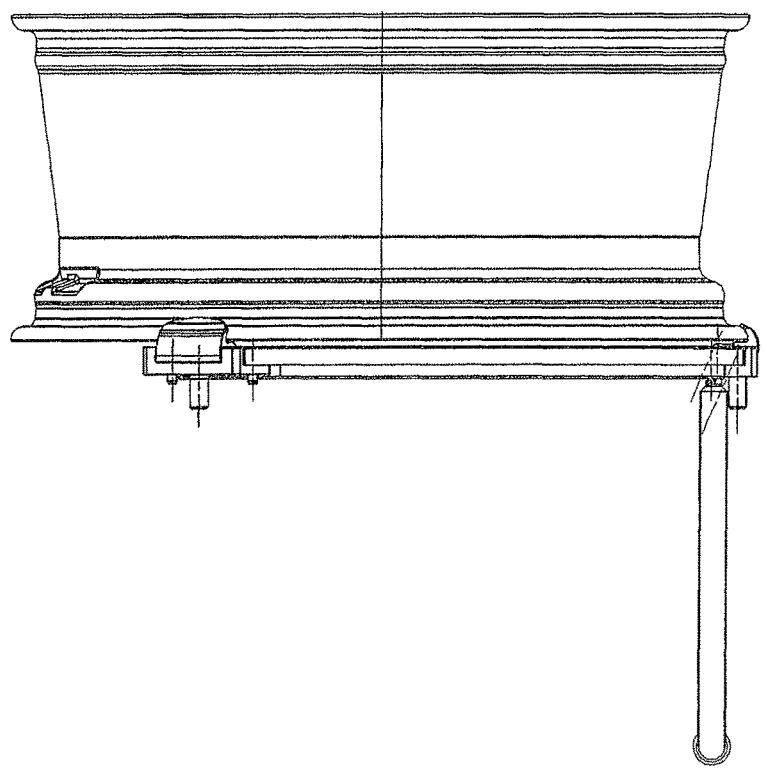
FIG. 53 a side view of the configuration from FIG. 52.

It is illustrated in the example of FIG. 46 that this locking device 136 can be produced by means of a toothed section 138 on the tensioning section 132 and a corresponding counterpart 142 (for example, in a cover of the bracing unit 120). Like the toothed section 138, the counterpart 142 has toothing that is formed complementary to the toothed section 138. The counterpart 142 can be moved into engagement with the toothed section 138 or out of this engagement via a corresponding pressure mechanism.

The attachment of FIGS. 39 to 48 manages without an assembly section 22 remaining on the vehicle wheel.

FIGS. 49 to 55 illustrate a variant of an attachment 14 that comprises two fixed clamping devices 20 (with respect to the attachment or the assembly section 22) and bears a pivotable clamping device, which has the reference character 146. The pivotable clamping device 146 is designed to be pivotable about the circumferential direction U. For the sake of clarity, only the assembly section 22 of the attachment 14 is shown in the figures in the present case.

To mount the assembly section 22 of this embodiment, the two fixed clamping devices 20 are brought manually into rear engagement with the rim flange 10. The pivotable clamping device 146 is then pivoted into rear engagement with the rim flange 10 via a lever mechanism 148, which is illustrated in FIG. 50 to 53 by means of a simple spanner. The lever mechanism 148 can be applied to the clamping device 146 at a lever application mechanism 147 (which is formed in this case by the fastening device 44).

The assembly section 22 has a basic body 150 in the form of a circular arc. The basic body 150 has two limbs 152, which are formed curved in the present case and extend away from the pivotable clamping device 146 in circumferential direction U. The fixed clamping devices 20 are arranged at the free ends of these limbs 152. The pivotable clamping device 146 has a contact surface 38, which extends in a plane orthogonal to the axial direction A (the same applies to the fixed clamping devices 20, which can be designed corresponding to that shown in FIG. 5, for example).

The clamping device 146 has a curved rear grip section 153 protruding from the contact surface 38. The rear grip section 153 is implemented here in such a way that it has a section formed complementary to the contour of the rim flange. In its front area (axially at the front) the rear grip section 153 has a tip 154, which is used for insertion between the tire 3 and rim flange 10. The rear grip section 153 on this clamping device 146 is designed curved, so that the clamping device 146 can be pivoted in efficiently. The clamping device 146 is designed in this case so that in the pivoted position of the clamping device 146 shown in FIG. 55, the rear grip section 153 first runs extending in axial direction A and then, due to the curvature of the rear grip section 153, transitions into a part (or into a section running accordingly) of the rear grip section 153 that runs at an angle of between 30 and 60 degrees, or 40 and 50 degrees, in this case approx. 45 degrees, to axial direction A.

FIGS. 56 to 60 show another embodiment of an attachment 14 according to the invention. In this embodiment it is provided that the attachment 14 has a bracing mechanism 156 which comprises a curved track 158. The curved track 158 has a separate curved track section 160 for each clamping device 20. Each of the clamping devices 20 actuatable via the curved track sections 160 has an engagement section 162. Due to the engagement of the engagement sections 162 in the curved track sections 160, the clamping devices 20 can be moved in radial direction R by rotation of the bracing mechanism 156 (or by rotation of the section bearing the curved track 158, or of the plate-shaped element 164).

The individual curved track sections 160 of the curved track 158 extend here in circumferential direction U, wherein their radial position changes along their circumferential extension. The change in the radial position is such that the clamping devices 20 are variable in their radial position on movement of the bracing mechanism in circumferential direction U. Due to the slot-shaped design of the curved track sections 160, it is possible to move the clamping devices 20 respectively radially inwards and radially outwards. The bracing mechanism 156 has a plate-shaped element 164 on which the curved track 158 is arranged.

The design of the tread section 16 with its stationary section 56 substantially corresponds to that of FIG. 27, for example, the attachment 14 or the tread body 48 in the present case comprising no drive-off aid (the provision of a drive-off aid 92 is likewise possible, however).

The tread section 16 of the version in FIG. 15 is also similarly constructed. The tread body 48 shown here (FIGS. 56 to 60) has no individual tread segments, however.

The additional provision of a drive-off aid 92 and of individual movable tread segments 78, which are arranged distributed in circumferential direction U (and supported flexibly, for example) to form the tread 18 is conceivable, therefore.

Another embodiment of an attachment 14 according to the invention is illustrated in FIGS. 61 to 64 (the assembly section 22 is shown).

Figure 61:
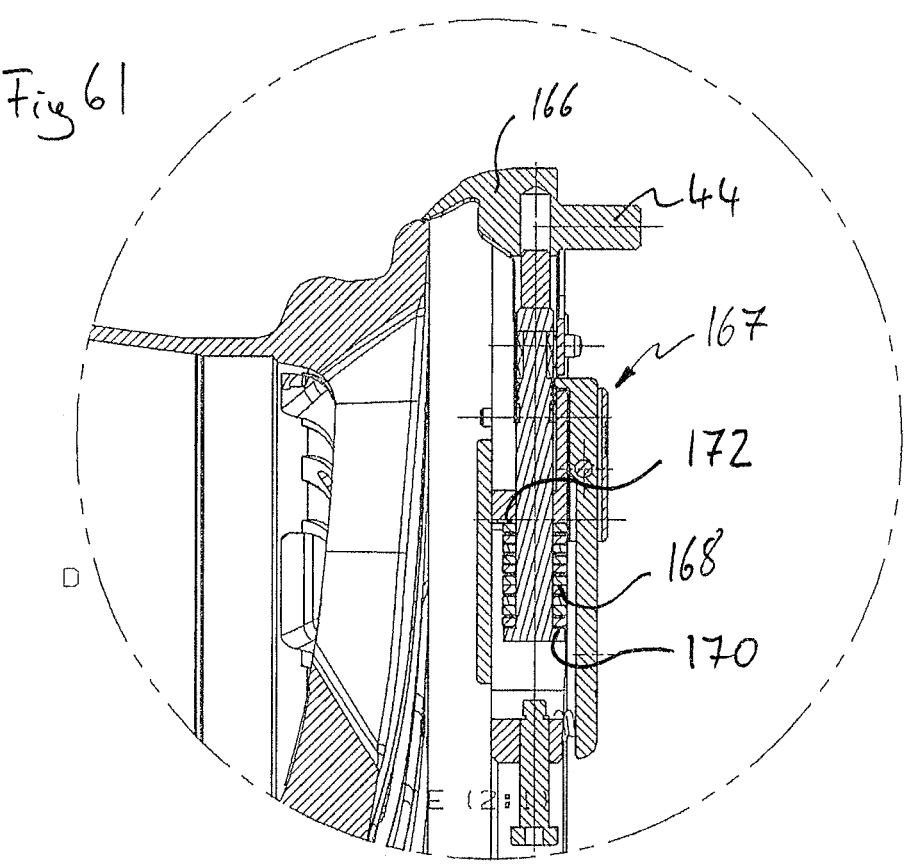
FIG. 61 another attachment according to the invention and its clamping device on application to the rim flange.
Figure 62:
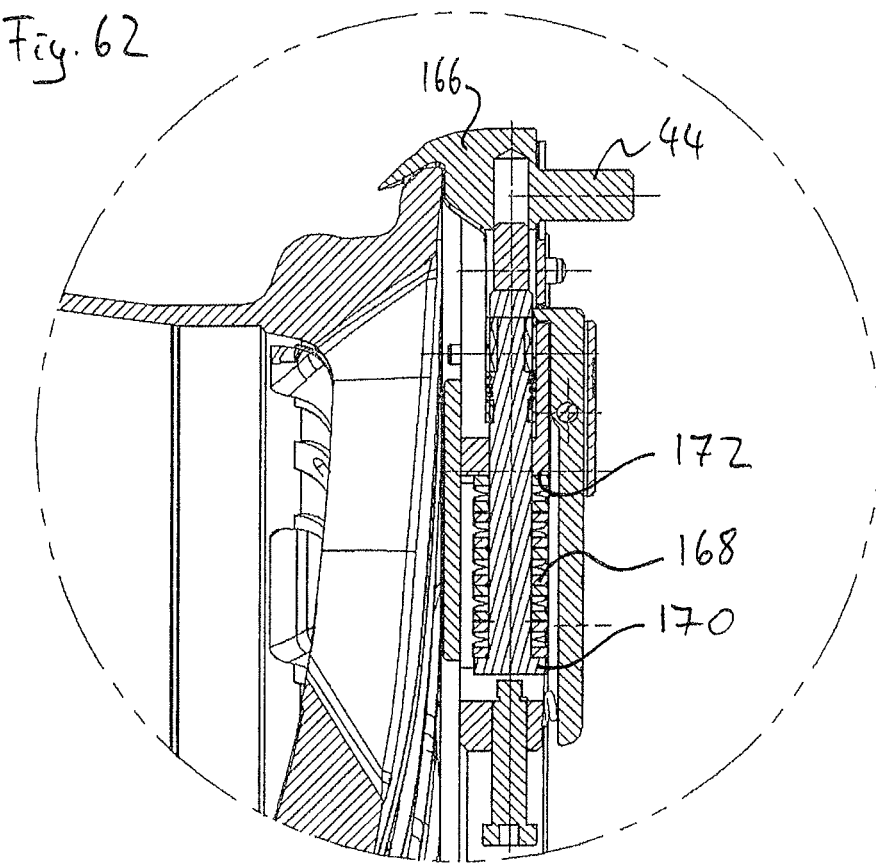
FIG. 62 the clamping device and the attachment from FIG. 61 in the state engaging behind the rim flange.
Figure 63:
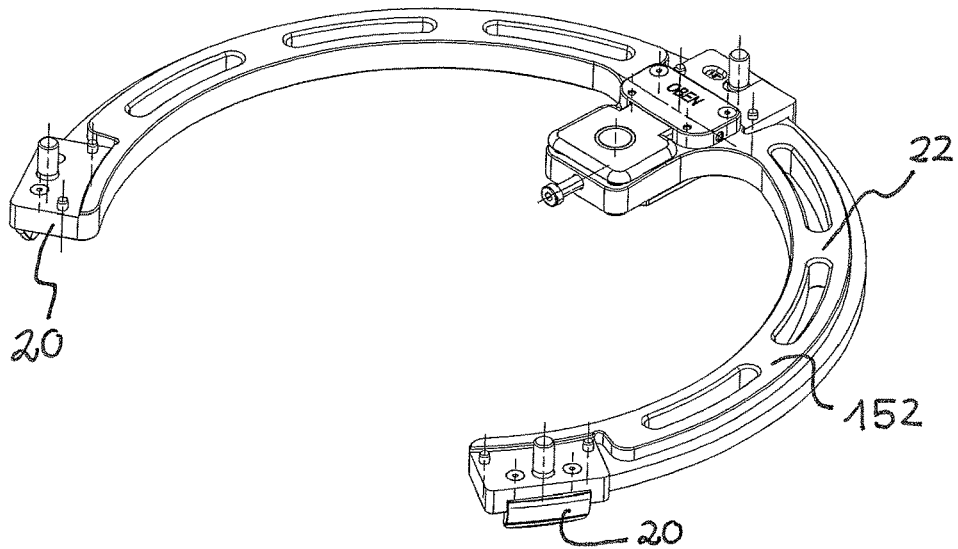
FIG. 63 the assembly section of the attachment from FIGS. 61 and 62.
Figure 64:
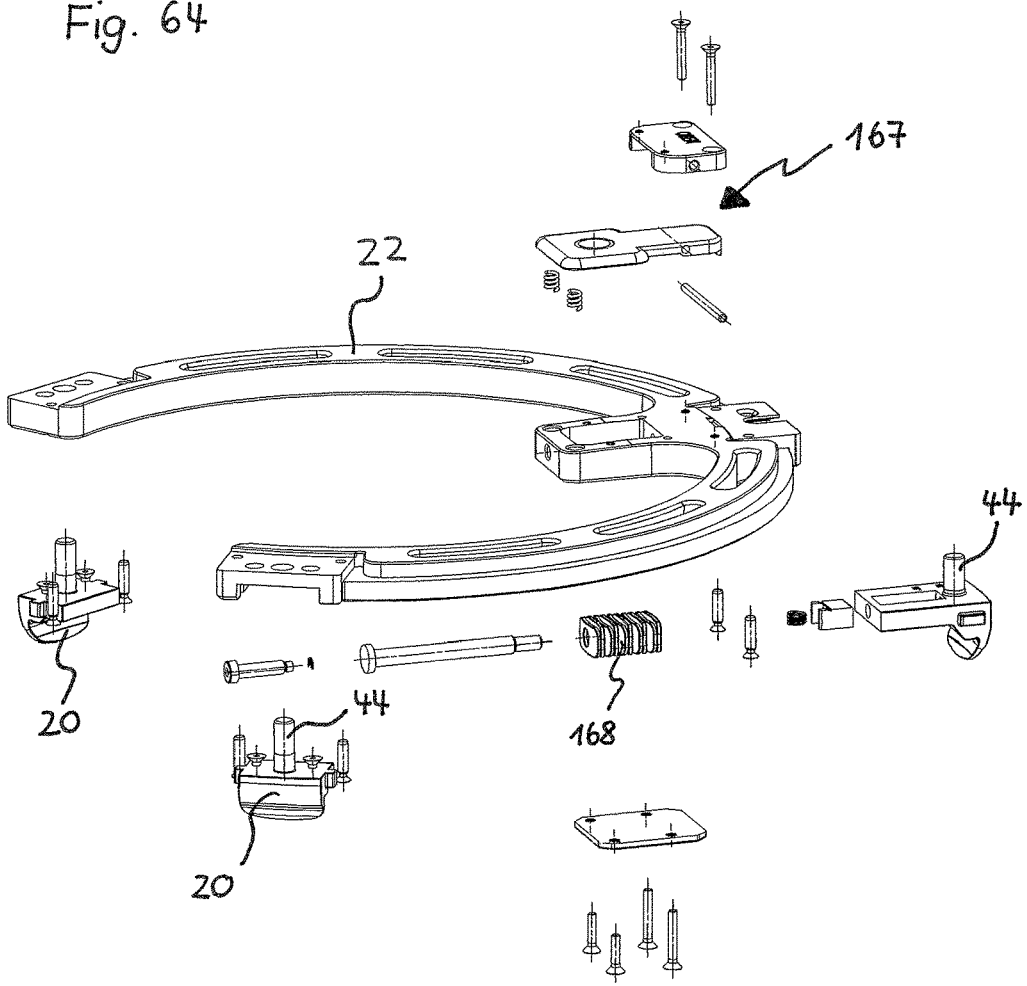
FIG. 64 the assembly section of FIG. 63 in an exploded view.
Figure 65:
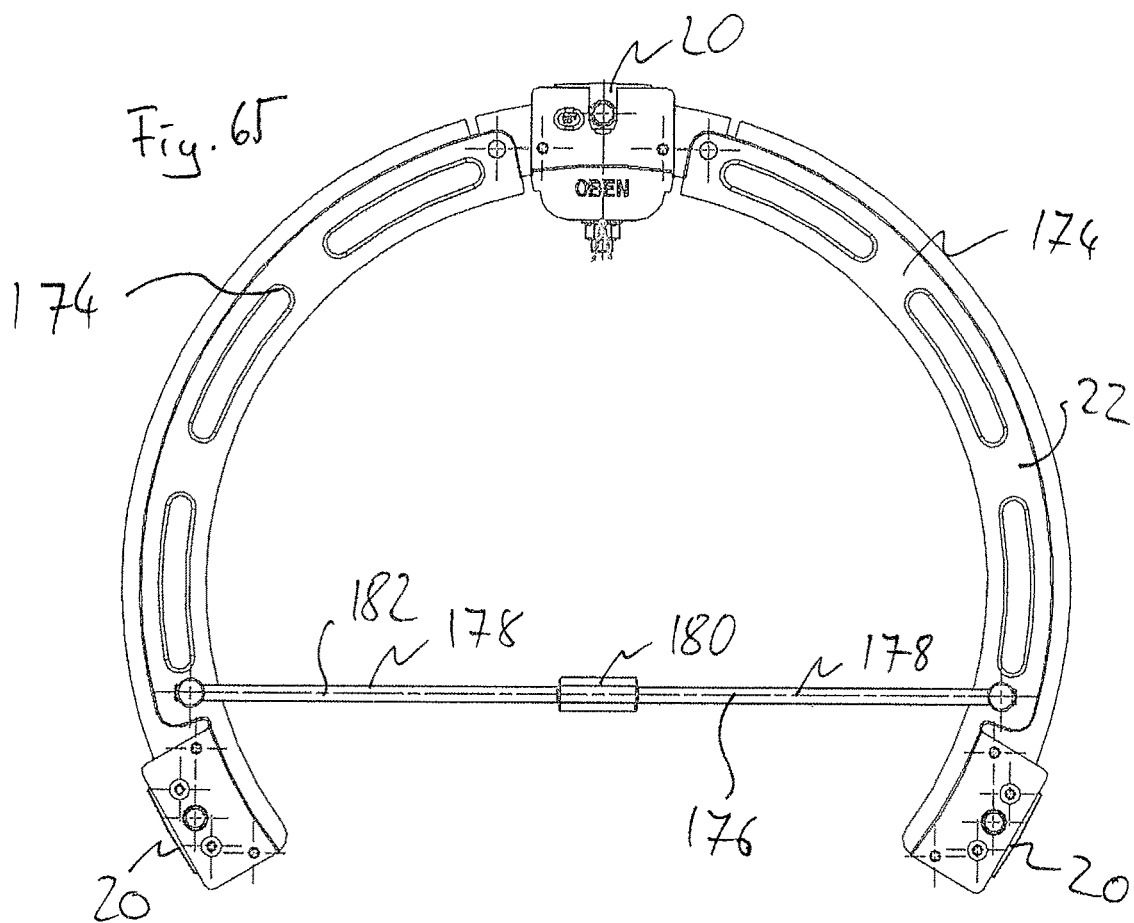
FIG. 65 another attachment according to the invention.
Figure 66:
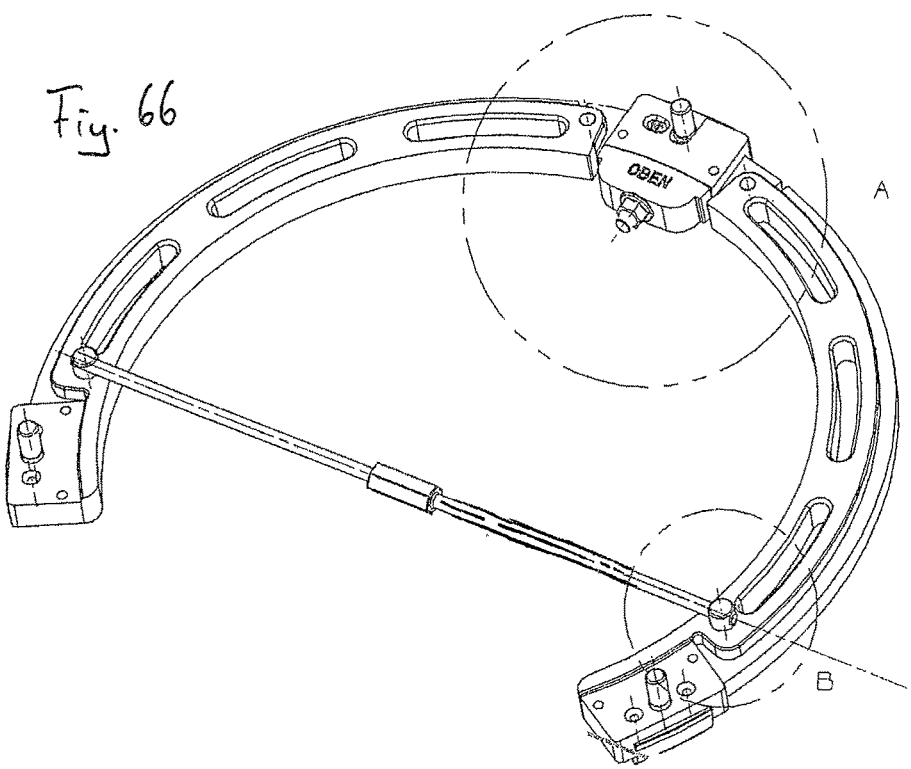
FIG. 66 the attachment from FIG. 65 and the assembly section of the attachment from FIG. 65.
Figure 67:
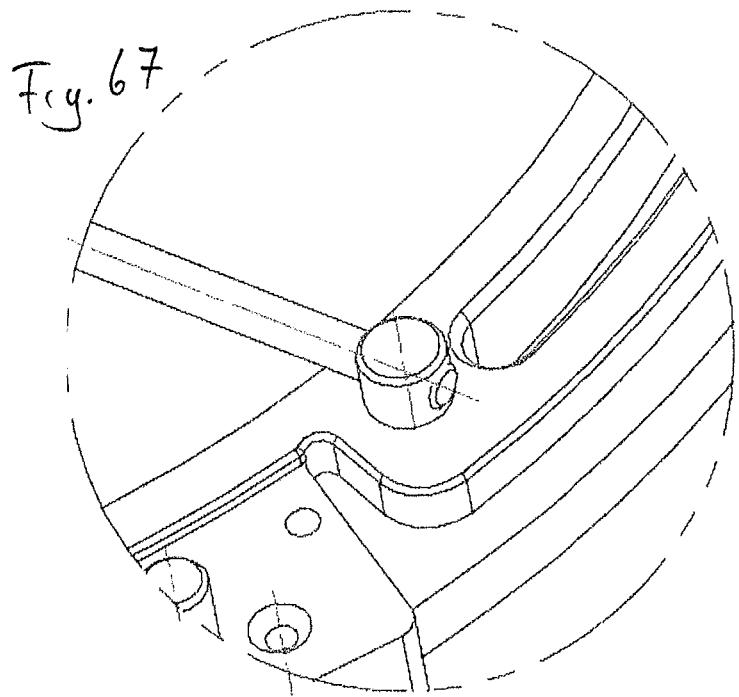
FIG. 67 a detail of the assembly section from FIGS. 65 and 66.
Figure 68:
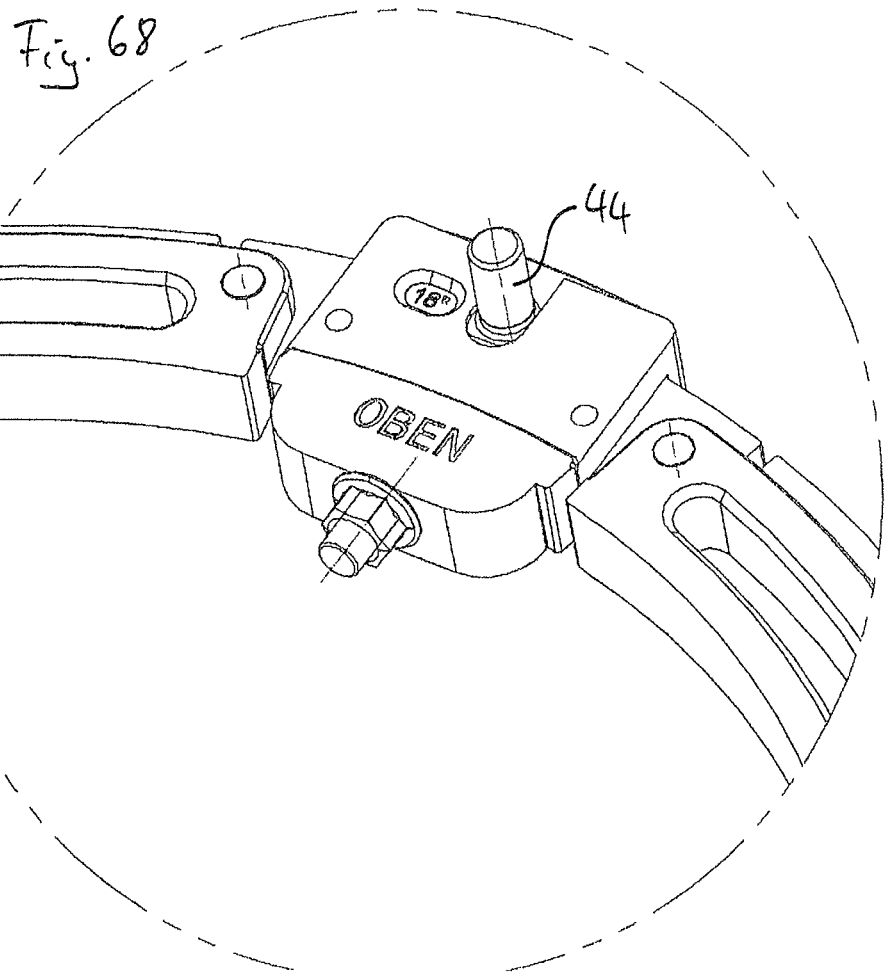
FIG. 68 another detail of the assembly section.

This attachment 14 comprises a clamping device 166, which is pretensioned in radial direction R. In the example shown, the clamping device 166 is pretensioned in a radially inner position. The other two clamping devices 20 (arranged on the limbs 152 of the assembly section 22 that extend in circumferential direction U) are formed fixed (or they can be mounted fixedly on the assembly section 22 in various positions coordinated to different rim diameters). The clamping device 166 is held in the radially outer position (as shown in FIG. 61) by a locking device 167. The pretensioning of the clamping device 166 can be released by actuating the locking device 167 and the clamping device 166 moves radially inwards on account of its pretensioning.

Due to the spring pretensioning of the clamping device 166, it is possible to being the two fixed clamping devices 20 into rear engagement with the rim flange 10 and then to apply the spring-pretensioned clamping device 166 to the rim flange 10 as shown in FIG. 61. Due to the pretensioning of the clamping device 166 into the radially inner position, the clamping device 166 is drawn automatically into the position shown in FIG. 62 when the locking device 167 has been actuated. In this position it engages positively behind the rim flange 10. It rests from axially outside on the rim flange 10 with its contact section 38 in this case.

The assembly section 22 can be mounted accordingly in a very simple and efficient manner on the vehicle wheel 1 or on the rim 2. The clamping device 166 (or the clamping devices) move practically by themselves into the rear engagement position.

The assembly section 22 as illustrated in FIGS. 61 to 64 can be combined, for example, with a tread section 16 as shown in FIG. 15. By bracing the tread section 16 by means of the fastening devices 44 on the clamping devices 20 and 166, the clamping devices 20, 166 are fixed in their position engaging behind the rim flange 10 and the rear engagement of the clamping device 166 is realised not only on account of the spring pretensioning.

To implement the spring pretensioning, the attachment 14 of this embodiment has a leaf spring arrangement 168. The leaf spring arrangement 168 lies on one side on a contact section 170 of the clamping device 166 and is supported at the other end on a contact section 172 of the assembly section 22, so that the clamping device 166 is braced with respect to the assembly section 22.

Another embodiment of an attachment 14 according to the invention is depicted in FIGS. 65 to 68. The assembly section 22 of this embodiment has limbs 174 that are pivotable relative to one another. The assembly section 22 here comprises three clamping devices 20. The two pivotable limbs 174 are each arranged pivotably about the axial direction A with respect to a central clamping device 20. Arranged at the free ends of the limbs 174 in each case is a clamping device 20 that is fixed with respect to the limbs 174. All three clamping devices 20 of this embodiment are fixed immovably in their position with respect to the assembly section in a radial direction (it is possible to provide clamping devices that can be fixed in various positions coordinated to different rim diameters).

Furthermore, the attachment has a bracing element 176. The bracing element 176 here comprises two threaded rods 178, which are introduced into a threaded sleeve 180 with opposed threads. The threaded rods 178 are each articulated pivotably by their ends on the limb side on the pivotable limb 174. With their end facing away from the limb they are each screwed into the threaded sleeve 180. By rotating the threaded sleeve 180 with respect to the threaded rods 178, it is possible to vary the extension of the shortenable element 182 that is formed by the threaded rods 178 and the threaded sleeve 180. The two pivotable limbs 174 can be moved towards one another by shortening. To mount this assembly section 22, it is accordingly possible to proceed as follows: first the upper central clamping device 20 is brought into rear engagement with the rim flange 10. The other clamping devices 20 articulated on the limbs 174 are then applied to the rim flange 10 and then the threaded sleeve 180 is twisted, so that the shortenable element 182 is shortened in its extension, whereby the clamping devices 20 mounted on the free ends of the limbs 174 are transferred to the rear engagement position with the rim flange 10. Following the mounting of the assembly section 22, a tread section 16 of the attachment 14 can be mounted. A part of the tread section 16 can also already be connected fixedly to the assembly section 22 during engagement behind the rim flange 10 in any case.

Figure 69:
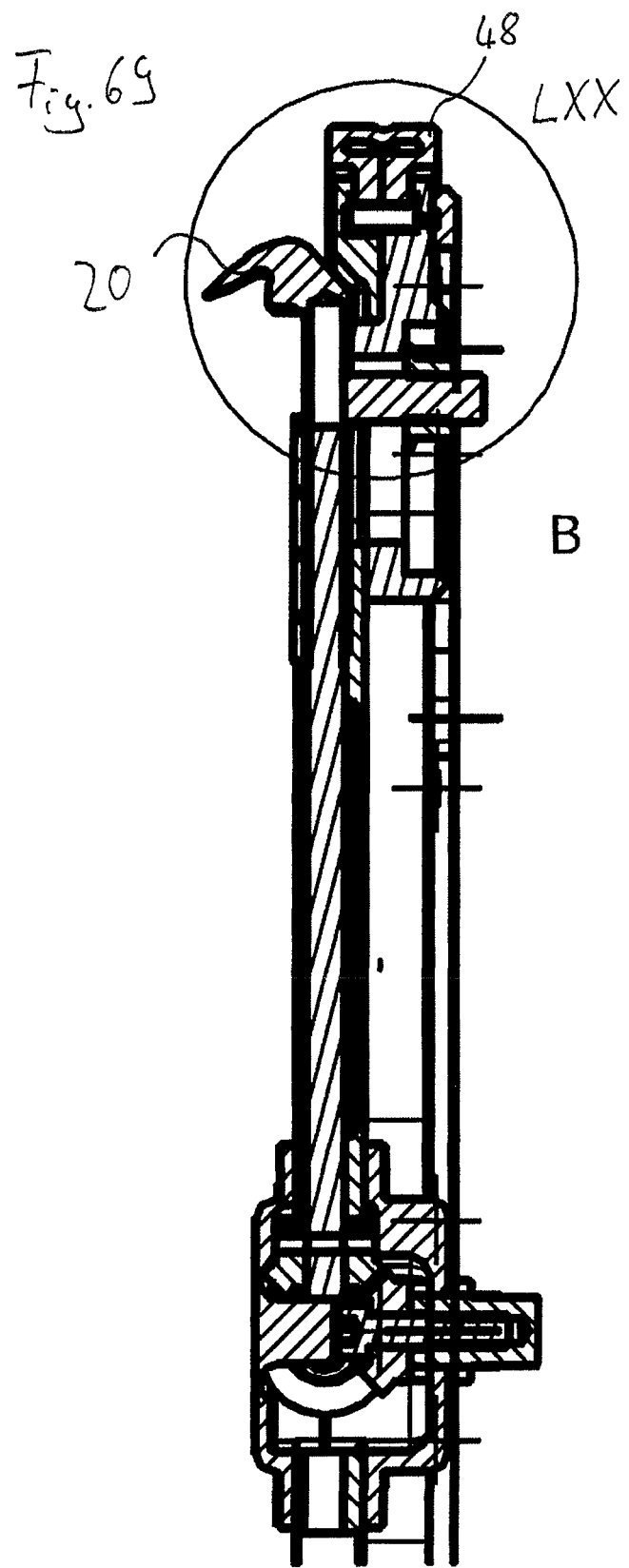
FIG. 69 another attachment according to the invention.
Figure 74:
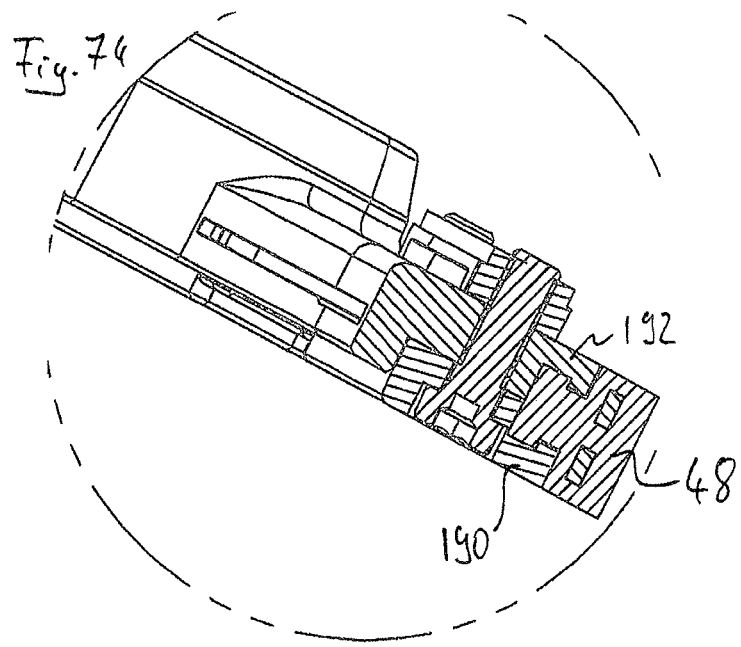
FIG. 74 a detail of the attachment from FIG. 71 to 73 in section.
Figure 75:
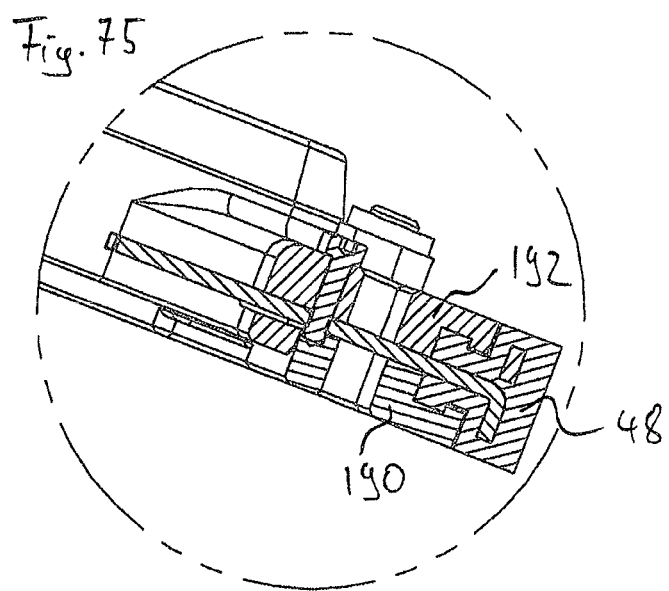
FIG. 75 another detail in section of the attachment from FIG. 71 to 73.
Figure 76:
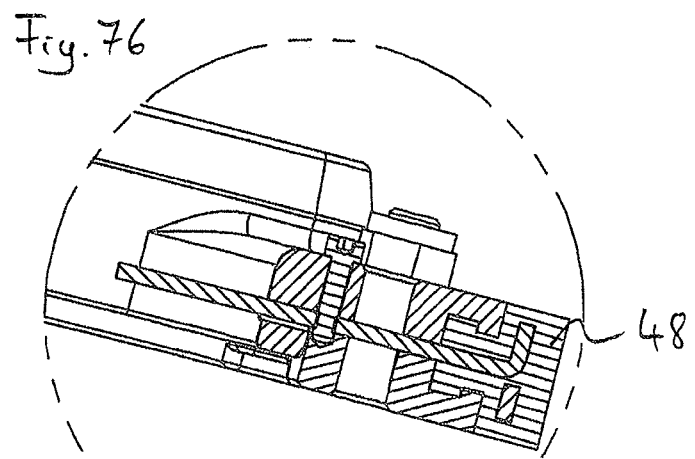
FIG. 76 another detail in section of the attachment from FIG. 71 to 73.
Figure 77:
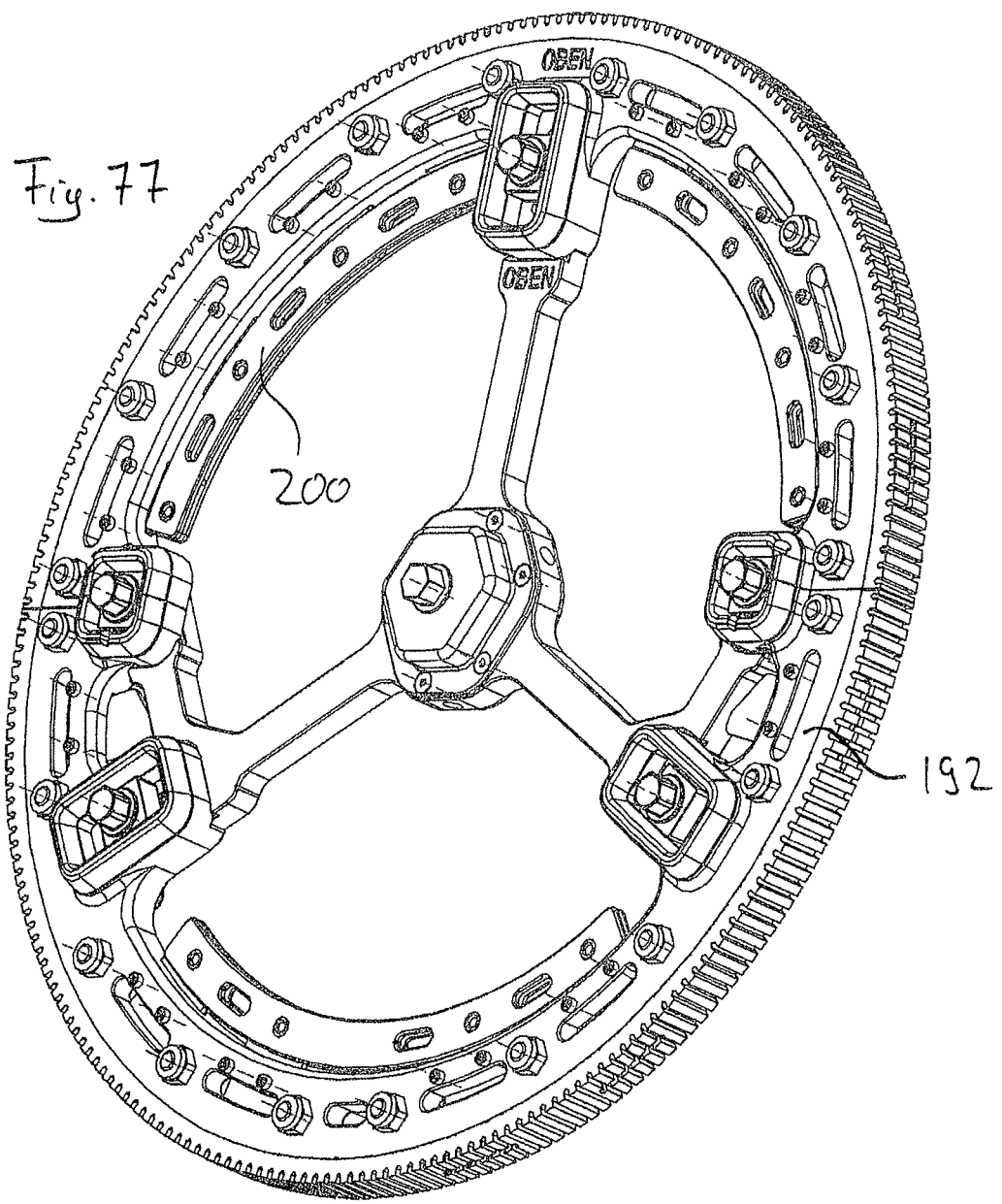
FIG. 77 another attachment according to the invention.
Figure 78:
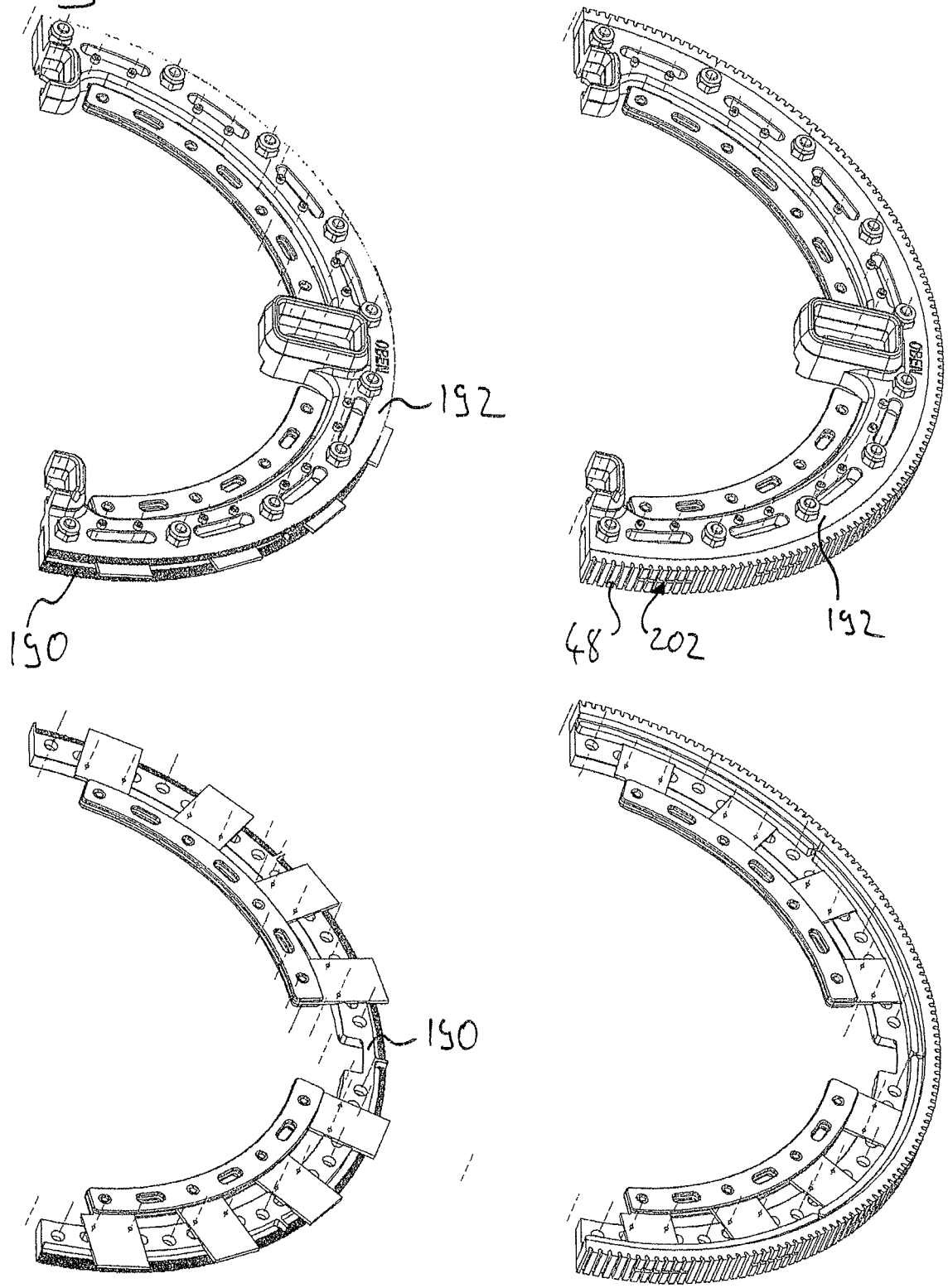
FIG. 78 various views of a part of the tread section of the attachment from FIG. 77.
Figure 79:
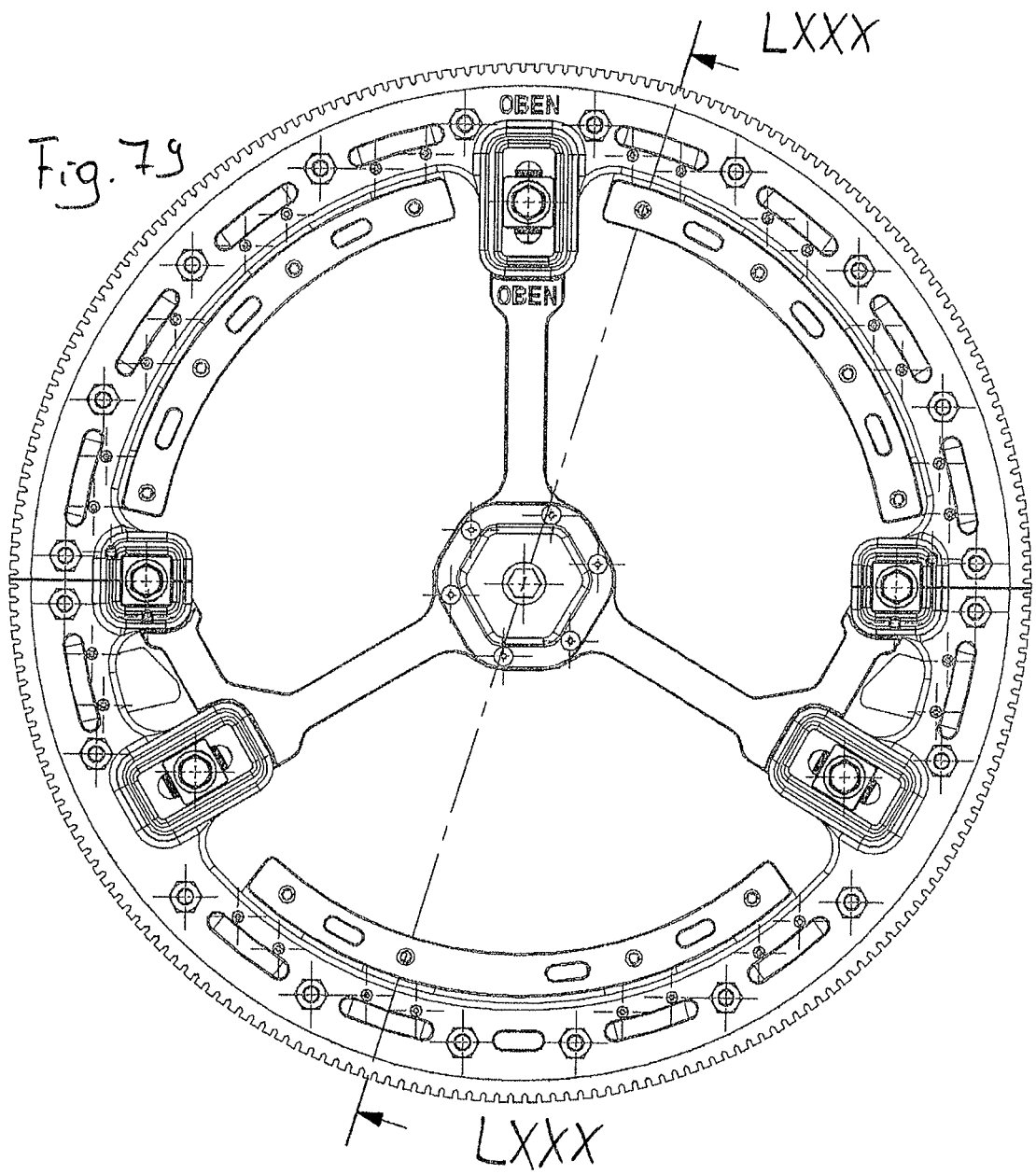
FIG. 79 the attachment from FIGS. 77 and 78 in a view when looking in an axial direction at the side facing away from the rim.
Figure 80:
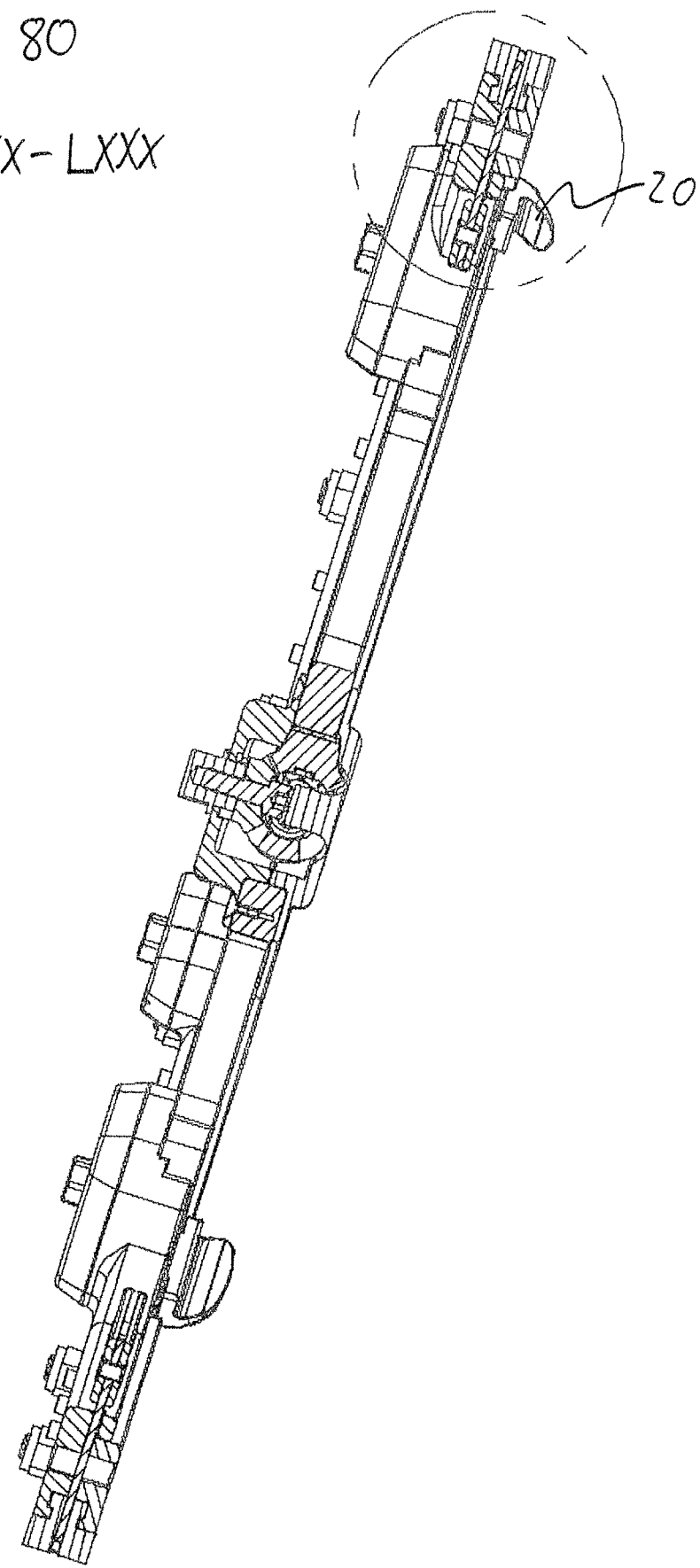
FIG. 80 a section through the view from FIG. 79.
Figure 81:
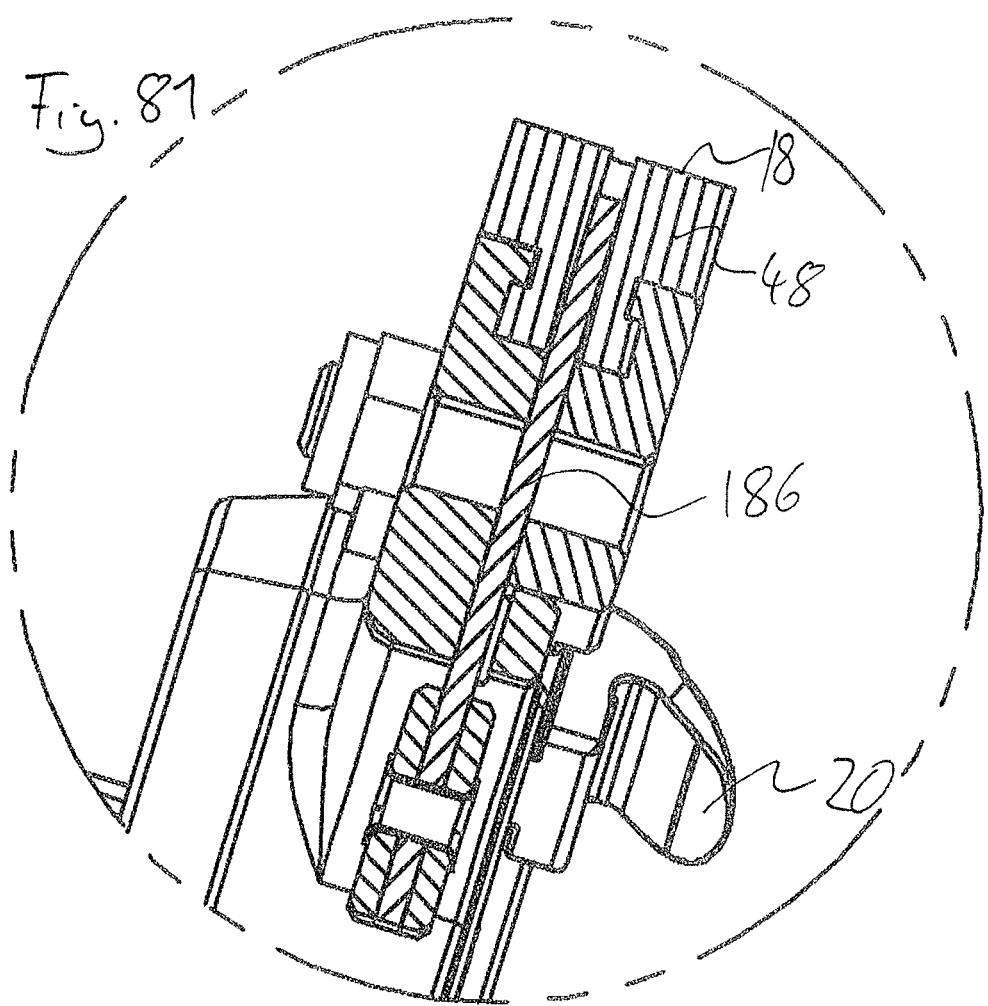
FIG. 81 a detail from FIG. 80.

Another embodiment according to the invention is illustrated in FIGS. 69 and 70. This attachment 14 comprises a tread body 48 with a pressure chamber 184. The pressure chamber 184 can be acted upon in a pressure medium. The pressure chamber is further designed and arranged such that the tread 18 is damped by the pressure medium located in the pressure chamber 184 during the rolling process of the attachment 14 (or during the rolling process of the tread 18 of the attachment 14) over a road. The pressure chamber 184 can be acted upon by pressure medium via a non-return valve, which is not shown in FIGS. 69 and 70, in order to fill the pressure chamber 184 and to transfer the tread body 48 to a filled and damping state.

The attachment 14 further has a pressure-generating device 102, which has several cavities 104 like the embodiment in FIGS. 30 to 38. The cavities 104 are each connected via a corresponding valve arrangement, which is not depicted in the figures, to the pressure chamber 184 in such a way that the pressure-generating device 102 can act upon the pressure chamber 184 with pressure when the attachment rolls over the road. Here the pressure-generating device 102 is formed such that above a certain pressure, the supply of pressure medium to the pressure chamber 184 is stopped.

Other embodiments of an attachment 14 according to the invention are illustrated in FIGS. 71 to 81. Only a first segment 60 of the corresponding annular section 58 is shown in FIG. 71. The attachments 14 of the embodiments according to FIGS. 71 to 81 comprise heat conduction elements 186, which are designed in this case as heat conduction plates 188. The heat conduction plates 188 are formed from copper. The heat conduction elements 186 designed as plates are spanned between two axial elements 190 and 192 of the tread section 16 or of the annular section 58.

As is recognisable in FIG. 72, the individual heat conduction elements 186 are connected to one another via circumferentially extended connection elements 194 and 196. The individual heat conduction elements 186 with the connection elements 194 and 196 together form a heat dissipation mechanism 198.

The heat dissipation mechanism 198 is inserted, in this case cast, with its end comprising the connection elements 194 and 196 into the tread body 48. In other words: the tread body 48 is moulded or cast around the heat dissipation system 198. This is clearly illustrated in FIGS. 74 to 76. It is also possible to connect the heat conduction elements (as in the embodiment of FIGS. 78 to 81) to one another radially on the inside via a radially inner connection element 200 and insert them into slots 202 of the tread body 48. To guarantee a secure retention of the heat conduction elements 186, these are spanned in this embodiment between the two axial parts 190 and 192 of the annular section 58. This is clearly illustrated in FIG. 78.

Figure 82:
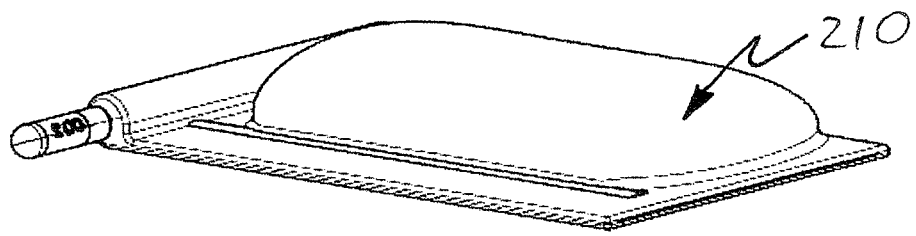
FIG. 82 a lifting device.
Figure 83:
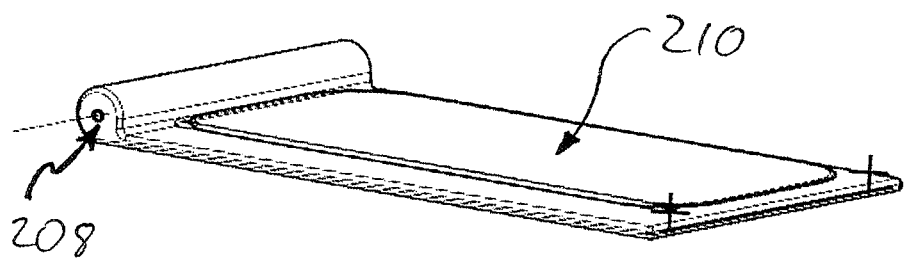
FIG. 83 the lifting device from FIG. 82 in the emptied state.
Figure 84:
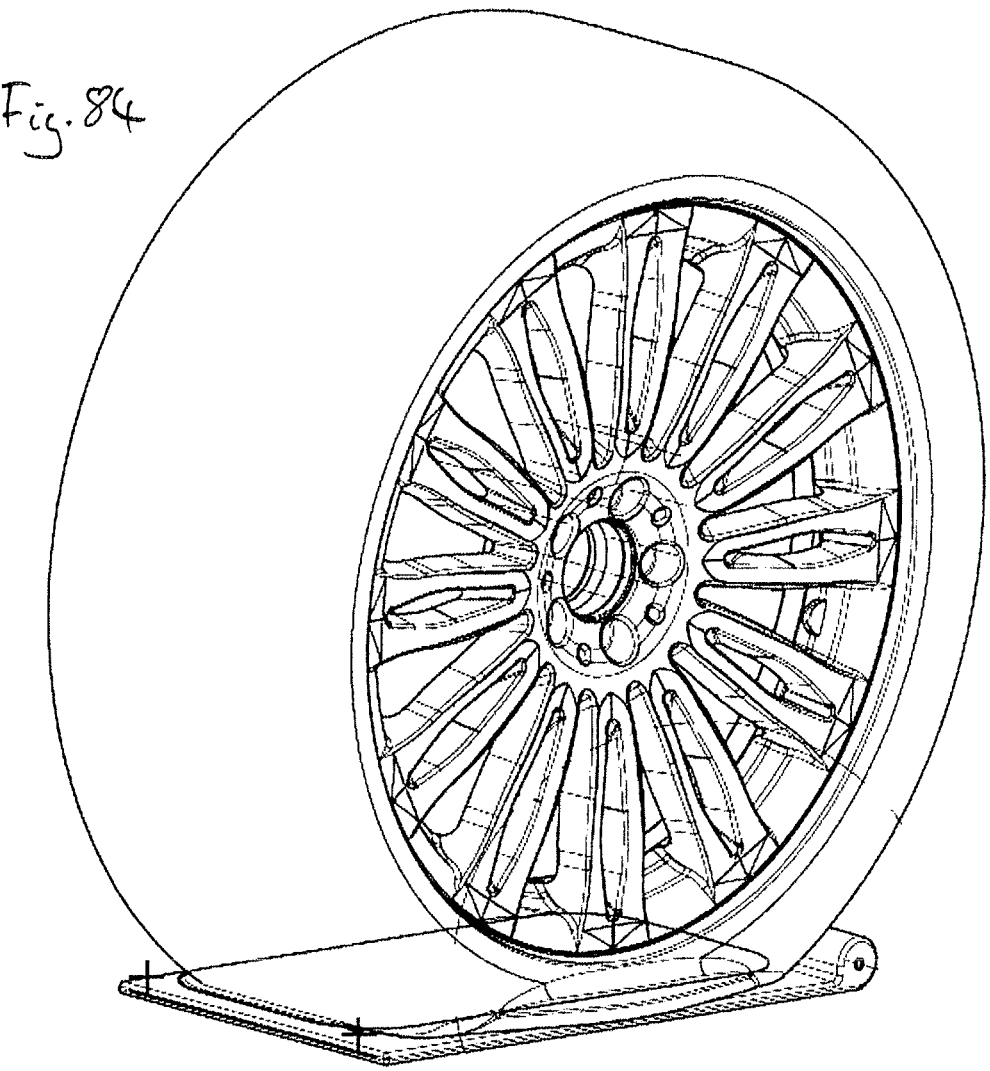
FIG. 84 the lifting device from FIGS. 82 and 83 with a vehicle wheel located thereon.
Figure 85:
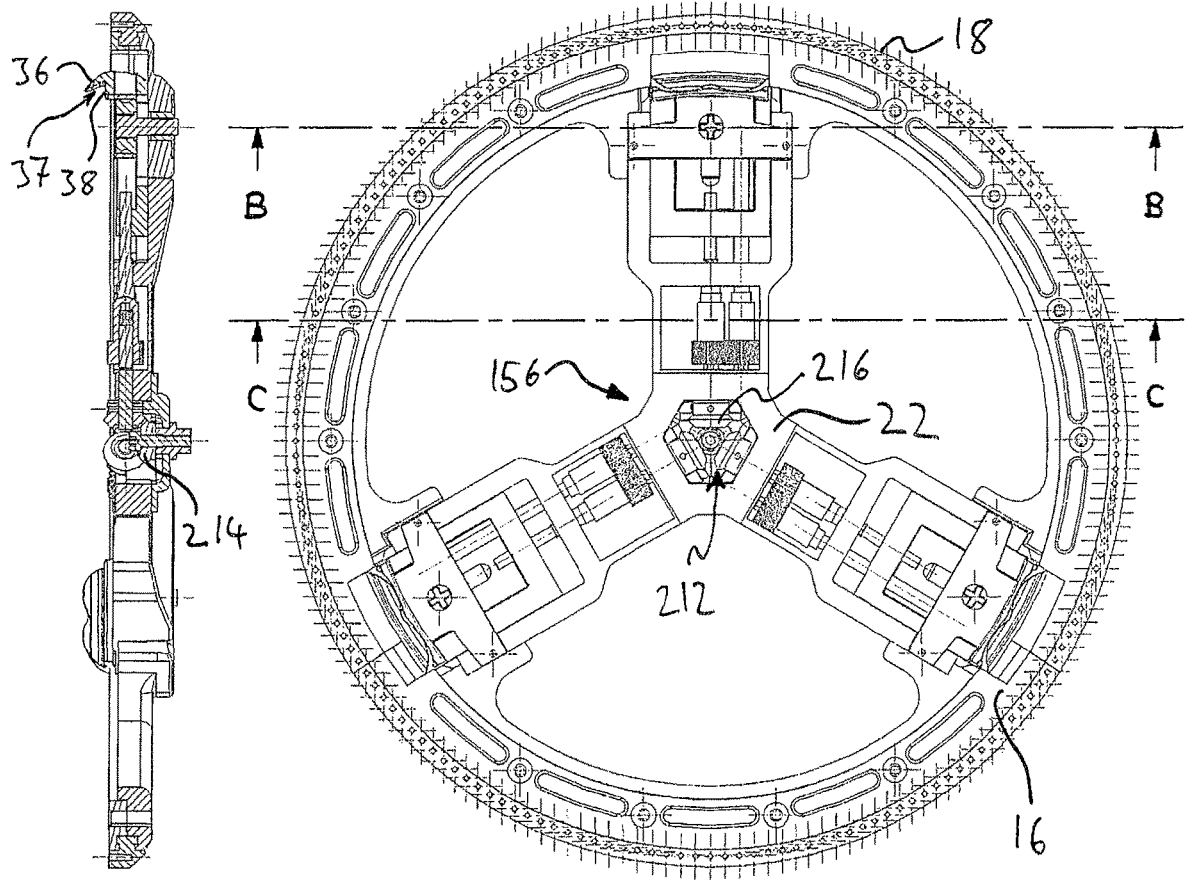
FIG. 85 another attachment according to the invention.
Figure 86:
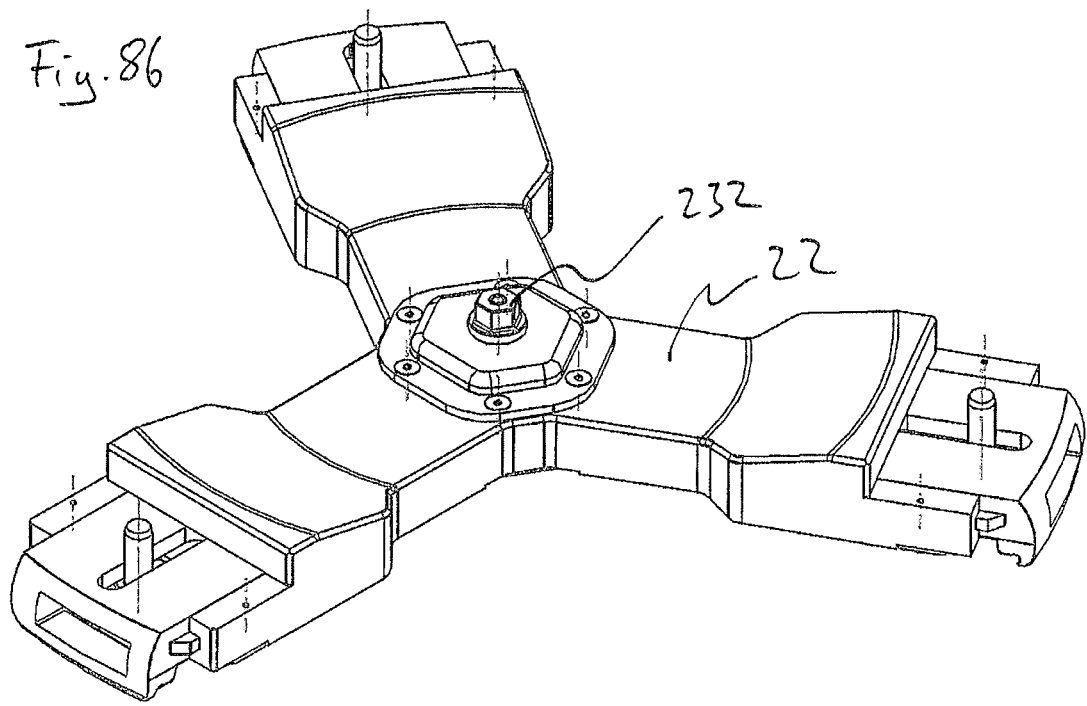
FIG. 86 a part of the attachment from FIG. 85.
Figure 87:
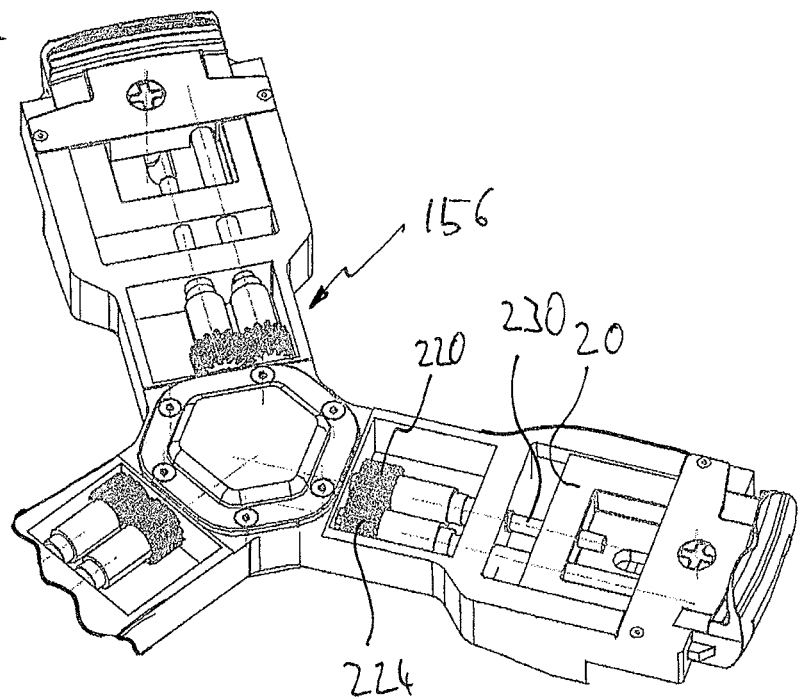
FIG. 87 the part from FIG. 86 from another perspective.
Figure 88:
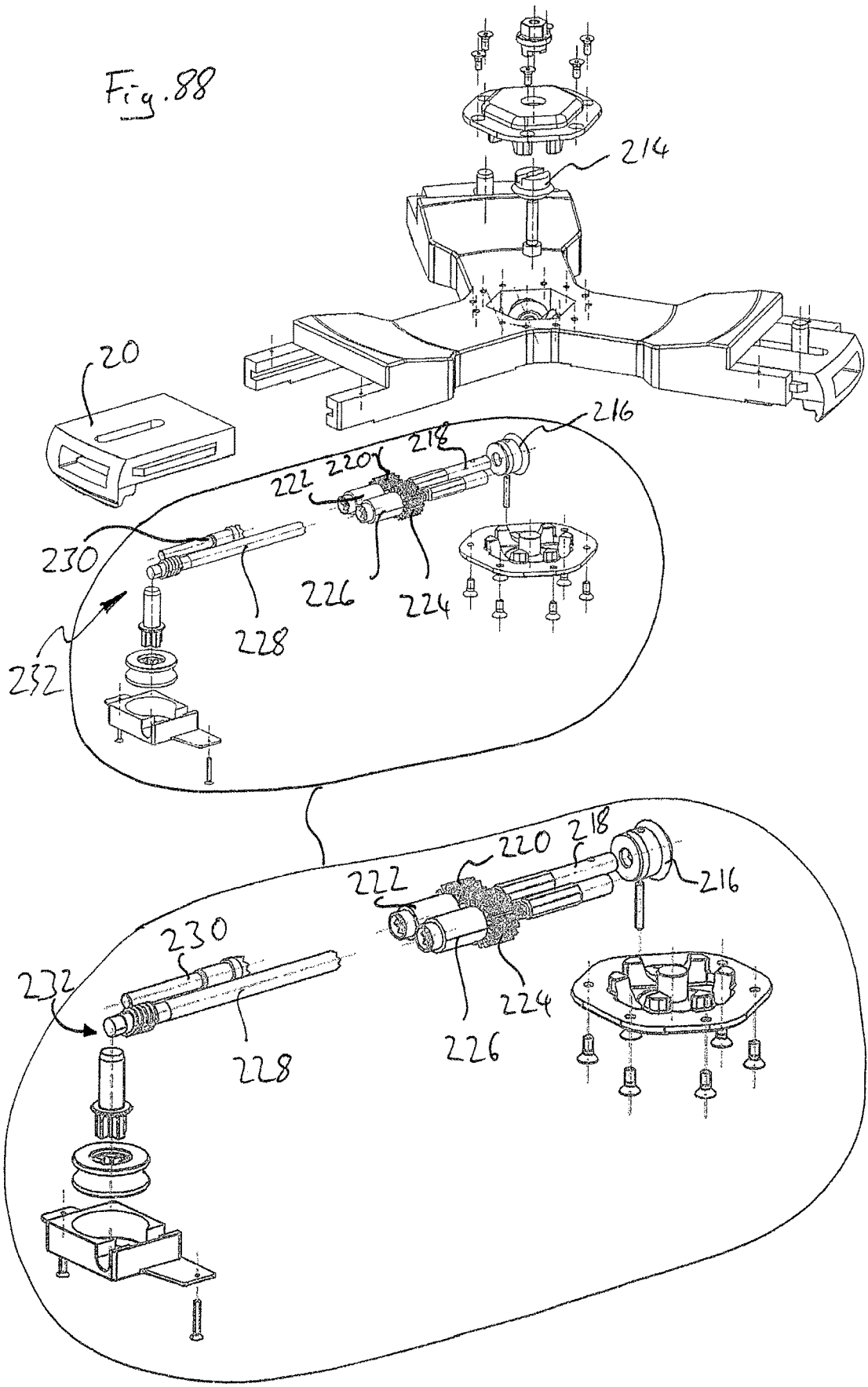
FIG. 88 the assembly section of the attachment from FIG. 85 in an exploded view.
Figure 91:
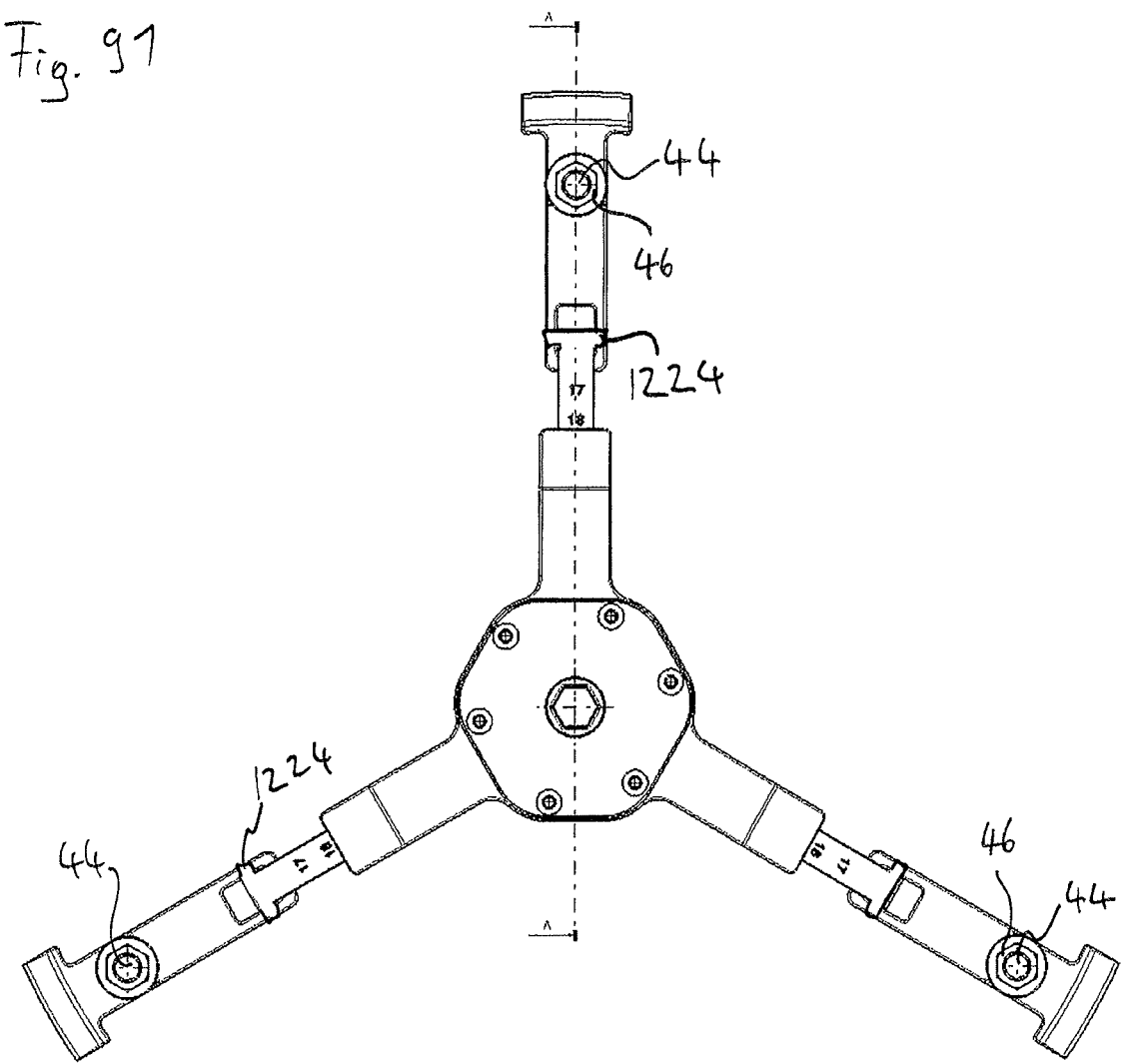
FIG. 91 the bracing unit seen from axially outside.
Figure 92:
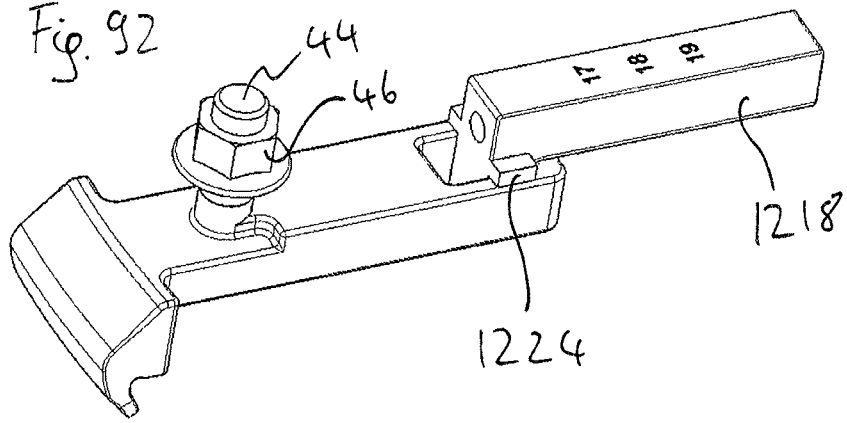
FIG. 92 a detail of the connection of the bracing unit to a clamping device.

A system formed of an attachment, which preferably corresponds to one of the embodiments described previously, and a lifting device 206 is also within the sense of the invention. A lifting device 206 of such a system is illustrated in FIGS. 82 to 84 and is designed to lift the vehicle wheel 1 with restricted tire function, by driving the vehicle onto the lifting device 206, in such a way that the attachment 14 with circumferentially closed tread 18 can be fastened on the vehicle wheel 1. To this end the lifting device 206 here has a connection 208 for a pressurised medium cartridge, in this case a CO2 pressure cartridge. The lifting device 206 further has an inflatable section 210, which is shown in the empty state on the right in FIG. 83 and in the inflated state on the left of FIG. 83. Inflation of this inflatable section leads to the lifting of the vehicle wheel 1 placed on it, as illustrated in FIG. 84. An attachment with completely circumferentially closed tread can be mounted in a mounting step on a vehicle wheel 1 lifted in such a way.

FIGS. 85 to 88 illustrate another attachment 14 according to the invention. The attachment 14 of this embodiment has a bracing mechanism 156, which is arranged in an assembly section 22. The bracing mechanism 156 has a transmission 212, which in the present case has a central drive bevel gear 214 and a driven bevel gear 216 for each clamping device 20. Extending away from each driven bevel gear 216 is a driven shaft 218, which is connected to a transmission gearwheel 220, the transmission gearwheel 220 being connected via a torque-limiting device 222 to a clamping device drive shaft 230. The torque-limiting device 222 forms a tightening force limiting device 222 and is designed so that it uncouples a movement of the transmission gearwheel 220 from a movement of the clamping device drive shaft 230 as soon as a limit value of a tightening torque for the clamping devices 20 is exceeded.

The transmission gearwheel 220 is in engagement with another transmission gearwheel 224. The other transmission gearwheel 224 is connected in turn via a torque-limiting device 226 to a tread section drive shaft 228.

The torque-limiting device 226 forms a pressure limiting device 226 and is designed so that it uncouples a movement of the other transmission gearwheel 224 from a movement of the tread section drive shaft 228 as soon as a limit value of a tightening torque for the movement of the tread section 16 directed axially towards the rim 2 is exceeded.

During mounting of the attachment 14 by means of the bracing mechanism 156, a torque is introduced into the transmission 212 via a tool application point 232. The first transmission gearwheel 220 is driven hereby via the drive shaft 218. As long as the torque of the first torque-limiting device 222 has not been exceeded, the rotation of the driven shaft 218 is transmitted to the drive shaft 230 of the clamping device 20, so that the drive shaft 230 is screwed into the clamping device 20, and the clamping device 20 is moved radially inwards. When the clamping device 20 engages behind the rim flange and rests with sufficient force on this, the torque limitation of the first torque-limiting device 222 is reached and the clamping device drive shaft 230 is rotated no further, rather the torque-limiting device 222 interrupts the transmission of force to the clamping device drive shaft 230.

The tread drive shaft 228 is driven in a similar manner via the drive of the other transmission gearwheel 224 until a corresponding torque of the torque-limiting device 226 is reached. On bracing via the bracing mechanism 156, the tread 18 is moved in the direction of the rim by the movement of the tread drive shaft 228 via a tread transmission 232. The bracing mechanism 156 thus moves both the clamping devices 20 into the rear engagement position with the rim flange 10 and the tread 16 into the configuration provided for the operating state.

FIGS. 89 and 90 as well as 91 to 96 each illustrate a bracing unit 120 of another respective attachment 14 according to the invention. The bracing unit 120 is formed by means of force transmission means 128 that can be shortened in radial direction R.

The shortenable force transmission means 128 have hook sections 1218, into which a threaded rod 1220 can be screwed to shorten these. The hook sections 1218 can be hooked into corresponding hook-in sections 1222 on the clamping devices 20, so that the force transmission means 128 are positively connected to the clamping devices 20. The hook sections 1218 in combination with the hook-in sections 1222 each represent a connection arrangement between the force transmission means 128 and the clamping devices 20. Other types of connection arrangement, in particular which comprise a positive-locking rear engagement for connecting force transmission means 128 and clamping devices 20, are likewise within the sense of the invention.

Actuation of the force transmission means 128 takes place via a transmission 212, which is designed here corresponding to the transmission 212 of the bracing mechanism 156 of the attachment according to FIGS. 85-88.

In the embodiments described here, the bracing unit 120 therefore has a transmission 212, which in the present case has a central drive bevel gear 214 and a driven bevel gear 216 for each clamping device 20. The respective threaded rod 1220 of the corresponding force transmission means 128 extends away from the respective driven bevel gear 216.

In the version of FIGS. 89 and 90, the force transmission means 128 are each designed without an axial stop in the area of the hook sections 1218.

In the version of FIG. 91 to 96, the hook sections 1218 each have an axial stop in the form of an axial contact device 1224, which definitively determines a position of the hook sections 1218 with respect to the clamping devices 20. As is clearly recognisable in FIGS. 93-96, in addition to the contact device 1224 arranged axially outside, the hook sections 1218 also have a contact device 1228 lying axially on the inside (this is also present in the version of FIGS. 89 and 90). The axially outer contact devices 1224 and the axially inner contact devices 1228 together encompass a part of the hook-in section 1220 of the clamping device 20.

To transfer the clamping devices 20 to the rear engagement position with the rim flange, these are pulled via the force transmission means 128 into the rear engagement position with the rim flange 10. The tread section 16 is braced by means of the fastening device 44 with respect to the clamping devices 20, whereby these are held in position. An opposed movement of the force transmission means 128 is then brought about via the tool application point 232, due to which these are moved out of their positive-locking rear engagement position with the hook-in sections 1222 of the clamping devices 20. The bracing unit 120 can then be removed from the clamping devices 20 and thus from the tread section 16 and the vehicle rim 2.

The clamping means 20 are braced fixedly here in their position with respect to the rim flange 10 by means of the fastening device 44 and the corresponding tread section 16.

Figure 96:
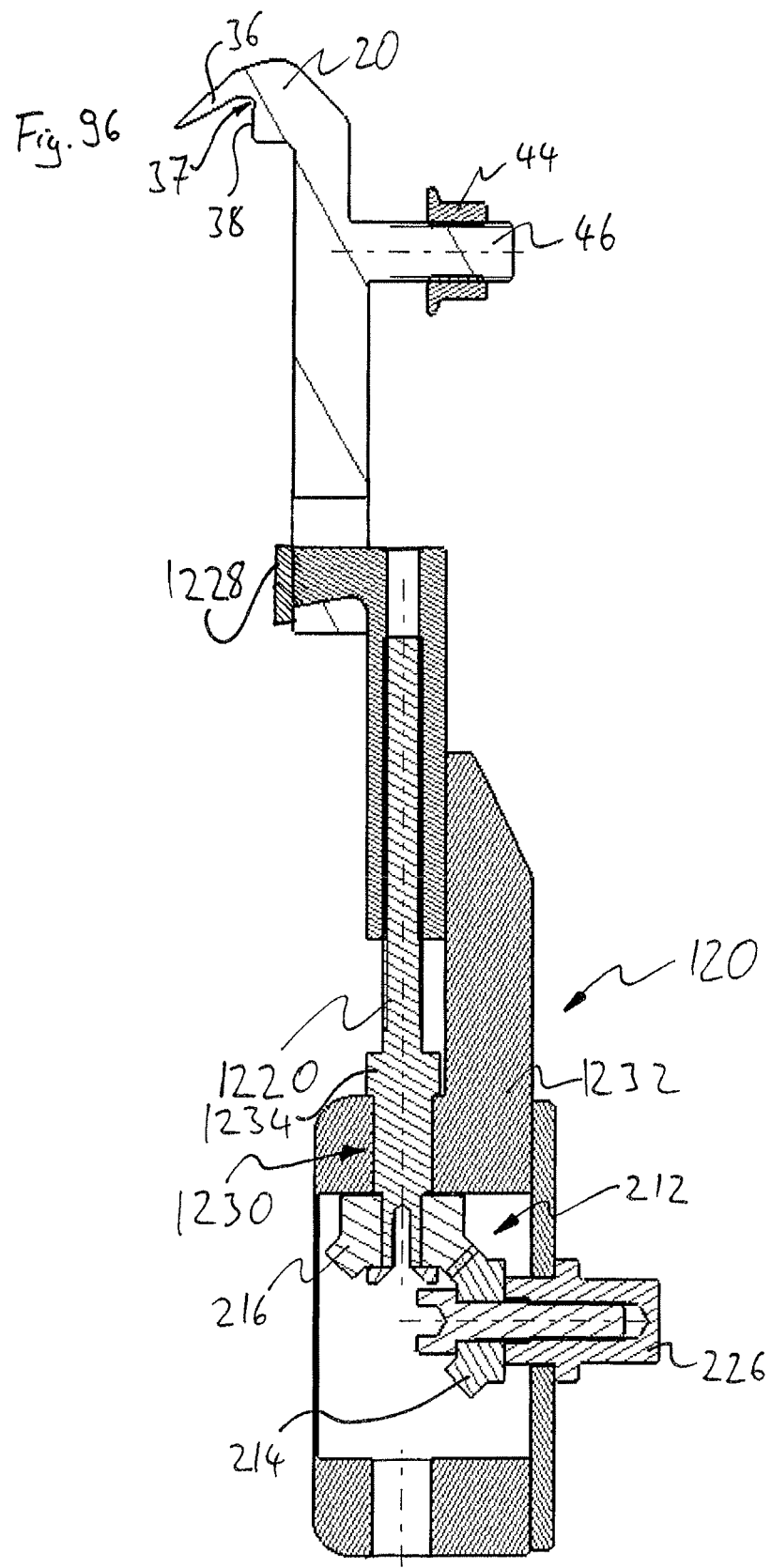
FIG. 96 the bracing unit from FIG. 90.

As illustrated clearly in FIG. 96, the bracing unit 120 has a guide device 1230 for the threaded rod 1220. The guide device 1230 is formed in the present case by an opening in a housing 1232 of the bracing unit 120. An outer expansion section 1234 of the threaded rod 1220 rests from outside on the border of the guide device 1230 and, together with the driven bevel gear 216 mounted on the threaded rod 1220, holds the threaded rod 1220 along its longitudinal extension in a precisely defined position with respect to the housing 1232.

FIG. 97 illustrates the tread section 16 of an embodiment of an attachment 14 according to the invention, which attachment comprises a tread body 48, which in turn comprises a section 234 that damps in axial direction A. The damping section 234 enables compression of the tread body 48 in axial direction A. The damping section 234 is designed so that it is more flexible in axial direction A than the material of the tread body 48 surrounding it axially on the inside and outside respectively.

Figure 98:
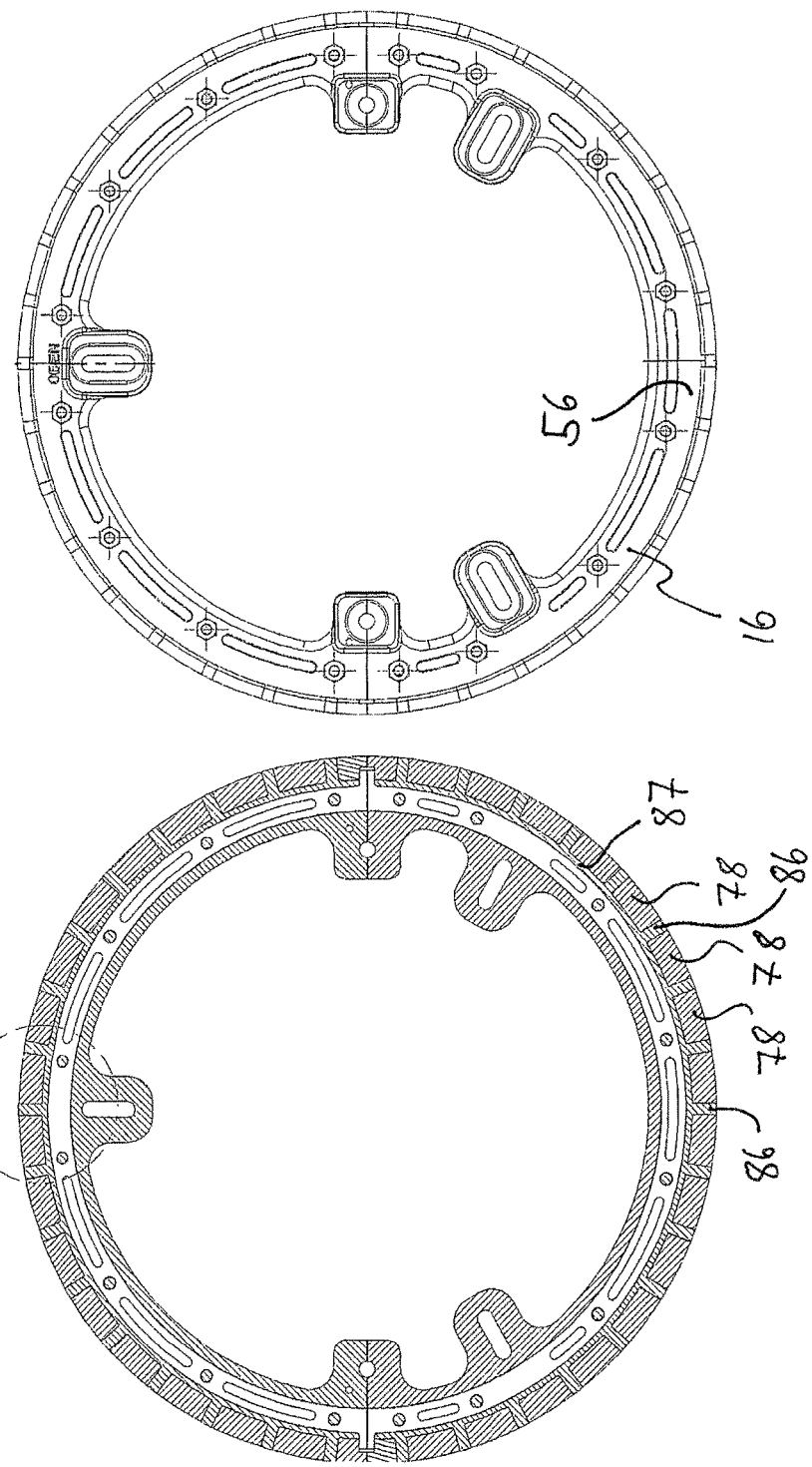
FIG. 98 a tread section of another attachment according to the invention.
Figure 99:
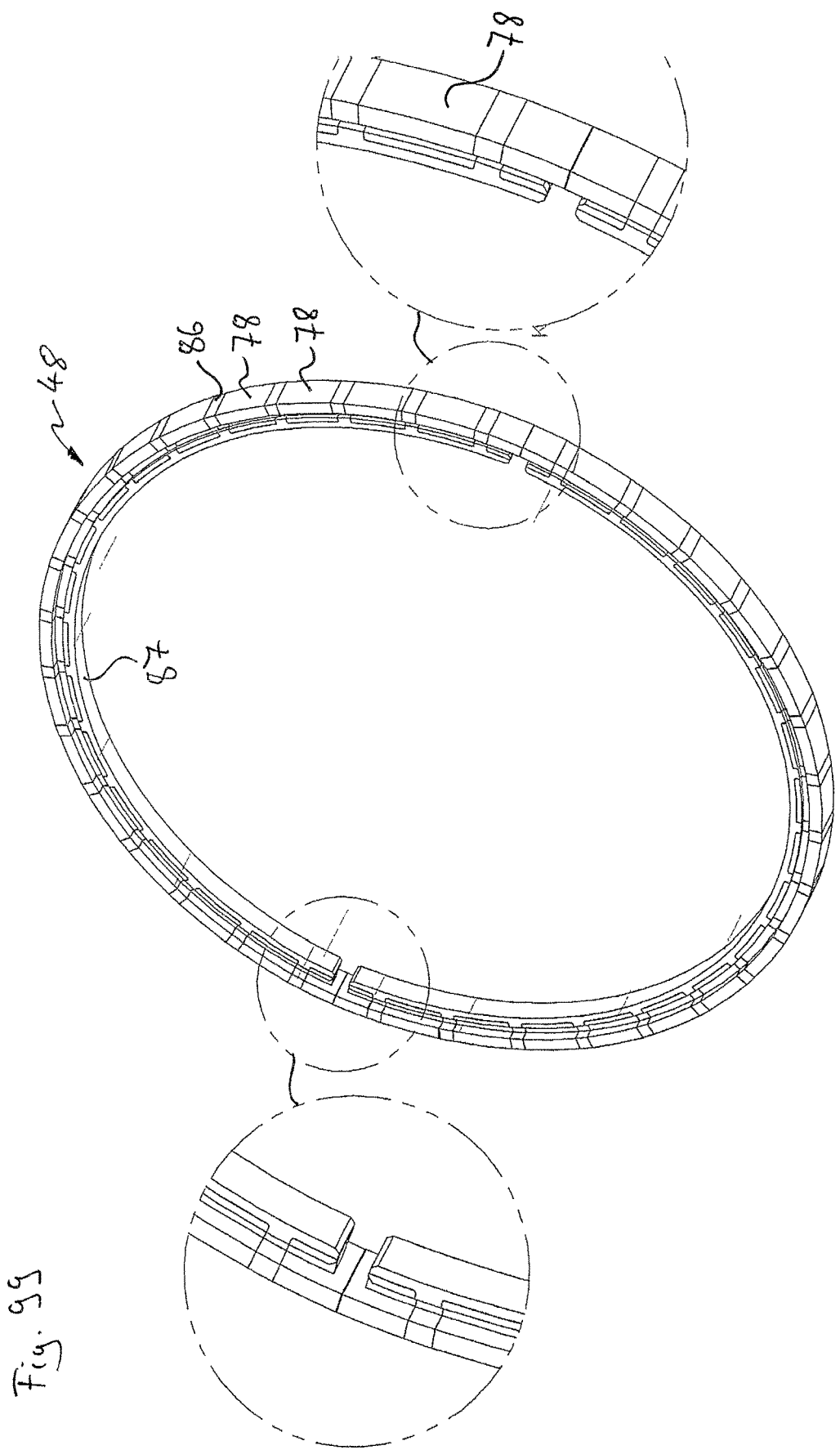
FIG. 99 a part of the tread section from FIG. 98.

FIGS. 98 and 99 illustrate the tread section 16 of an embodiment of an attachment 14 according to the invention, which attachment comprises a tread body 48, which in turn is divided into several tread segments 78. The individual tread segments 78 are spaced at a distance from one another in circumferential direction U. In the gaps between the individual tread segments 78, the tread section 16 has elastic or flexible elements 86.

The tread section 16, or its tread body 48, is thus designed similar to that of the embodiment of FIGS. 14 to 18 and is provided for combination with an assembly section 22 similar to that of FIG. 3.

FIG. 100 illustrates an embodiment which comprises a damping device 87, which is arranged lying radially inside the tread body 48 and is formed separately from this. The damping device 87 comprises a damping body 240, which is formed separately from the tread body 48 and is formed by a layer of flexible soft material (a solid material that is deformable on loading).

FIG. 101 illustrates an attachment 14, which is designed with a tread body 48 that is designed to be rotatable about axial direction A with respect to the stationary section 56. Similar to the attachment 14 according to FIGS. 6 and 7, the attachment 14 according to FIG. 101 has a sliding element 72, on which the tread body 48 is supported rotatably with respect to the stationary section 56. The assembly section 22 of this embodiment, however, has three movable clamping devices 20 and is designed corresponding to the assembly section 22 of the embodiment in FIG. 21 or 22.

FIGS. 102 to 108 illustrate various attachments 14 with differently configured damping devices 87.

Figure 102:
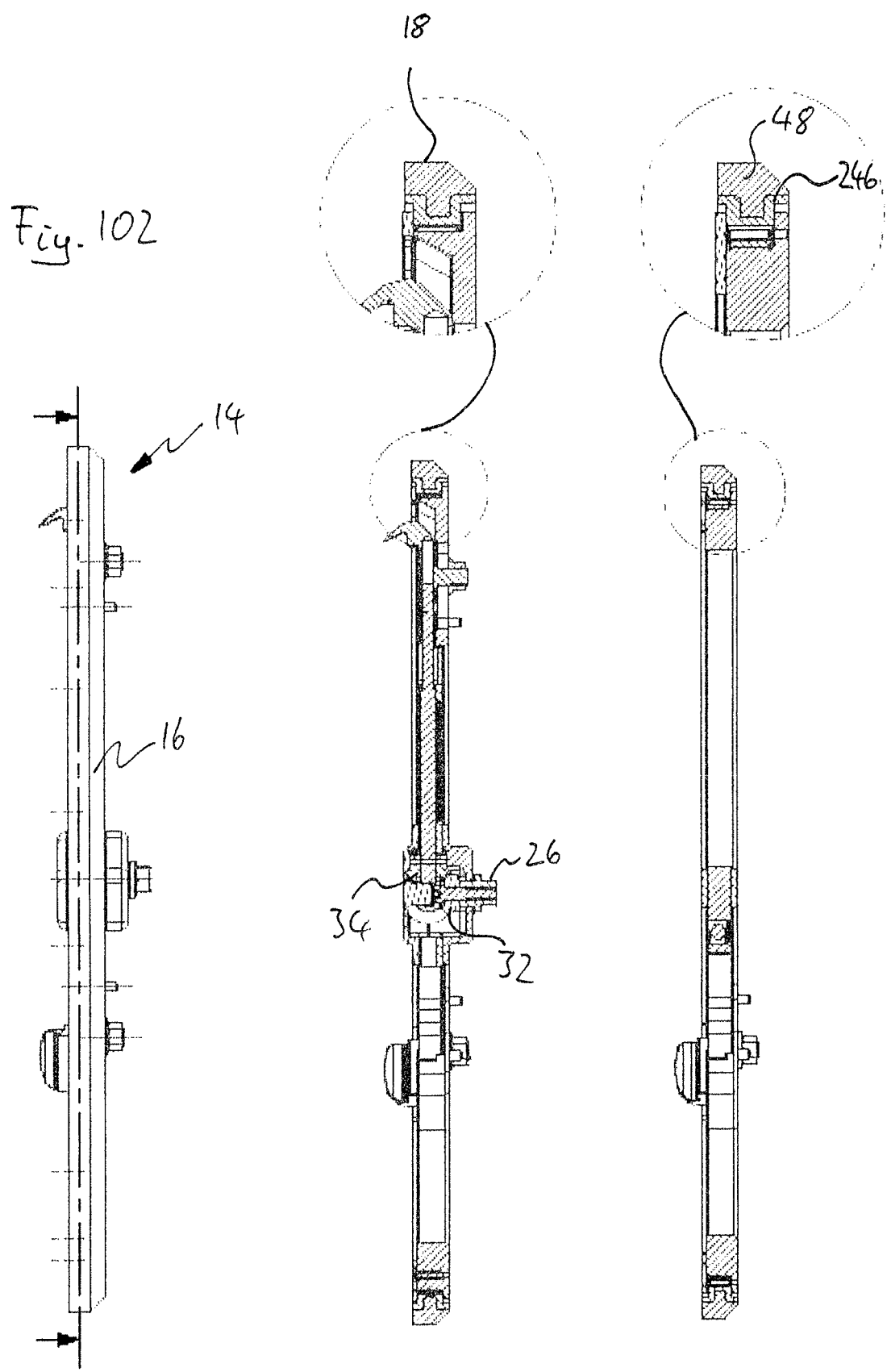
FIG. 102 another attachment according to the invention.
Figure 103:
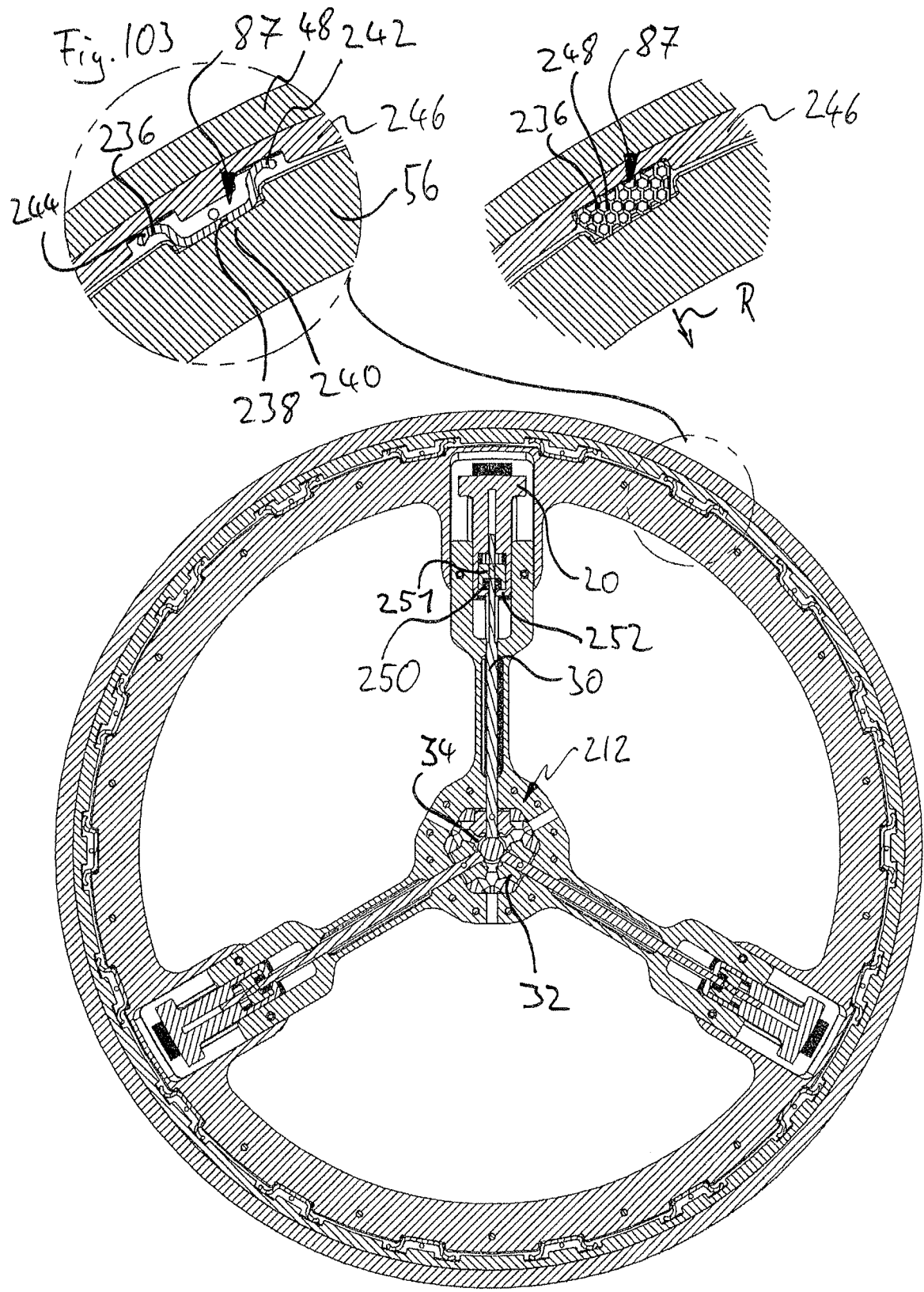
FIG. 103 the attachment from FIG. 102 in a sectional view and an alternative design of spring elements.
Figure 104:
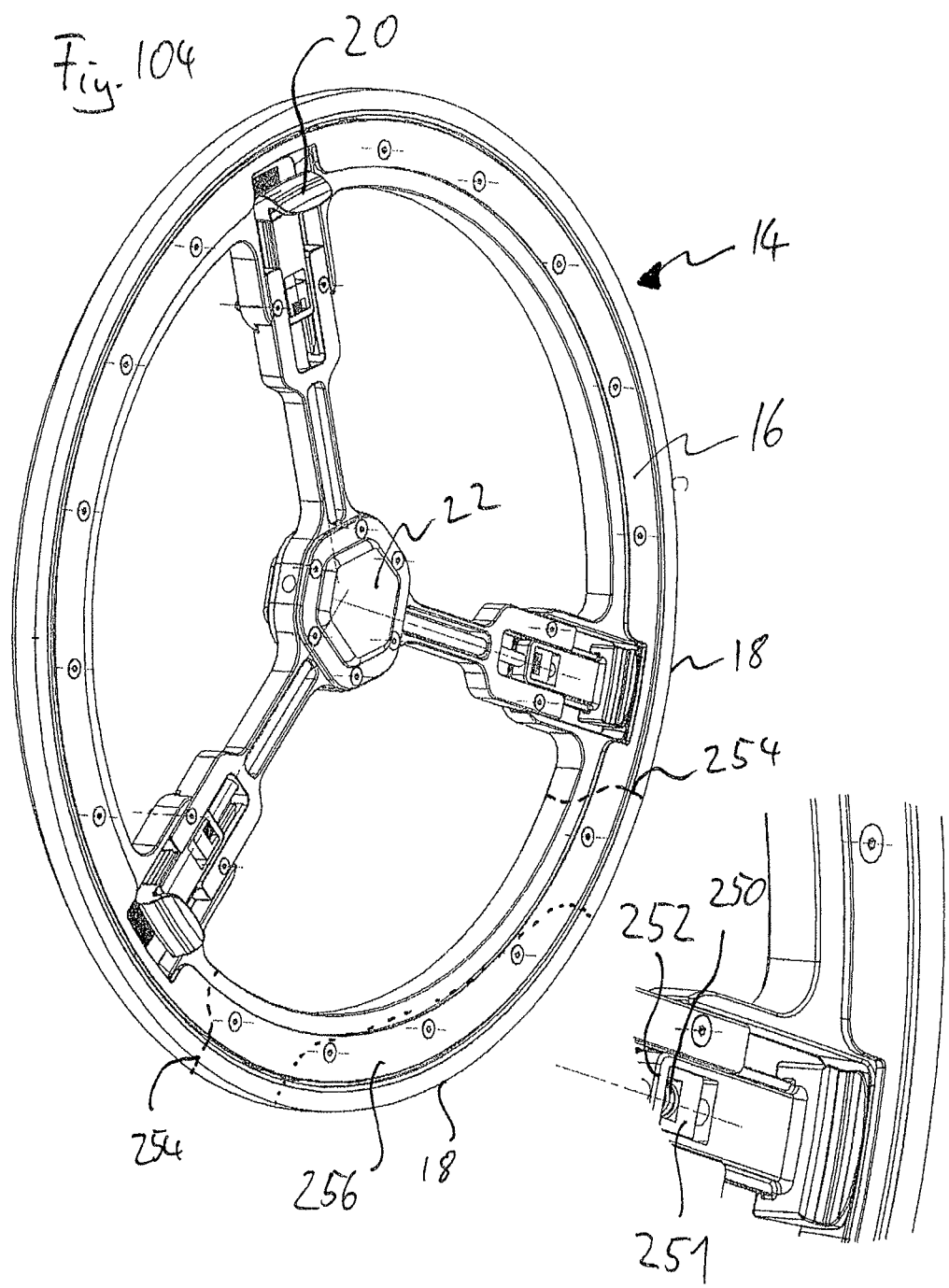
FIG. 104 another attachment according to the invention.

In FIGS. 102 to 104, an attachment 14 is illustrated that comprises a damping device 87 in the form of multiple spring elements 236 distributed around the circumference of the tread. The spring elements 236 are formed here U-shaped in the broadest sense. In the present case, the respective U-shaped spring elements 236 each have a central section 238, which is designed for contacting a radially inner area 240 of the tread section 16. Outer areas 242 and 244 adjoining the central area are designed and arranged to support the tread body 48 in radial direction R.

The tread body 48 here is not in direct contact with the spring elements 236 but is taken up radially inside in a metal casing element 246, this casing element 246 being in contact with the spring elements 236. An alternative embodiment of the damping device 87 or spring element 236 is illustrated at the top right of FIG. 103. The spring element 236 of this embodiment has a honeycomb structure 248 formed of metal, which likewise causes a springing or damping effect in radial direction R.

As is clearly recognisable in FIGS. 103 and 104, the clamping devices are each pretensioned into radially inner position. The pretensioning of the clamping devices is realised in this case via a spring element 250 in each case, which rests radially outside on a stop 251 of the threaded rod 30 and radially inside on a stop 252 of the respective clamping device 20.

Due to the pretensioning of the clamping devices 20 into the radially inner position, it is possible to place the attachment practically loosely onto the rim flange 10 so that the clamping devices 20 on the rim flange 10 hold the attachment 14 due to the spring pretensioning. The clamping devices 20 can then be moved radially inwards via actuation of the tool application point 26 and the transmission 212 connected thereto, which comprises the drive bevel gear 32 and the driven bevel gear 34 and the threaded rod 30. During the radially inwards directed movement of the clamping devices, these engage behind the rim flange and at the same time draw the attachment 14 in the direction of the rim until the rim flange rests on the contact section 38 of the clamping devices 20.

Due to the pretensioning of the clamping devices 20, a movement of the clamping devices is not carried out directly when the tool application point 26 is actuated. First the stop 251 of the threaded rod 30 is drawn radially inwards. When the stop 251 of the threaded rod 30 rests on the stop 252 of the respective clamping device 20 or the spring element 250 has compressed completely, a movement of the clamping device 20 radially inwards takes place. The clamping device 20 thus acquires a clearance due to the pretensioning.

Here the attachment 14 is illustrated with a one-piece tread section 16 in a circumferential direction. The tread section 16 can be constructed in multiple parts in circumferential direction U in particular, however, to facilitate simple mounting without aids.

The mounting of a one-piece tread section 16 is considered in further detail in connection with FIG. 109 ff.

In FIG. 104 a possible division of the tread section 16 into several circumferential segments is illustrated by means of dashed lines, which each illustrate a connection point 254 of the circumferential segments to one another.

It is likewise conceivable that although the tread section 16 is implemented closed in circumferential direction U, the tread section 16 has a removable element 256 in circumferential direction U, so that the tread 18 is formed in multiple parts in circumferential direction U. The removable element of the tread section 16 bears the reference character 256 and its outlines are indicated by a dotted line.

The provision of such a removable element, a circumferentially closed implementation of the tread section 16 but with tread 18 constructed circumferentially in multiple parts, can also be used to mount the attachment 14 without aids.

Figure 106:
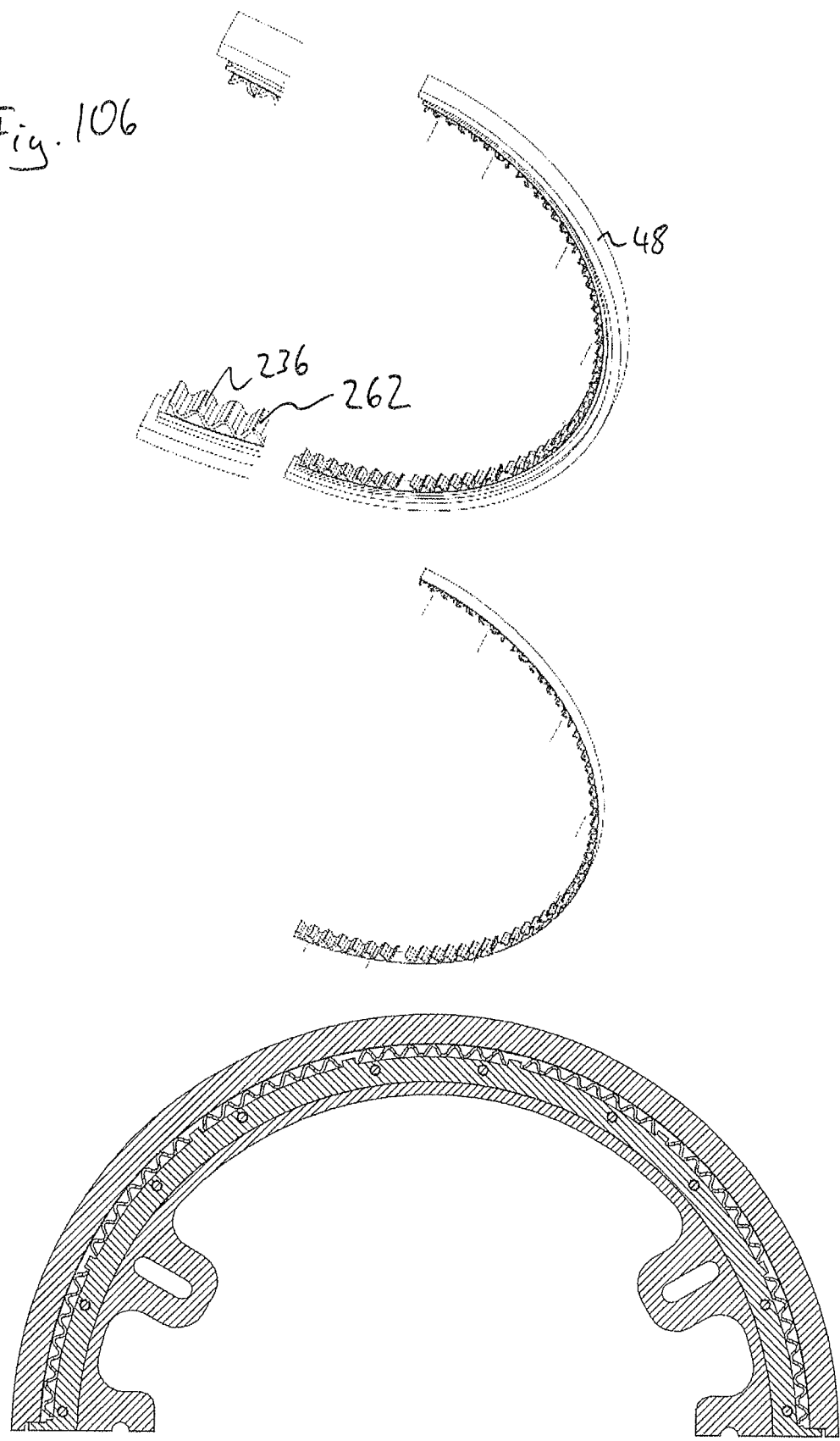
FIG. 106 alternative design of spring elements and a tread section of another attachment according to the invention.

FIGS. 105 and 106 illustrate other possible configurations of the damping device 87 and the spring elements 236 used in the damping device 87. In the version in FIG. 105, the spring elements 236 are designed as honeycombed structures extending in the circumferential direction similar to the top right depiction of FIG. 103. In the version in FIG. 105, the honeycombed structures 248 are connected to one another in the circumferential direction via a connection section 260 and the tread body 48 can be cast over the connection section 260 onto the honeycombed structures 248.

The spring elements 236 of FIG. 106 are connected to one another in a similar manner and the tread body 48 moulded onto these. The individual spring elements 236 of the embodiment of FIG. 106 extend wavelike from a radially inner contact with the stationary section 56 or the tread section 16 to a radially outer contact with the tread body 48. In the embodiment of FIG. 106, the spring elements 236 are thus designed as wave spring elements 262.

Figure 107:
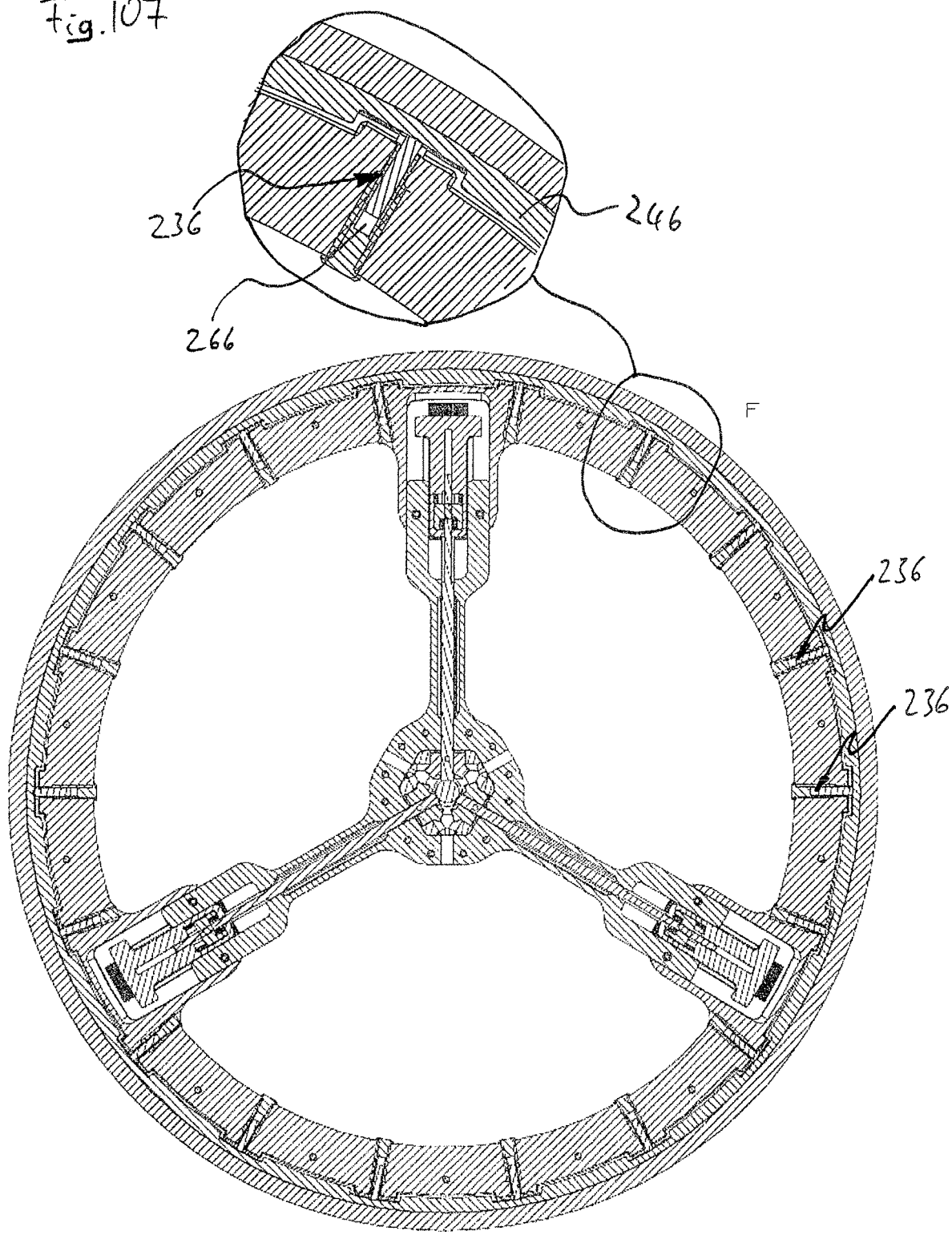
FIG. 107 another attachment according to the invention.
Figure 110:
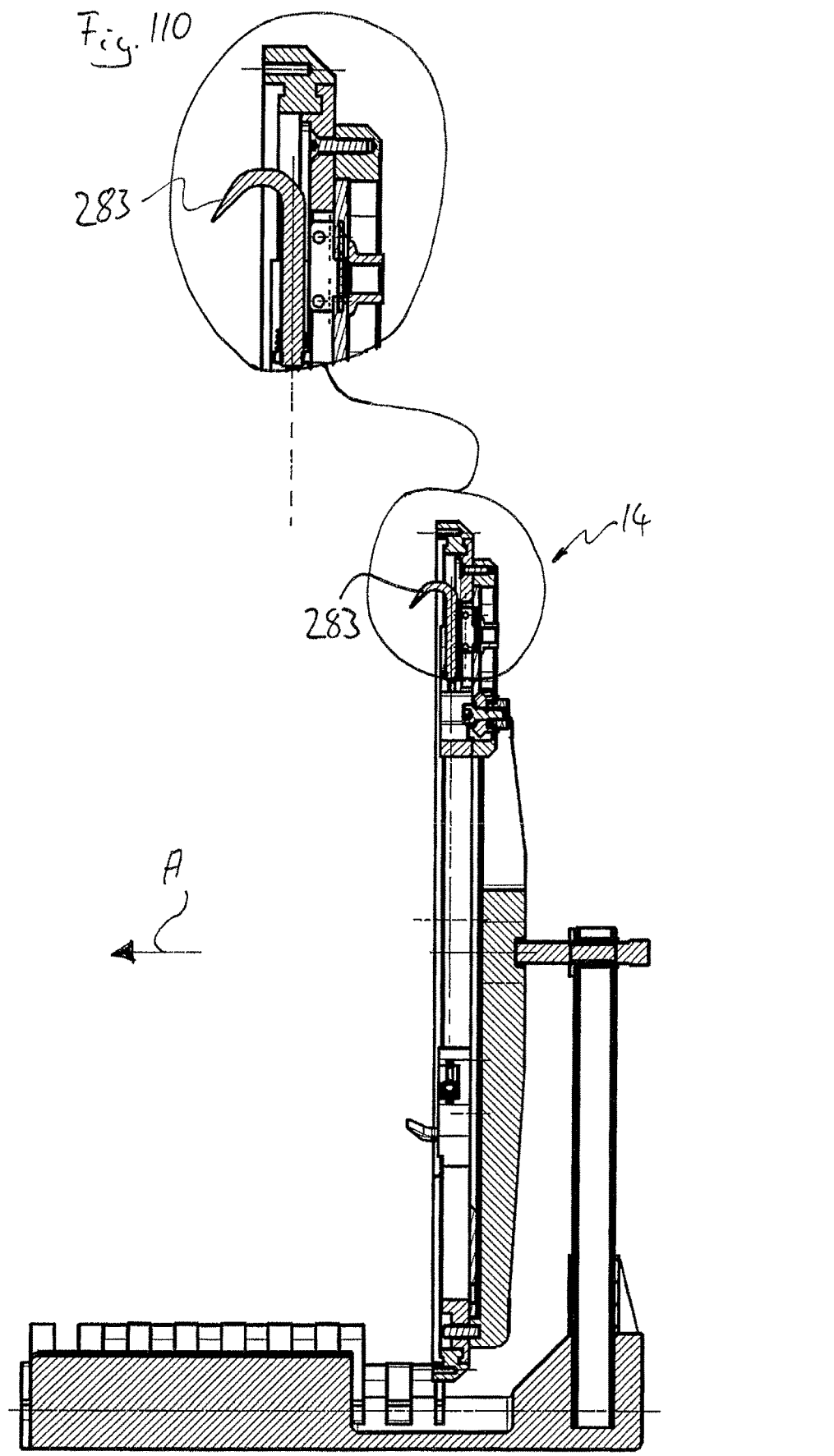
FIG. 110 another system according to the invention.
Figure 111:
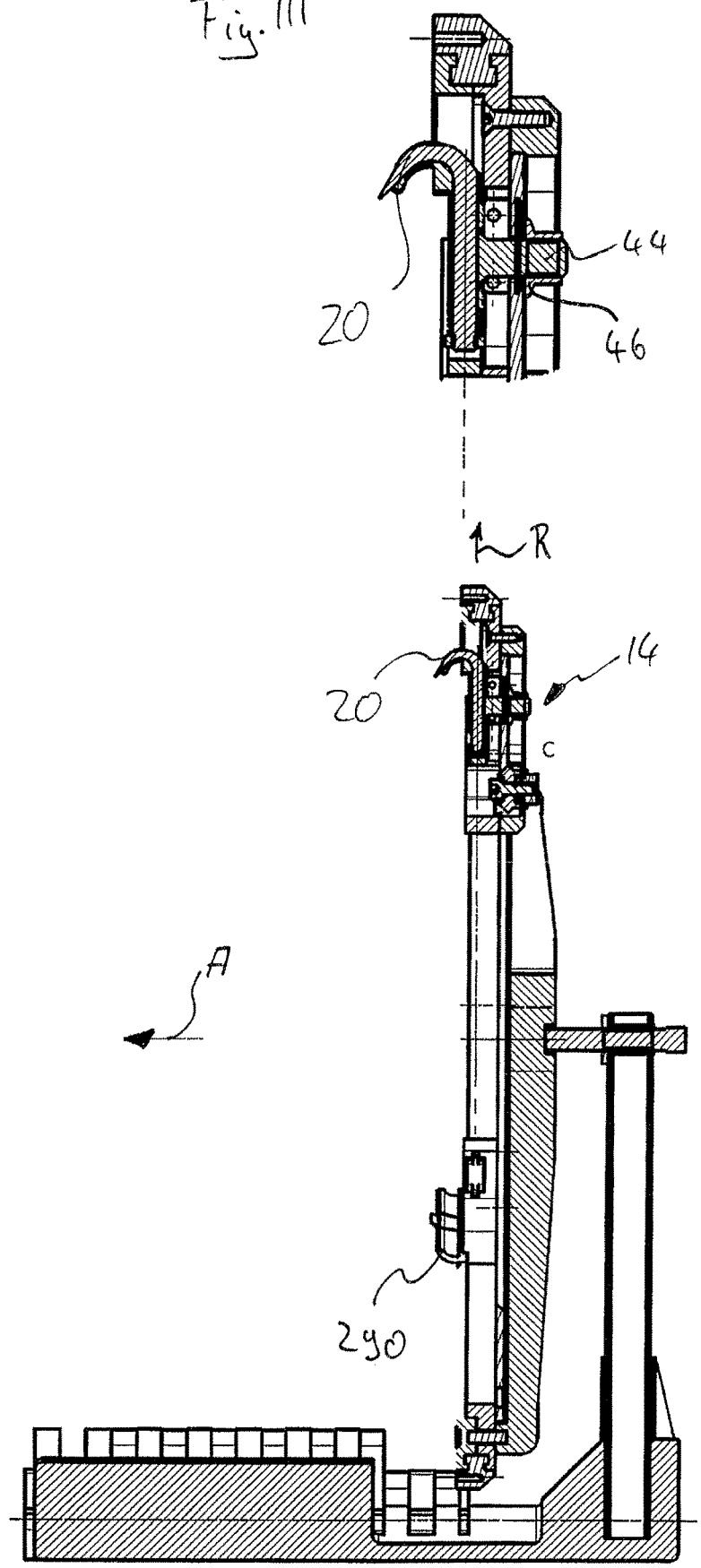
FIG. 111 another system according to the invention.
Figure 112:
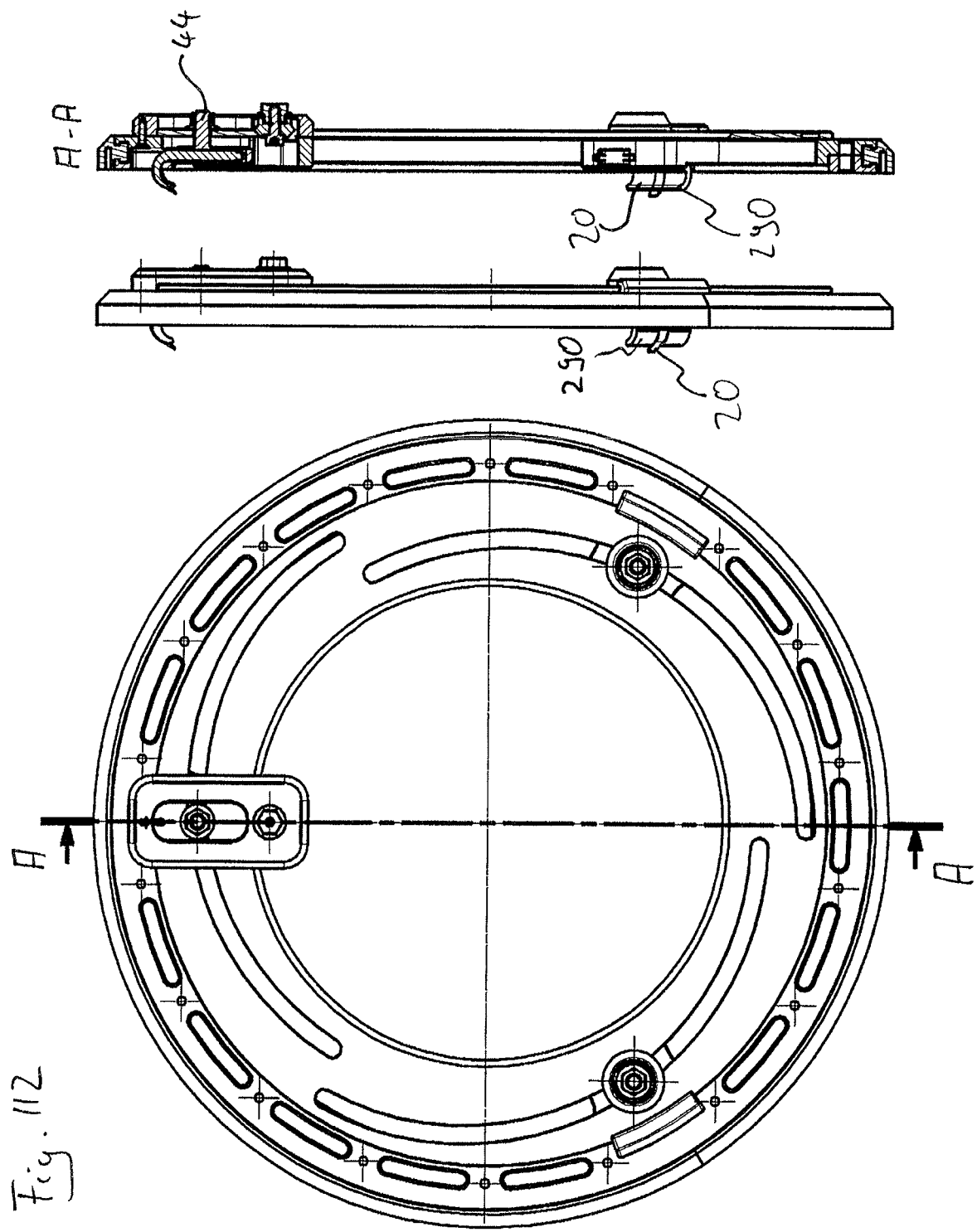
FIG. 112 another attachment according to the invention.

In the embodiment of FIGS. 107 and 108, the spring elements 236 are formed by means of gas-pressure-sprung piston-cylinder arrangements 266. The piston-cylinder arrangements 266 each have a cylinder element 268, in which a piston 270 is supported in a gas-tight manner. Located in a cavity 272 is a compressible damping medium, which damps a movement of the piston. Here the movement of the piston is in a radial direction. On the radially outer side of the piston this contacts a casing element 246, which is formed here of metal and supports the tread body 48.

FIGS. 109 to 117 illustrate inventive systems of an attachment 14 and an assembly aid 280, which represents a lifting device. In the example of FIG. 109, the assembly aid is designed in the form of a foldable drive-on ramp 282. The foldable drive-on ramp 282 comprises a support element 284, which is arranged and designed to support the attachment 14 when a vehicle tire 3 is located on the drive-on ramp 282, so that the attachment can be mounted on the vehicle wheel 1. The attachment 14 can be pushed in axial direction A towards the vehicle wheel 1 via the support element 284. By using the support element 284, it is possible to push the tire away from the rim flange by means of clamping devices 283 so that even clamping devices 283 that are curved sharply inwards can be brought into rear engagement with the rim flange 10. See the clamping devices of FIG. 110, for example.

By using the drive-on ramp 282 it is also possible to mount an attachment with integrally formed tread section on the vehicle wheel. In particular, the attachment does not have to have an assembly section 22 that is fastened on the vehicle wheel 1 before the tread section 16. The attachment 14 can be designed virtually as one piece and affixed to the vehicle wheel 1 as an entire entity in a fastening process.

Instead of the foldable drive-on ramp 282, it is also possible to use the inflatable cushion according to FIGS. 82-84. It is possible in particular to combine the clamping devices 20 movable radially inwards with pivotable fastening means 290. The pivotable fastening means 290 can be arranged, for example, in a circumferential direction respectively adjacent to the clamping devices 20 on the attachment 14.

Figure 114:
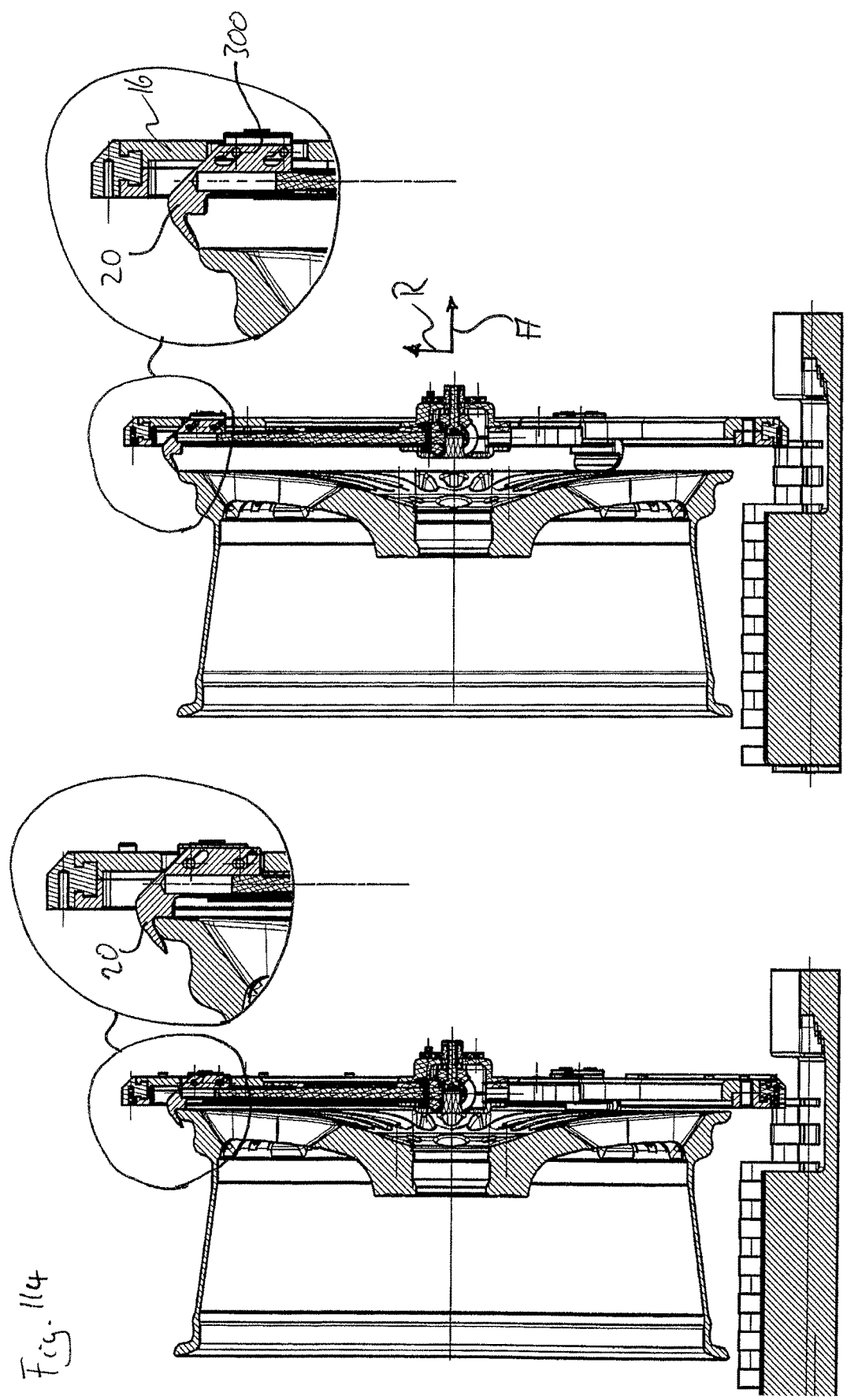
FIG. 114 another system according to the invention.

FIG. 114 illustrates the mounting of an attachment with clamping devices 20 similar to those of FIG. 5, for example. The clamping devices 20 also have a link guide 300. This link guide 300 is coupled to the tread section 16. Due to the coupling of the link guide 300 with the tread section 16, upon a movement of the clamping devices 20 directed radially inwards (for example, on the transition from the position shown to the right of FIG. 114, in which the clamping devices only rest with their tip on the rim flange, to the position fully engaging behind the rim flange on the left of FIG. 114) the tread section 16 is likewise moved in an axial direction towards the rim.

Figure 116:
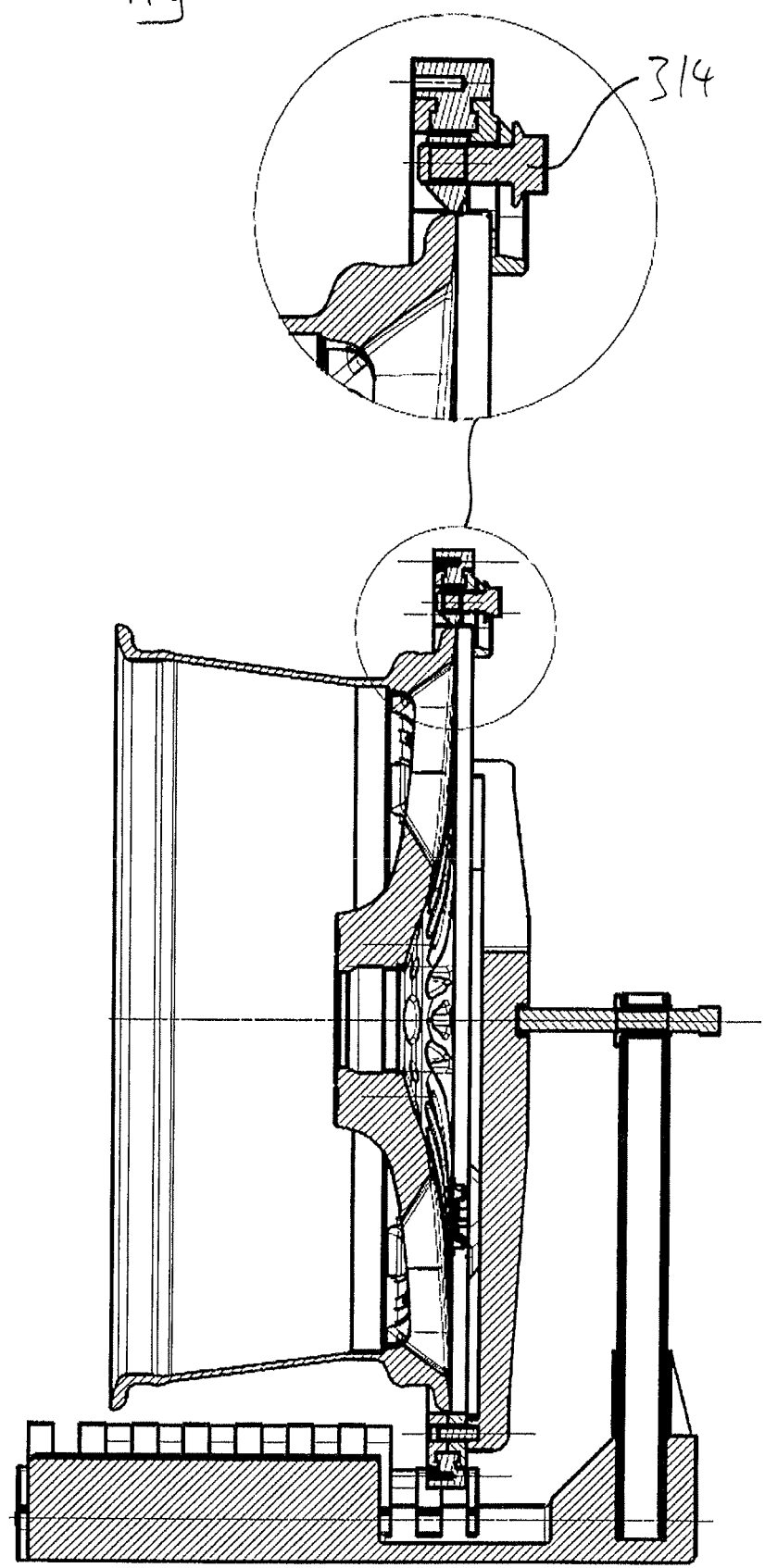
FIG. 116 the system from FIG. 115 during the mounting process.
Figure 117:
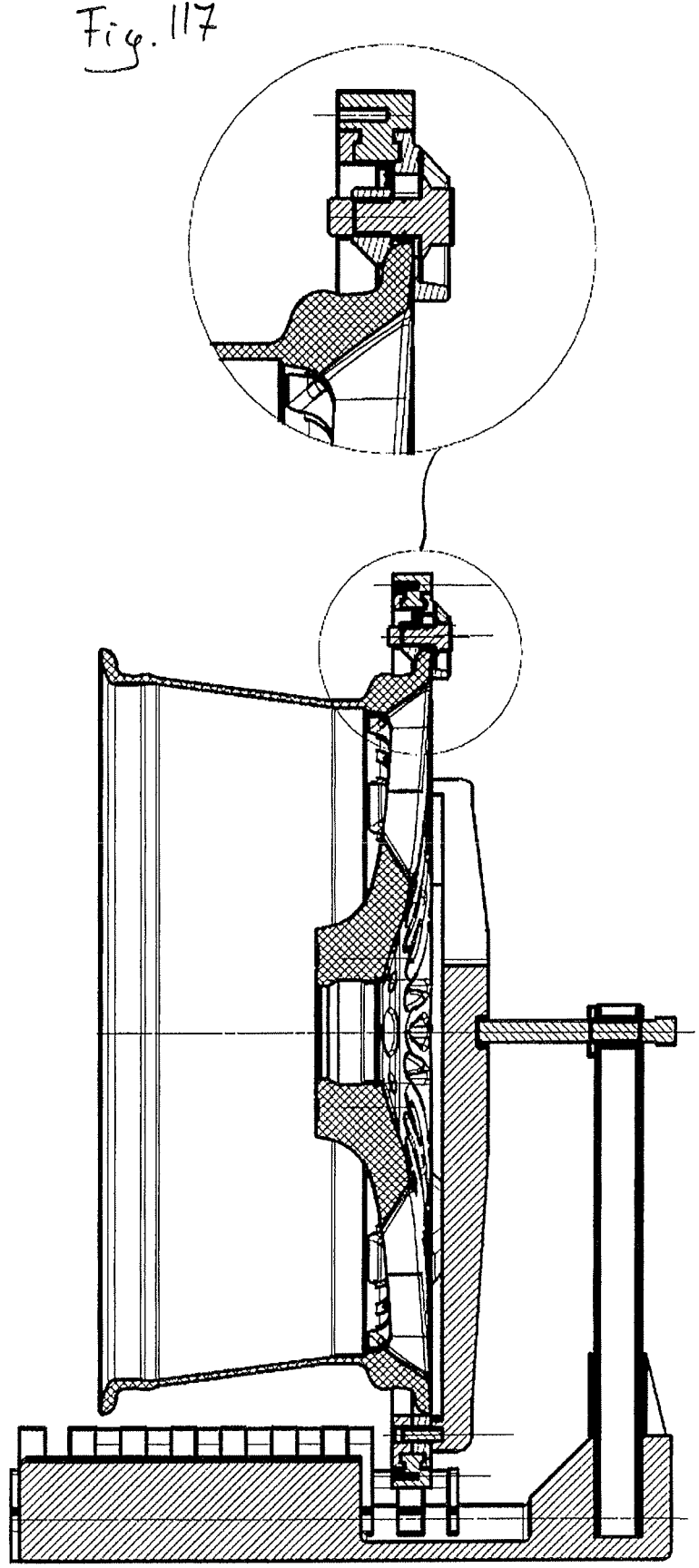
FIG. 117 the system from FIG. 115 in the mounted state.

The attachment according to FIGS. 115 to 117 has clamping devices in the form of sliders 310 braced radially inwards. The sliders 310 braced radially inwards have a contacting surface 312, which is formed complementary to the inner contour of the rim flange 10. To guarantee a precisely defined position of the attachment 14 on the rim flange 10, the attachment 14 has contact sections 38 arranged offset to the spring-pretensioned sliders 310. When pressed onto the rim or the tire 3, the spring-pretensioned sliders 310 move radially outwards and simultaneously push the tire 3 away from the rim flange 10 in axial direction A. As soon as the spring-pretensioned sliders 310 get behind the rim flange 10 with their tip, they contact and engage behind the rim flange 10 from axially inside with their contact surface 312 matched to the rim contour. The rim flange 10 is arranged precisely between a contact surface 38 (which is not additionally shown in the figures) and the spring-pretensioned sliders 310. The tread section 16 can then be braced via the fastening means 314 against the radially pretensioned sliders 310, so that the radially pretensioned sliders 310 are fixed in their radial position and the tread section 16 is pressed in an axial direction against the tire or the rim flange 10. The rim flange 10 is then braced between the tread section 16 or its contact surface 38 and the radially pretensioned sliders 310. Mounting of the pertinent attachment is then complete.

Figure 118:
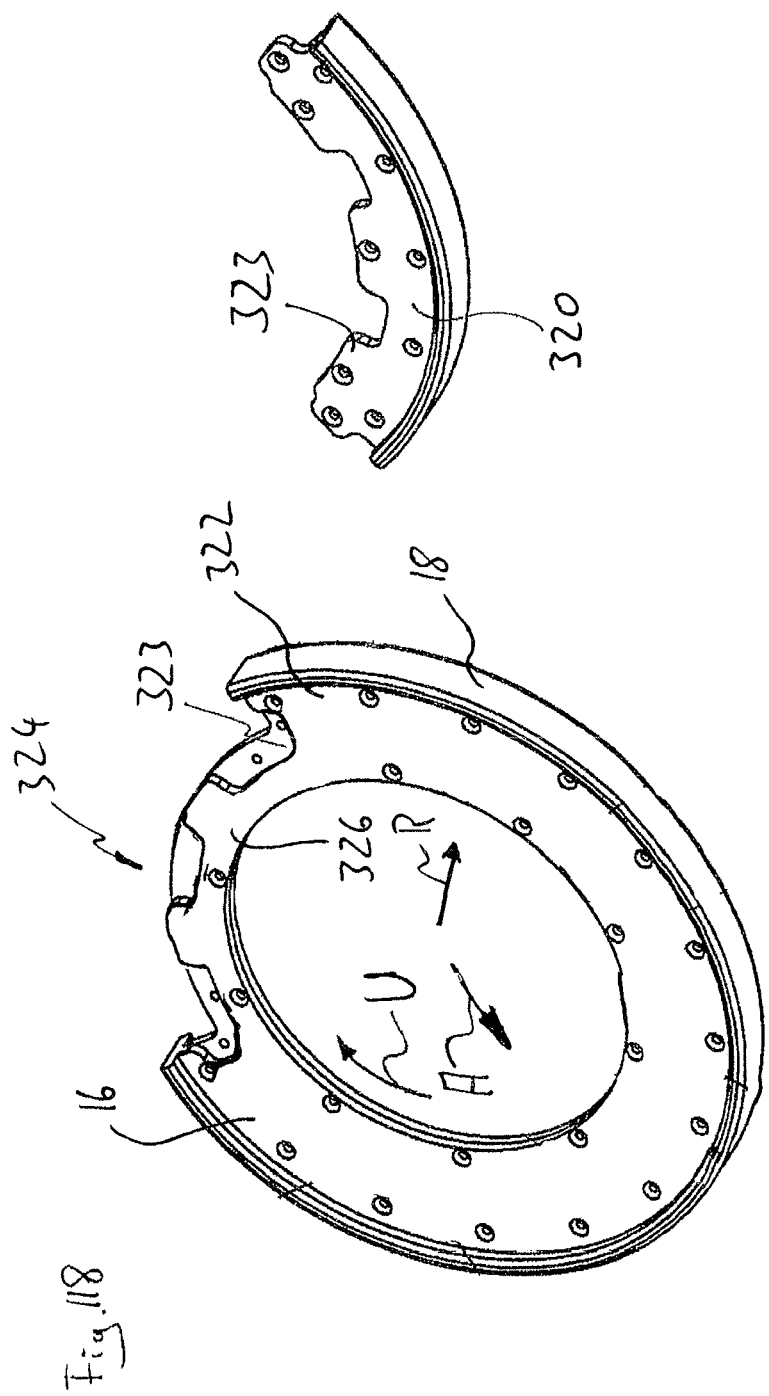
FIG. 118 a tread section 16.

The tread section 16 can (as already mentioned) be constructed continuously in circumferential direction U, the tread 18 comprising a withdrawable circumferential segment 320 (removable part), which is illustrated in FIG. 118. It can thus be provided that a radially outer part 322 of the tread section 16 has a circumferential interruption 324, while a radially inner part 326 of the tread section 16 is closed in circumferential direction U and thus the tread section 16 is constructed continuously in itself. To facilitate a fixed and secure connection of the withdrawable circumferential segment 320 to the remaining tread section 16, it can be provided (as shown in FIG. 118) that, when looking in an axial direction at the withdrawable circumferential segment 320 and the remaining tread section 16, overlapping areas 323 are present, so that both parts rest flat on one another in the connected state in the plane extending orthogonal to axial direction A.

In FIGS. 119 and 120, a tread section 16 is shown in which the damping device 87 comprises several spring elements 236 arranged distributed in the circumferential direction U. The spring elements 236 are designed as spiral springs 316 arranged extending in circumferential direction U. The spiral springs 316 rest radially outside on the tread body 48 and radially inside on the metal structure of the tread section 16. As is clearly depicted in FIG. 119, the spiral springs 316 are encased in an axial direction on both sides by the metal structure of the tread section 16 and held in their position.

FIGS. 121 and 122 illustrate another option for designing a damping device 87. The damping device 87 can thus comprise a media chamber 318, which is filled with a liquid 328 (represented by curved lines), in particular a high-viscosity medium (e.g. glycerine). The media chamber 318 here comprises sub-chambers 330, which are each connected fluidically to one another. Connection sections 332 of the sub-chambers 330 to one another have a higher flow resistance (bottlenecks in the flow cross section) than the sub-chambers 330. The flow resistance is meant with reference to a flow of the liquid 328 taking place in circumferential direction U here. As shown in FIG. 122, the tread section 16 for encasing the media chamber 318 can comprise axially separate segments of the tread section 16, which are connectable to one another.

FIG. 123 illustrates another option for designing a damping device 87. The damping device 87 is formed separately from the tread body 48. Here the damping device 87 comprises a pressure chamber 334, which is formed radially on the inside and separately from the tread body 48. The pressure chamber 334 has a connection 336 for the application of pressure medium.

FIG. 124 illustrates another option for designing a damping device 87. The damping device is formed by means of a tread body 48, which comprises a pressure chamber 338, which is or can be acted upon by a pressure medium (filled with a medium, in particular a gas with long molecule chains or nitrogen and closed gas-tight). The pressure chamber 338 is designed and arranged here so that the tread 18 is damped during the rolling process of the tread 18 over the road by the pressure medium located in the pressure chamber 338. The pressure chamber 338 is acted upon by pressure medium preferably via a check valve.

The tread body 48 is designed in (two parts) multiple parts to form the pressure chamber 338. A main body 340 is sealed by a sealing element 342 so that the pressure chamber 338 is formed between the main body 340 and the sealing element 342.

FIG. 125 illustrates another attachment 14 according to the invention. FIG. 126 shows a sectional view through an area around a clamping device and a protective strip slider mechanism 420 of the attachment 14 from FIG. 125.

As is clearly recognisable from FIG. 126, the clamping device 20 is pretensioned via a spring mechanism implemented in this case as a spiral spring 422 into a position pivoted axially inwards. The protective strip slider mechanism 420 is arranged extending further outwards in a radial direction than the clamping device 20.

In FIG. 127, the assembly section of the attachment from FIG. 125 is depicted in detail. As is clearly recognisable there, a protective strip slider mechanism 420 is arranged on each of the individual clamping devices 20. The protective strip slider mechanism 420 is designed and arranged so that it can engage on the protective strip 426 (see FIG. 128) of the tire on which the attachment 14 is to be fastened. For this purpose it has a section 424 protruding in radial direction R that can catch the protective strip, so to speak, from radially inside and can move this radially outwards. The protective strip slider mechanism 420 can be moved to this end in radial direction R together with the clamping devices 20. The movement mechanism for this is likewise realised via a central thread 212 and a threaded rod, which engages in the clamping devices 20, in a manner similar to that realised in the embodiments described previously.

The process of rear engagement of the rim flange 10 by the clamping devices 20 with this implementation is illustrated in FIGS. 128 to 130.

It is shown in FIG. 128 how the clamping device 20 is pivoted axially outwards against its spring pretensioning.

The protective strip slider mechanism 420 does not contact the protective strip 426 just yet. The clamping device 20 with protective strip slider mechanism 420 located thereon is moved radially outwards. The protective strip slider mechanism 420 then engages in the protective strip 426 from radially inside and thereby slides the tire 3 axially outwards and lifts it from the rim flange 10. The clamping device 20 is moved into the position shown in FIG. 129, the tire being lifted slightly from the rim flange 10 by the grip of the protective strip slider mechanism 420 on the protective strip 426. It is possible hereby for the clamping device 20 to act on the rim flange 10 as shown in FIG. 129. Due to light pressure in axial direction A, the clamping device 20 now moves into the rear engagement position with the rim flange 10, as the tire raised by the protective strip slider mechanism 420 no longer opposes the movement of the clamping device 20.

The clamping device 20 and the protective strip slider mechanism 420 are then moved radially inwards (by a movement reversal by means of the tool application point 26) and finally moved radially inwards into the position of FIG. 130. In this position the clamping device 20 engages in a positive-locking manner behind the rim flange 10 and rests close to this with its section formed complementary to the rim flange 10. Due to actuation of the tool application point 26, all 3 clamping devices 20 of the attachment perform the movement sequence just described and finally all three clamping devices 20 of the attachment 14 move hereby into the configuration shown in FIG. 130. The assembly section 22 is then securely fastened to the rim flange 10. The tread section 16 can then be fastened, as illustrated in FIG. 130, by means of the fastening device 44 on the tread section 16 or the clamping devices 20, as already described in connection with other embodiments. In the case of the attachment in FIGS. 125 to 130, the assembly section is therefore designed so that it is provided that the clamping devices 20 are initially moved radially outwards. By means of the protective strip slider mechanism 420 the tire 3 or its part resting on the rim flange 10 is hereby moved away from the rim flange 10. When the clamping devices 20 are moved far enough radially outwards, so that they can sit on the rim flange 10 (position shown in FIG. 129), it is provided that the movement direction is reversed and the clamping devices are moved radially inwards. Due to the course of the rear grip section of the clamping devices 20, these slide in a movement directed radially inwards into complete rear engagement with the rim flange 10 (FIG. 130).

FIGS. 131 to 134 illustrate another attachment 14 according to the invention. The attachment 14 from said figures has a pivotable clamping device 20, the pivotable clamping device 20 being pivotable, by way of a pressure movement directed radially outwards of an actuating element 440, inwards into a rear engagement position with the rim flange 10 (transition from FIG. 132 into the position of FIG. 133). The clamping device 20 is articulated pivotably for this purpose with an axially inner pivot axis with respect to a basic body of the assembly section 22. The axially internal pivot axis has the reference character 442 in FIG. 133. An axially outer connecting axis of an actuating frame 444 has the reference character 446. The connecting axis 446 is pivotable with respect to the axis 442 by a push or pull movement of the actuating element 440. The clamping device 20 is pivotable hereby in axial direction A into a rear engagement position with the rim flange 10 or movable out of this position. The clamping device 134 as well as the axes 442 and 446 are shown again in detail in FIG. 134. The actuating element 440 is arranged spring-mounted inside the actuating frame 444. A threaded rod 30 (or coupling agent 30) extends in each case from the central transmission 212 to the clamping devices 20. The actuating element 440 of the respective clamping device 20 is mounted on the threaded rods 30 such that the actuating element 440 can be moved radially inwards or outwards by a rotational movement of the threaded rod 30. The respective actuating elements 440 are arranged in the respective actuating frame 444 so that they each locate a stop on the actuating frame 444 on a movement directed radially inwards or outwards. The actuating frame 444 can thus be moved radially inwards or outwards by a rotational movement of the respective threaded rod 30. The actuating frame 444 is articulated pivotably on the respective clamping device 20 on its second axis 446. In a movement directed radially inwards or outwards of the actuating frame 444, this pivots on the one hand with respect to the clamping device and thus moves its second axis 446 radially inwards or outwards, whereby the clamping device 20 as a whole is pivoted about the axis 442 so that it is pivotable into or out of the rear engagement position with the rim flange 10.

The invention claimed is:

1. An attachment for a vehicle wheel, wherein the vehicle wheel has a rim and a tire arranged on the rim, the attachment for enabling a driving operation with a restricted tire function in an operating state in which the attachment is fastened on the vehicle wheel, the attachment comprising:
    a stationary section configured to be fastened immovably with respect to the rim in the operating state in which the attachment is fastened on the vehicle wheel,
    a tread section with a tread for contacting the road in the operating state in which the attachment is fastened on the vehicle wheel, and
    at least two clamping devices configured to engage behind a section of the rim to fasten the attachment on the vehicle wheel,
    wherein the tread includes at least one tread segment arranged movably in a circumferential direction with respect to the stationary section in the operating state in which the attachment is fastened on the vehicle wheel.

2. The attachment according to claim 1, further comprising an assembly section configured to be coupled to the rim in a position lying radially inside of the tread,
    and wherein at least a part of the tread section is detachable from the assembly section.

3. The attachment according to claim 1, wherein the at least two clamping devices are arranged on the tread section,
    and wherein the attachment further comprises a bracing unit configured to move the at least two clamping devices into engagement behind the section of the rim, wherein the bracing unit is detachable from the tread section and is configured to be removed from the attachment in the operating state with the at least two clamping devices engaged behind the section of the rim.

4. The attachment according to claim 3, wherein the bracing unit comprises a support device configured and arranged to support the bracing unit in an axial direction from the rim.

5. The attachment according to claim 3, wherein the bracing unit comprises rigid force transmission means, shortenable in a radial direction, for connection to the at least two clamping devices.

6. The attachment according to claim 5, wherein the force transmission means is configured to be couplable to the at least two clamping devices such that the at least two clamping devices are movable into engagement behind the section of the rim due to a shortening of radial extension of the force transmission means.

7. The attachment according to claim 3, wherein the force transmission means is configured to be coupled detachably to the at least two clamping devices via a positive engagement with the at least two clamping devices.

8. The attachment according to claim 1, wherein the stationary section comprises an annular section, and wherein the attachment further comprises a number of tread segments distributed on the annular section in a circumferential direction, such that each of the number of tread segments is movable with respect to the stationary segment in the circumferential direction, or wherein the tread section is configured such that the entire tread is arranged rotatably around an axial direction with respect to the annular section.

9. The attachment according to claim 8, wherein the tread segments are mounted on the annular section in the circumferential direction, by way of at least one of (i) elastic elements arranged between individual ones of the number of tread segments and configured to support the number of tread segments movably relative to one another, and (ii) elastic elements configured to brace the tread segments movably with respect to the annular section.

10. The attachment according to claim 8, wherein an annular section of the tread section has at least two segments, seen in a circumferential direction and configured to be at least one of detachable from one another and pivotable or displaceable relative to one another.

11. The attachment according to claim 1, further comprising:

a tread body which forms the tread or a segment of the tread, and at least one heat conduction element.

12. The attachment according to claim 11, wherein the tread section comprises two elements braced against one another in an axial direction and between which the at least one heat conduction element is arranged.

13. The attachment according to claim 1, further comprising:

a bracing mechanism, and an actuating device responsive to actuation to cause the bracing mechanism to move the at least two clamping devices into a position of the rear engagement behind the section of the rim and to move the tread section in an axial direction towards the rim.

14. The attachment according to claim 13, wherein the bracing mechanism comprises at least one of a tool application point and a drive configured to be responsive to an applied force to actuate the actuating device.

15. The attachment according to claim 14, wherein the bracing mechanism has a transmission configured to convert a rotating drive movement of an actuating element of the actuator into translational movement of the at least two clamping devices, and wherein the transmission is further configured to move the tread section in the axial direction toward the rim.

16. The attachment according to of claim 1, wherein the attachment further comprises a drive-off aid configured to aid in directing the attachment out of a groove-shaped indentation in a road, and wherein the drive-off aid comprises an area of the tread projecting in an axial direction.

17. The attachment according to claim 1 wherein the tread section comprises a damping device for damping the tread in a radial direction.

18. The attachment according to claim 17, wherein the damping device comprises at least one spring element having a radially outer area supporting a tread body radially outwards and a radially inner area resting on a base body of the tread section, wherein the tread body forms the tread or a segment of the tread.

19. The attachment according to claim 1, further comprising a pressure-generating device configured to compress a fluid medium by rotational movement of the attachment along a road.

20. The attachment according to claim 19, wherein the pressure-generating device comprises at least one cavity defined radially inside of the tread, wherein the fluid medium is located within the at least one cavity, the at least one cavity having section configured to move in response to the rotational movement of the attachment along the road so as to reduce a volume of the at least one cavity and thereby compress the fluid medium located therein.

21. The attachment according to claim 1, wherein at least one of the at least two clamping devices is pretensioned into a position lying radially inwards.

22. The attachment according to claim 21, wherein the pretensioning of the at least one of the at least two clamping devices is lockable and releasable by a locking device.

23. The attachment according claim 1, wherein at least one of the at least two clamping devices has a fastening section including a fastening device configured to fasten the tread section on the at least one of the at least two clamping devices and to secure the tread section in an axial direction against play with respect to the at least one of the at least two clamping devices.

24. The attachment according to claim 23, wherein the fastening device is configured to move the tread section, upon fastening the tread section on the at least one of the two clamping devices, in the axial direction towards the rim.

25. The attachment according to claim 1, further comprising an assembly section having two limbs, wherein at least one of the at least two clamping devices is arranged on each of the two limbs, and wherein the two limbs are configured to be pivotable relative to one another to vary a spacing of the at least one of the at least two clamping devices on the limbs.

26. The attachment according to claim 25, wherein the assembly section comprises a clamping device arrangement in which one of the at least two clamping devices is held, and wherein the two limbs extend away from the clamping device arrangement and are each arranged pivotably with respect to the clamping device arrangement.

* * * * *